(12) United States Patent
Knudson et al.

(10) Patent No.: US 8,001,563 B2
(45) Date of Patent: Aug. 16, 2011

(54) INTERACTIVE PROGRAM GUIDE SYSTEM AND METHOD

(75) Inventors: Edward B. Knudson, Littleton, CO (US); Michael D. Ellis, Boulder, CO (US); W. Benjamin Herrington, Tulsa, OK (US); Steven C. Williamson, Broken Arrow, OK (US); Pamela L. McKissick, Tulsa, OK (US); William L. Thomas, Malvern, PA (US); David M. Berezowski, Tulsa, OK (US); Kenneth F. Carpenter, Jr., Mount Laurel, NJ (US); Jeffrey Ross, Littleton, CO (US); Daniel C. Hagenbuch, Holland, PA (US); Steven J. Reynolds, Littleton, CO (US); David M. Rudnick, Denver, CO (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 12/632,471

(22) Filed: Dec. 7, 2009

(65) Prior Publication Data

US 2010/0205634 A1 Aug. 12, 2010

Related U.S. Application Data

(63) Continuation of application No. 11/788,002, filed on Apr. 17, 2007, now abandoned, which is a continuation of application No. 10/929,361, filed on Aug. 26, 2004, now abandoned, which is a continuation of application No. 09/357,941, filed on Jul. 16, 1999, now abandoned.

(60) Provisional application No. 60/110,262, filed on Nov. 30, 1998.

(51) Int. Cl.
H04N 5/54 (2006.01)
H04N 7/16 (2006.01)
(52) U.S. Cl. ........................................................ 725/38
(58) Field of Classification Search .............. 725/38–59; 348/734
See application file for complete search history.

(56) References Cited

U.S. PATENT DOCUMENTS 4,162,513 A * 7/1979 Beyers et al. .................. 348/570
(Continued)

FOREIGN PATENT DOCUMENTS

JP 09083888 A 3/1997
(Continued)

OTHER PUBLICATIONS

Matthew D. Miller, A Scenario for the Deployment of Interactive Multimedia Cable Television Systems in the United States in the 1990's, (©1994), pp. 585-589.
(Continued)

*Primary Examiner* — Andrew Y Koenig
*Assistant Examiner* — Carmine Malangone
(74) *Attorney, Agent, or Firm* — Ropes & Gray LLP

(57) ABSTRACT

An interactive television program guide system and method is provided. Time separators are displayed within lists of program listings to allow users to more easily view the program listings. On-screen arrows have their display characteristics changed according to user actions. Similar program listings are displayed only once when using search program listings. Users are provided with an opportunity to view channel information before setting channels as favorites. Information from local information services is provided in program guide display screens that are configurable by a main facility. Users are provided with an opportunity to centrally lock and unlock programs, and to bypass locks when desired.

6 Claims, 129 Drawing Sheets

U.S. PATENT DOCUMENTS

| | | | |
|---|---|---|---|
| 4,355,415 A | | 10/1982 | George et al. |
| 4,605,964 A | | 8/1986 | Chard |
| 4,694,490 A | | 9/1987 | Harvey et al. |
| 4,718,107 A | | 1/1988 | Hayes |
| 4,857,999 A | | 8/1989 | Welsh |
| 4,908,707 A | | 3/1990 | Kinghorn |
| 4,924,303 A | | 5/1990 | Brandon et al. |
| 4,930,158 A | | 5/1990 | Vogel |
| 4,959,720 A | | 9/1990 | Duffield et al. |
| 4,977,455 A | | 12/1990 | Young |
| 5,020,139 A | * | 5/1991 | Keenan ................ 455/151.2 |
| 5,109,279 A | | 4/1992 | Ando |
| 5,134,719 A | | 7/1992 | Mankovitz |
| 5,172,413 A | | 12/1992 | Bradley et al. |
| 5,200,822 A | | 4/1993 | Bronfin et al. |
| 5,253,066 A | | 10/1993 | Vogel |
| 5,305,435 A | | 4/1994 | Bronson |
| 5,317,403 A | * | 5/1994 | Keenan ..................... 725/38 |
| 5,335,277 A | | 8/1994 | Harvey et al. |
| 5,382,983 A | | 1/1995 | Kwoh et al. |
| 5,412,720 A | | 5/1995 | Hoarty |
| 5,442,389 A | | 8/1995 | Blahut et al. |
| 5,485,197 A | | 1/1996 | Hoarty |
| 5,517,257 A | | 5/1996 | Dunn et al. |
| 5,524,195 A | | 6/1996 | Clanton, III et al. |
| 5,539,449 A | | 7/1996 | Blahut et al. |
| 5,541,738 A | | 7/1996 | Mankovitz |
| 5,548,338 A | | 8/1996 | Ellis et al. |
| 5,550,576 A | | 8/1996 | Klosterman |
| 5,576,755 A | | 11/1996 | Davis et al. |
| 5,583,561 A | | 12/1996 | Baker et al. |
| 5,583,563 A | | 12/1996 | Wanderscheid et al. |
| 5,585,838 A | | 12/1996 | Lawler et al. |
| 5,589,892 A | | 12/1996 | Knee et al. |
| 5,592,551 A | | 1/1997 | Lett et al. |
| 5,596,373 A | | 1/1997 | White et al. |
| 5,602,582 A | | 2/1997 | Wanderscheid et al. |
| 5,619,274 A | | 4/1997 | Roop et al. |
| 5,629,733 A | | 5/1997 | Youman et al. |
| 5,630,119 A | | 5/1997 | Aristides et al. |
| 5,635,978 A | | 6/1997 | Alten et al. |
| 5,635,987 A | | 6/1997 | Park et al. |
| 5,635,989 A | | 6/1997 | Rothmuller |
| 5,652,612 A | | 7/1997 | Chiulli et al. |
| 5,654,748 A | * | 8/1997 | Matthews, III .............. 725/14 |
| 5,654,886 A | | 8/1997 | Zereski, Jr. et al. |
| 5,657,072 A | | 8/1997 | Aristides et al. |
| 5,666,645 A | | 9/1997 | Thomas et al. |
| 5,684,525 A | | 11/1997 | Klosterman |
| 5,694,163 A | | 12/1997 | Harrison |
| 5,694,176 A | | 12/1997 | Bruette et al. |
| 5,696,765 A | | 12/1997 | Safadi |
| 5,699,107 A | | 12/1997 | Lawler et al. |
| 5,708,961 A | | 1/1998 | Hylton et al. |
| 5,717,452 A | | 2/1998 | Janin et al. |
| 5,721,829 A | | 2/1998 | Dunn et al. |
| 5,745,710 A | | 4/1998 | Clanton, III et al. |
| 5,751,282 A | | 5/1998 | Girard et al. |
| 5,752,159 A | | 5/1998 | Faust et al. |
| 5,754,771 A | | 5/1998 | Epperson et al. |
| 5,754,940 A | | 5/1998 | Smith et al. |
| 5,758,259 A | | 5/1998 | Lawler |
| 5,760,821 A | | 6/1998 | Ellis et al. |
| 5,768,528 A | | 6/1998 | Stumm |
| 5,778,182 A | | 7/1998 | Cathey et al. |
| 5,781,226 A | | 7/1998 | Sheehan |
| 5,781,228 A | | 7/1998 | Sposato |
| 5,781,246 A | | 7/1998 | Alten et al. |
| 5,793,438 A | | 8/1998 | Bedard |
| 5,796,952 A | | 8/1998 | Davis et al. |
| 5,801,787 A | | 9/1998 | Schein et al. |
| 5,802,284 A | | 9/1998 | Karlton et al. |
| 5,805,204 A | | 9/1998 | Thompson et al. |
| 5,805,763 A | | 9/1998 | Lawler et al. |
| 5,805,804 A | | 9/1998 | Laursen et al. |
| 5,808,694 A | | 9/1998 | Usui et al. |
| 5,809,204 A | | 9/1998 | Young et al. |
| 5,812,123 A | | 9/1998 | Rowe et al. |
| 5,818,438 A | | 10/1998 | Howe et al. |
| 5,819,019 A | | 10/1998 | Nelson |
| 5,828,945 A | | 10/1998 | Klosterman |
| 5,844,620 A | | 12/1998 | Coleman et al. |
| 5,850,218 A | | 12/1998 | LaJoie et al. |
| 5,880,768 A | | 3/1999 | Lemmons et al. |
| 5,892,498 A | | 4/1999 | Marshall et al. |
| 5,963,269 A | * | 10/1999 | Beery ......................... 348/570 |
| 5,990,927 A | | 11/1999 | Hendricks et al. |
| 6,002,394 A | | 12/1999 | Schein et al. |
| 6,049,333 A | | 4/2000 | LaJoie et al. |
| 2003/0133050 A1 | * | 7/2003 | Shintani et al. ............. 348/734 |

FOREIGN PATENT DOCUMENTS

| | | |
|---|---|---|
| WO | WO 8804507 A1 | 6/1988 |
| WO | WO 9322877 A2 | 11/1993 |
| WO | WO 9501059 A1 | 1/1995 |
| WO | WO 9532583 A1 | 11/1995 |
| WO | WO 9634491 A1 | 10/1996 |
| WO | WO 9641471 A1 | 12/1996 |
| WO | WO-9713368 A1 | 4/1997 |
| WO | WO-9718673 A1 | 5/1997 |
| WO | WO-9732434 A1 | 9/1997 |
| WO | WO-9734414 A1 | 9/1997 |
| WO | WO-9746943 A1 | 12/1997 |
| WO | WO-9747124 A1 | 12/1997 |
| WO | WO-9748230 A1 | 12/1997 |
| WO | WO-9826584 A1 | 6/1998 |
| WO | WO-9826596 A1 | 6/1998 |
| WO | WO-9839893 A2 | 9/1998 |
| WO | WO-9843183 A1 | 10/1998 |
| WO | WO-9847287 A1 | 10/1998 |
| WO | WO-9856173 A1 | 12/1998 |
| WO | WO-9903267 A1 | 1/1999 |
| WO | WO-9903271 A1 | 1/1999 |
| WO | WO-9966725 A1 | 12/1999 |
| WO | WO-0002380 A2 | 1/2000 |

OTHER PUBLICATIONS

"Electronic Programme Guide (EPG); Protocol for a TV Guide using electronic data transmission" by European Telecommuniation Standards Institute, May 1997, Valbonne, France, publication No. ETS 300 707.

Hartwig, Rautenberg, Bollmann, "Broadcasting and Processing of Program Guides for Digital TV", SMPTE Journal, pp. 727-732, Oct. 1997.

"Passport Complete FEature Set", from the Internet at http://www.pioneerdigital.com/prod/passport/passdfts.htm, printed on May 19, 1999, the document bears a copyright dtae of 1999.

* cited by examiner

INTERACTIVE PROGRAM GUIDE SYSTEM AND METHOD

This application is a continuation of U. S. patent application Ser. No. 11/788,002, filed on Apr. 17, 2007 now abandoned, which is a continuation of U.S. patent application Ser. No. 10/929,361, filed on Aug. 26, 2004 now abandoned, which is a continuation of U.S. patent application Ser. No. 09/357,941, filed on Jul. 16, 1999 now abandoned, which claims the benefit of U.S. Provisional application Ser. No. 60/110,262 filed Nov. 30, 1998. Each of these applications is hereby incorporated in their entirety herein by reference.

BACKGROUND OF THE INVENTION

This invention relates to interactive television program guide systems, and more particularly, to interactive television program guide systems with enhanced features and user interface.

Cable, satellite, and broadcast television systems provide viewers with a large number of television channels. Users have traditionally consulted printed television program schedules to determine the programs being broadcast at a particular time. More recently, interactive television program guides have been developed that allow television program information to be displayed on a user's television. Interactive television program guides, which are typically implemented on set-top boxes, allow the user to navigate through television program listings using a remote control. In a typical program guide, various groups of television program listings are displayed in predefined or user-selected categories. Program listings are typically displayed in a grid or table.

Interactive television systems to this point have displayed program related information in less than optimal ways. Some program guides do not allow users to continue to watch television while viewing program guide data. Other program guide systems display too much data for the user at once, overwhelming the user.

It is therefore an object of the present invention to provide an interactive television program guide system in which users are provided with easier access to various program guide functions through an enhanced user interface.

It is a further object of the present invention to provide an interactive television program guide system in which users are provided with the opportunity to access program related information, and other information in new ways.

SUMMARY OF THE INVENTION

These and other objects of the present invention are accomplished in accordance with the principles of the present invention by providing an interactive television program guide system in which television program listings and other television related information is displayed in a way that is visually pleasing to users and that is user friendly. In addition, the electronic television program guide of the present invention provides functions that have not been provided before by other electronic program guide systems.

In the electronic program guide system of the present invention, a main facility (e.g., a satellite uplink facility) provides data from a data source to a number of television distribution facilities (e.g., a cable system headend, a broadcast distribution facility, a satellite television distribution facility, or any other suitable distribution facility). There may be multiple data sources, some of which may be located at different facilities and have their data provided to the main facility for localization and distribution. The data transmitted by main facility to television distribution facility includes television programming data (e.g., titles, channels, content information, rating information, or any other information associated with television programming), and other program guide data for additional services other than television program listings (e.g., weather information, associated Internet web links, computer software, etc.).

The electronic program guide of the present invention may be provided in systems in which program guide data is distributed from a main facility to an interactive television program guide implemented on user television equipment, via a television distribution facility. Other suitable systems involve systems in which data is distributed to a program guide on user television equipment using other suitable distribution schemes, such as schemes involving data transmission over the Internet or the like. If desired, the interactive television program guide application may be implemented using a client-server architecture in which the primary processing power for the application is provided by a server located at, for example, the television distribution facility or the main facility and user television equipment acts as a client processor.

Further features of the invention, its nature and various advantages will be more apparent from the accompanying drawings and the following detailed description of the preferred embodiments.

BRIEF DESCRIPTION OF THE DRAWINGS

FIG. 6b shows how a channel may be indicated as a favorite in a BROWSE overlay.

DETAILED DESCRIPTION OF THE PREFERRED EMBODIMENTS

Figure 1:
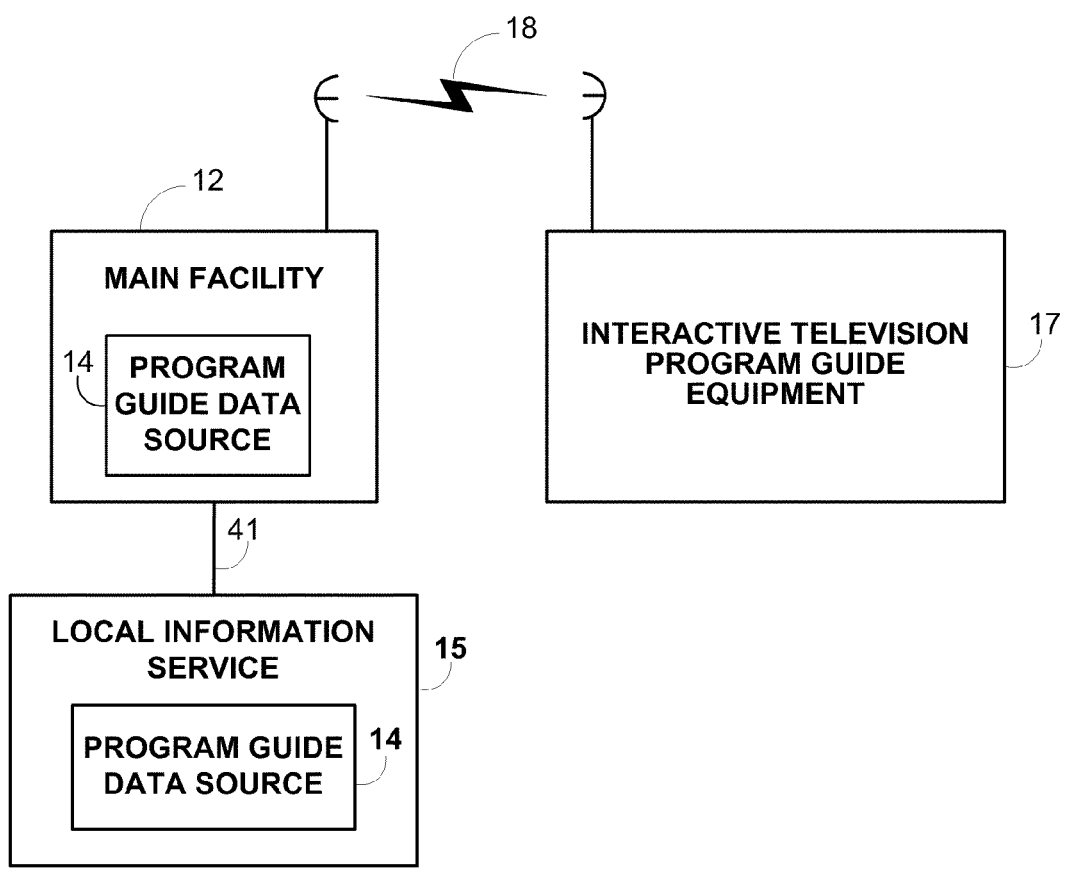
FIG. 1 is a schematic block diagram of an illustrative system in accordance with the present invention.

An illustrative system 10 in accordance with the principles of the present invention is shown in FIG. 1. Main facility 12 provides program guide data from program guide data source 14 to interactive television program guide equipment 17 via communications link 18. There may be multiple program guide data sources but only one has been shown to avoid overcomplicating the drawing. If desired, program guide data sources may be located at facilities separate from main facility 12, such as at local information services 15, and have their data provided to main facility 12 for localization and distribution. Data sources 14 may be any suitable computer or computer based system for obtaining data (e.g., manually from an operator, electronically via a computer network or other connection, or via storage media) and putting the data into electronic form for distribution by main facility 12. Link 18 may be a satellite link, a telephone network link, a cable or fiber optic link, a microwave link, an Internet link, a combination of such links, or any other suitable communications link. Video signals may also be transmitted over link 18 if desired.

Local information service 15 may be any suitable facility for obtaining data particular to a localized region and providing the data to main facility 12 over communications link 41. Local information source 41 may be, for example, a local weather station that measures weather data, a local newspaper that obtains local high school and college sporting information, or any other suitable provider of information. Local information source 15 may be a local business with a computer for providing main facility 12 with, for example, local ski reports, fishing conditions, menus, etc., or any other suitable provider of information. Link 41 may be a satellite link, a telephone network link, a cable or fiber optic link, a microwave link, an Internet link, a combination of such links, or any other suitable communications link.

The program guide data transmitted by main facility 12 to interactive television program guide equipment 17 may include television programming data (e.g., program identifiers, times, channels, titles, and descriptions) and other data for services other than television program listings (e.g., help text, pay-per-view information, weather information, sports information, music channel information, associated Internet web links, associated software, etc.). There are preferably numerous pieces or installations of interactive television program guide equipment 17, although only one is shown in FIG. 1 to avoid over-complicating the drawing.

Program guide data may be transmitted by main facility 12 to interactive television program guide equipment 17 using any suitable approach. Data files may, for example, be encapsulated as objects and transmitted using a suitable Internet based addressing scheme and protocol stack (e.g., a stack which uses the user datagram protocol (UDP) and Internet protocol (IP)). Systems in which program guide data is transmitted from a main facility to television distribution facilities are described, for example, in Gollahon et al. U.S. patent application Ser. No. 09/332,624, filed Jun. 11, 1999, which is hereby incorporated by reference herein in its entirety.

An interactive television program guide is implemented on interactive television program guide equipment 17. Four illustrative arrangements for interactive television program guide equipment 17 are shown in FIGS. 2a-2d. As shown, interactive television program guide equipment 17 may include program guide distribution equipment 21 located at television distribution facility 16, and user television equipment 22.

Figure 2A:
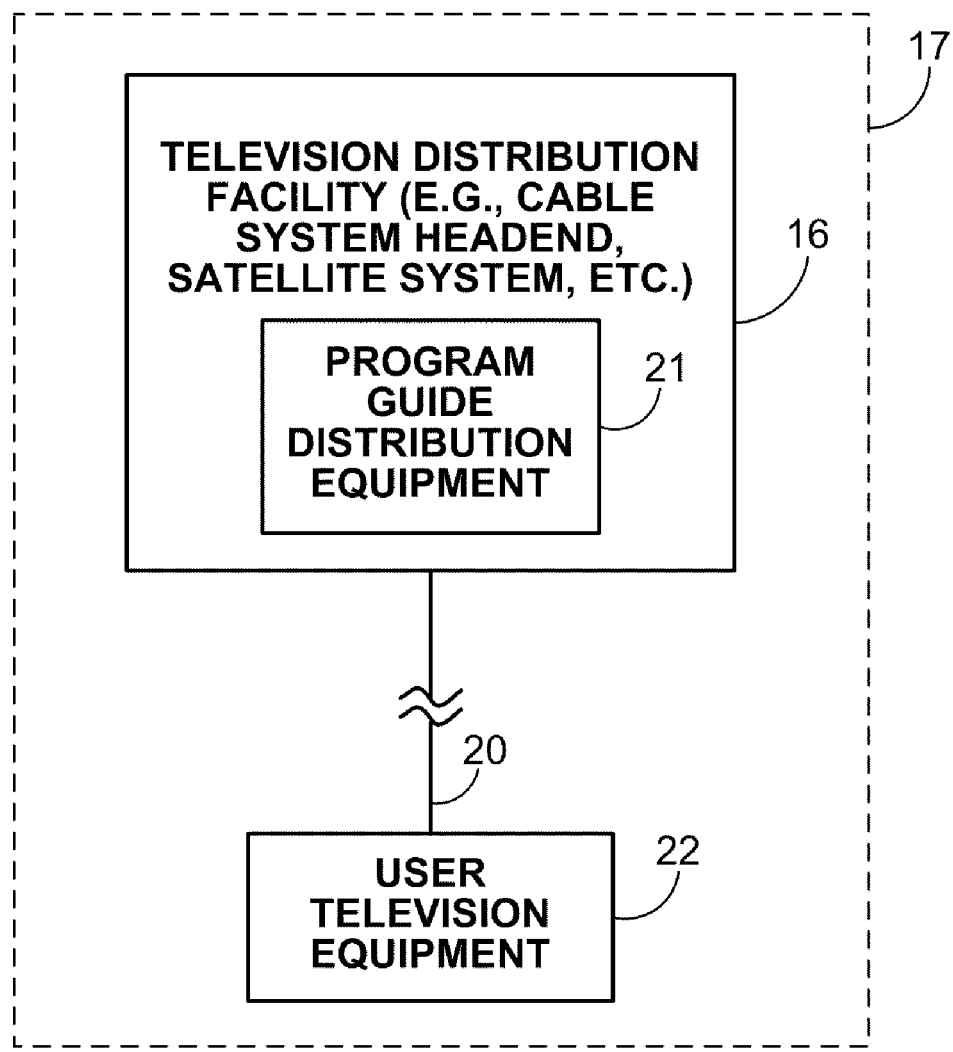
FIGS. 2a-2d show illustrative arrangements for the interactive program guide equipment of FIG. 1 in accordance with the principles of the present invention.
Figure 2B:
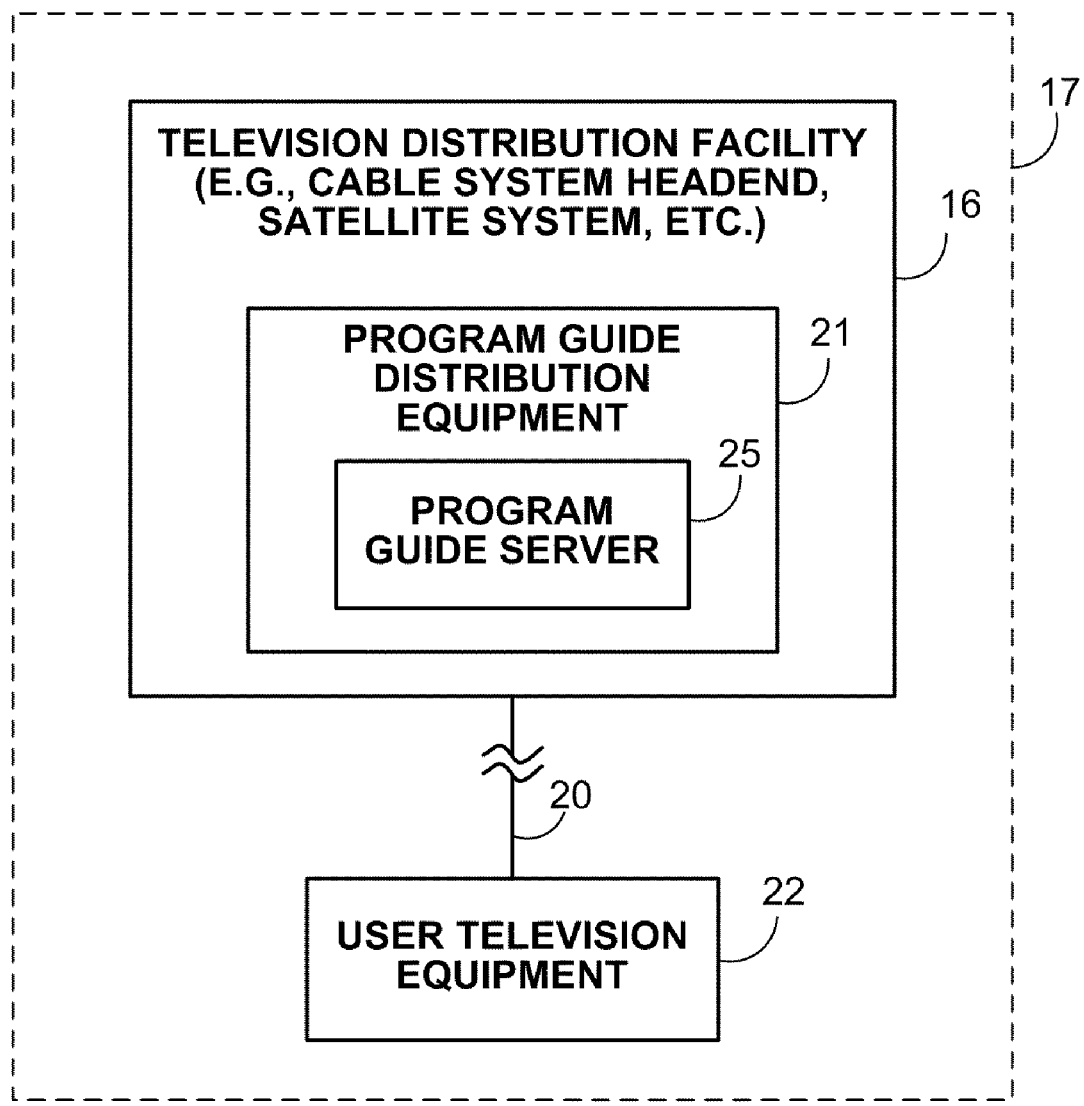
Figure 2C:
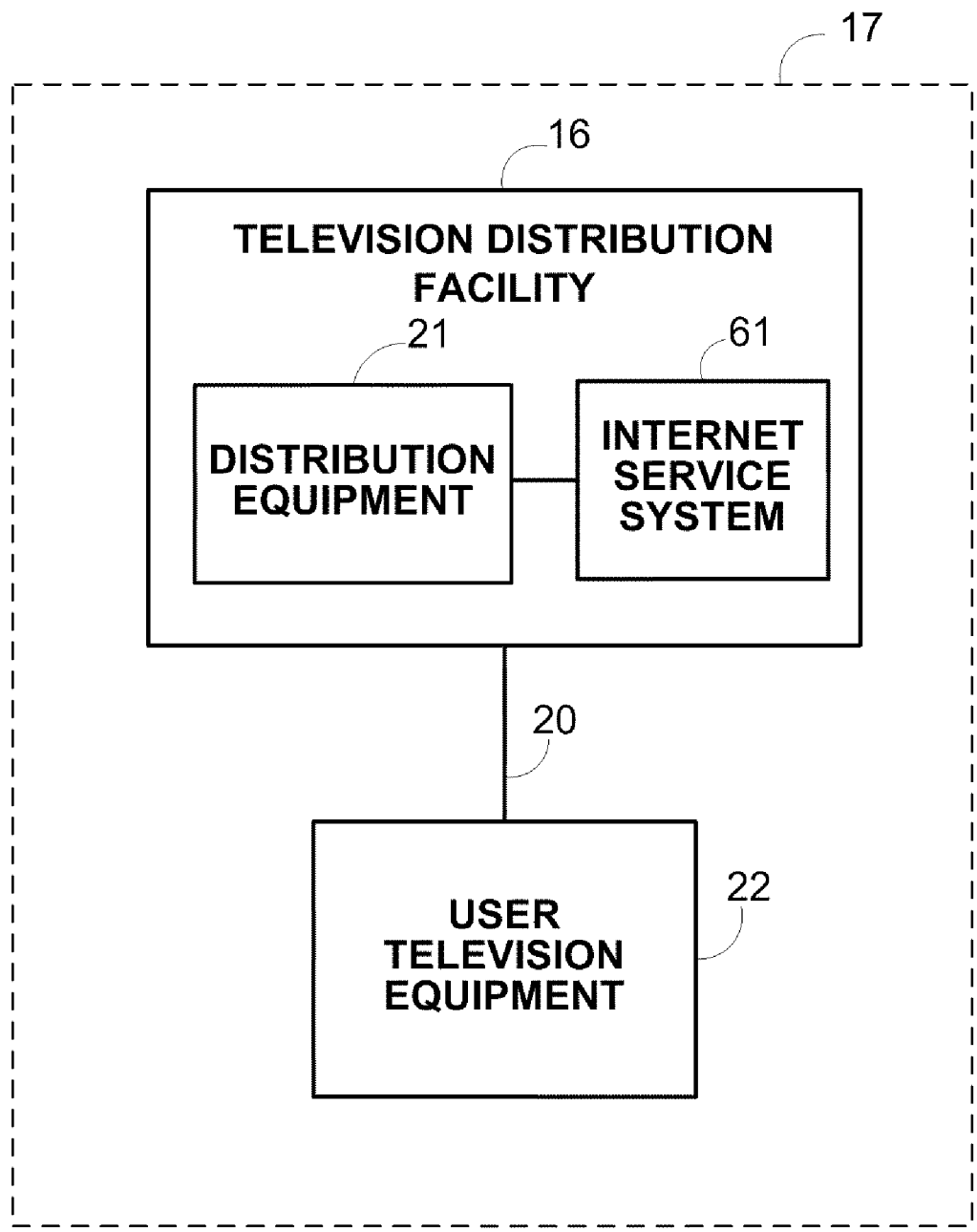
Figure 2D:
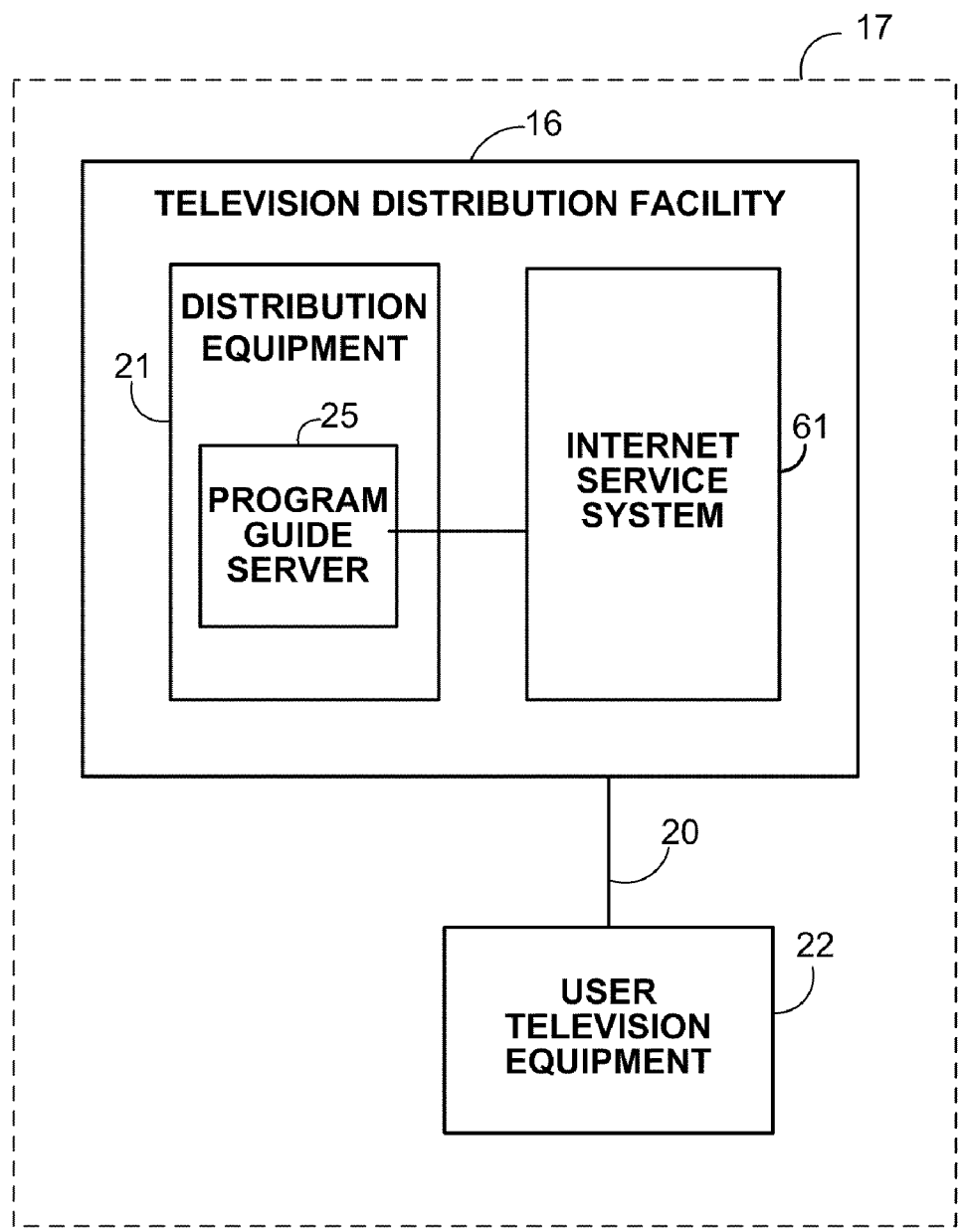

The interactive television program guide may run totally on user television equipment 22 as shown in FIGS. 2a and 2c, or may run partially on user television equipment 22 and partially on interactive television program guide equipment 17 using a suitable client-server or distributed processing approach as shown in FIGS. 2b and 2d. Television distribution facility 16 may be any suitable distribution facility (e.g., a cable system headend, a broadcast distribution facility, a satellite television distribution facility, or any other suitable type of television distribution facility). Television distribution facility 16 may have distribution equipment 21.

Distribution equipment 21 of FIGS. 2a, 2b, 2c, and 2d may be any equipment suitable for providing program guide data to user television equipment 22 over communications path 20. Distribution equipment 21 may include, for example, suitable transmission hardware for distributing program guide data on a television channel sideband, in the vertical blanking interval of a television channel, using an in-band digital signal, using an out-of-band digital signal, or by any other suitable data transmission technique. Analog or digital video signals (e.g., television programs) may also be distributed by distribution equipment 21 to user television equipment 22 over communications paths 20 on multiple television channels.

Communications paths 20 may be any communications paths suitable for distributing program guide data. Communications paths 20 may include, for example, a satellite link, a telephone network link, a cable or fiber optic link, a microwave link, an Internet link, a data-over-cable service interface specification (DOCSIS) link, a combination of such links, or any other suitable communications link. Communications paths 20 preferably have sufficient bandwidth to allow television distribution facility 16 to distribute television programming to user television equipment 22. There are typically multiple pieces of user television equipment 22 and multiple associated communications paths 20, although only one piece of user television equipment 22 and communications path 20 are shown in FIGS. 2a-2d to avoid over complicating the drawings. If desired, television programming may be provided over separate communications paths (not shown).

FIG. 2b shows an illustrative arrangement for interactive television program guide equipment 17 in a client-server based or distributed interactive program guide system. As shown in FIG. 2b, distribution equipment 21 may include program guide server 25. Program guide server 25 may be any suitable software, hardware, or combination thereof for providing a client-server based program guide. Program guide server 25 may, for example, run a suitable database engine (e.g., SQL Server by Microsoft) and provide program guide data in response to queries generated by a program guide client implemented on user television equipment 22. If desired, program guide server 25 may be located at main facility 12 (not shown).

The program guide may retrieve program guide data from program guide server 25 using any suitable client-server based approach. The program guide may, for example, pass SQL requests as messages to program guide server 25. In another suitable approach, the program guide may invoke remote procedures that reside on program guide server 25 using one or more remote procedure calls. Program guide server 25 may execute SQL statements for such invoked remote procedures. In still another suitable approach, client objects executed by the program guide may communicate with server objects executed by program guide server 25 using, for example, an object request broker (ORB). This may involve using, for example, Microsoft's Distributed Component Object Model (DCOM) approach.

The program guide may communicate with program guide server 25 or Internet service system 61 over communications path 20 using any suitable network and transport layer protocols, if desired. A protocol stack may be used which includes, for example, Sequenced Packet Exchange/Internetwork Packet Exchange (SPX/IPX) layers, Transmission Control Protocol/Internet Protocol (TCP/IP) layers, AppleTalk Transaction Protocol/Datagram Delivery Protocol (ATP/DDP) layers, or any other suitable network and transport layer protocols. If desired DOCSIS may also be used.

FIGS. 2c and 2d show illustrative Internet based interactive television program guide systems. Television distribution facility 16 may, for example, include Internet service system 61. Internet service system 61 may use any suitable combination of hardware and software capable of providing program guide data to the guide using an Internet based approach (e.g., the HyperText Transfer Protocol (HTTP)). If desired, Internet service system 61 may be located at a facility that is separate from program guide distribution facility 16.

If the program guide is implemented on user television equipment 22 of interactive television program guide equipment 17 as shown in FIG. 2c, Internet-service system 61 (or other suitable equipment at program guide distribution facility 16 that is connected to Internet service system 61) may provide program guide data to user television equipment 22 via the Internet, or via program guide distribution equipment 21 using any suitable Internet-based approach (e.g., using the HyperText Transfer Protocol (HTTP) or File Transfer Protocol (FTP) over a Transmission Control Protocol/Internet Protocol (TCP/IP) type link). If the program guide implemented on interactive television program guide equipment 17 is a client-server guide as shown in FIG. 2d, program guide server 25 may obtain program guide data from Internet service system 61. The program guide may also, however, obtain program guide data from Internet service system 61 via an Internet connection.

In still another embodiment, distribution equipment 21 may include suitable hardware (not shown) on which a first portion or version of the interactive television program guide is implemented. A second portion or version of the program guide may be implemented on user television equipment 22. The two versions or portions of the interactive program guide may communicate using any suitable peer-to-peer communications scheme (e.g., messaging, remote procedure calls, etc.) and perform interactive program guide functions distributively between television distribution facility 16 and user television equipment 22.

Figure 3:
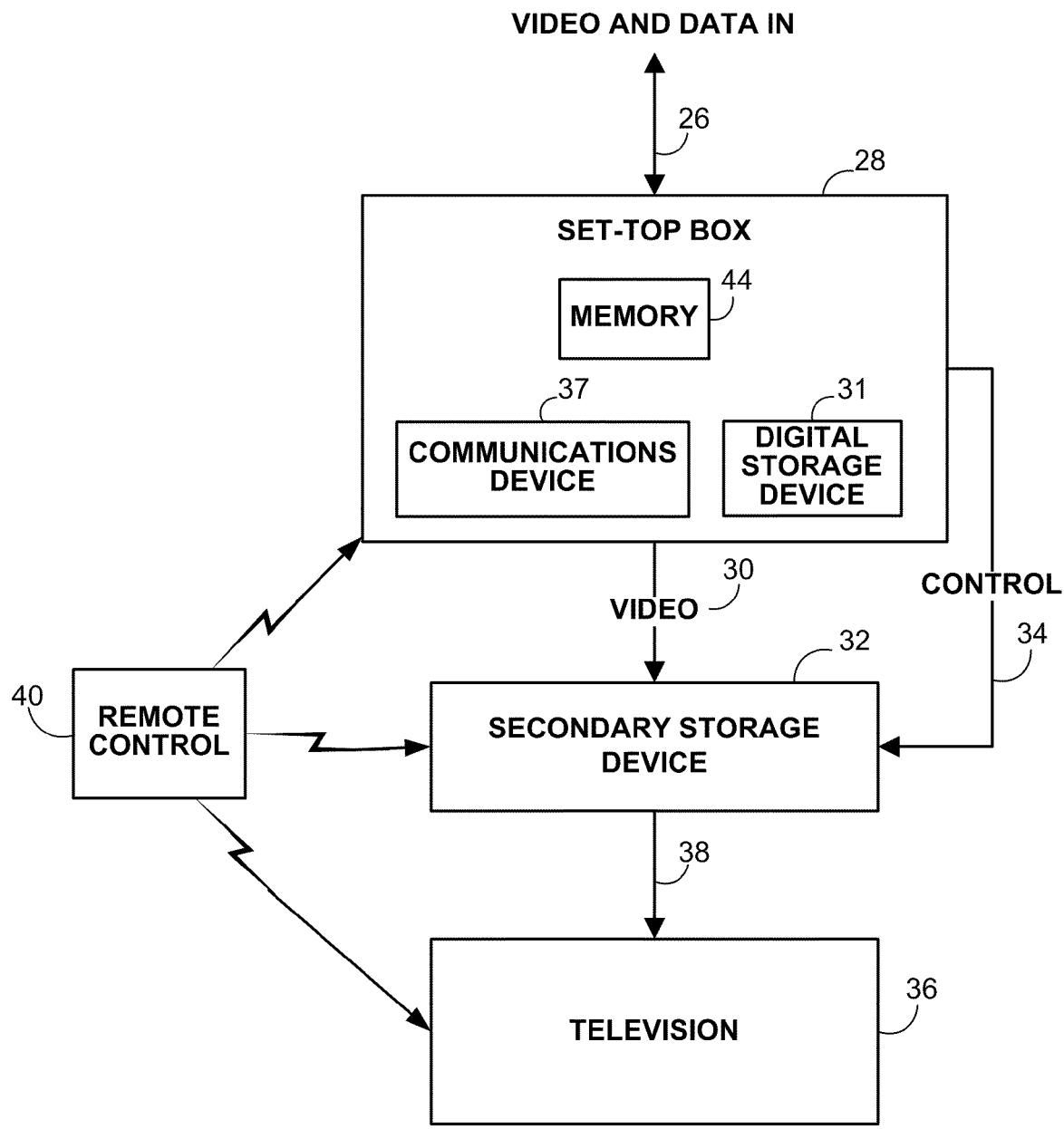
FIG. 3 is an illustrative schematic block diagram of a user television equipment of FIGS. 2a-2d in accordance with the principles of the present invention.

An illustrative arrangement for user television equipment 22 is shown in FIG. 3. User television equipment 22 of FIG. 3 receives video or a digital video stream and data from television distribution facility 16 (FIG. 1) at input 26. During normal television viewing, a user tunes set-top box 28 to a desired television channel. The signal for that television channel is then provided at video output 30. The signal supplied at output 30 is typically either a radio-frequency (RF) signal on a predefined channel (e.g., channel 3 or 4), or a analog demodulated video signal, but may also be a digital signal provided to television 36 on an appropriate digital bus (e.g., a bus using the Institute of Electrical and Electronics Engineers (IEEE) 1394 standard, (not shown)). The video signal at output 30 is received by optional secondary storage device 32.

The interactive television program guide may run on set-top box 28, on television 36 (if television 36 has suitable processing circuitry and memory), on a suitable analog or digital receiver connected to television 36, or on digital storage device 31 if digital storage device 31 has suitable processing circuitry and memory. The interactive television program guide may also run cooperatively on a suitable combination of these devices. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

Secondary storage device 32 can be any suitable type of analog or digital program storage device or player (e.g., a videocassette recorder, a digital versatile disc (DVD) player, etc.). Program recording and other features may be controlled by set-top box 28 using control path 34. If secondary storage device 32 is a videocassette recorder, for example, a typical control path 34 involves the use of an infrared transmitter coupled to the infrared receiver in the videocassette recorder that normally accepts commands from a remote control such as remote control 40. Remote control 40 may be used to control set-top box 28, secondary storage device 32, and television 36.

If desired, a user may record programs, program guide data, or a combination thereof in digital form on optional digital storage device 31. Digital storage device 31 may be a writeable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 31 can be contained in set-top box 28 or it can be an external device connected to set-top box 28 via an output port and appropriate interface. Digital storage device 31 may, for example, be contained in local media server 29. If necessary, processing circuitry in set-top box 28 formats the received video, audio and data signals into a digital file format. Preferably, the file format is an open file format such as the Moving Picture Experts Group (MPEG) MPEG-2 standard or the Moving Joint Photographic Experts Group (MJPEG) standard. The resulting data is streamed to digital storage device 31 via an appropriate bus (e.g., a bus using the Institute Electrical and Electronics Engineers (IEEE) 1394 standard), and is stored on digital storage device 31. In another suitable approach, an MPEG-2 data stream or series of files may be received from distribution equipment 21 and stored.

Television 36 receives video signals from secondary storage device 32 via communications path 38. The video signals on communications path 38 may either be generated by secondary storage device 32 when playing back a prerecorded storage medium (e.g., a videocassette or a recordable digital video disc), by digital storage device 31 when playing back a pre-recorded digital medium, may be passed through from set-top box 28, may be provided directly to television 36 from set-top box 28 if secondary storage device 32 is not included in user television equipment 22, or may be received directly by television 36. During normal television viewing, the video signals provided to television 36 correspond to the desired channel to which a user has tuned with set-top box 28. Video signals may also be provided to television 36 by set-top box 28 when set-top box 28 is used to play back information stored on digital storage device 31.

Set-top box 28 may have memory 44. Memory 44 may be any memory or other storage device, such as a random access memory (RAM), read only memory (ROM), flash memory, a hard disk drive, a combination of such devices, etc., that is suitable for storing program guide application instructions and program guide data for use by the program guide.

Set-top box 28 may have communications device 37 for communicating directly with program guide server 25 or Internet service system 61 over communications path 20. Communications device 37 may be a modem (e.g., any suitable analog or digital standard, cellular, or cable modem), network interface card (e.g., an Ethernet card, Token ring card, etc.), or other suitable communications device. Communications device 37 may also be a personal computer with an Internet connection in, for example, the arrangement shown in FIGS. 2c and 2d. Television 36 may also have such a suitable communications device if desired. In an alternative approach, user television equipment 22 may communicate with Internet service system 61 via distribution equipment 21 using a suitable return path.

Figure 4:
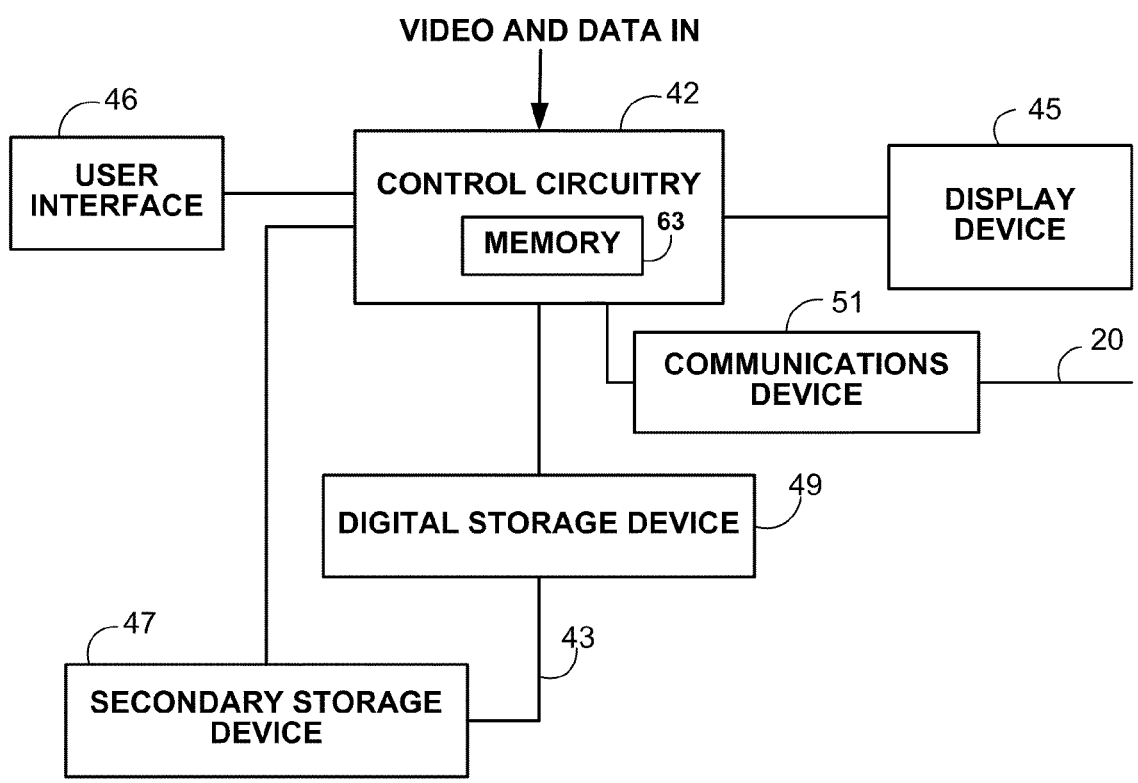
FIG. 4 is a generalized schematic block diagram of portions of the illustrative user television equipment of FIG. 3 in accordance with the principles of the present invention.

A more generalized embodiment of user television equipment 22 of FIG. 3 is shown in FIG. 4. As shown in FIG. 4, program guide data from television distribution facility 16 (FIG. 1) is received by control circuitry 42 of user television equipment 22. The functions of control circuitry 42 may be provided using the set-top box arrangement of FIGS. 2a and 2b. Alternatively, these functions may be integrated into an advanced television receiver, personal computer television (PC/TV), or any other suitable arrangement. If desired, a combination of such arrangements may be used.

User television equipment 22 may also have secondary storage device 47 and digital storage device 49 for recording programming. Secondary storage device 47 can be any suitable type of analog or digital program storage device (e.g., a videocassette recorder, a digital versatile disc (DVD), etc.). Program recording and other features may be controlled by control circuitry 42. Digital storage device 49 may be, for example, a writeable optical storage device (such as a DVD player capable of handling recordable DVD discs), a magnetic storage device (such as a disk drive or digital tape), or any other digital storage device.

User television equipment 22 may also have memory 63. Memory 63 may be any memory or other storage device, such as a random access memory (RAM), read only memory (ROM), flash memory, a hard disk drive, a combination of such devices, etc., that is suitable for storing program guide application instructions and program guide data for use by control circuitry 42.

User television equipment 22 of FIG. 4 may also have communications device 51 for supporting communications between the program guide and distribution equipment 21 or Internet service system 61 via communications path 20. Communications device 51 may be a modem (e.g., any suitable analog or digital standard, cellular, or cable modem), network interface card (e.g., an Ethernet card, Token ring card, etc.), or other suitable communications device.

A user controls the operation of user television equipment 22 with user interface 46. User interface 46 may be a pointing device, wireless remote control, keyboard, touch-pad, voice recognition system, or any other suitable user input device. To watch television, a user instructs control circuitry 42 to display a desired television channel on display device 45. Display device 45 may be any suitable television, monitor, or other suitable display device. To access the functions of the program guide, a user instructs the program guide implemented on interactive television program guide equipment 17 to generate a main menu or other desired program guide display screen for display on display device 45.

Figure 5A:
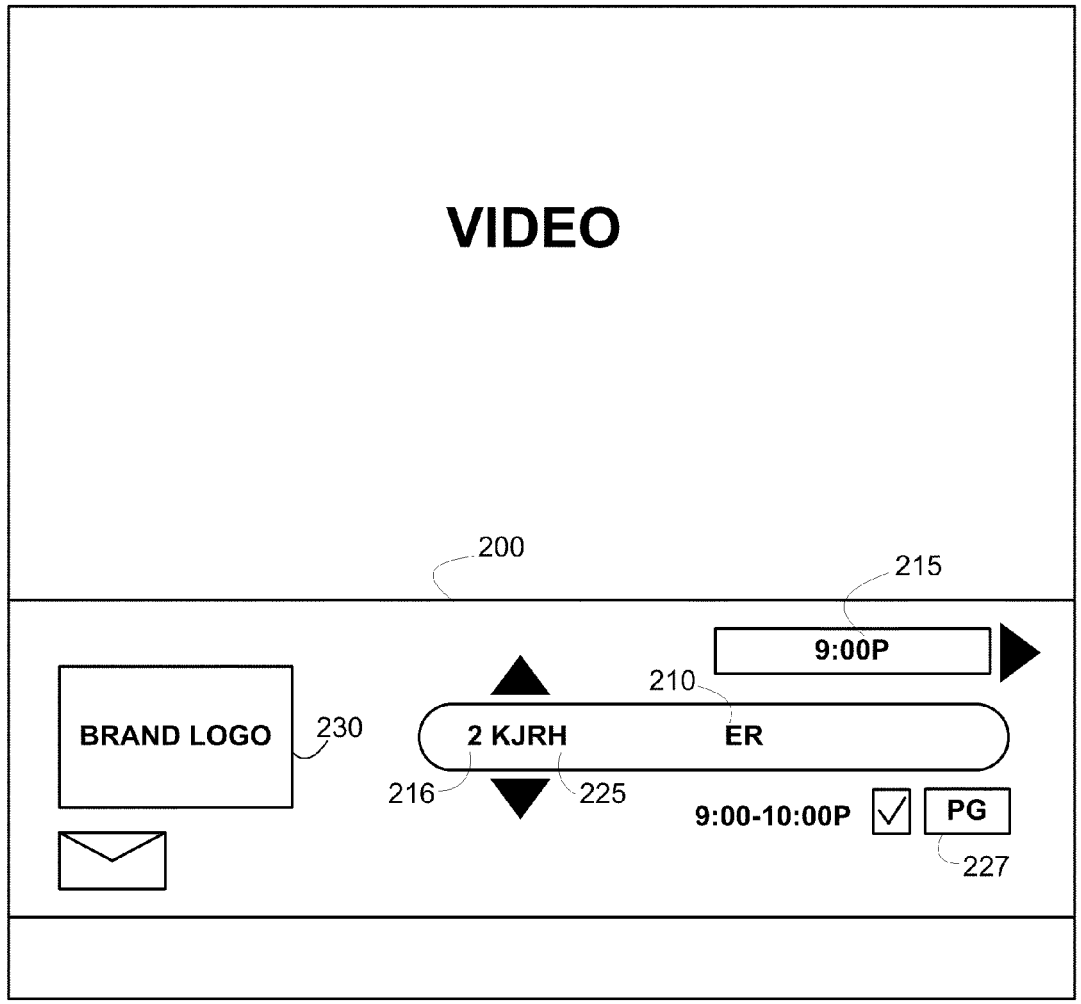
FIGS. 5a and 5b show illustrative "FLIP" overlays or banners that the program guide may display when the user indicates a desire to change television channels.
Figure 5B:
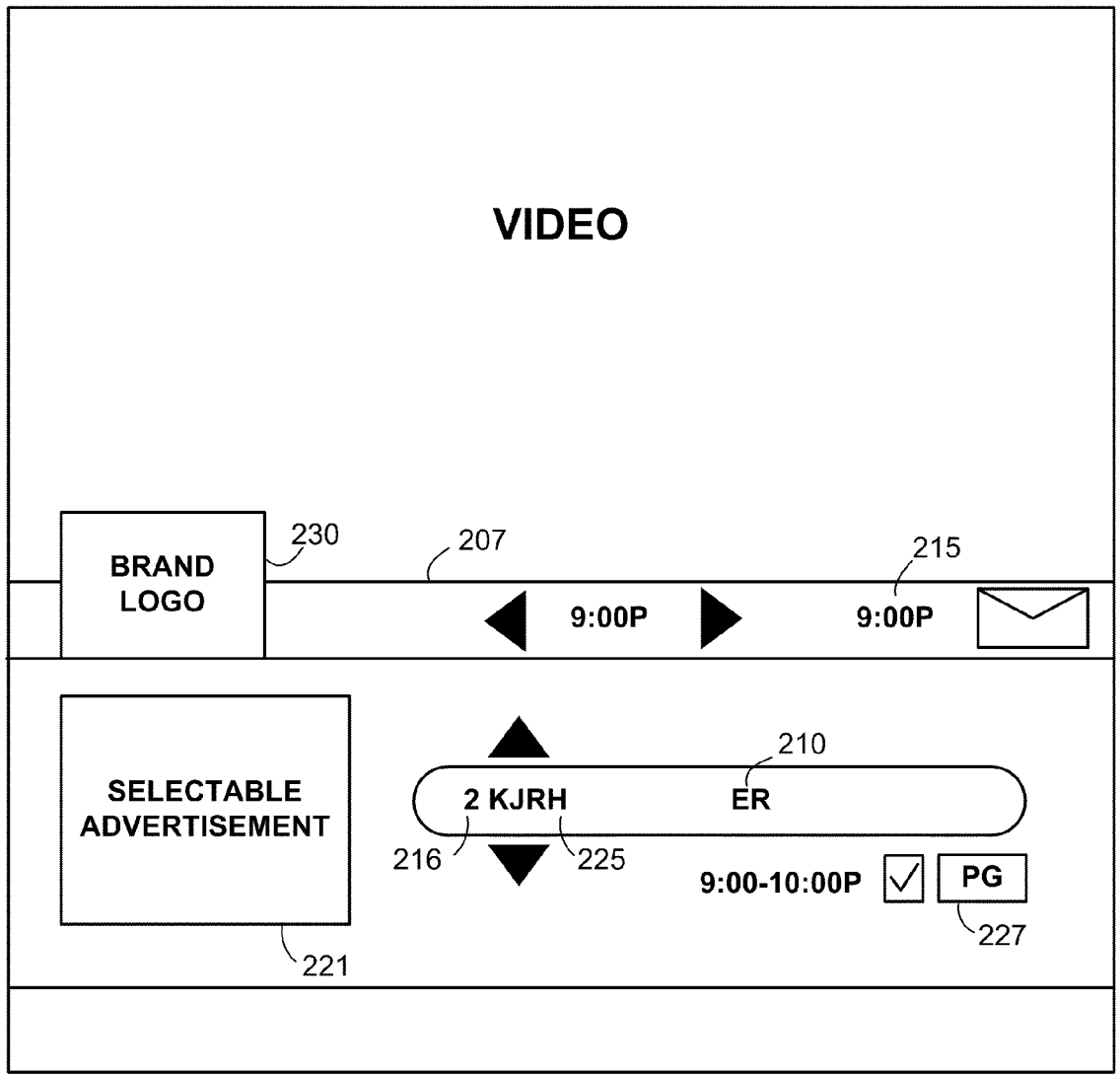

The program guide may, for example, provide a user with an opportunity to view program listings while watching a television program. In response to a user indicating a desire to view program listings while watching a program, the program guide may overlay a "FLIP" or "BROWSE" overlays over a television program. FIGS. 5a and 5b show illustrative FLIP overlays 200 and 207 the program guide may display whenever a user changes television channels. This feature may provide a user with information on the television program that is being displayed by the new channel. FLIP overlays 200 and 207 may be displayed for a predefined period of time, or for a user configurable period of time, if desired. The FLIP overlay may instantaneously disappear, may slide downward off of the screen, or may be removed from the screen using any other suitable approach.

FLIP overlays 200 and 207 may display information associated with the current program, such as the program title 210, run time 215, rating 227, the current channel number 216, and the current channel's call letters 225. The FLIP overlays may also include a number of graphics, such as brand logo 230, a sponsorship graphic, a channel logo graphic, mail indicator, reminder indicator or any other suitable graphic. The current time may also be displayed. If desired, brand logo 230 may be replaced by or displayed together with selectable advertisement 221. A user may select selectable advertisement 221 to obtain additional program information for the program currently displayed in FLIP overlays 200 and 210.

Figure 6A:
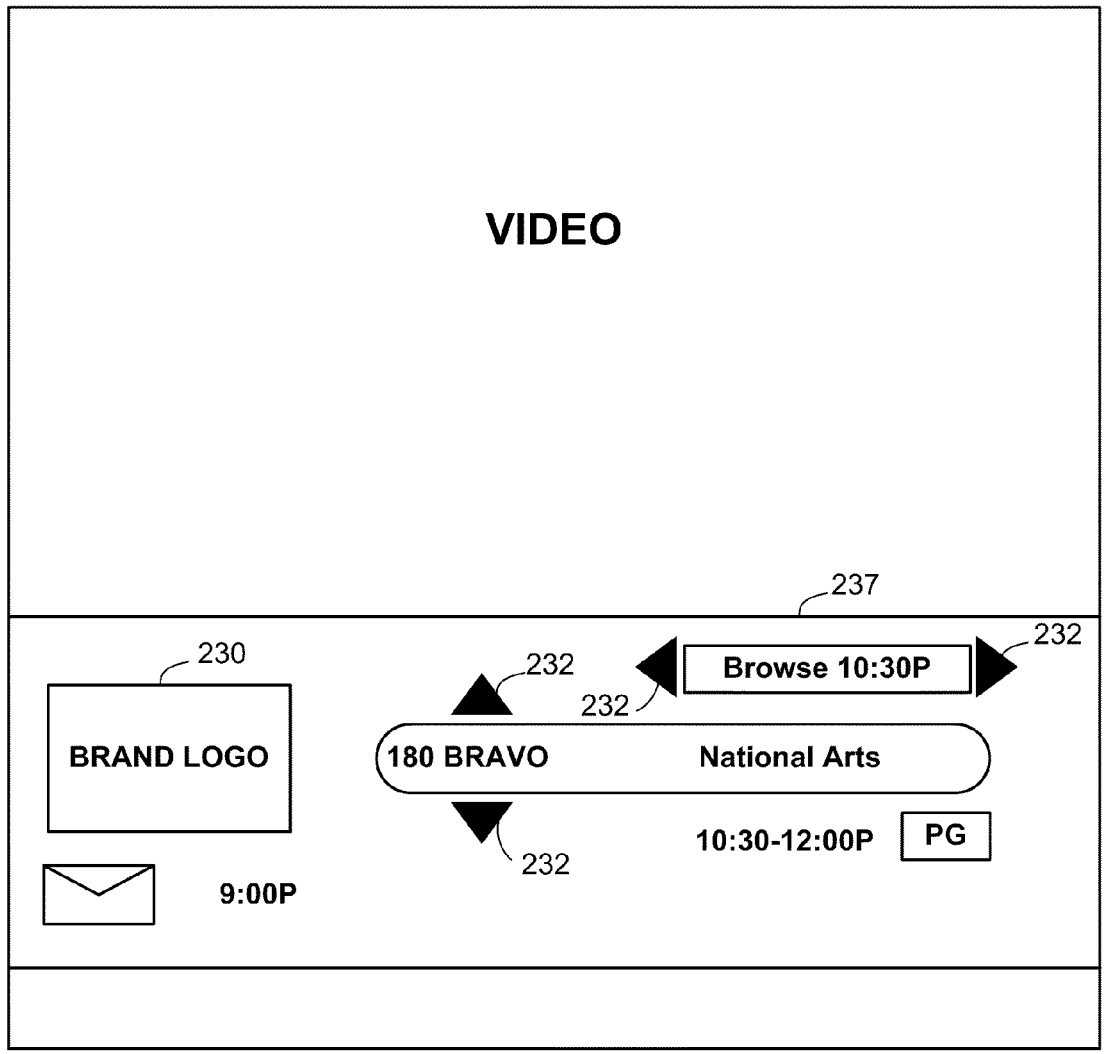
FIGS. 6a, 6b, and 6c show illustrative "BROWSE" overlays or banners that the program guide may display in response to an indication by a user to browse through program listings for a given time slot.
Figure 6B:
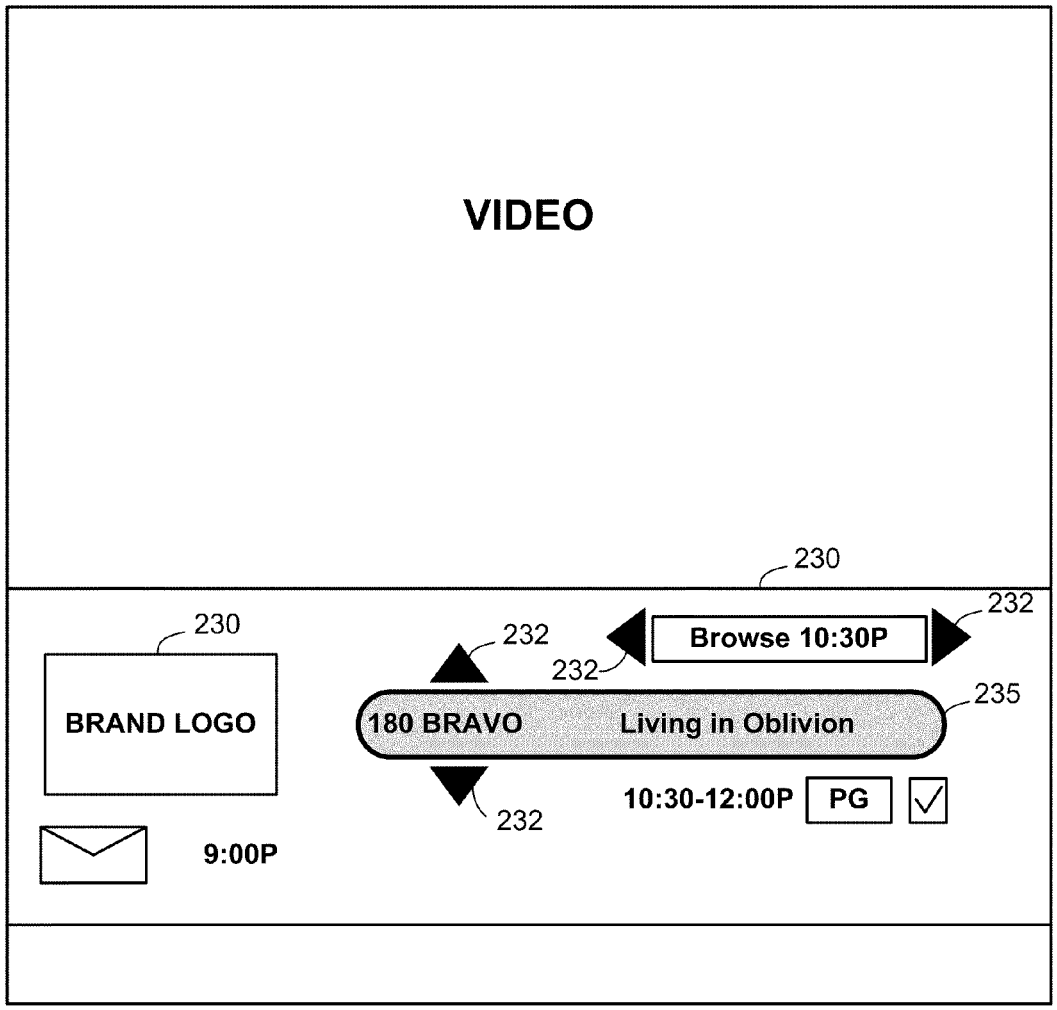
Figure 6C:
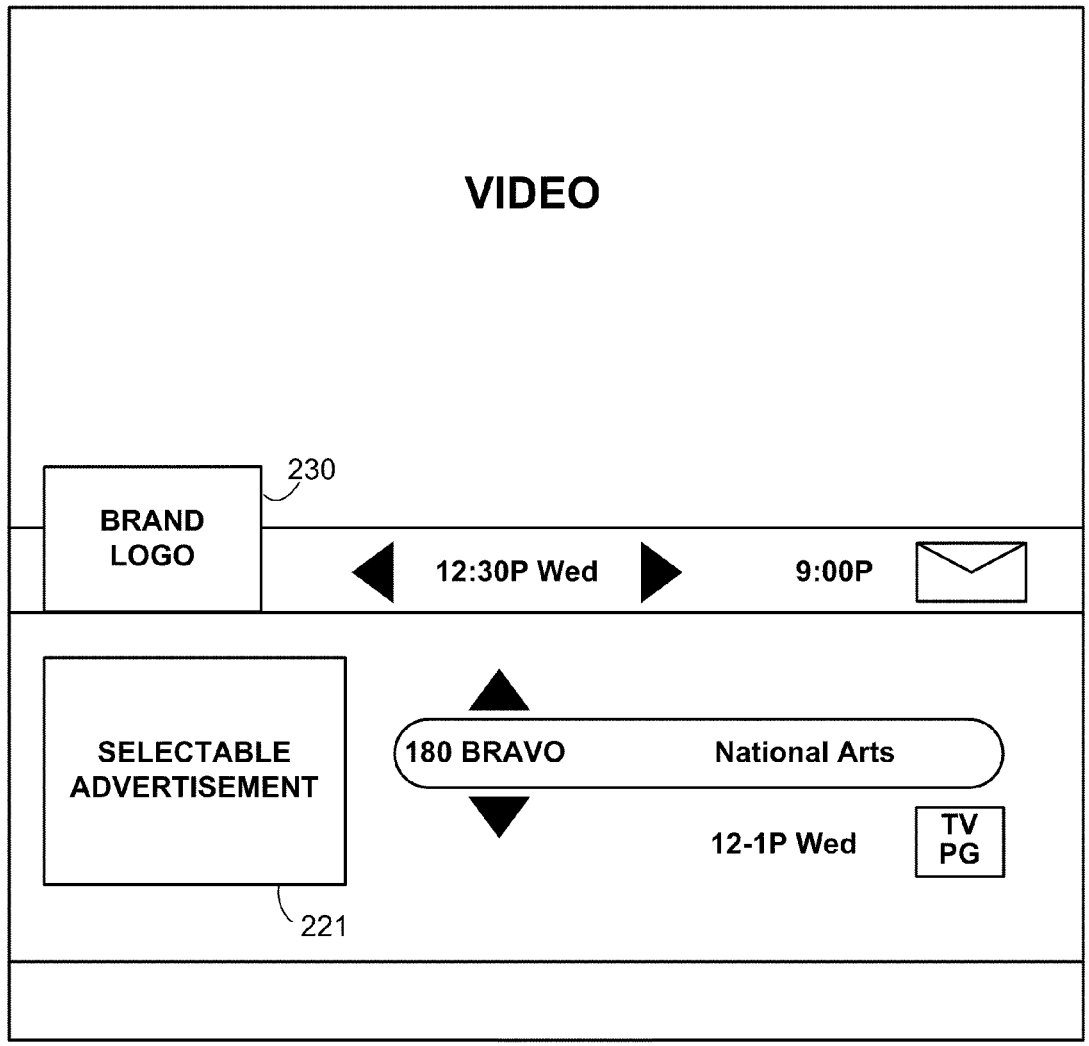

FIGS. 6a, 6b and 6c show illustrative "BROWSE" overlays 230 that the program guide may display when a user opts to browse through program listings for a given time slot while watching a program. A user may browse through program listings by, for example, using remote control arrow keys. Unlike the FLIP overlay, the BROWSE overlay allows a user to continue to watch a program on a particular channel (e.g., channel 178) while browsing for information on programs that are playing on other channels and at other times.

The program guide may provide a user with an opportunity to change time slots and channels in order to browse through additional program listings. A user may indicate a desire to browse through additional program listings by, for example, pressing "up", "down", "left", and "right" arrows to access additional channels and time slots. The program guide may, for example, highlight an on-screen arrow 232 to indicate to a user that a particular arrow has been pressed. This aspect of the invention may be performed in any display screen in which an arrow is used to indicate to a user an available action.

If desired, FLIP and BROWSE overlays may indicate to a user that a user has flagged a channel as a favorite. Favorite channels may be indicated using any suitable technique. A specific color, such as sky-blue, may be used. FIG. 6b shows the use of shading 235 to denote that a channel has been selected as a favorite in BROWSE overlay 237. FIG. 6c shows a further illustrative embodiment of BROWSE overlay 237.

FLIP and BROWSE overlays may also include selectable advertisements, such as selectable advertisements 221. Selectable advertisements 221 may, for example, include text and graphics advertising the program being played or other television programs, channels, or products. When a user selects a selectable advertisement 221, the program guide may display information (e.g., pay-per-view information) or take other actions related to the content of the advertisement.

Figure 7:
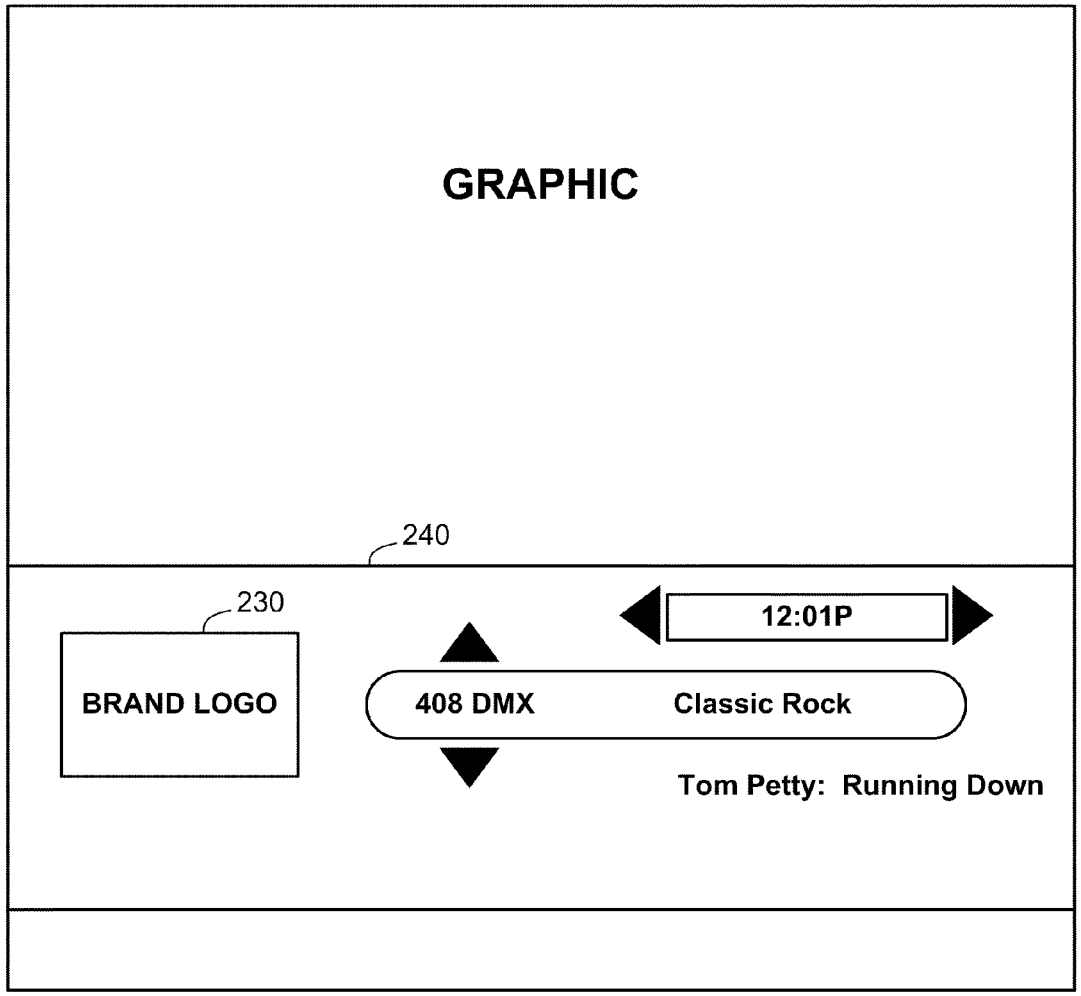
FIG. 7 shows an illustrative music flip overlay that the program guide may display when the user indicates a desire to change channels to a digital music channel.

FIG. 7 shows an illustrative music flip overlay 240 that the program guide may generate for display in response to a user changing channels to a digital music channel. Music flip overlay 240 may be displayed, for example, over a black background or over a graphic if desired. The current artist and title playing may be displayed along with the category of music played on the channel.

Music information regarding the currently playing selection may be transmitted with the rest of the program guide data provided by main facility 12 to television distribution facility 16, or may be part of an in-band data stream provided by a third party over the digital music channel. If desired, music flip overlay 240 may be used as a BROWSE overlay when, for example, a user indicates a desire to browse through music program listings for other music channels. To provide a user with an opportunity to BROWSE through music program listings for other channels, set-top box 28 of user television equipment 22 may require two-tuners; one for playing the music from one channel while in-band data is retrieved from another for display in a BROWSE overlay. Program guides that provide users with an opportunity to browse music program listings using multiple tuners are described, for example, in Ellis U.S. patent application Ser. No. 09/330,860, filed Jun. 11, 1999 , which is hereby incorporated by reference herein in its entirety.

Figure 8:
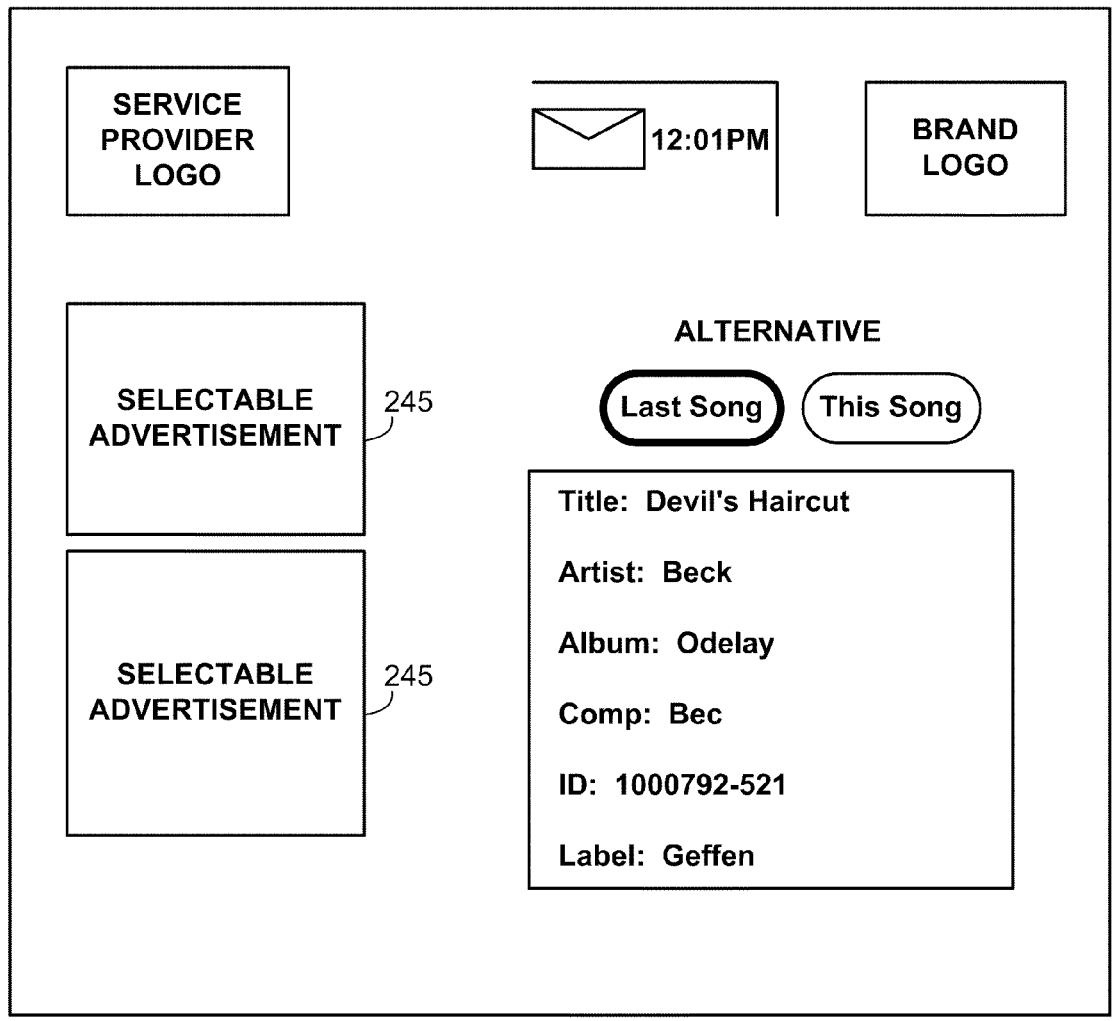
FIG. 8 shows an illustrative program guide display screen, for providing a user with access to title, track, and artist information for a digital music channel.

As the program on a music channel changes, the program guide may display music information about the new program, such as the title, track, and artist information. The program guide may also display this information when, for example, a user presses an "info" key on remote control 40. An illustrative music information screen is shown in FIG. 8. The music information screen of FIG. 8 may display one or more selectable advertisements 245. Selectable advertisements 245 may, for example, include text and graphics advertising the music being played or other television programs or products. When a user selects a selectable advertisement 245, the program guide may display information (e.g., pay-per-view information) or take other actions related to the content of the advertisement.

Some program guide display screens may display FLIP or BROWSE style overlays or banners that include logo advertisements (such as logo advertisement 230). The logo advertisements may change within the same overlay or banner if a user displays the overlay or banner for a defined time. The logo advertisement may, for example, rotate through a list of logo advertisements, returning to the first advertisement after each advertisement in the list has been displayed.

The FLIP and BROWSE overlays of FIGS. 5, 6a, 6b, 6c, and 7 have been shown as including a brand logo advertisement 230 displayed at the left of the overlay. The logo may also, for example, promote different sponsors as a user browses program listings or flips between channels. The logos may change within the same overlay or banner if a user displays the overlay or banner for a predefined time. The logo may, for example, automatically rotate through a list of logo advertisements, returning to the first advertisement after each advertisement in the list has been displayed. The brand logo may also be replaced by a text based advertisement.

The logo may change position as it is displayed if desired. The logo may, for example, initially appear at the side of the overlay. After a predefined period (e.g., six seconds), the logo may slide off the top of the overlay and pull the mail indicator and time indicator to the upper right of the display.

The program guide may provide users with an opportunity to access other program guide features through a main menu. A main menu screen, such as illustrative main menu screen 100 of FIG. 9, may include menu 102 of selectable program guide features 106. If desired, program guide features 106 may be organized according to feature type. In menu 102, for example, program guide features 106 have been organized into three columns. The column labeled "TV GUIDE" is for listings related features, the column labeled "MSO SHOWCASE" is for multiple service organization (MSO) related features, and the column labeled "VIEWER SERVICES" is for viewer related features. The interactive television program guide may generate a display screen for a particular program guide feature when a user selects that feature from menu 102.

Main menu screen 100 may include one or more selectable advertisements 108. Selectable advertisements 108 may, for example, include text and graphics advertising pay-per-view programs or other programs, channels, or products. When a user selects a selectable advertisement 108, the program guide may display information (e.g., pay-per-view information) or take other actions related to the content of the advertisement. Pure text advertisements may be presented, if desired, as illustrated by selectable advertisement banner 110.

Main menu screen 100 may also include other screen elements. The brand of the program guide product may be indicated, for example, using a product brand logo graphic such as product brand logo graphic 112. The identity of the television service provider may be presented, for example, using a service provider logo graphic such as service provider logo graphic 114. The logos may be included in the program guide data allowing for on-the-fly configurability of the display screens. The current time may be displayed in clock display region 116. In addition, a suitable indicator such as indicator graphic 118 may be used to indicate to a user that mail from a cable operator or program guide provider is waiting for a user if the program guide supports messaging functions.

The interactive television program guide may provide a user with an opportunity to view television program listings. A user may indicate a desire to view program listings by, for example, positioning highlight region 120 over a desired program guide feature 106. Alternatively, the program guide may present program listings when a user presses a suitable key (e.g., a "guide" key) on remote control 40. When a user indicates a desire to view television program listings, the program guide generates an appropriate program listings screen for display on display device 45 (FIG. 4). A program listings screen may contain one or more groups or lists of program listings organized according to one or more organization criteria (e.g., by time, by channel, by program category, etc.).

Program listings screens may be overlaid on a program being viewed by a user or overlaid on a portion of the program in a "browse" mode. The program guide may, for example, provide a user with an opportunity to view listings by time, by channel, according to a number of categories (e.g., movies, sports, children, etc.), or may allow a user to search for a listing by title. Program listings may be displayed using any suitable list, table, grid, or other suitable display arrangement. If desired, program listings screens may include selectable advertisements, product brand logo graphics, service provider brand graphics, clocks, or any other suitable indicator or graphic.

Figure 10:
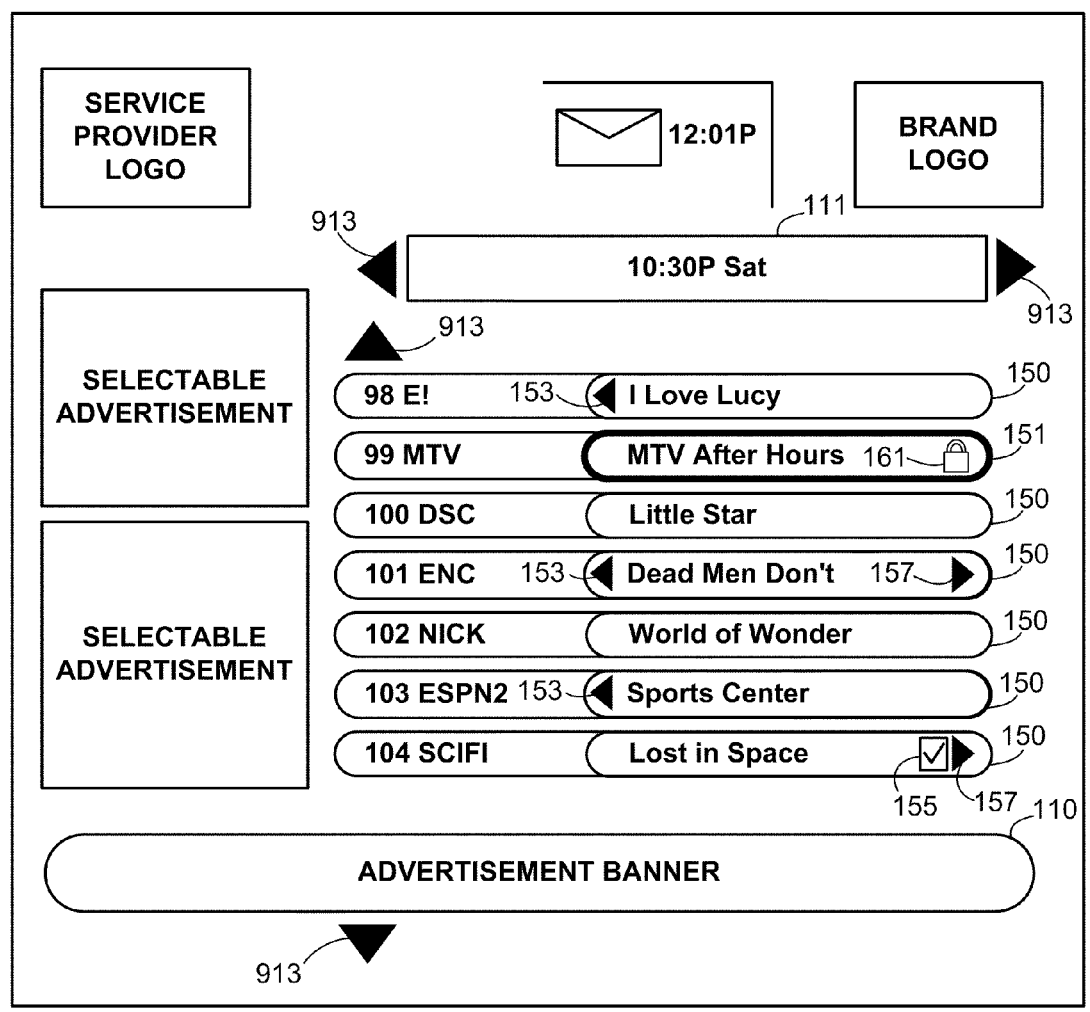
FIG. 10 shows an illustrative program listings by time screen.

A user may indicate a desire to view program listings by time, channel, or category by, for example, selecting a selectable feature 106 from menu 102. In response, the program guide may display program listings in a suitable program listings screen. FIG. 10 illustrates the display of program listings by time. Program listings screen 130 of FIG. 10 may include highlight region 151, which highlights the current program listing 150. A user may position highlight region 151 by entering appropriate commands with user interface 46. For example, if user interface 46 has a keypad, a user can position highlight region 151 using "up" and "down" arrow keys on remote control 40. A user may select a listing by, for example, pressing on the "OK" or "info" key on remote control 40. Alternatively, a touch sensitive screen, trackball, voice recognition device, or other suitable device may be used to move highlight region 151 or to select program listings without the use of highlight region 151. In still another approach, a user may speak a television program listing into a voice request recognition system. These methods of selecting program listings are merely illustrative. Any other suitable approach for selecting program listings may be used if desired.

A user may view additional listings for the time slot indicated in timebar 111 by, for example, pressing an "up" or "down" arrow, or a "page up" or "page down" key on remote control 40. The user may also see listings for the next 24 hour period, or the last 24 hour period, by pressing a "day forward" or "day backward" key on remote control 40, respectively. If there are no listings starting exactly 24 hours in the indicated direction, the program guide may pick programs starting at either closer or further than 24 hours away. If desired, the program guide may require a user to scroll through advertisement banner 110. A user may view program listings for other time slots by, for example, pressing "right" and "left" arrows on remote control 40, or by scrolling up or down until listings for the next time slot are displayed. Timebar 111 may change its display to the previous or next time slot accordingly.

Figure 11A:
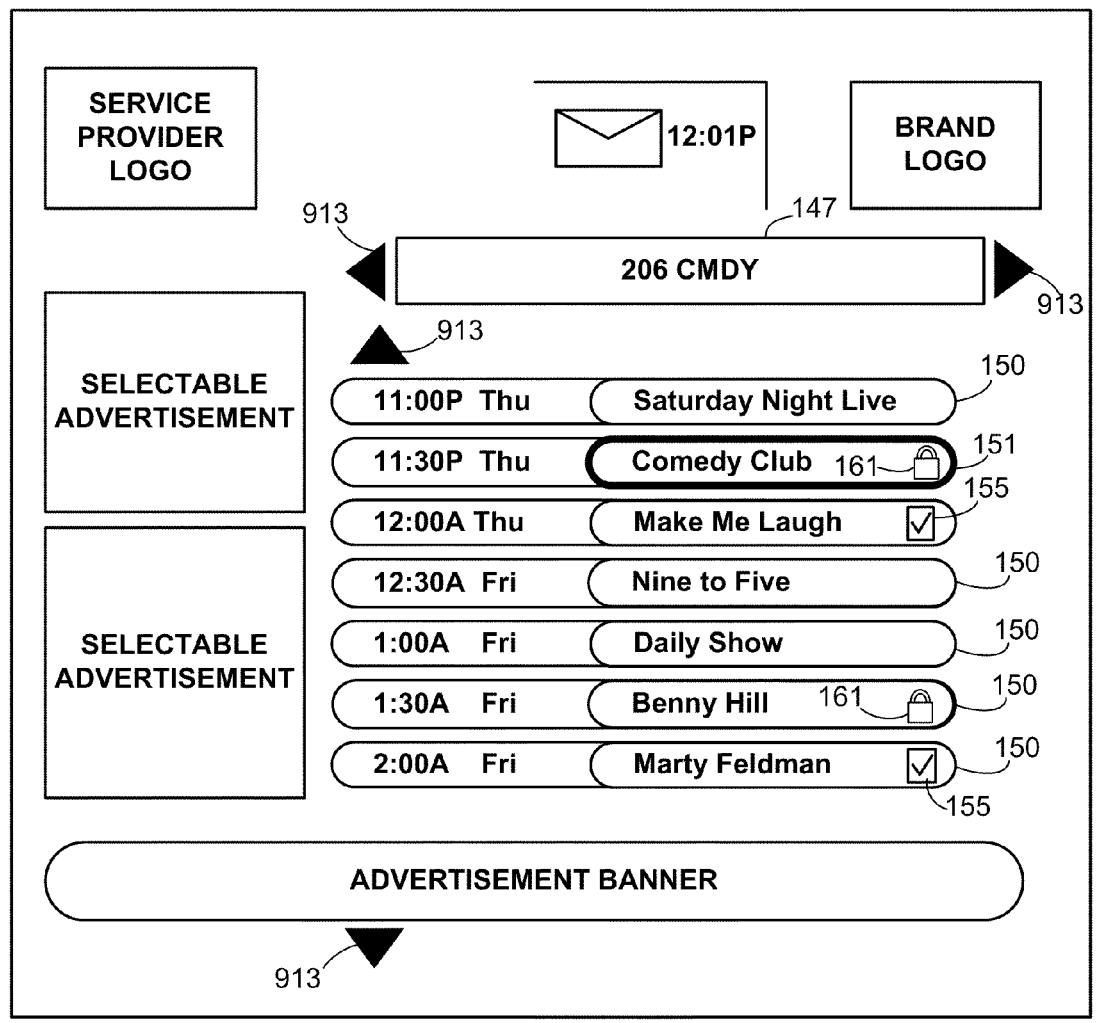
FIGS. 11a and 11b show illustrative program listings by channel screens.
Figure 11B:
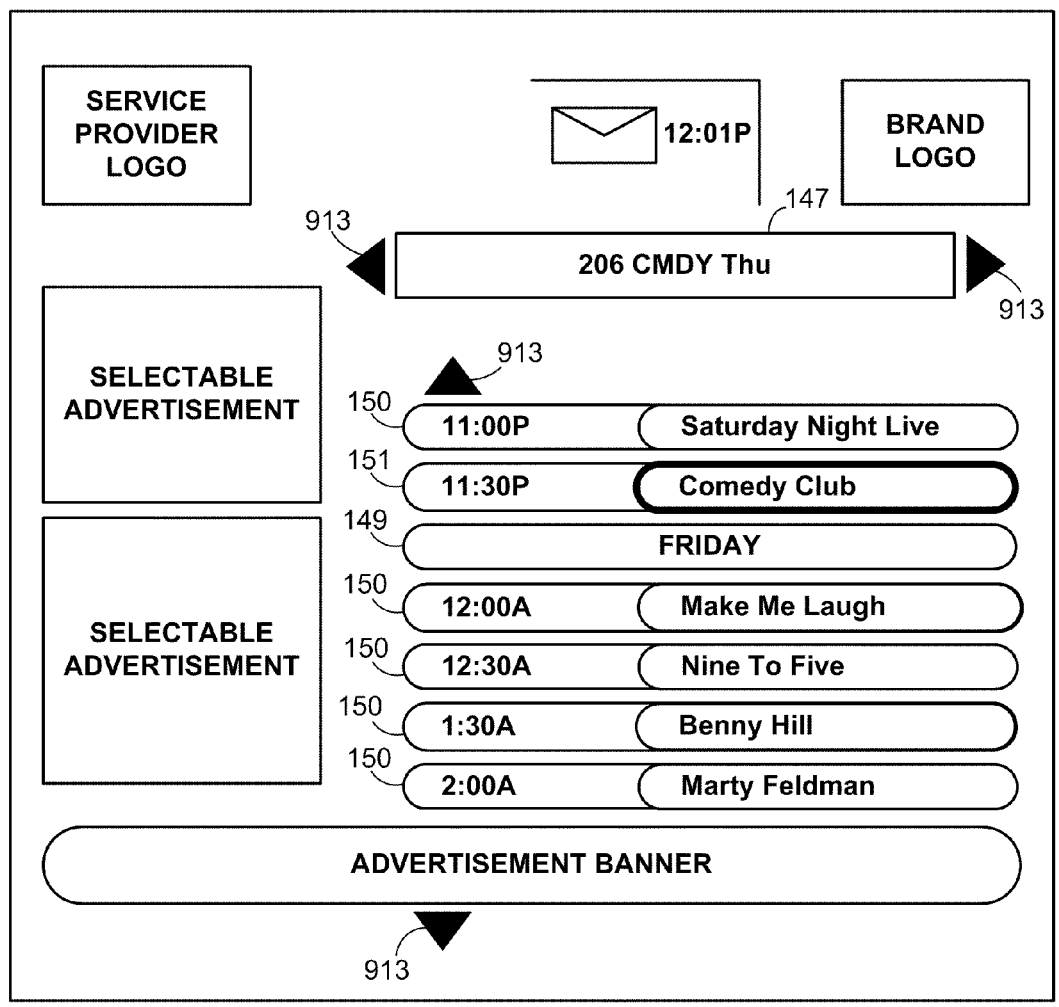

FIGS. 11a and 11b illustrate the display of program listings by channel. A user may scroll up and down to view program listings for additional time slots, and may scroll left and right to view program listings for other channels. In listings by channel screen 140 of FIG. 11a, each program is listed with its air time and day. If desired, the day for which program listings are displayed may be included in display area 147 with the channel number as shown in FIG. 11b. Preferably, the day displayed corresponds to the day of the program associated with the first displayed listing.

The program guide may display a clear demarcation of programs starting at or near the same time. For example, separator 149 may be displayed to indicate when a user scrolls or pages from one day's listings to the next. FIG. 11b also illustrates how the program guide may display an advertisement banner so that a user is required to scroll past the banner to access additional program listings. If desired, a listings by channel screen may indicate that a channel is set as a favorite by, for example, displaying the channel number in a predefined color such as sky blue (not shown).

Figure 12A:
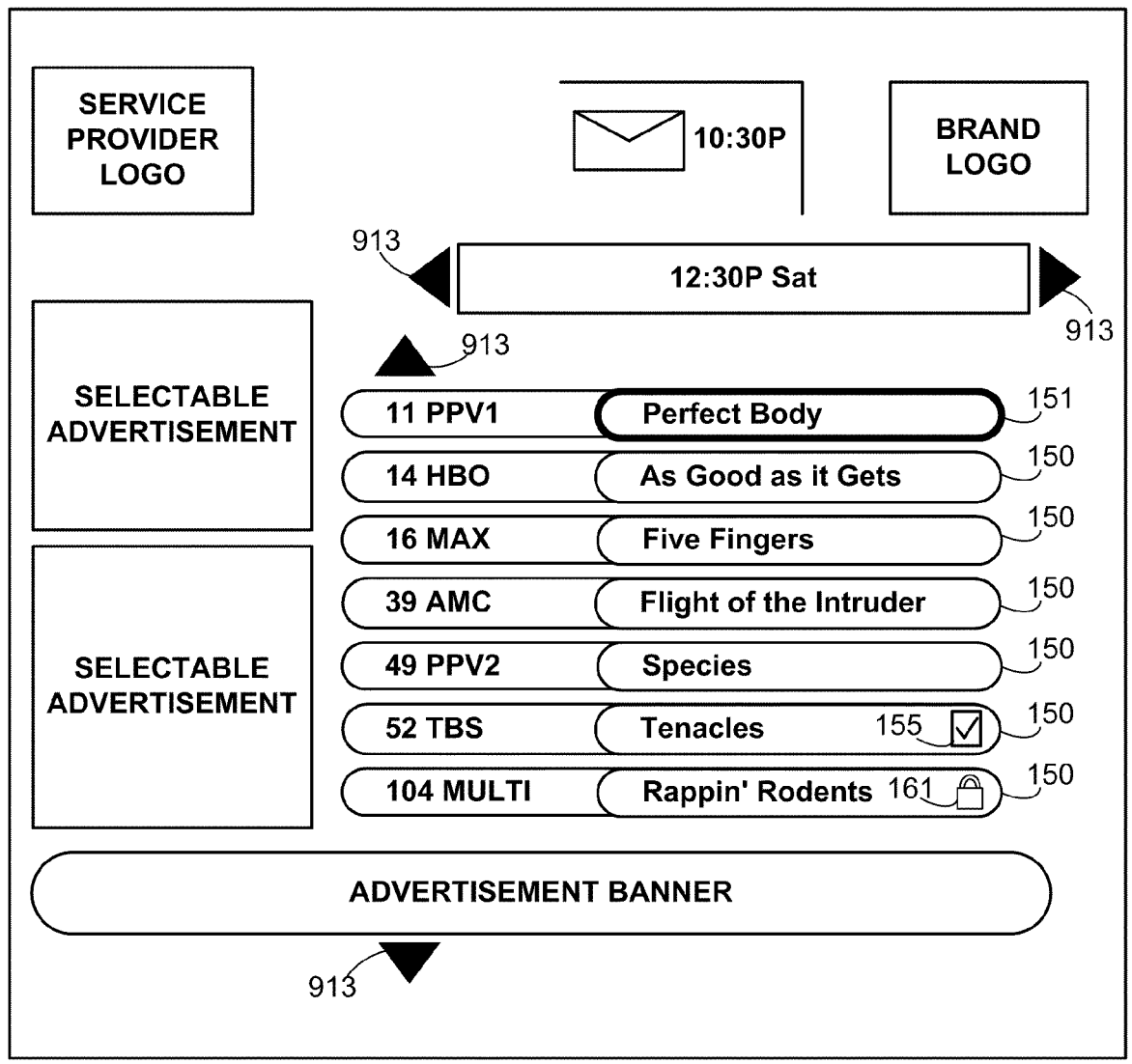
FIGS. 12a, 12b, 12c, 12d, and 12e show illustrative program listings by category screens.
Figure 12B:
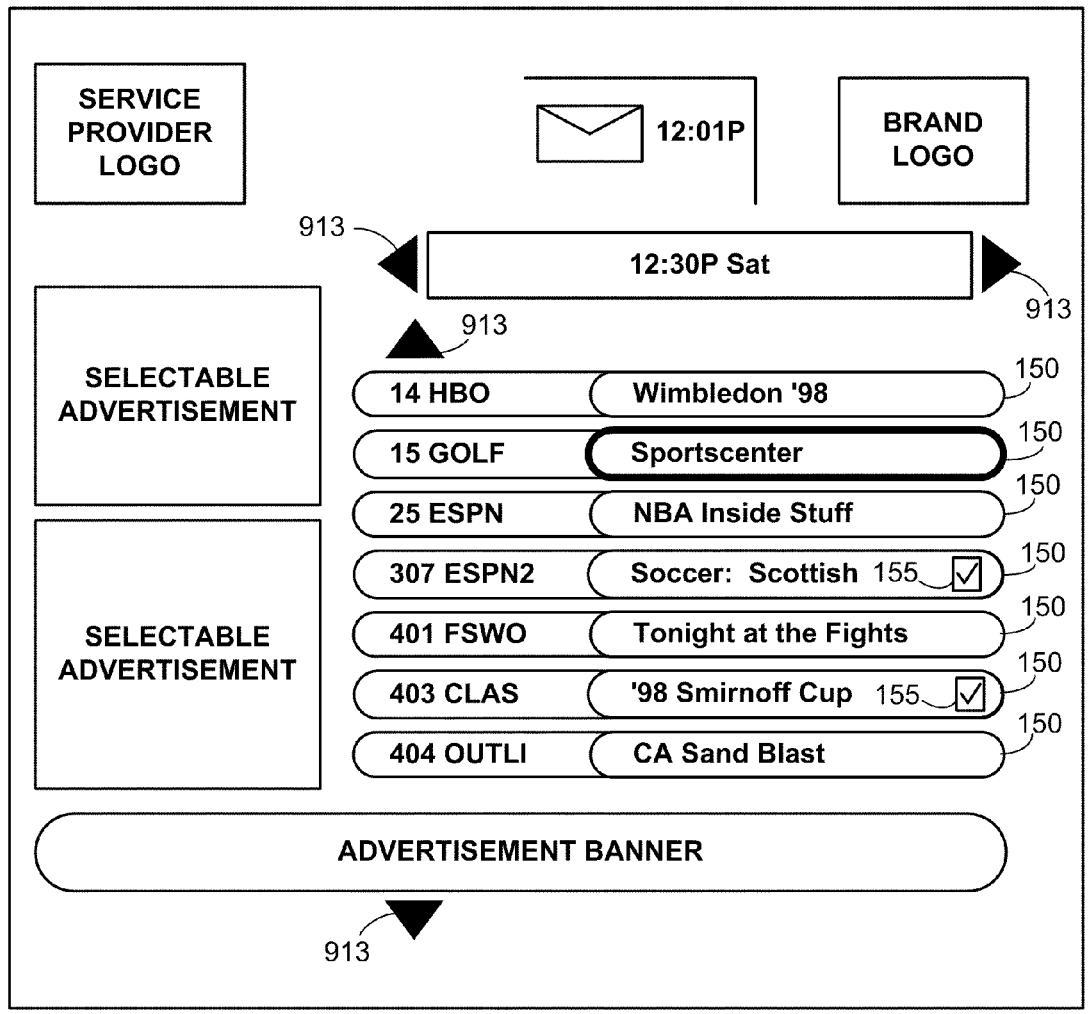
Figure 12C:
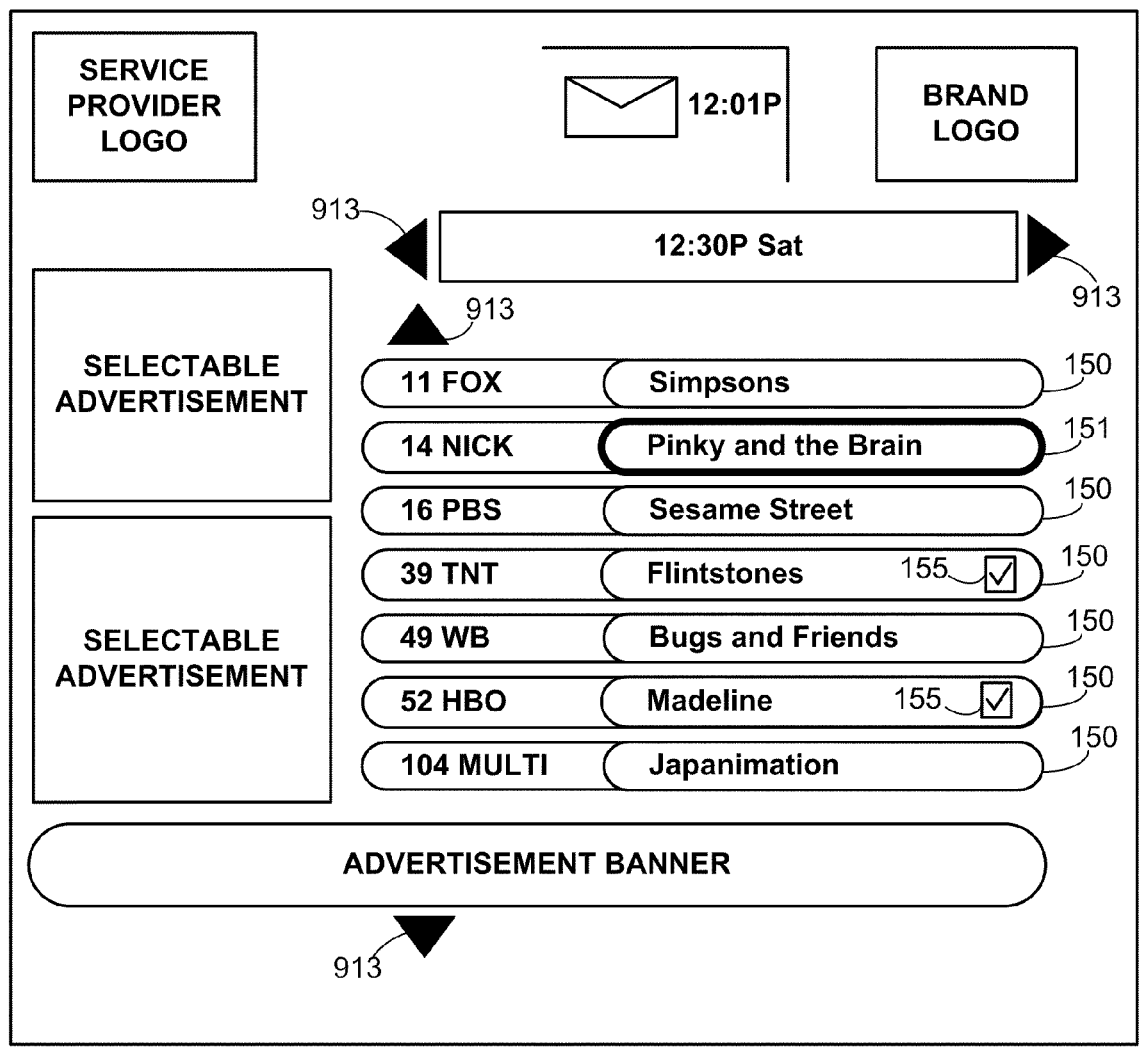

The program guide may provide users with an opportunity to view program listings sorted by category. A user may, for example, press a special category key on remote control 40 (e.g., "movies", "sports", "children", etc.), select a selectable category feature from main menu screen 100 (FIG. 9), or may indicate a desire to view program listings by category using any other suitable approach. FIG. 12*a* is an illustrative program listings screen in which program listings for movies are displayed. FIG. 12*b* is an illustrative program listings screen in which program listings for sports-related programming are displayed. FIG. 12*c* is an illustrative program listings screen in which program listings for children's' programs are displayed.

Figure 12D:
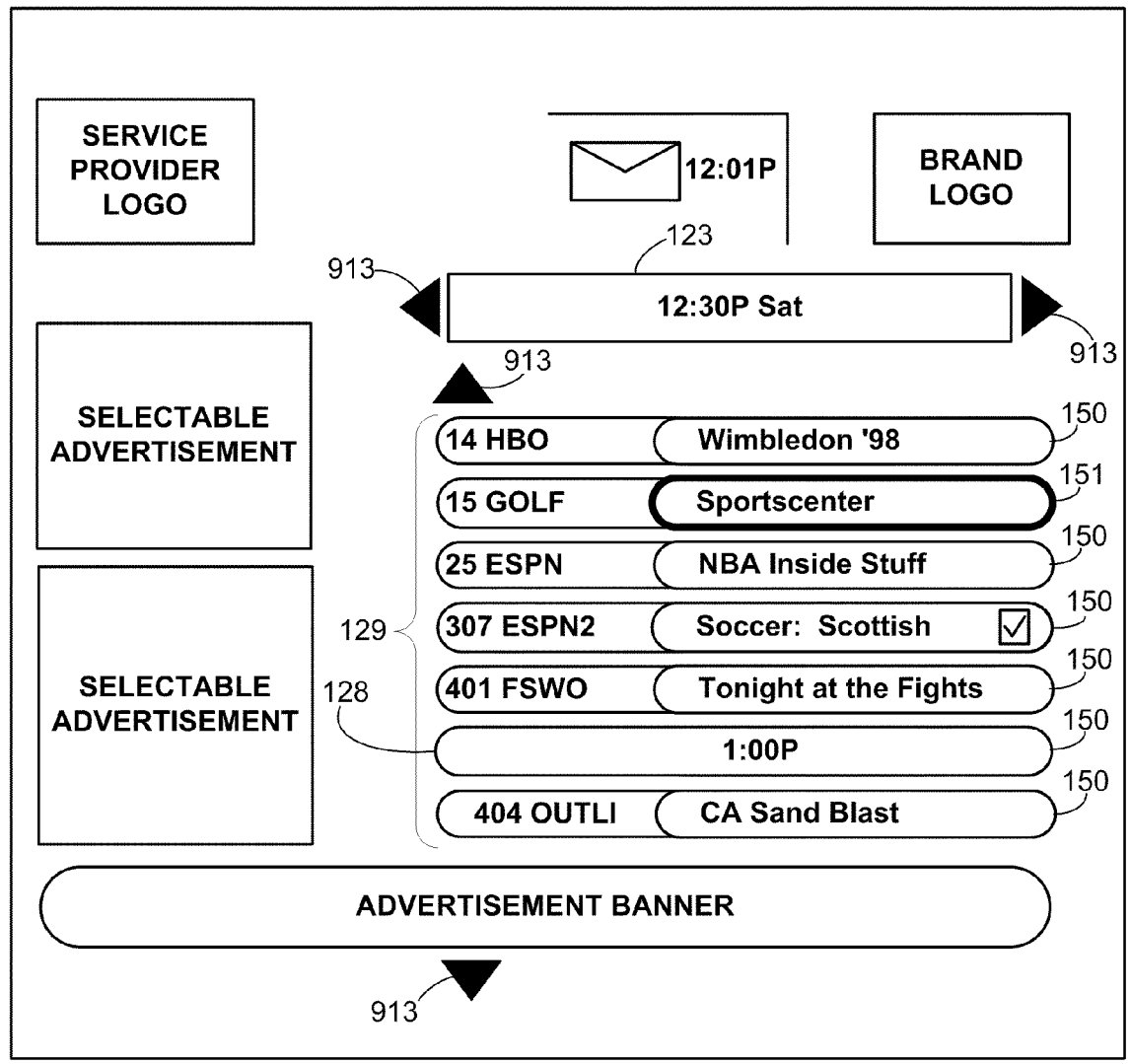
Figure 12E:
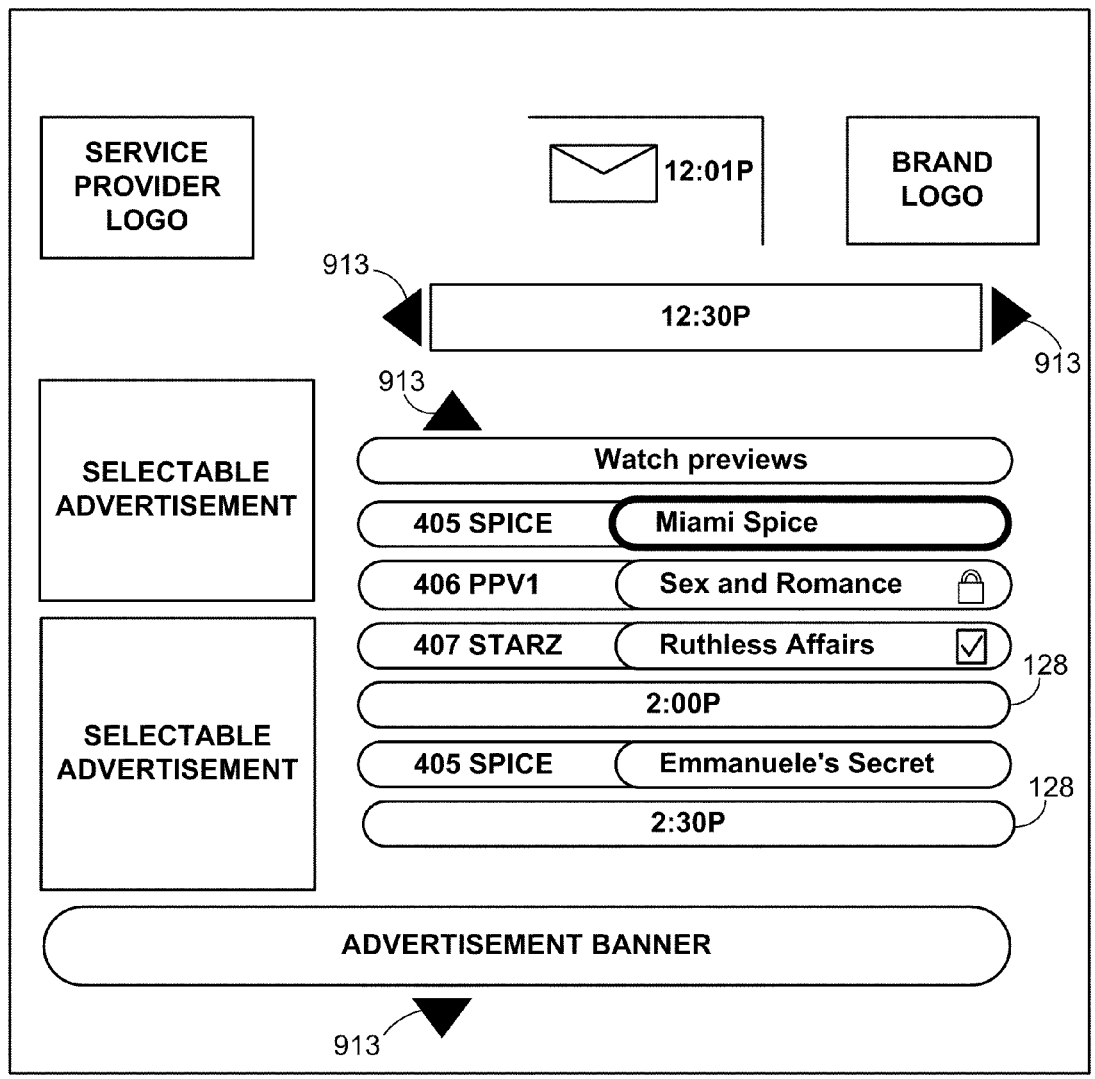

A further example of a program listings by category screen is shown in FIG. 12*d*. The illustrative screen of FIG. 12*d* includes program listings for sports, but the screen of FIG. 12*d* may be used to display program listings for any suitable category. The program listings by category screen of FIG. 12*d* shows an alternative way in which program listings may be displayed and navigated through for any display screen in which listings are displayed for multiple time slots (e.g., FIGS. 10, 11*a*, 11*b*, 12*a*, 12*b*, and 12*c*.) Program listings within list 129 may be divided into predefined time slots, such as into 30 minute time slots. Users may quickly change between time slots by, for example, pressing a "right" or "left" arrows on remote control 40. Between each time slot, separator 128 may be displayed to indicate to a user that a user has scrolled or paged program listings from one time slot to the next. In FIG. 12*d*, for example, a user is scrolling from program listings for sports in the 12:30 PM time slot to program listings for sports in the 1:00 PM time slot. When the user scrolls within listings, highlight region 151 may skip separator 128. FIG. 12*d* also illustrates how the program guide may display an advertisement banner so that a user is required to scroll past the banner to access additional program listings. FIG. 12*e* shows an illustrative program listings by category screen for adult programs. If desired, separators 128 may be displayed only for those timeslots for which there are listings. In this example, there are no adult programs starting at 1:00 PM or 1:30 PM. If desired, there may be a watch previews selectable feature that users may select to view a preview for a highlighted listing. Users may also view additional information for a listing by, for example, highlighting the listing and pressing an "info" key on remote control 40.

In the program listings screens of FIGS. 10-12*e*, program listing may be displayed within each time slot sorted in any suitable manner. Listings may be displayed, for example, by title, channel, start time, or using any other suitable approach. The program listings screens of FIGS. 10, 11*a*, 11*b*, 12*a*, 12*b*, 12*c*, 12*d*, and 12*e* have also been shown as including various other screen elements. Program listings display screens may include, for example, selectable advertisements, advertisement banners, brand logos, service provider logos, clocks, message indicators, arrow indicators 913, or any other suitable screen element. The program guide may provide users with access to selectable advertisements in response to, for example, a user arrowing left to move highlight region 151 to highlight a selectable advertisement. Pressing left, right, up, or down arrows in the listings screens of FIGS. 10-12*e*, or any other suitable display screen, may cause the guide to temporarily change the display characteristics, (e.g. highlight, bold, enlarge, change its color, etc.) of an on-screen arrow, such as arrows 913. In the illustrative program listings screens of FIGS. 11*b*, 12*d* and 12*e*, the program guide may also adjust the time displayed in timebar 123 as the user scrolls or pages through program listings to reflect the time of the program listing at the top of the list.

The program guide may also provide users with an opportunity to set reminders for programs and to parentally control programs. The program listings screens of FIGS. 10, 11*a*-11*c*, and 12*a*-12*e* illustrate, for example, the display of reminder indicator 155 and parental lock 161 to indicate to a user that a program has a reminder set or that a program is parentally locked, respectively. The ratings of the programs may also be indicated by, for example, displaying rating indicators 159. Duration arrows 153 and 157 may be displayed to indicate if programs started before or finish after a time block.

Figure 9:
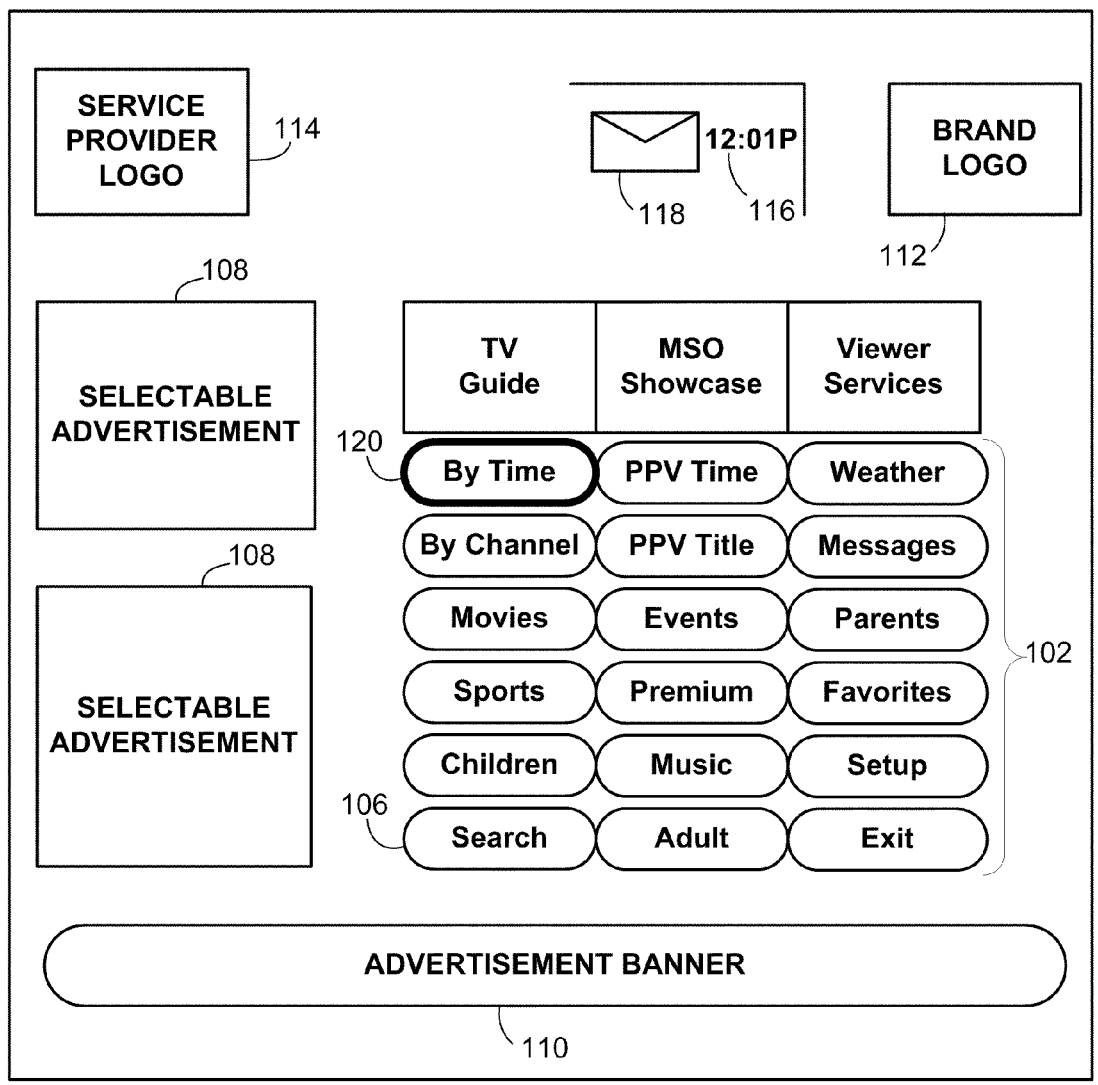
FIG. 9 shows an illustrative program guide main menu screen for providing a user with an opportunity to navigate through program guide features.

The program guide may provide users with an opportunity to textually search for particular program listings. The program guide may display a search screen in response to a user indicating a desire to textually search through program listings by, for example, pressing a suitable key on remote control 40 (e.g., a "search" key), or selecting a selectable search feature 106 from main menu 102 (FIG. 9). Illustrative search screens are shown in FIGS. 13*a*-13*c*.

Figure 13A:
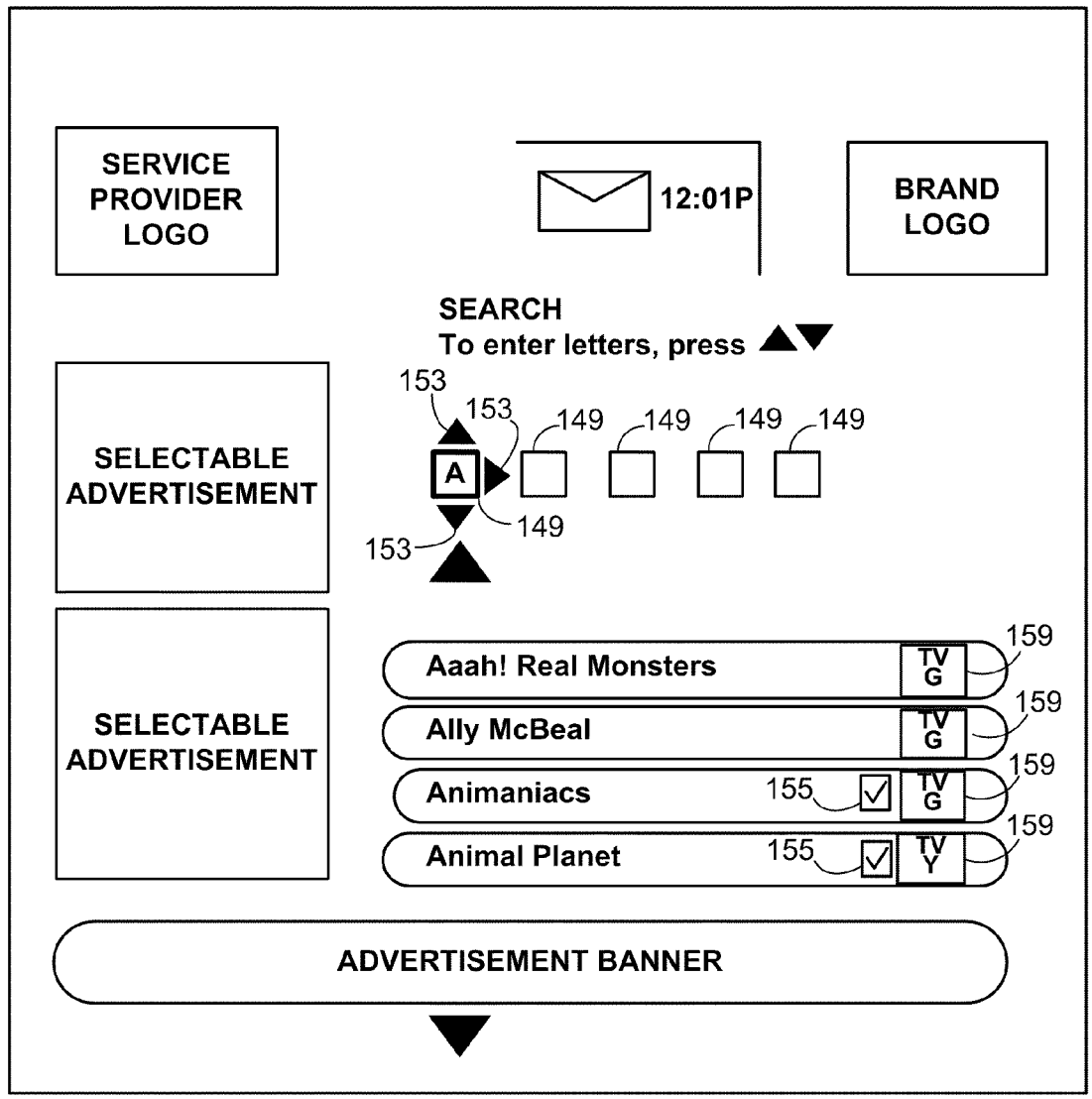
FIGS. 13a, 13b and 13c are illustrative program guide display screens for providing a user with an opportunity to textually search through program listings in various ways.
Figure 13B:
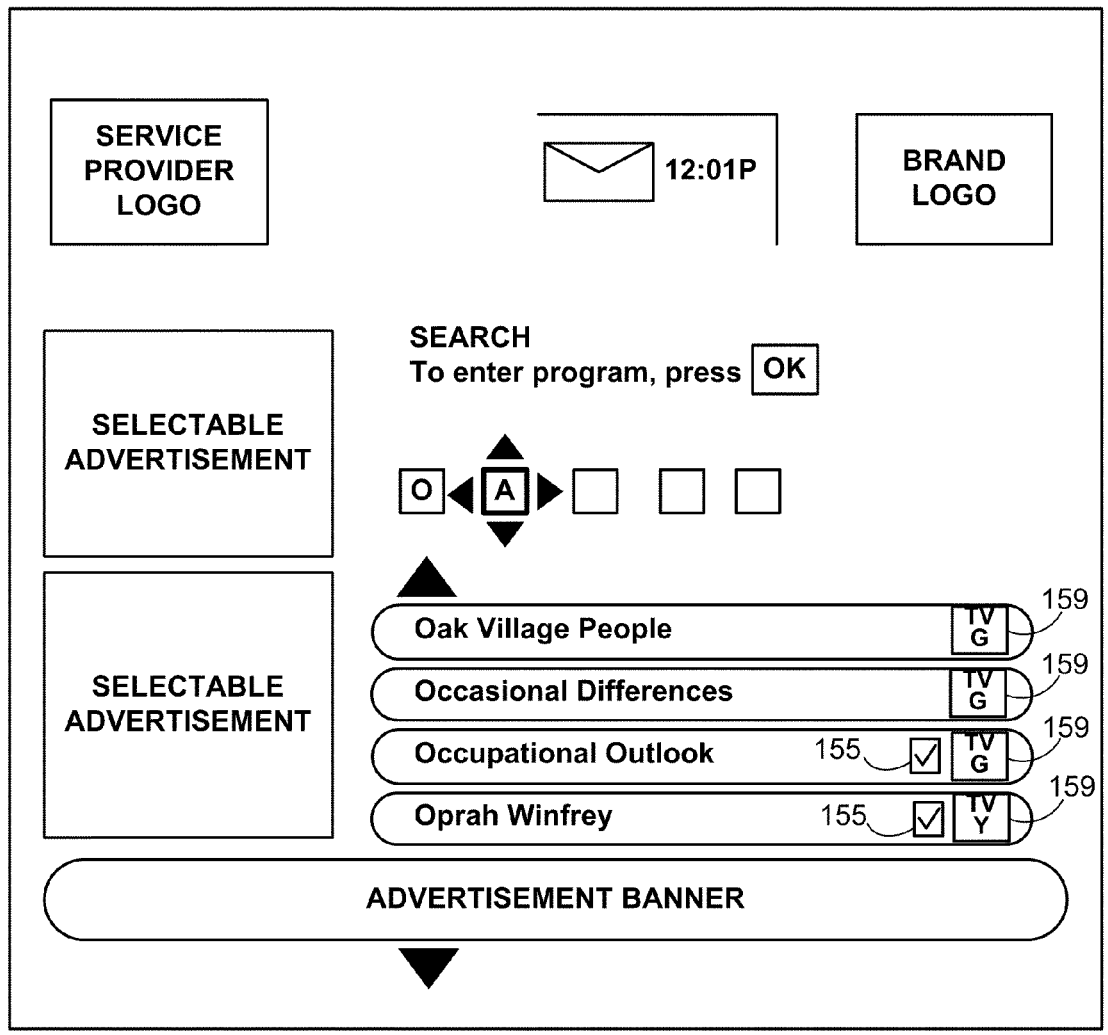
Figure 13C:
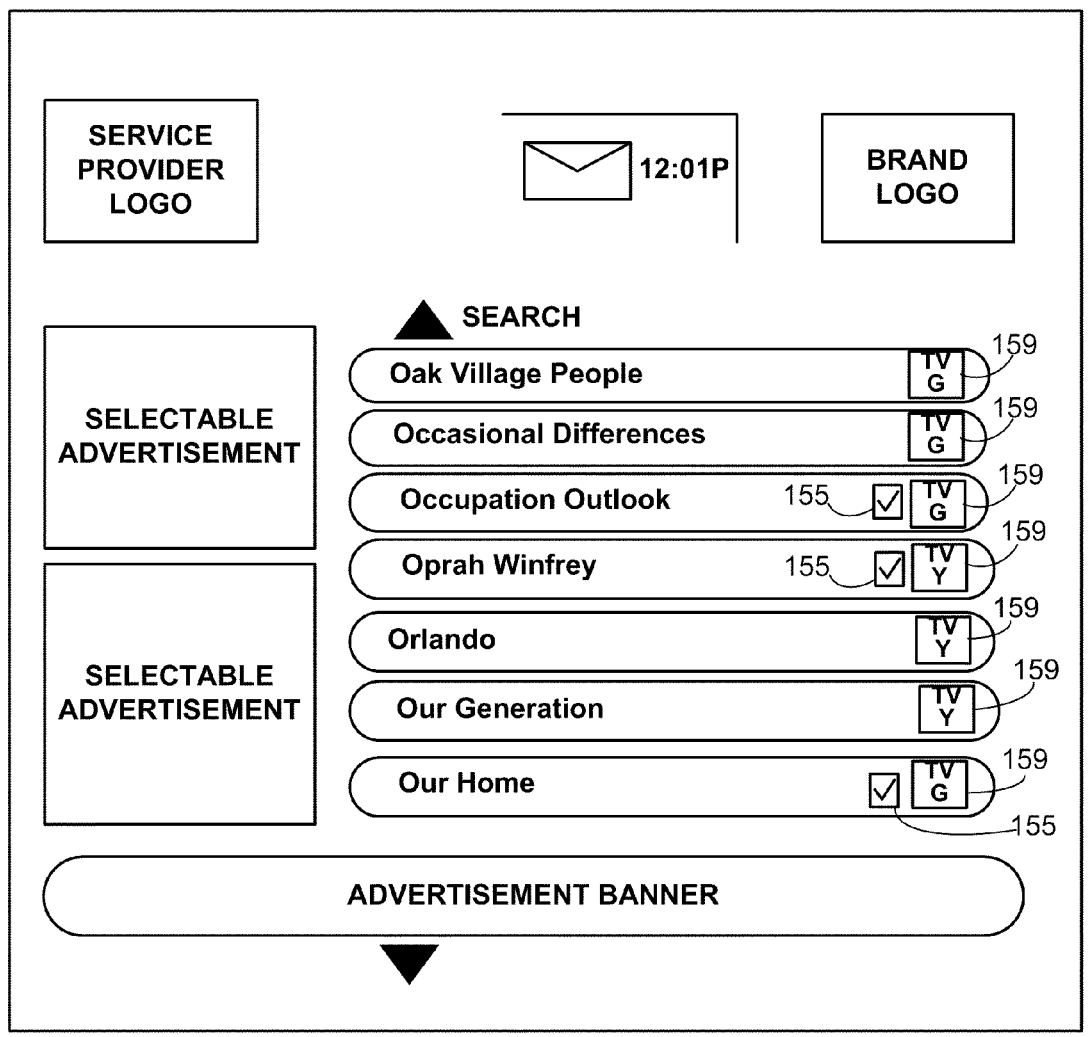

As shown in FIGS. 13*a*-13*c*, the program guide may prompt a user to enter up to a predefined number of letters into entry boxes 149 (in this example up to five letters). A user may enter a letter in each entry box 149 by, for example, using "up" and "down" arrow keys on remote control 40 to scroll through the alphabet. To enter an additional letter, a user may, for example, press a "right" arrow on remote control 40. The program guide may highlight an appropriate on-screen arrow 153 to indicate to a user the arrow that a user has pressed.

In the example shown in FIG. 13*b*, a user has selected the letter "O" as the first letter of the program listing that is being searched for and has been prompted for an additional letter. After a user enters each letter, the program guide may search through available program listings and display the program listings starting with first letters that match the letters that a user has entered. In this example, the program guide has displayed listings beginning with the letters "Oa". In practice, it may be desirable for only one listing of a program to be displayed even though it may have multiple showings. Otherwise, a user may be presented with a screen full of listings with the same title. The program guide may, therefore, display multiple airings of the same program using one listing.

When a user is finished entering letters, a user may indicate a desire to scroll through listings by, for example, pressing an "OK" or "enter" key on remote control 40. In response, the program guide may display a full screen of listings as shown in FIG. 13*c*. From within a screen such as that shown in FIG. 13*c*, a user may select a selectable advertisement by, for example, pressing a "left" arrow key on remote control 40 to select a selectable advertisement. A user may page or scroll through listings by, for example, pressing suitable keys on remote control 40 (e.g., "page up", "page down", "up" arrow, "down" arrow, etc.).

A user may indicate a desire to view additional information about a particular program, such as all of the times a program airs, by selecting its listing and pressing "OK" or "info" on remote control 40. The program guide may respond by displaying a program information screen in which a user is provided with the opportunity to view the air times for a program and to view other suitable information (e.g., the title, a brief description, rating information, actor information, etc.). The guide may allow a user to perform other functions from within the screen, such as setting a reminder, setting a lock, ordering a program, or any other suitable function.

Figure 14:
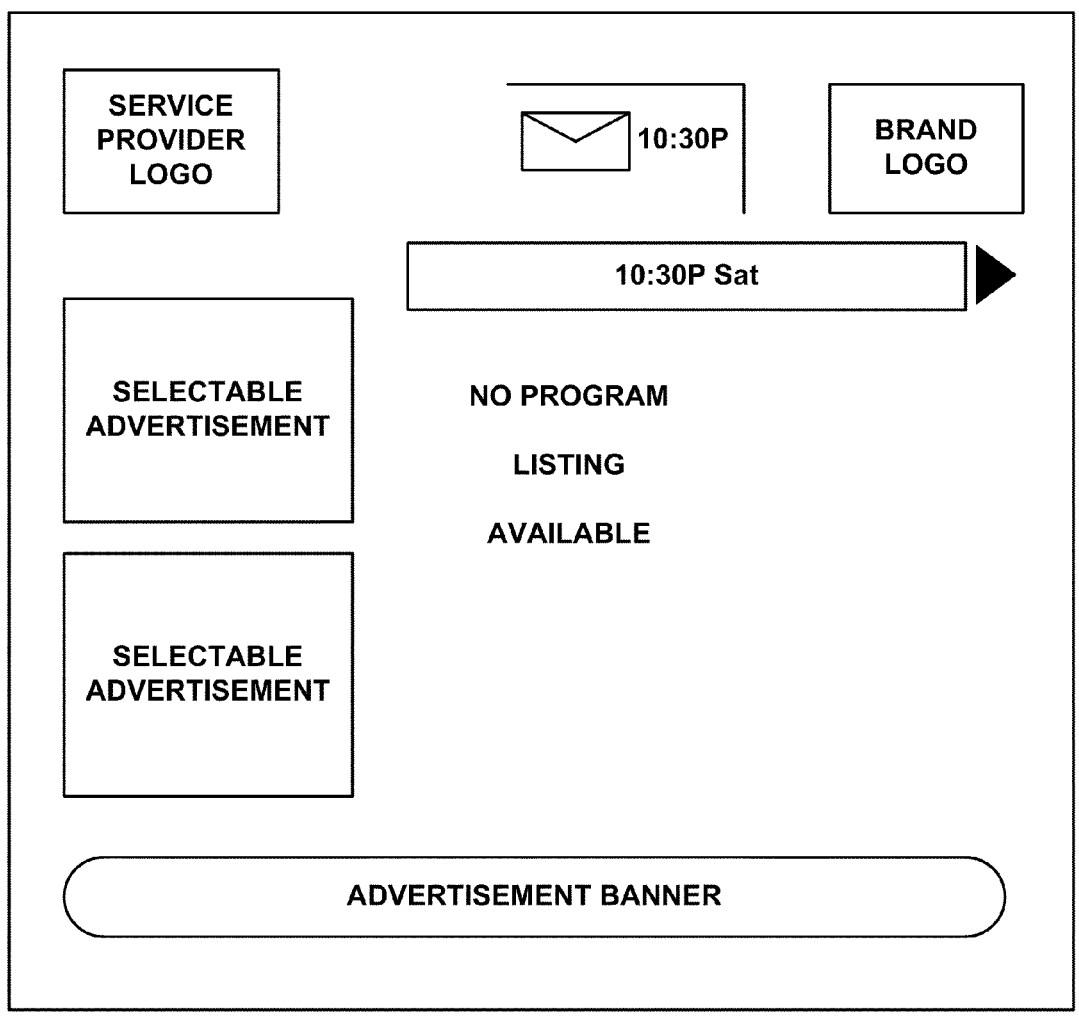
FIG. 14 shows a default display screen that may be displayed by the program guide when the user indicates a desire to display a listings screen for which there is no matching data.

The program guide of the present invention may download program guide data continuously, periodically, using a client-server based approach, via the Internet, or using any other suitable approach. There may be instances, however, when downloading program guide data may take long enough for users to experience a wait. The program guide may, if desired, display a default screen indicating that the program guide is downloading data. An illustrative default screen 180 that the program guide may display, for example, when there are no program listings, is shown in FIG. 14. Default screen 180 may also be displayed generally when a user indicates a desire to view a listings screen for which there is no matching data (e.g., when there are no movies listings for a movies listings screen).

The interactive program guide may provide users with access to a passive program guide channel (e.g. the TV Guide Channel) so that a user is provided with a guide and television viewing experience that combines the features of both a passive and an interactive guide. Systems in which interactive guides are overlaid on passive program guide channels are described, for example, in Marshall et al. U.S. patent application Ser. No. 08/225,246, filed Apr. 8, 1994, which is hereby incorporated by reference herein in its entirety. Illustrative hybrid passive/interactive display screens are shown in FIGS. 15-16.

Figure 15:
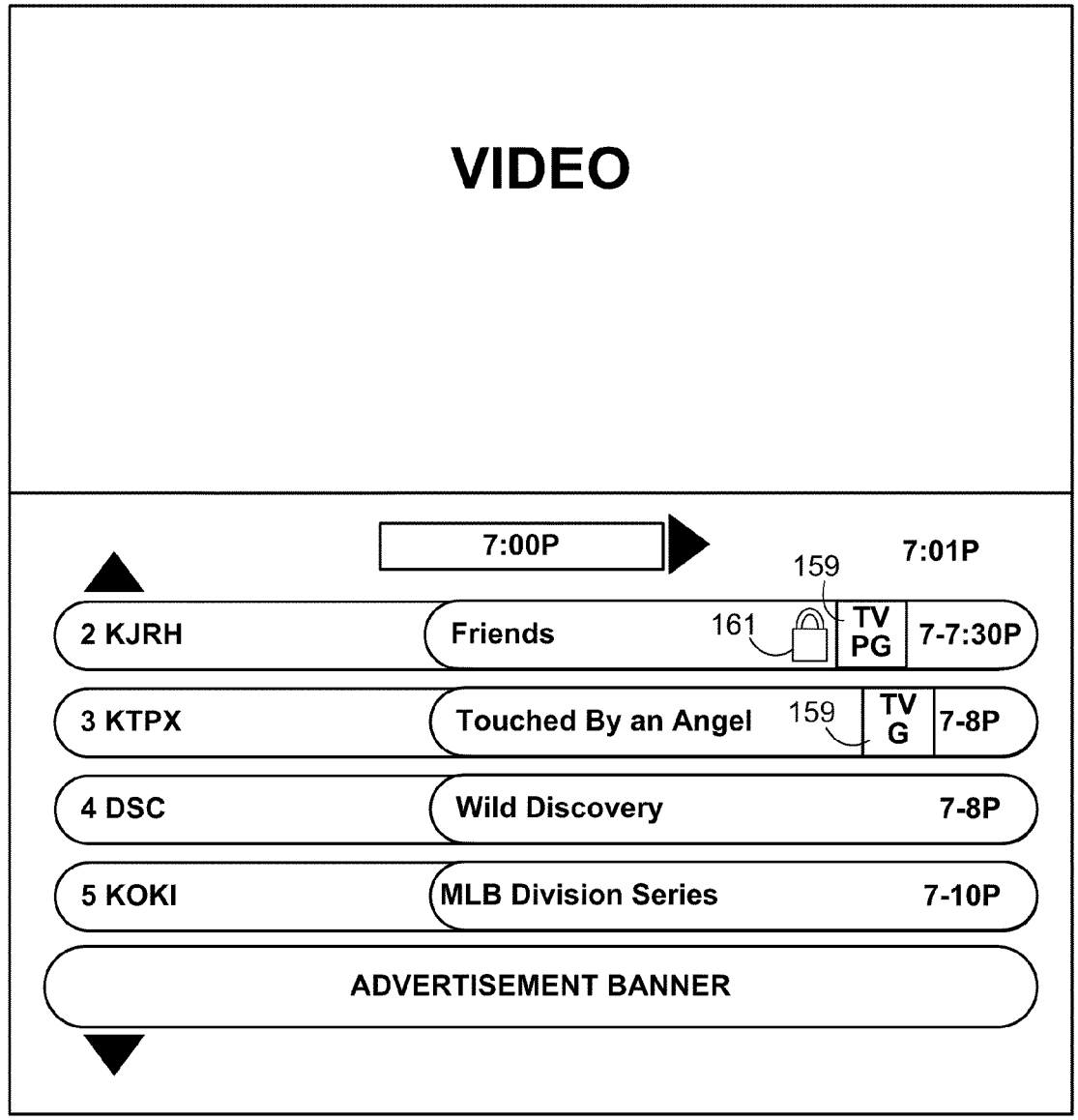
FIGS. 15-16 are additional illustrative program guide display screens for providing a user with access to a passive electronic television program guide channel.

As shown in FIG. 15, for example, the top portion of the display screen may contain the video that is provided as part of a passive television program guide channel that a user has tuned to. The bottom portion of the screen may, for example, display program listings that have been generated by the interactive program guide. The video of the passive television program guide channel may be sized to fit in the top portion of the screen, or, the television program listings portion of the screen may be overlaid onto a full screen video.

Figure 16:
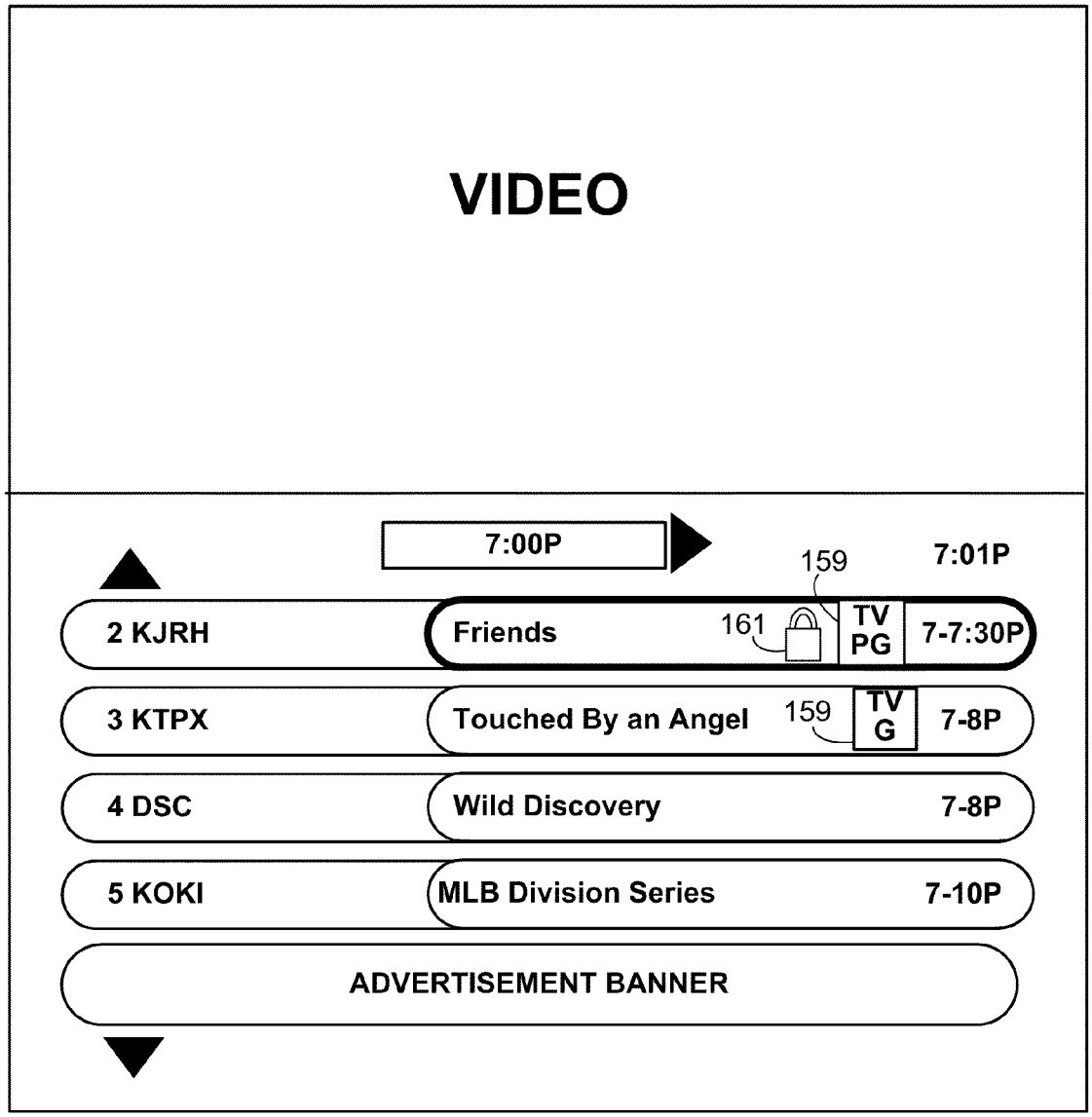

The passive portion of FIGS. 15 and 16 may include promotional videos. Promotional videos may promote programs, channels, services, goods, or any other suitable subject matter. In practice, it may be desirable to have promotions distributed to users so as to attempt to maximize their effectiveness. Promotions may be selected for distribution by television distribution facility 16 according, for example, to promotional philosophies. Promotional philosophies are selection algorithms that attempt to maximize the effectiveness of promotions by selecting them for distribution during times for which expected audiences will view the promotions.

For example, when promotions are selected for distribution on a national basis, some promotions may not be apropos for a given area at a given time. It would therefore be desirable to "play something better", i.e., play a promotion that is more suitable for the expected audience than the promotion selected on a national basis. Promotional philosophies may be used to effect this. Systems in which promotional philosophies may be used to "play something better" are described, for example, in Kern et al. U.S. patent application Ser. No. 09/332,448, filed Jun. 11, 1999, which is hereby incorporated by reference herein in its entirety.

An operator at main facility 12 may, for example, generate one or more promotional philosophy templates that are used by main facility 12 to generate a national play list of promotional events. The promotional philosophy templates and national playlist may be provided to television distribution facility 16 as part of the program guide data.

Television distribution facility 16 may generate a local playlist of promotional events according to the promotional philosophy templates and the local database. If the promotional events scheduled by the national playlist are unavailable or undesirable to a television distribution facility, the local playlist may schedule store-and-forward promotional material instead of a national promotional video. The television distribution facilities generate program guide display screens with the promotional material, national promotional videos, and program guide data according to the local playlist. The display screens are distributed to users for viewing on their televisions.

The program guide may display the portion of the display screen with the program listings in two modes: a passive mode and an interactive mode. When displaying listings in the passive mode, the program guide may display television program listings in pages that automatically change periodically at a user configurable rate, as shown in FIG. 15. The listings may also scroll, rather than page, and may be displayed in any suitable format, such as a grid or list.

In the interactive mode (FIG. 16), the program listings are displayed and the program guide may provide a user with an opportunity to navigate through the listings by, for example, using arrow keys on a remote control. The program guide may display the listings in the interactive mode in response to a user command to do so. For example, a user may press a suitable key on remote control 40, such as an "OK" or arrow key, while viewing listings in the passive mode. The program guide may return to the passive mode from the interactive mode after a period of time during which the program guide has not received commands from a user (e.g., five minutes).

The program guide portions of the screens of FIGS. 15-16 may also indicate the rating of a program and whether a program is locked by displaying rating indicators 159 or parental lock indicators 161, respectively. The program guide may also indicate that a program has had a reminder set.

Figure 17:
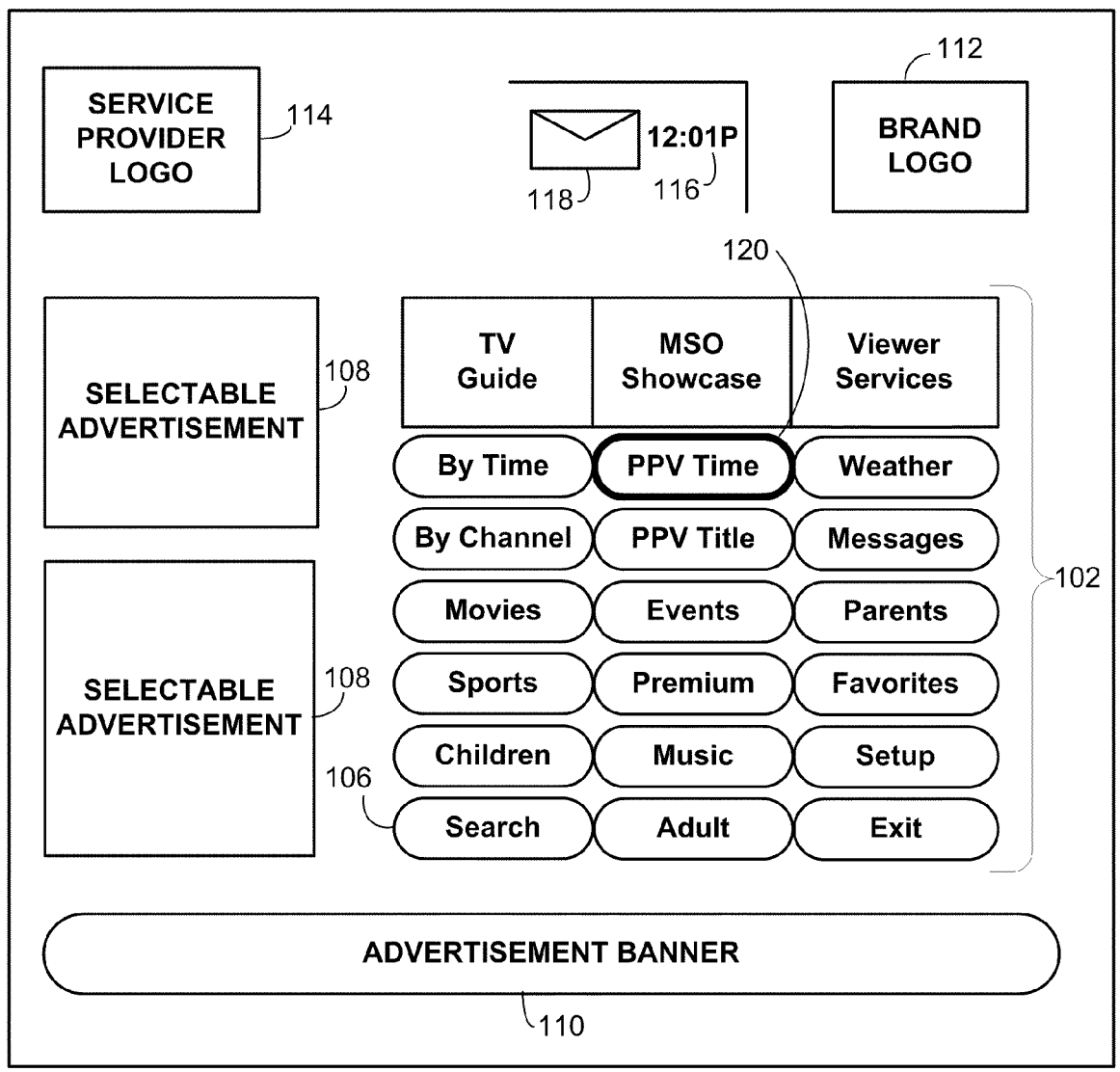
FIG. 17 shows another illustrative main menu screen for providing a user with an opportunity to navigate through program guide features.

The program guide may also be configurable by a system operator that operates television distribution facility 16, such as a multiple system operator (MSO). The program guide may provide users with an opportunity to access MSO provided services through, for example, a main menu screen. Illustrative main menu screen 100 of FIG. 9 has been redrawn in FIG. 17 to illustrate that a user has moved highlight region 120 to the MSO showcase column of menu 102. MSO provided services may include, for example, access to pay-per-view (PPV) program listings, ordering of pay-per-view programs and packages, listing and ordering sporting events or other sports related programming, listing and ordering special offers, access to music channels, listing and ordering adult programs, or any other suitable service that may be provided by an MSO. Interactive television program guide systems that provide a configurable operator showcase are described, for example, in Ellis et al. U.S. patent application Ser. No. 08/944,162, filed Oct. 6, 1997, which is hereby incorporated by reference herein in its entirety.

Figure 72:
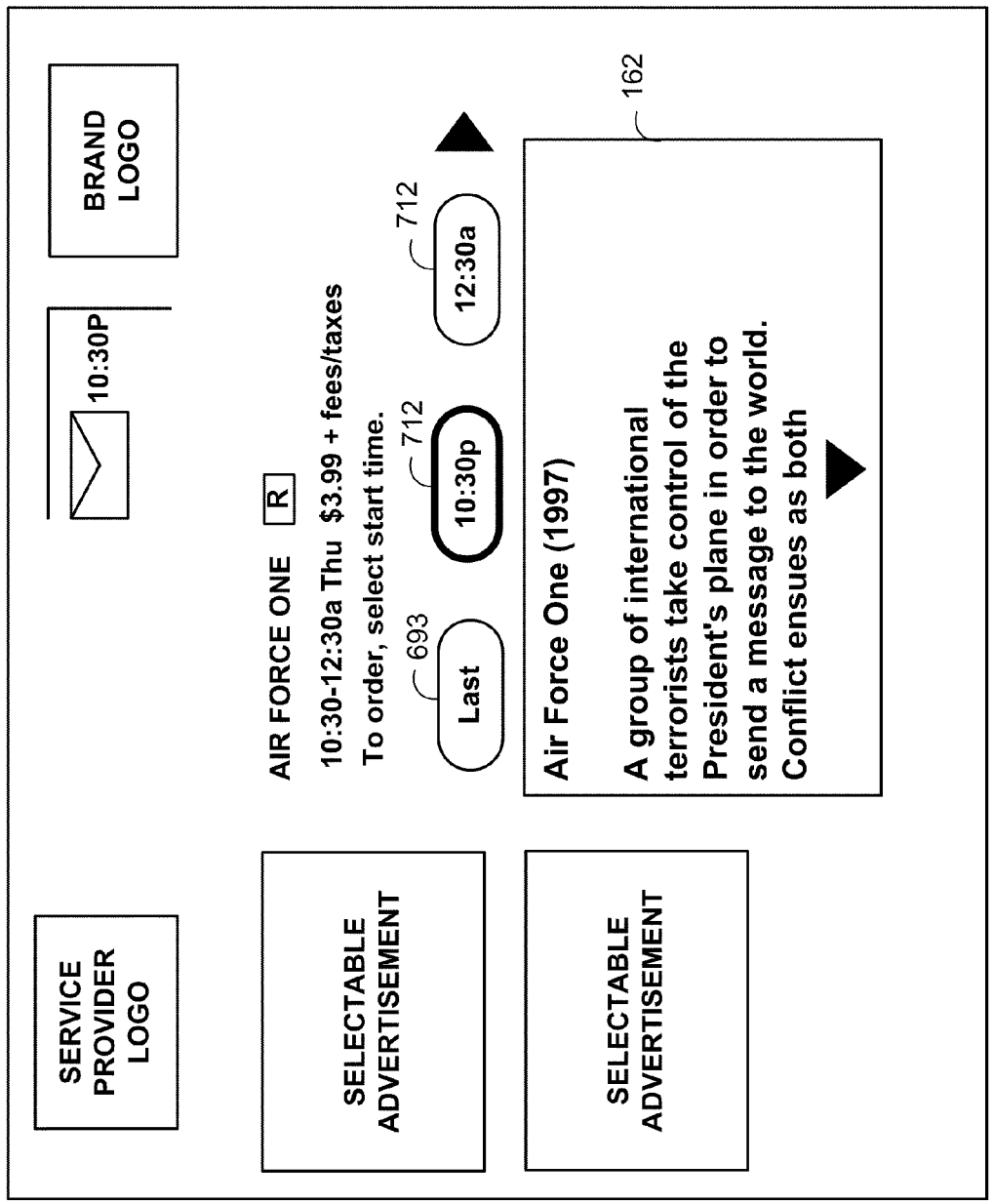

A user may, for example, indicate a desire to view listings for pay-per-view programs by selecting the "PPV Time" on-screen option. In response, the program guide may display pay-per-view program listings by time, as is illustrated by pay-per-view listings by time screens 201 and 203 of FIGS. 18 and 19. As with other listings screens, a user may scroll up and down to view pay-per-view program listings for additional channels. In response to a user selecting a pay-per-view program listing, the program guide may, for example, display an additional information screen for the selected pay-per-view, such as shown in FIG. 72. The additional information screen may, for example, display additional air-times for the pay-per-view and provide the user with an opportunity to order it. A user may watch previews by, for example, selecting watch preview feature 191.

Figure 18:
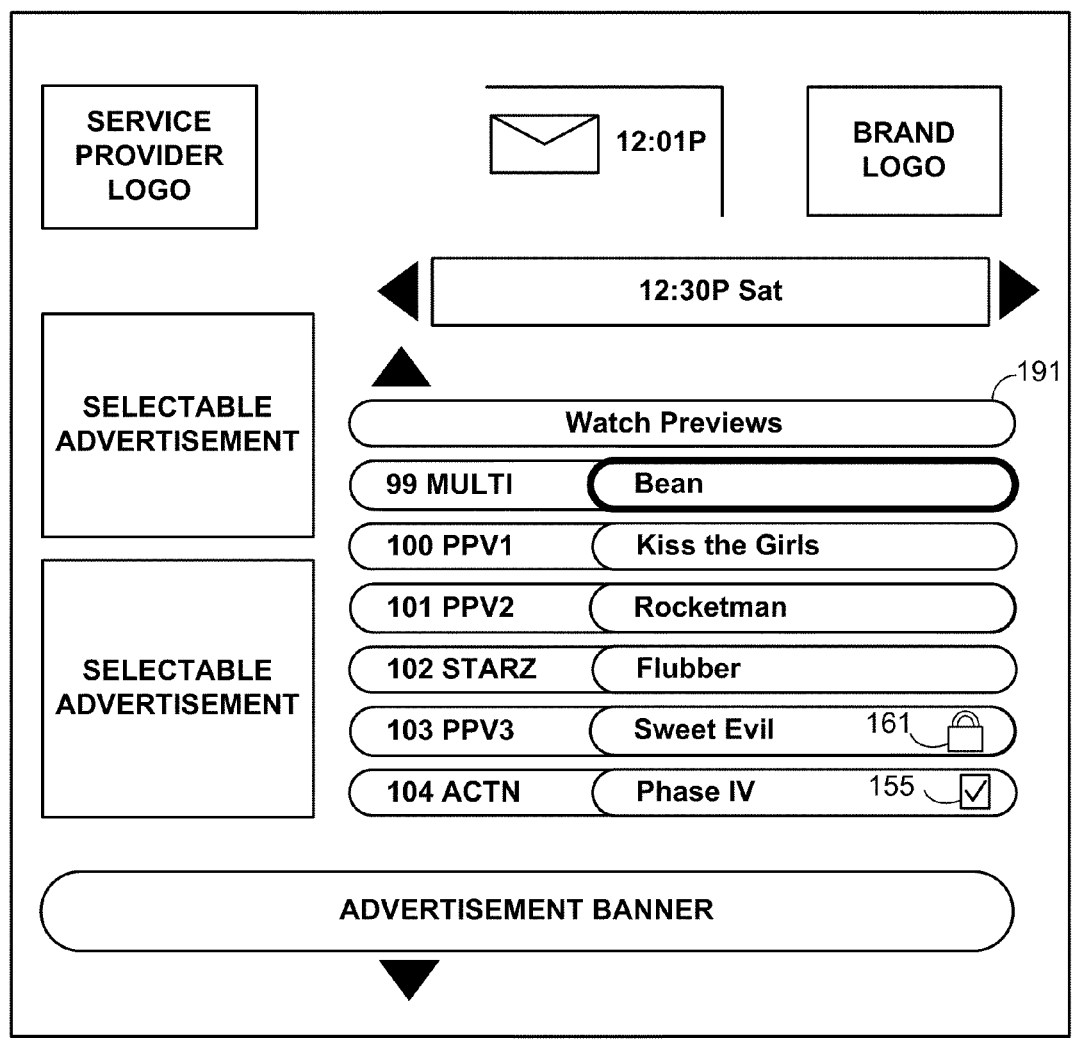
FIGS. 18-22, and 24 show illustrative program guide display screens for providing a user with access to pay-per-view, event, premium offers, and adult listings.
Figure 19:
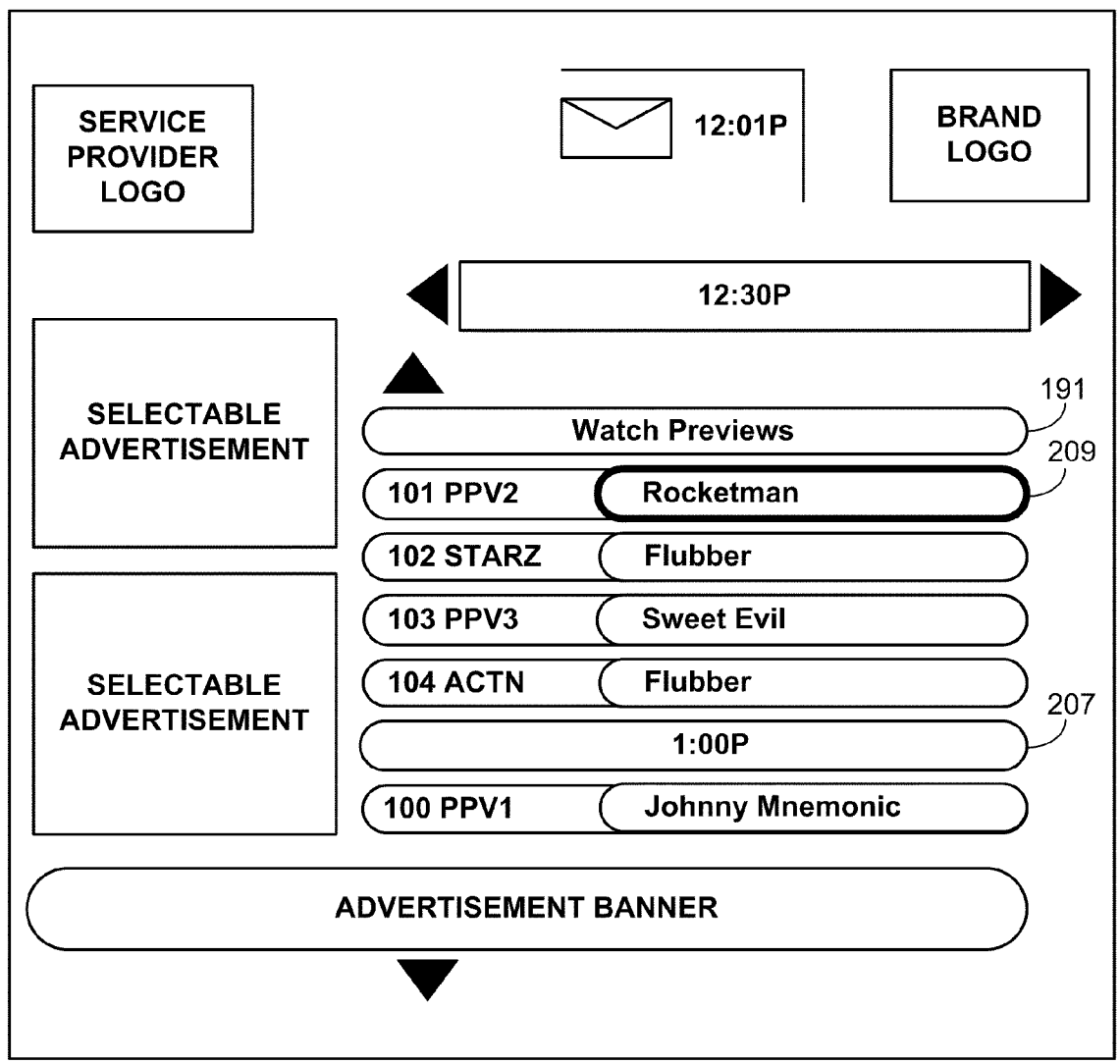

In pay-per-view program listings by time screen 201 of FIG. 18, a user may view program listings for additional time slots by arrowing right. A user may also, for example, select selectable advertisements by arrowing to the left. If desired, however, pay-per-view program listings may be divided into predefined time slots (e.g., 30 minutes). As shown in the pay-per-view programs by time screen 203 of FIG. 19, the program guide may display separator 207 to indicate to a user that a user has scrolled or paged between time slots. When the user scrolls within pay-per-view program listings, highlight region 209 may skip separator 207. FIG. 19 also illustrates how the program guide may display an advertisement banner such that a user is required to scroll through an advertisement banner in order to access additional listings. The program guide may provide a user with an opportunity to highlight a selectable advertisement by, for example, arrowing left. The program guide may also provide a user with an opportunity to watch previews by, for example, selecting watch previews feature 191.

Figure 20:
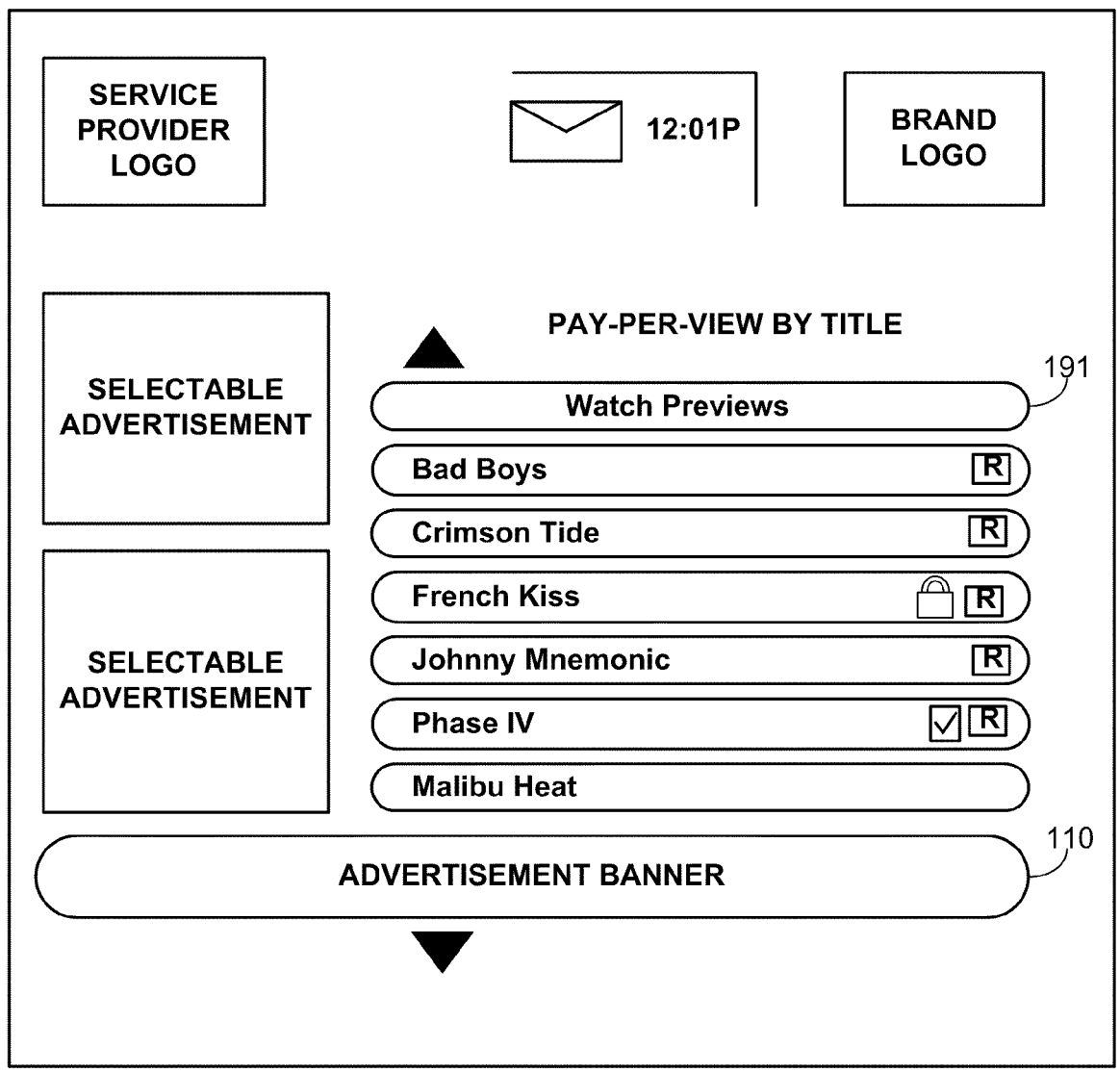

The program guide may also provide a user with an opportunity to view pay-per-view program listings by title. A user may indicate a desire to view pay-per-view program listings by title by, for example, selecting a "PPV Title" selectable feature from menu 102 of FIG. 17. In response, the program guide may display pay-per-view program listings by title as shown, for example, in pay-per-view program listings by title screen 211 of FIG. 20. If desired, an advertisement banner may be made part of the program listings as shown. In this approach, a user may be required to scroll through advertisement banner 110 to access additional program listings. The program guide may provide a user with an opportunity to highlight a selectable advertisement by, for example, arrowing left. The program guide may also provide a user with an opportunity to watch previews by, for example, selecting watch previews feature 191.

Figure 21:
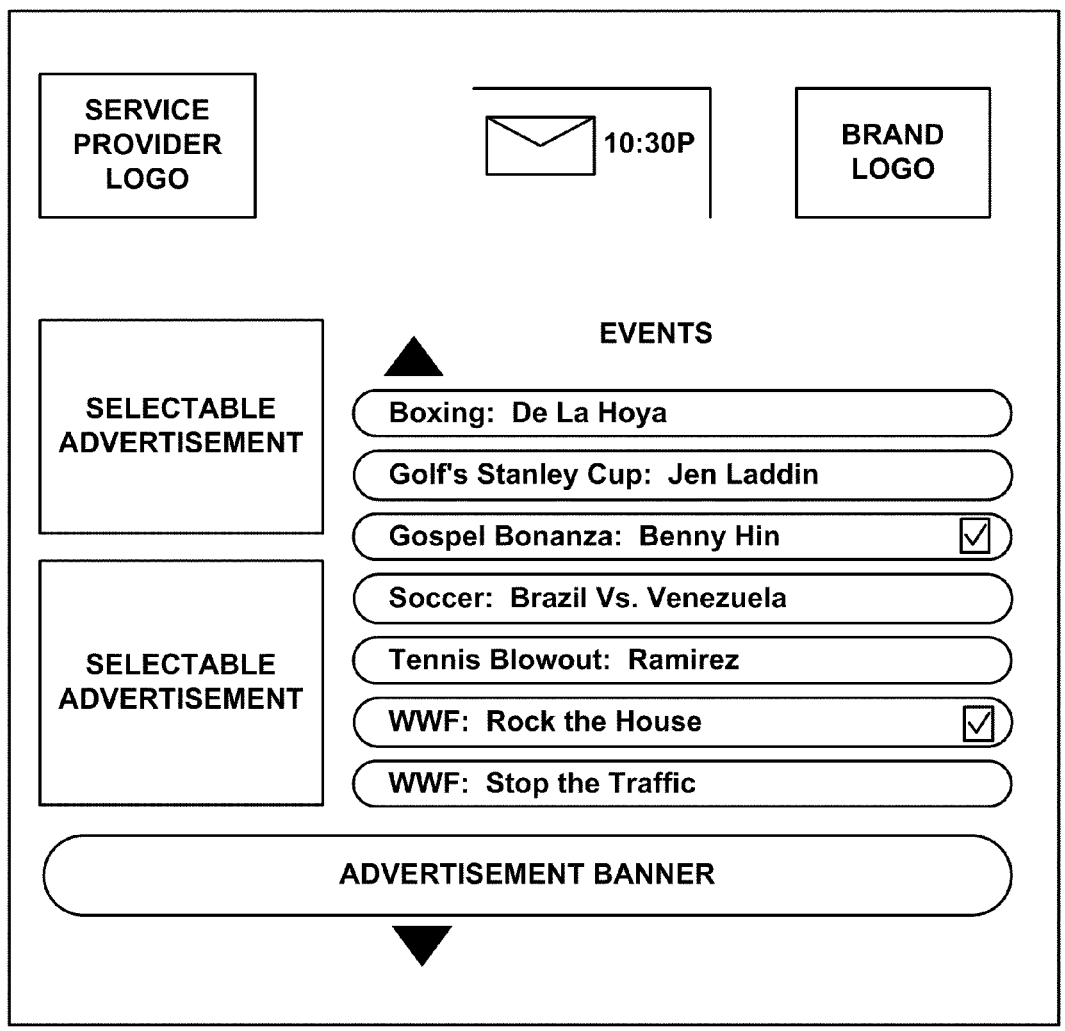

The program guide may also provide a user with an opportunity to view listings for special events. A user may indicate a desire to view program listings for special events by, for example, selecting an "Events" selectable feature from menu 102 of FIG. 17. The program guide may respond by displaying program listings for upcoming special events, for example, in special events program listings by title screen 221 of FIG. 21. If desired, a system operator may configure the guide to sort the events by time rather than by title. If desired, an advertisement banner may be made part of the program listings as shown. In this approach, a user may be required to scroll through the advertisement banner to access additional program listings. The program guide may provide a user with an opportunity to select a selectable advertisement by, for example, arrowing left. Users may also view additional information for an event by, for example, highlighting a listing and pressing an "info" key on remote control 40. In response, the program guide may, for example, display an additional information screen that provides the user with an opportunity to view additional air-times for the event and order an airing of the event.

Figure 22:
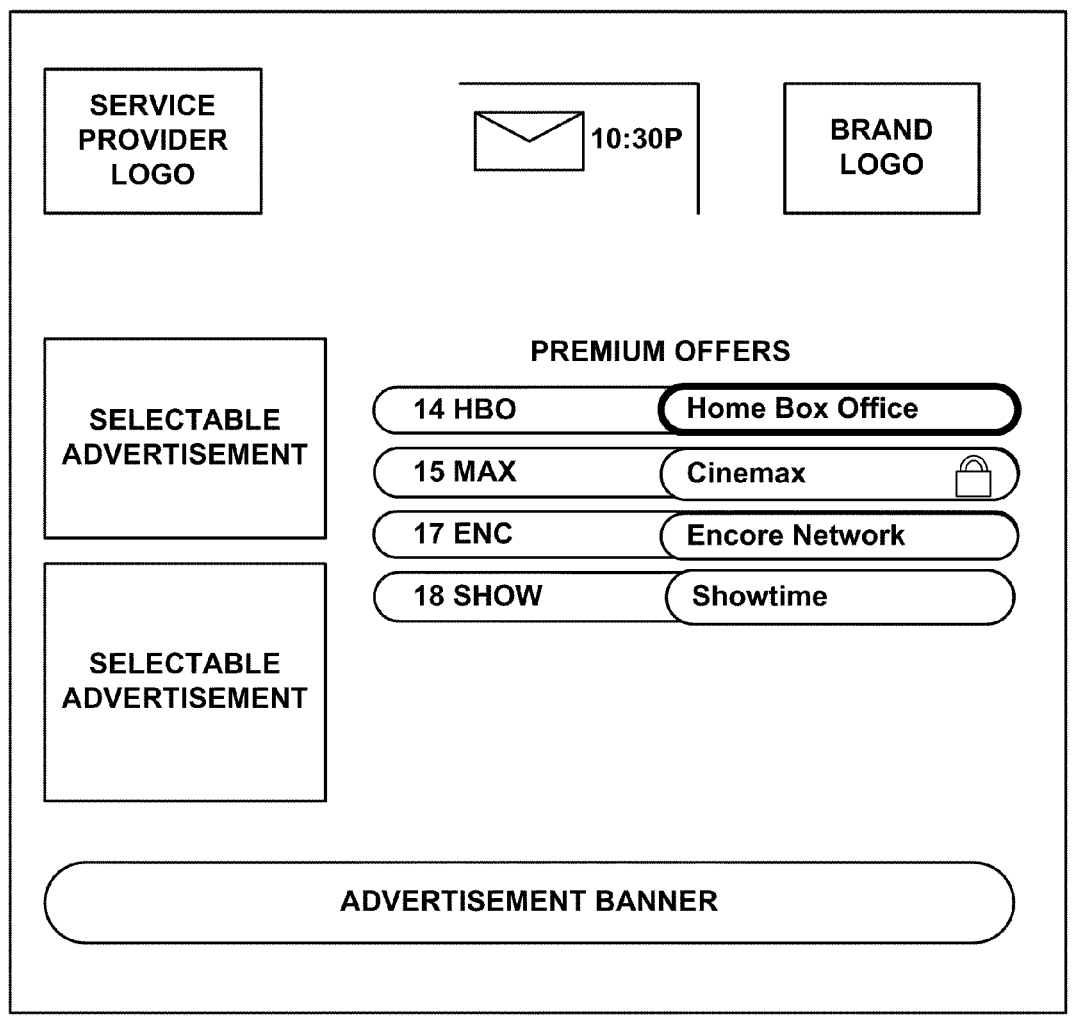

The program guide may also provide a user with an opportunity to view a list of available premium services. A user may indicate a desire to view a list of available premium services by, for example, selecting a "Premium" selectable feature from menu 102 of FIG. 17. In another suitable embodiment, a user may select an "Offers" feature from menu 102 (not shown). When a user indicates a desire to view a list of available premium services, the program guide may display program listings for premium services as shown, for example, in premium offers listings screen 231 of FIG. 22. If desired, an advertisement banner may be made part of the program listings. In this approach, a user may be required to scroll through the advertisement banner to access additional program listings. The program guide may provide a user with an opportunity to highlight a selectable advertisement by, for example, arrowing left. When the user selects a listing, the program guide may display a channel information screen which may include a description of the channel and may provide the user with an opportunity to watch the channel, get ordering information, lock the channel, see listings for the channel, set the channel as a favorite, or perform any other suitable action related to the channel.

Figure 23:
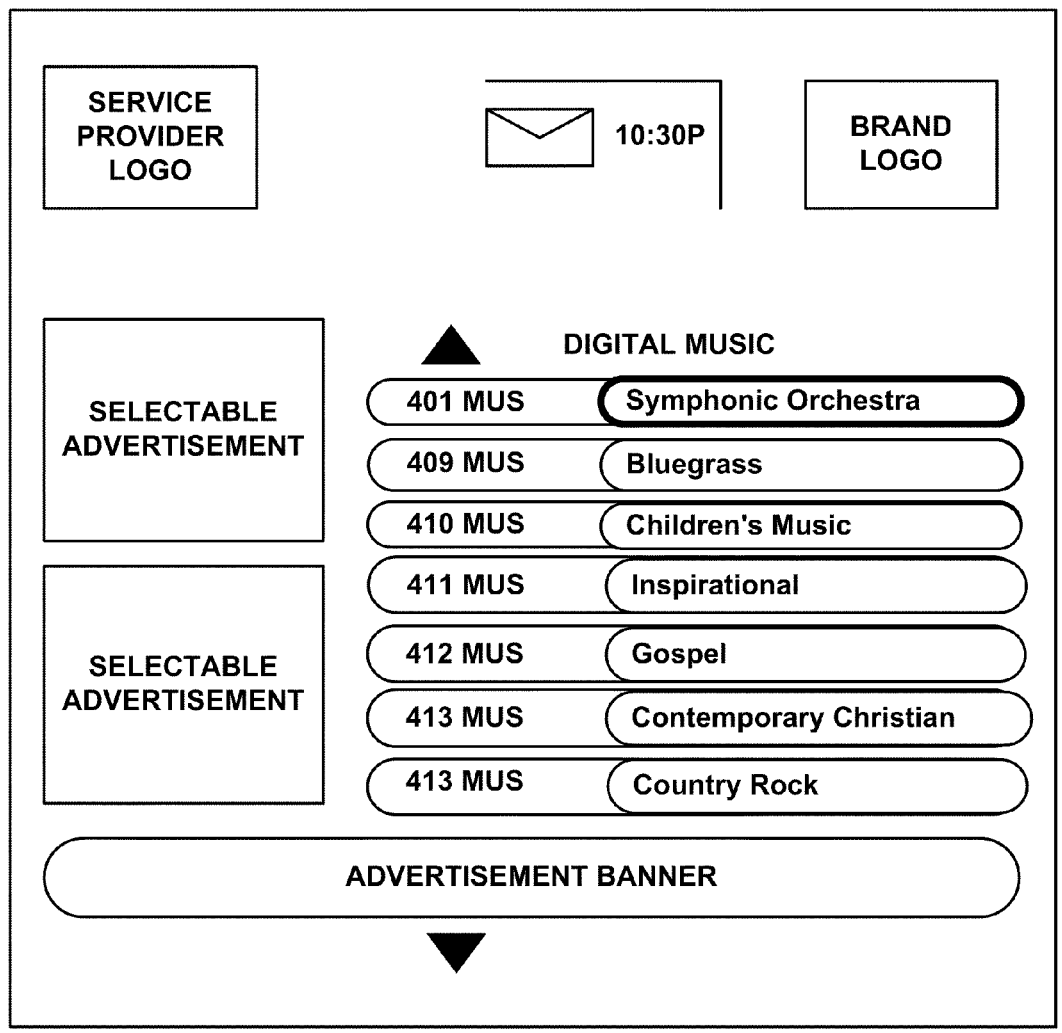
FIG. 23 shows an illustrative program guide display screen for providing a user with access to digital music channel information.

The program guide may also provide a user with an opportunity to view music channel information for available music channels. Music channel information may include, for example, the channel, call letters, and music type of a music channel. A user may indicate a desire to view music channel information by, for example, selecting a "Music" selectable feature from menu 102 of FIG. 17 or press a "music" key on remote control 40. When a user indicates a desire to view music channel information, the program guide may display a list of music channels as displayed in music channel listing screen 241 of FIG. 23. If desired, an advertisement banner may be made part of the program listings as shown. In this approach, a user may be required to scroll through the advertisement banner to access additional program listings. The program guide may provide a user with an opportunity to highlight a selectable advertisement by, for example, arrowing left. A user may select a listing to display a channel information screen for the selected music channel. Channel information screens, such as the music channel information screens of FIGS. 76a and 76b, may display a brief description of the music channel, provide a user with an opportunity to listen to the music channel, to order the channel, to lock the channel, to set the channel as a favorite, or to perform any other suitable action.

Figure 24:
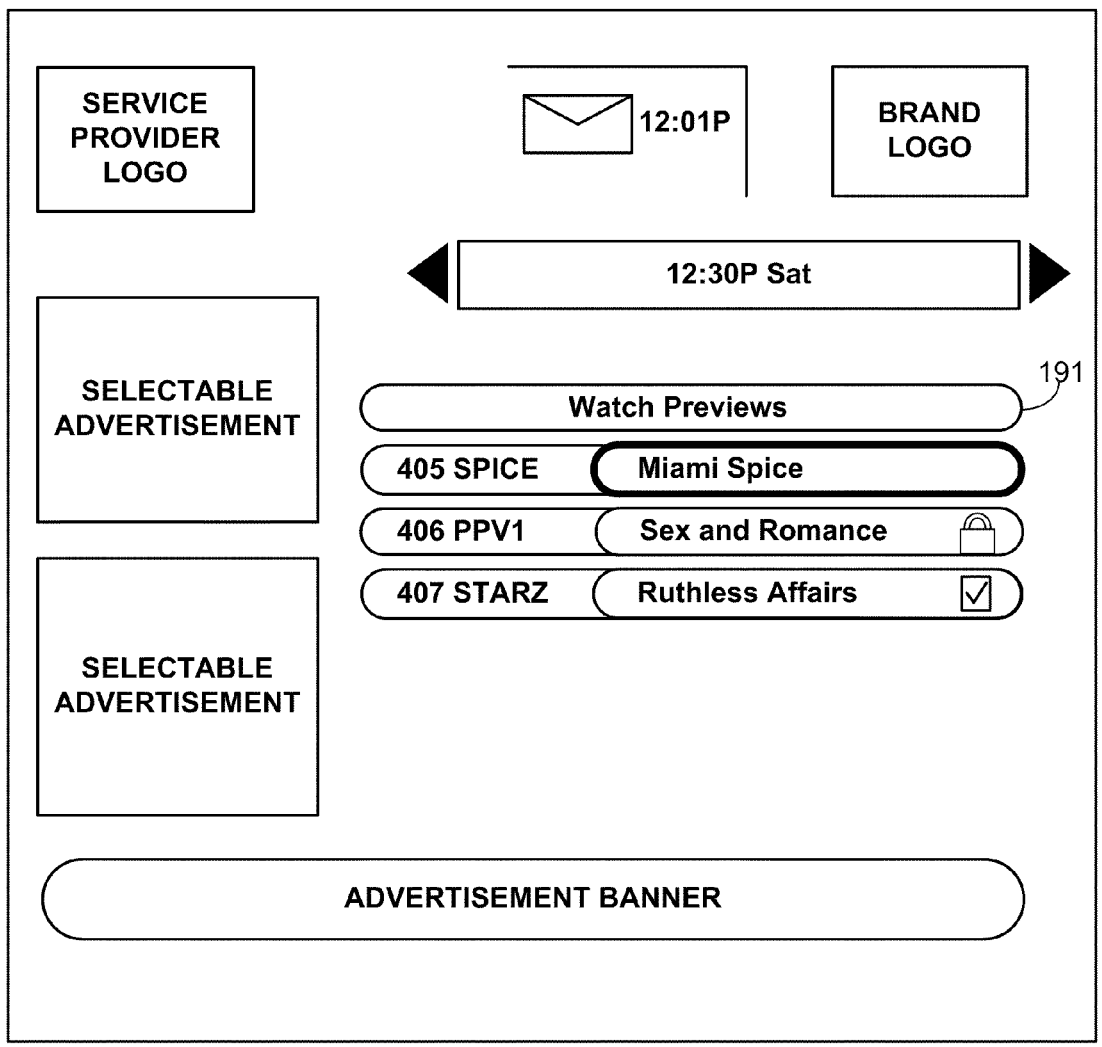
Figure 73:
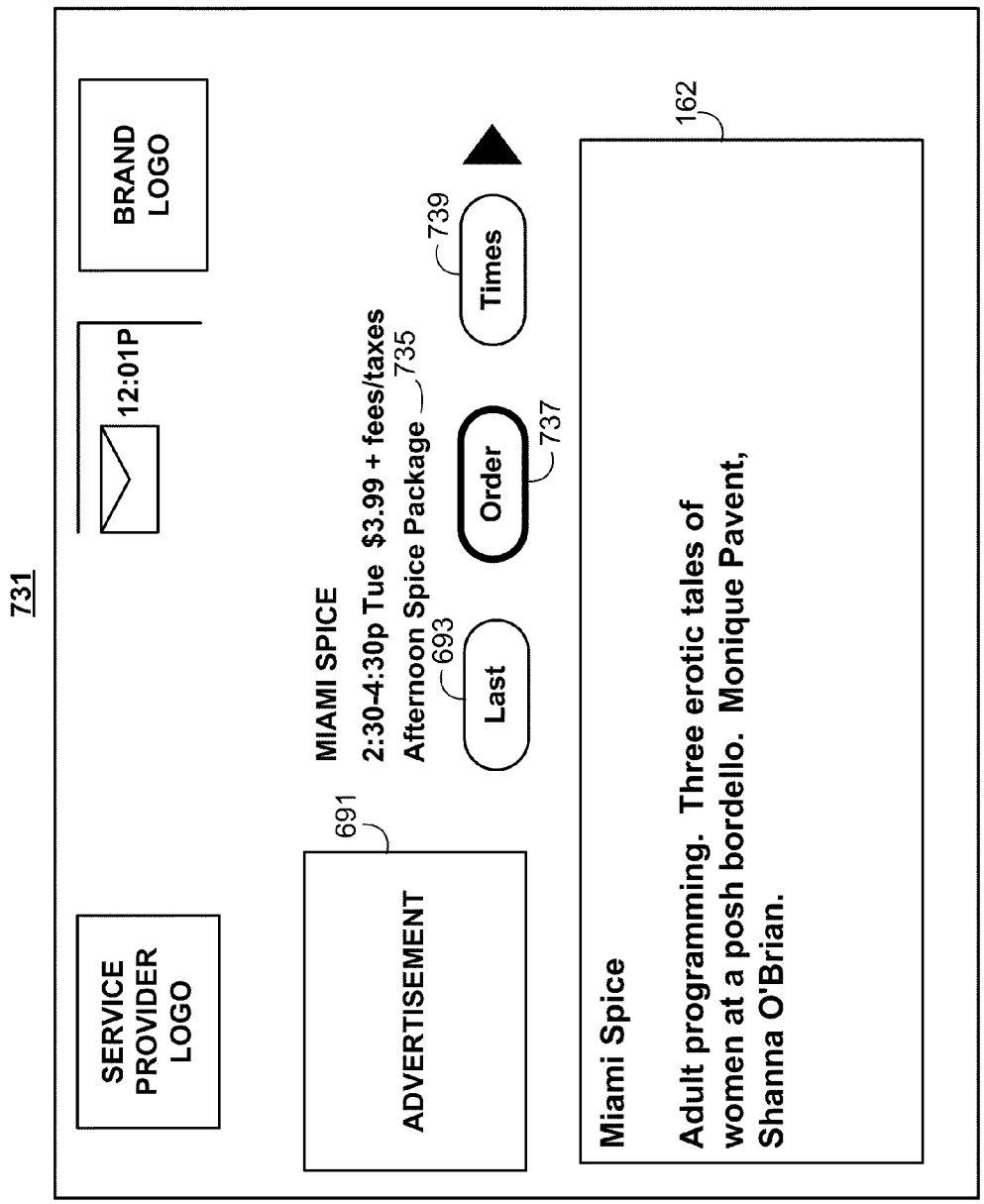

The program guide may also provide a user with an opportunity to view adult pay-per-view program listings by title. A user may indicate a desire to view adult program listings by, for example, selecting an "Adult" selectable feature from menu 102 of FIG. 18. In response, the program guide may display adult pay-per-view program listings for upcoming adult pay-per-view programs, for example, in adult pay-per-view program listings by time screen 251 of FIG. 24. A system operator may configure the guide to display program listings assorted by title, if desired. If desired, an advertisement banner may be made part of the program listings. In this approach, a user may be required to scroll through the advertisement banner to access additional program listings. The program guide may provide a user with an opportunity to highlight a selectable advertisement by, for example, arrowing left. The program guide may tune to a channel carrying previews when, for example, the user selects the watch previews feature 191. In response to a user selecting an adult pay-per-view listing, the program guide may, for example, display an information screen for the listing, such as shown in FIG. 73. The information screen may, for example, display additional air times for the adult pay-per-view, provide the user with an opportunity to order the pay-per-view, lock the pay-per-view, set a reminder for the pay-per-view, tune to the pay-per-view, or perform any other suitable function.

Figure 25:
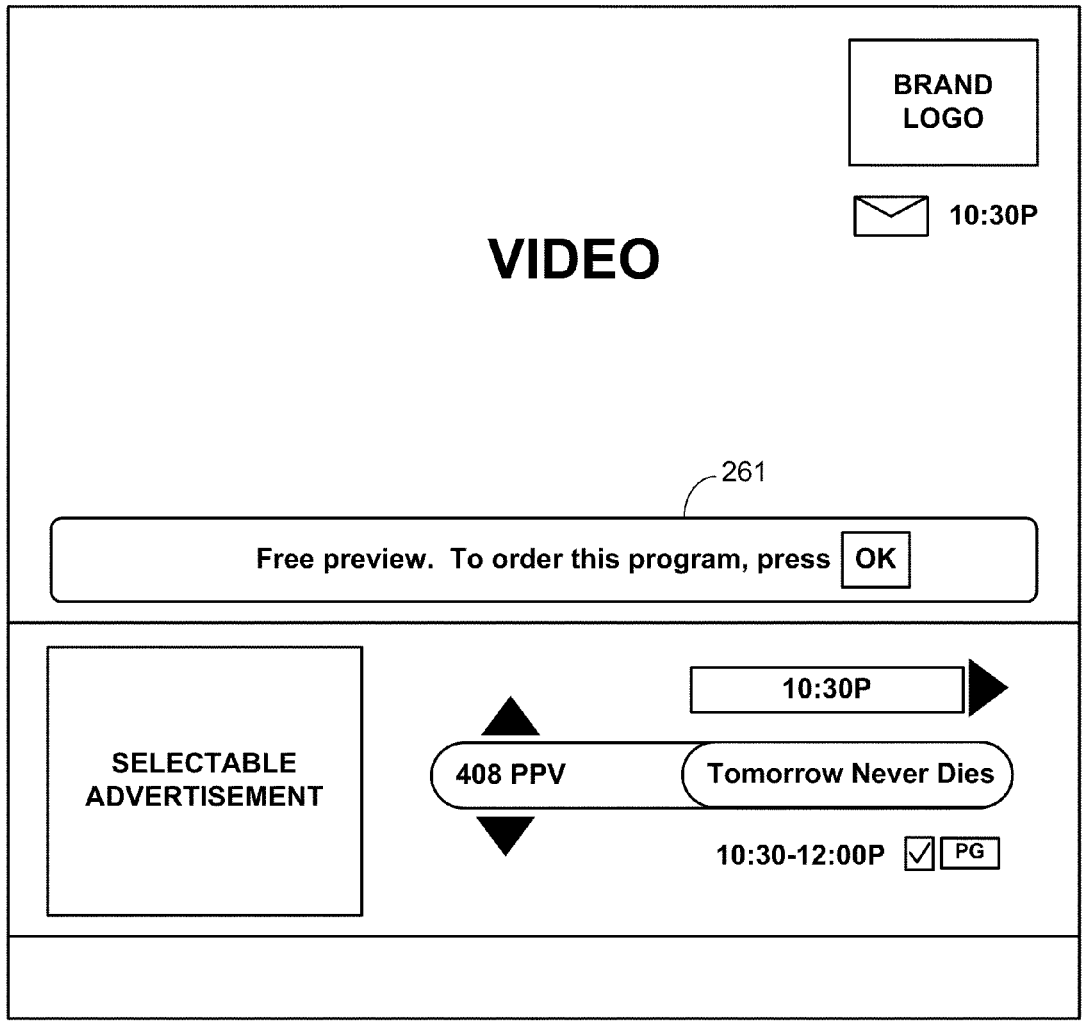
FIG. 25 shows an illustrative free pay-per-view overlay for providing a user with access to free pay-per-view previews.

Some operators of television distribution facility 16 may offer their customers free previews of pay-per-view programs. The program guide may display an overlay indicating that what a user is currently watching is a free portion of a pay-per-view program. An illustrative overlay 261 is shown in FIG. 25.

FIGS. 26-29 show illustrative informational overlays for providing a user with access to information on channels, services, and programs which have not been subscribed to by a user. The program guide may provide a user with an opportunity to obtain ordering information and to subscribe to a channel, service, or program by, for example, pressing an "OK" key on remote control 40. If desired, these screens may also include a product brand graphic, cable service provider graphic, a message or reminder graphic, or any other suitable graphic. These screens may include FLIP overlays as shown.

Figure 26:
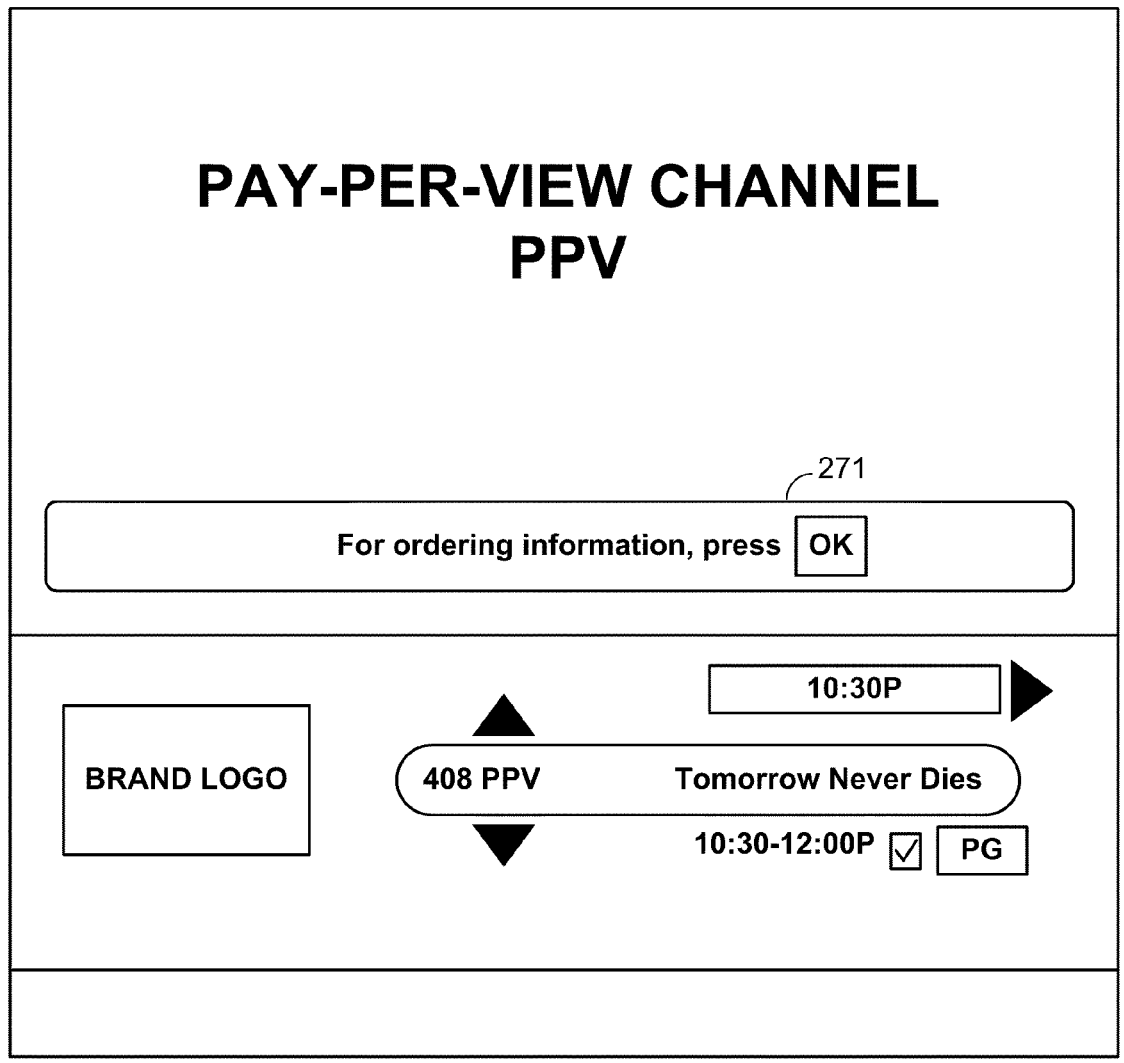
FIGS. 26-29 show illustrative display screens with informational overlays for providing a user with access to information on channels, services, and programs that have not been subscribed to by a user.

FIG. 26 shows an illustrative overlay 271 that the program guide may display when a user tunes to a channel that is broadcasting a pay-per-view program that a user has not ordered. A user may obtain ordering information by, for example, pressing an "OK" key on remote control 40. In response the guide may display a pay-per-view information screen such as shown in FIG. 72.

Figure 27:
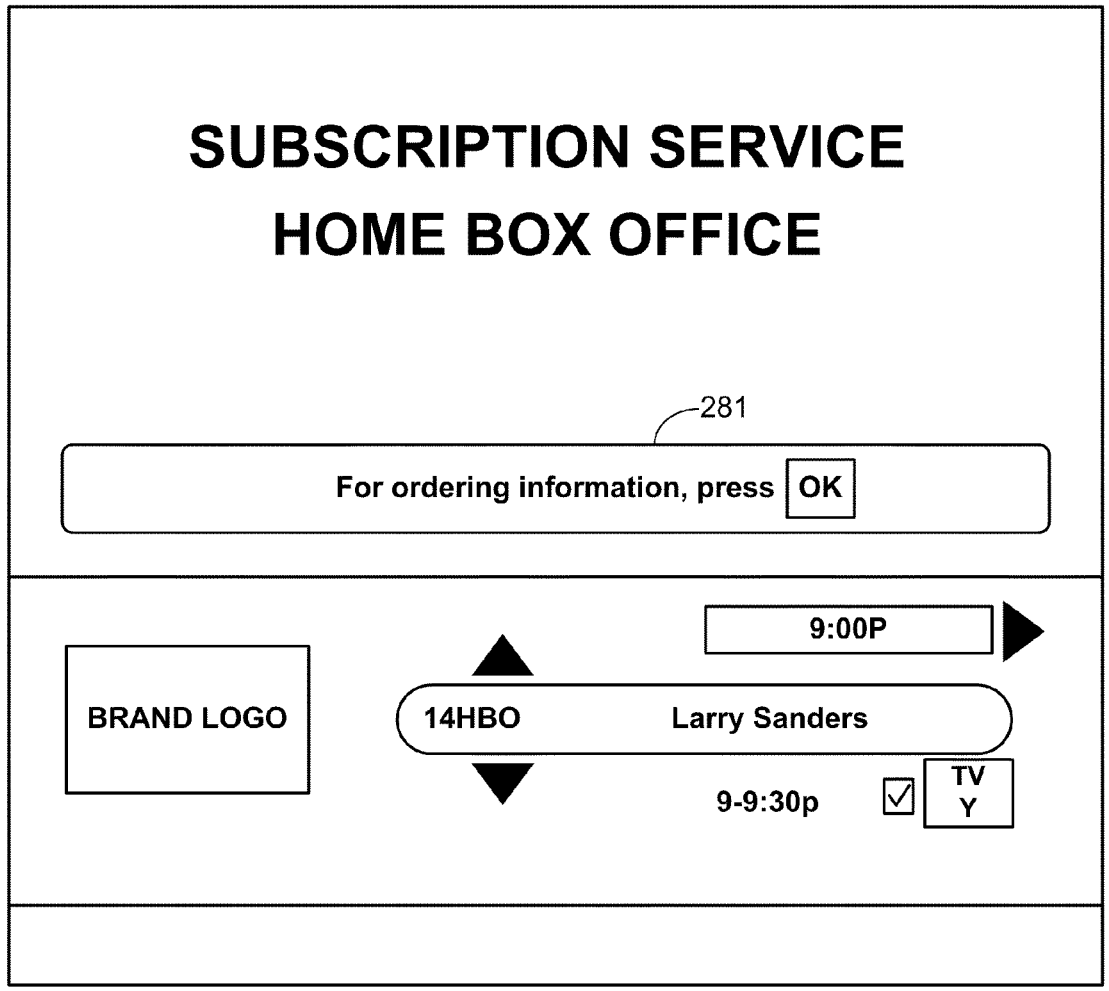

FIG. 27 shows an illustrative overlay 281 that the program guide may display when a user tunes to a subscription service, in this example a premium channel, to which a user has not subscribed. A user may obtain ordering information by, for example, pressing an "OK" key on remote control 40. In response, the program guide may display a channel information screen for the premium channel, such as the channel information screen shown in FIG. 75*b*.

Figure 28:
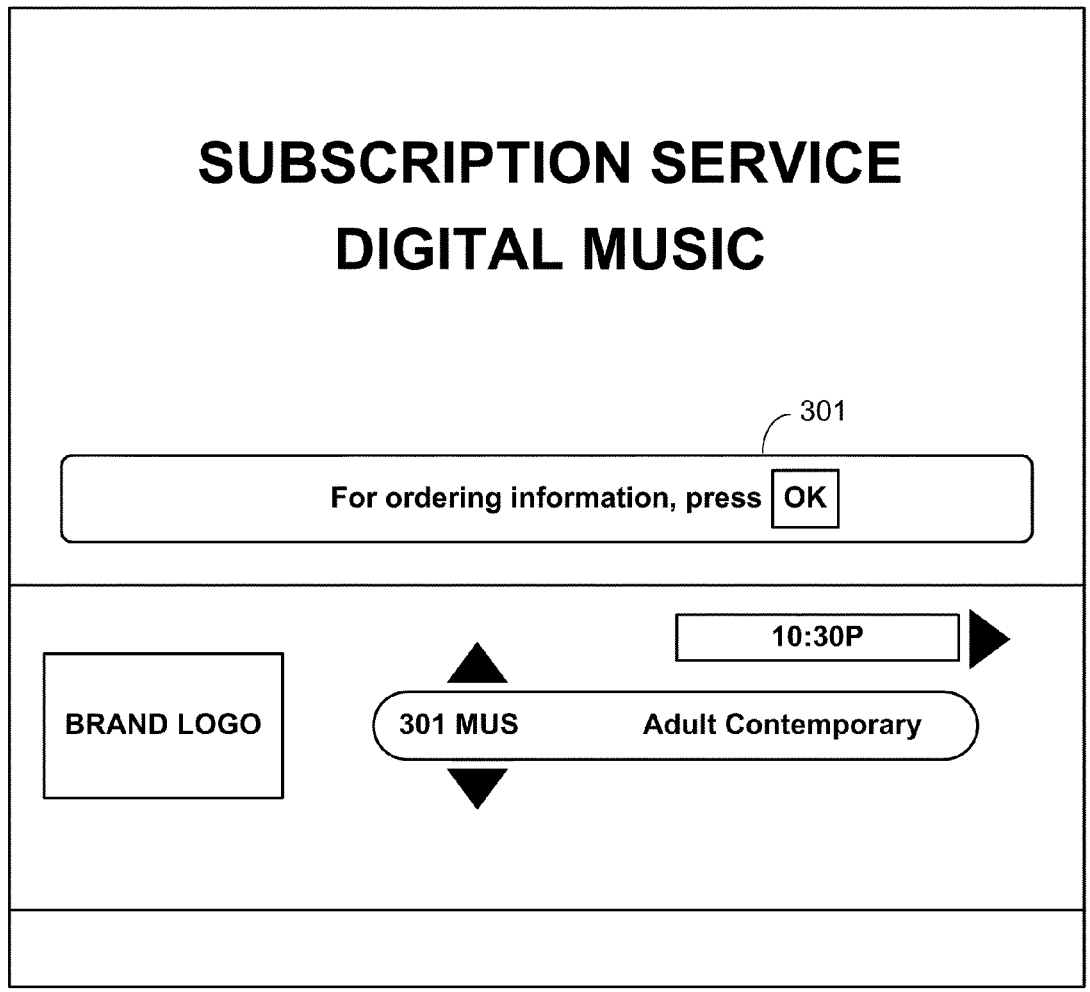

FIG. 28 shows illustrative overlay 301 that the program guide may display when a user tunes to a subscription service, in this example a digital music channel, to which a user has not subscribed. A user may obtain ordering information by, for example, pressing an "OK" key on remote control 40. In response, the program guide may display a music channel information screen, for the music channel such as the music channel information screen shown in FIG. 76*b*.

Figure 29:
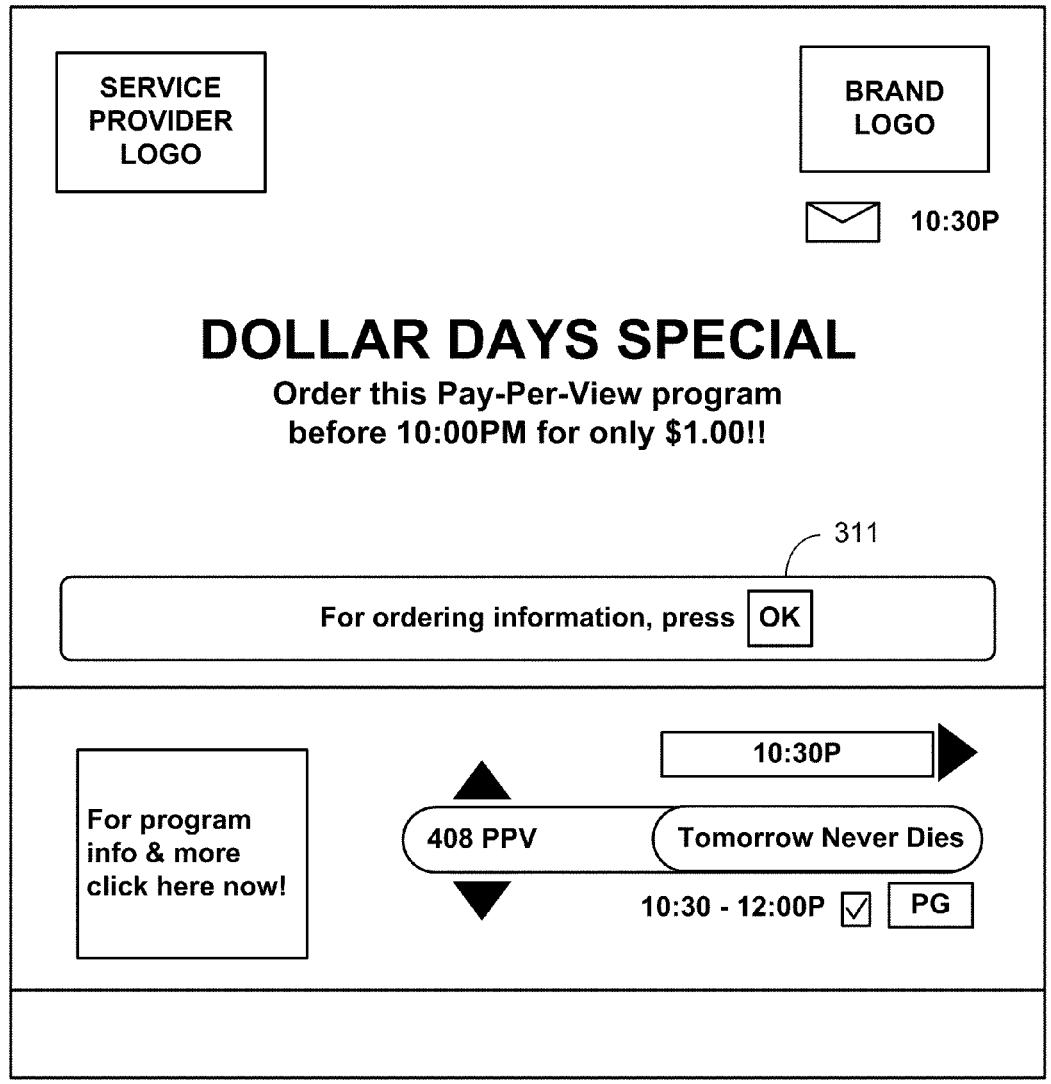

FIG. 29 shows illustrative overlay 311 that the program guide may display when, for example, a user tunes to a channel with an in-band promotion. A user may obtain ordering information related to the pay-per-view program indicated in a FLIP overlay by, for example, pressing an "OK" key on remote control 40.

Figure 30:
FIGS. 30-31 show illustrative program guide display screens for providing a user with access to promotional channels.
Figure 31:
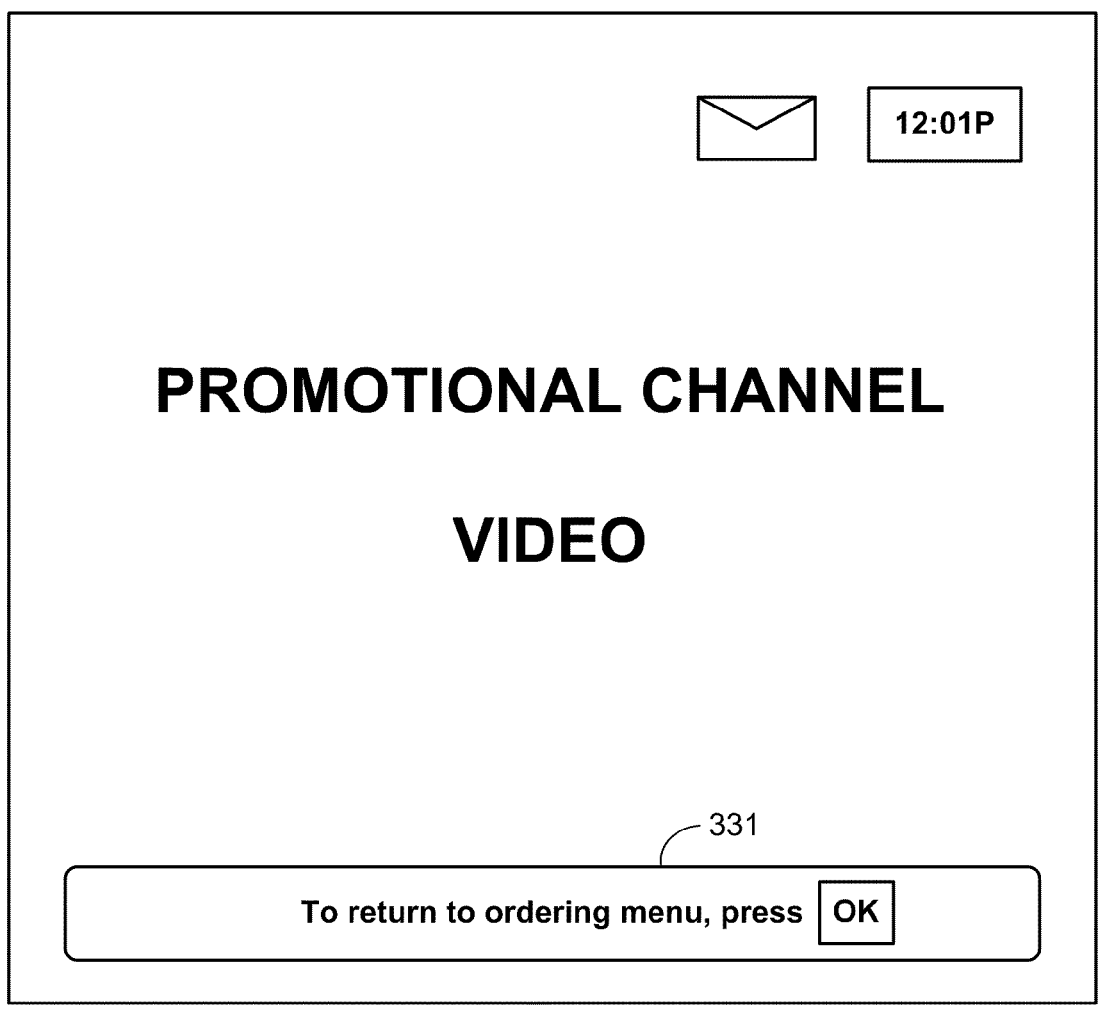

FIGS. 30-31 show illustrative program guide display screens for providing a user with an opportunity to view ordering information for programs promoted by promotional channels. Promotional channels are channels that are dedicated to promoting television channels or television programming that meet a particular theme. Promotional channels typically promote pay-per-view programs, but may also promote, for example, comedies, adult programming, children's programming, movies, sports, premium channels, or any other suitable channel type or programming type. A programming system may carry one or more promotional channels.

When a user tunes or flips to a promotional channel, the program guide may recognize the channel as such and may display a suitable display screen such as that shown in FIG. 30. The display screen may have two portions, a first portion that displays all or part of the real-time video displayed by the promotional channel, and a second portion that provides a user with an opportunity to obtain ordering information. If a user indicates a desire to access ordering information, the program guide may respond by displaying a listings screen, such as those shown in FIGS. 18-24, that displays listings and provides a user with the opportunity to access ordering information for the programming or channels promoted by the promotional channel. Each promotional channel may have different listings screens if desired.

FIG. 31 shows an illustrative overlay 331 that, may be displayed by the program guide over a promotional channel that is tuned to by the guide when a user indicates a desire to watch a preview. Overlay 331 may be displayed, for example, after a user has selected a watch previews feature from the listings screens of FIGS. 12*e*, 19, 20 and 24, and the program guide has tuned to the appropriate promotional or pay-per-view channel. Overlay 331 may indicate to a user how to return to the listings screen from which a user selected the watch previews feature. Watch preview features may be displayed in the screens shown in FIGS. 21, 22 and 23, if desired.

The program guide may also provide a user with an opportunity to access information services that have data configurable by main facility 12. Local information service 15 of FIG. 1, for example, may have its data localized by main facility 12 and sent to specific television distribution facilities 16, groups of television distribution facilities 16 (e.g., those only within a specific geographical area), specific users, groups of users (e.g., users within a specific geographical area), or other subsets of television distribution facilities 16 or viewers. Systems that localize program guide data are described, for example, in commonly assigned Ellis et al. U.S. Pat. No. 5,760,821, which is hereby incorporated by reference herein in its entirety.

In another suitable approach, for example, localized data may have a mapping applied to it. Multiple real-time sources of data, such as local information service 15 of FIG. 1, may provide data to main facility 12. Such data may be mapped to specific television distribution facilities 16 so that the television distribution facilities 16 receive data that was supplied to main facility 12 by sources relevant to the television distribution facilities 16. Local information service 15 may also provide its data directly to television distribution facility 16. For example, weather data may be provided by a number of weather stations to main facility 12. The data may be mapped to the specific television distribution facilities 16 that service users in those areas. Program guide systems in which multiple real-time data sources are described, for example, in Knudson et al. U.S. patent application Ser. No. 09/229,047, filed Jan. 12, 1999, which is hereby incorporated by reference herein in its entirety.

Main facility 12 may configure information service data for the program guide using any suitable approach. Main facility 12 may, for example, indicate through program guide data or commands to the program guide what feature to present in menu 102 if data for a particular information service is not available (e.g., replace "Weather" option with a "Browse" option on main menu 102). Alternatively, this determination may be made by the program guide without commands or other indicators from main facility 12. Main facility 12 may also provide feature names for display in main menu 102, the number of sub-selections within an information service, and their feature names. Main facility 12 may also provide advertisements displayed by the guide with an information service, sub-selection, or groups of sub-selections. Main facility 12 may also provide information to be displayed within sub-selections of an information service (e.g., formatted text, graphics, video, audio, or any suitable combination thereof).

Figure 32:
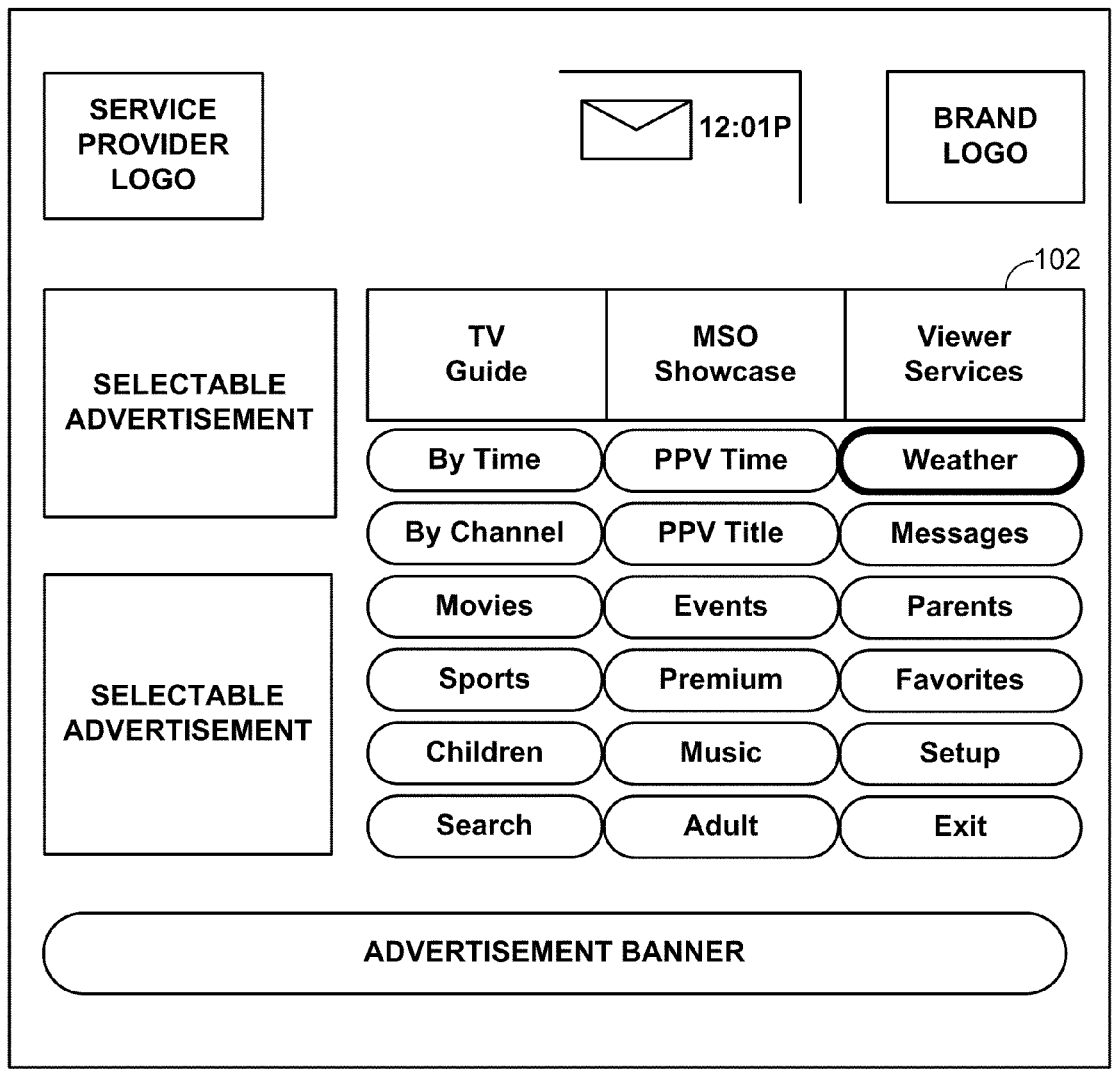
FIG. 32 is another illustrative main menu screen for providing a user with an opportunity to navigate through program guide features.
Figure 33A:
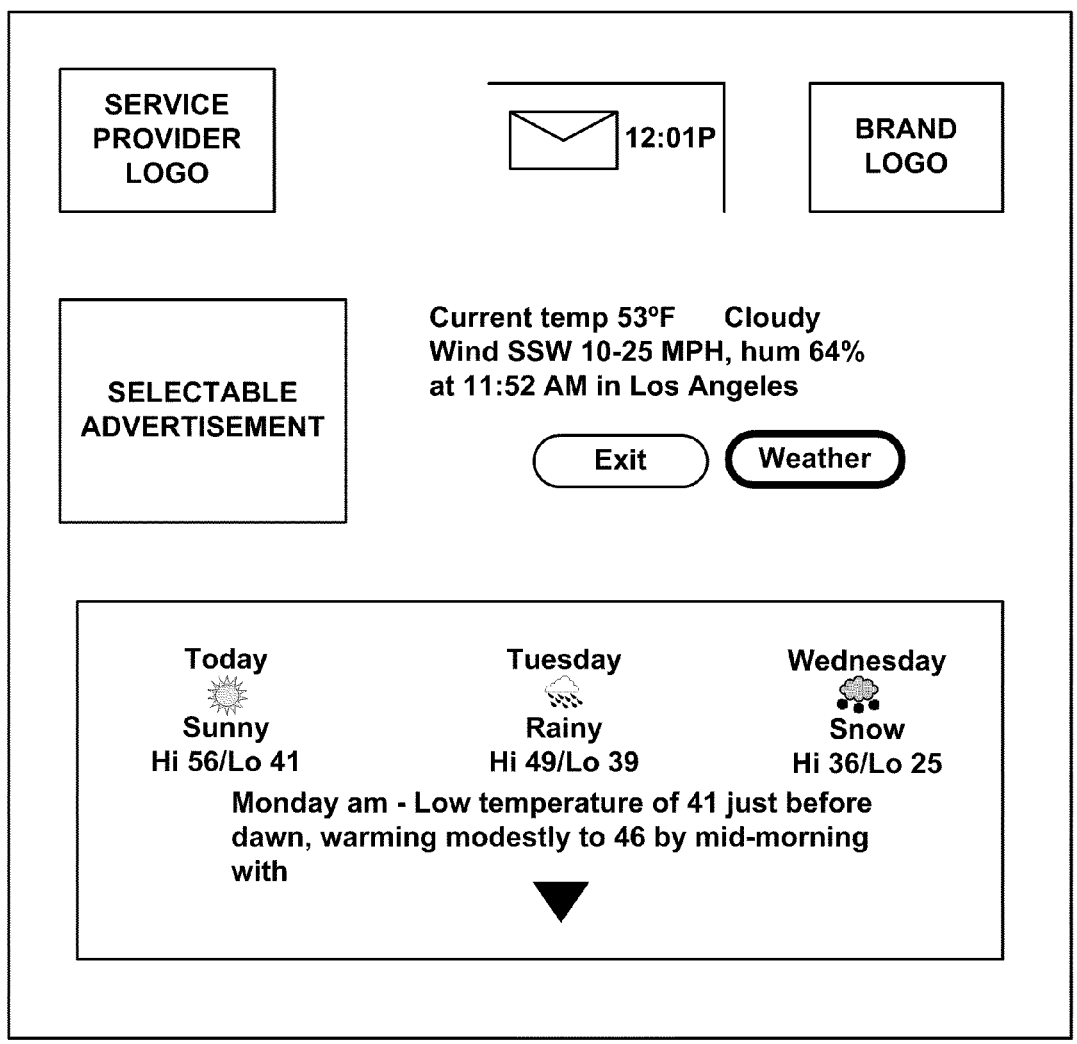
FIGS. 33a, 33b, 33c, 33d, and 33e show illustrative program guide display screens for providing a user with access to local information services.
Figure 33B:
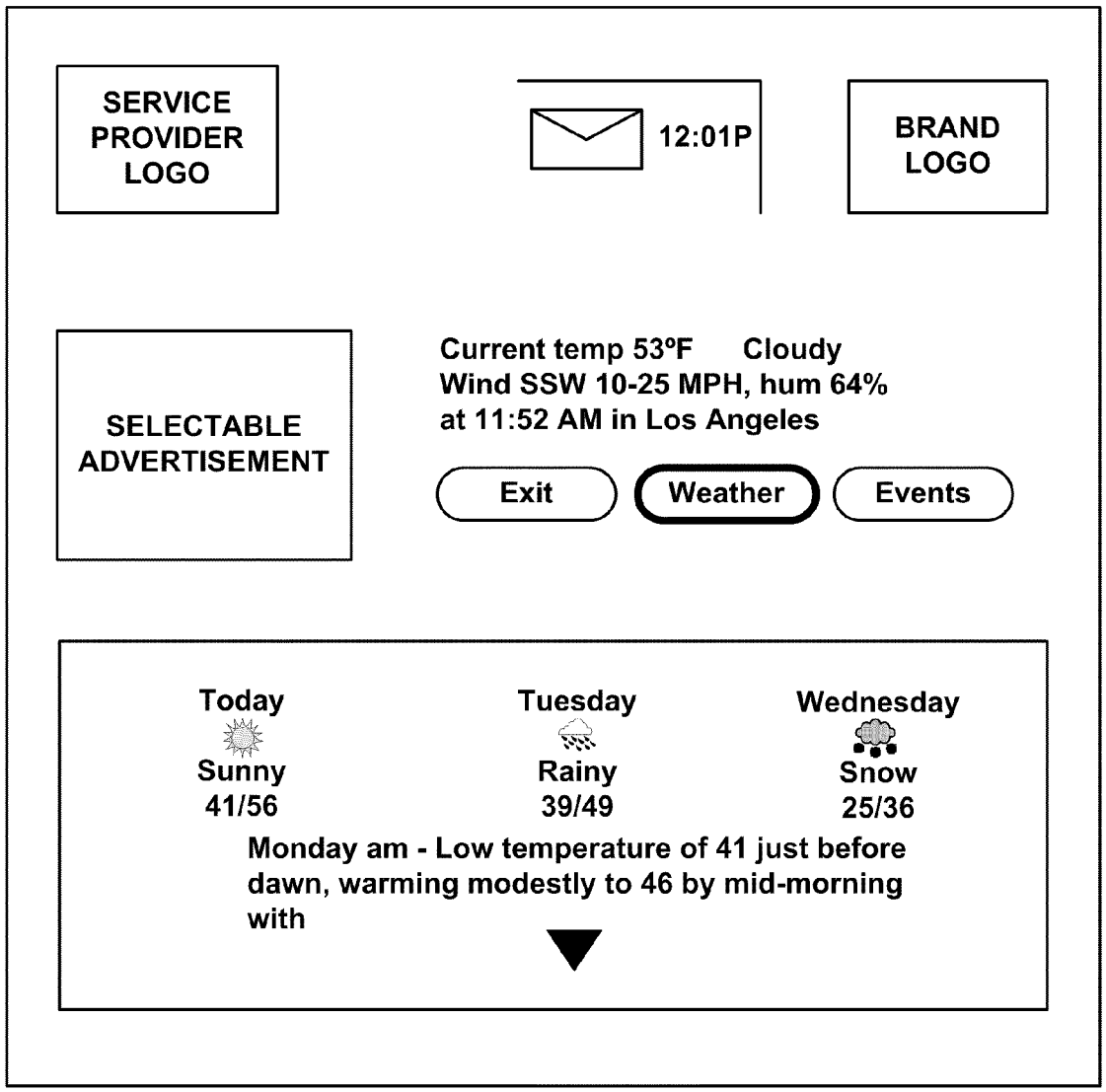
Figure 34:
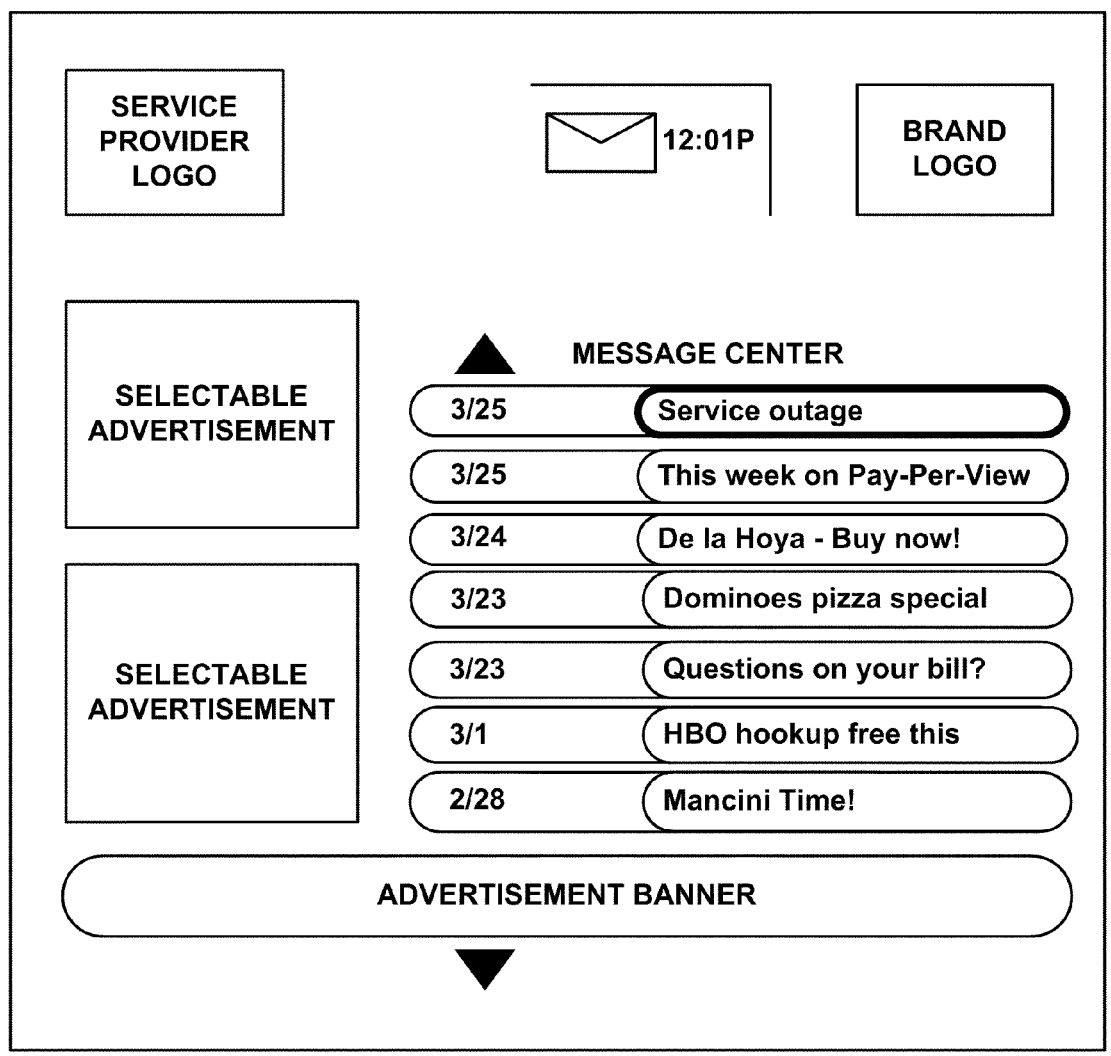
FIGS. 34, 35, and 36 show illustrative program guide display screens for providing a user with access to messaging features of the program guide.

Main menu screen 100 has been redrawn in FIG. 34 to illustrate how a user may navigate within main menu 102 to access such services. FIG. 32 shows how the program guide may provide a user with access to local weather service data, but other services may be provided if desired (e.g., local events, local high school and college sports, school lunches, lottery results, ski conditions, etc.) A user may indicate a desire to access a weather service by, for example, selecting a "Weather" feature from main menu 102. When a user indicates a desire to access a weather service, the program guide may display a weather information services screen. An illustrative weather information services screen 351 is shown in FIG. 33*a*. If there are multiple information services, the program guide may provide a user with an opportunity to select other services by, for example, selecting an on-screen feature. In FIG. 33b, for example, a user is presented with an opportunity to access two information services, local weather information and local events.

Figure 33C:
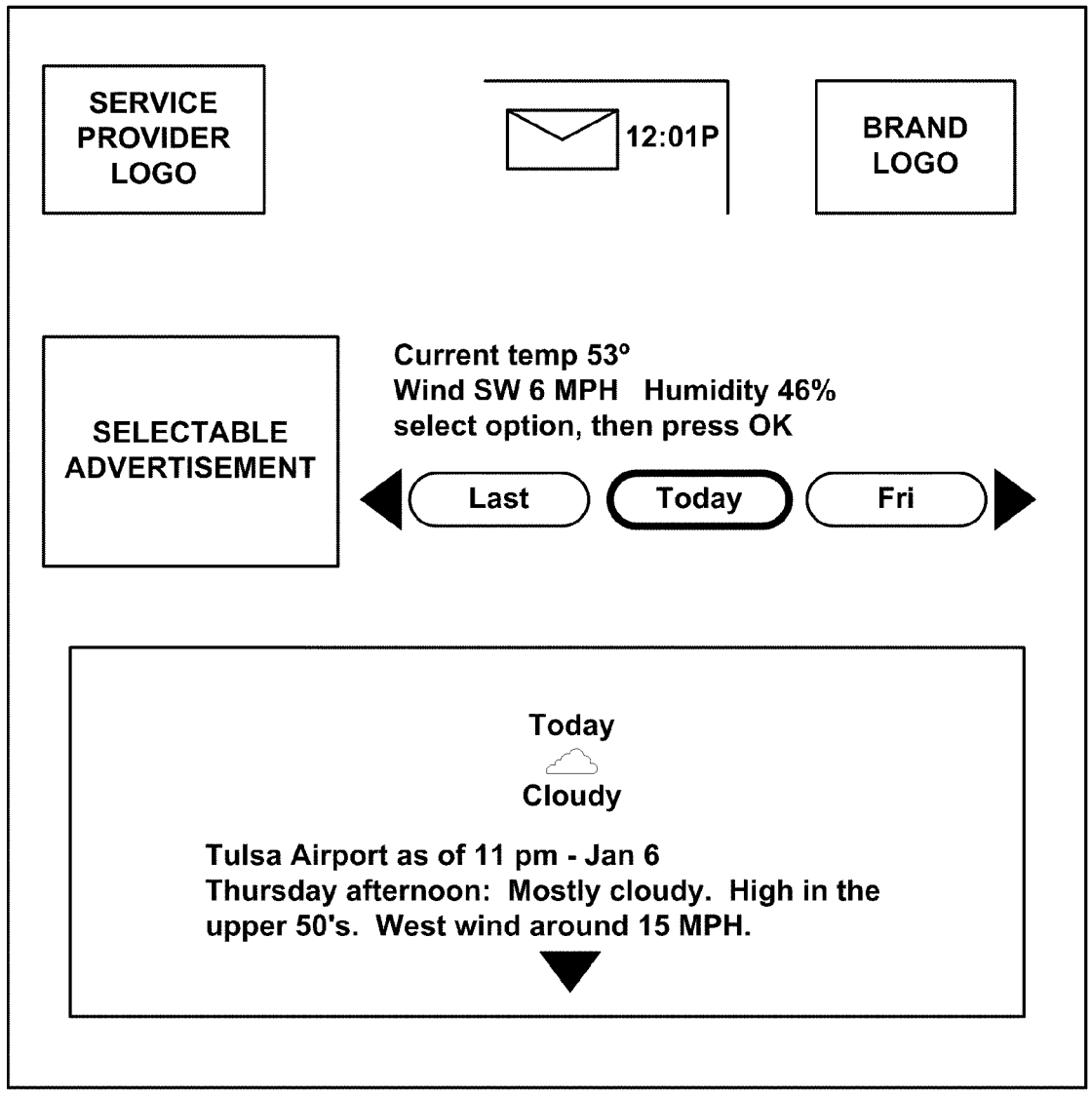
Figure 33D:
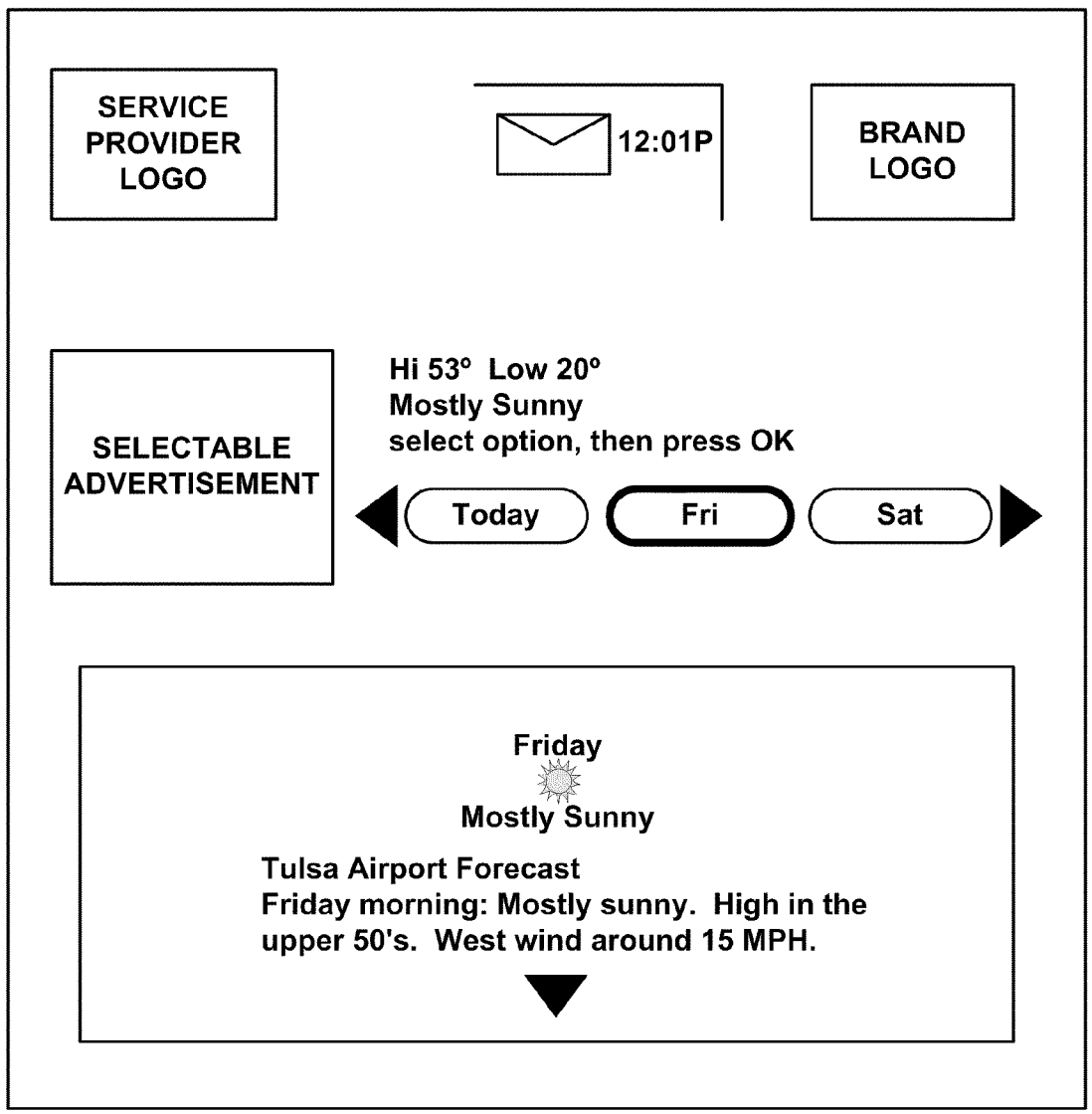
Figure 33E:
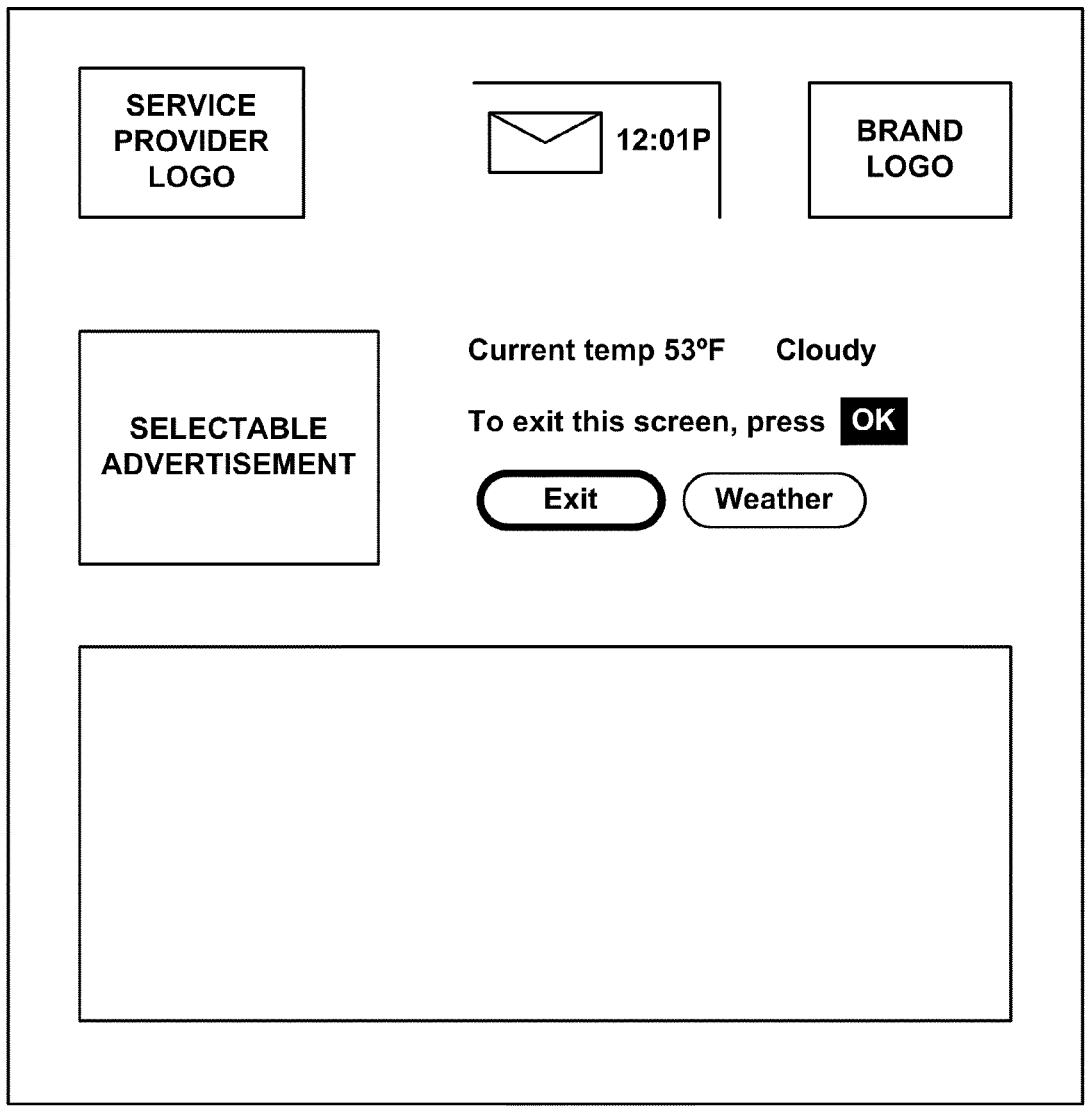

FIGS. 33c and 33d show an alternative format in which the program guide may display weather information from a local weather service. The display of weather information for separate days, as opposed to displaying weather information for a number of days, simultaneously as shown in FIG. 33b, may be configured, for example, by main facility 12. In FIG. 33c, for example, a user has indicated a desire to see "today's" weather by selecting today feature 351. A user may view weather information for other days by selecting a different feature. In FIG. 33d, for example, a user has selected "FRI" feature 353. FIG. 33e shows an illustrative display screen that may be displayed by the program guide in response to a user highlighting, for example, an "EXIT" feature (FIG. 33e).

If desired, the weather information services screens of FIGS. 33a-33e may be formatted based on the country in which they are displayed. For example, they may display degrees Centigrade and kilometers-per-hour in some counties, and degrees Fahrenheit and miles-per-hour in others.

Figure 36:
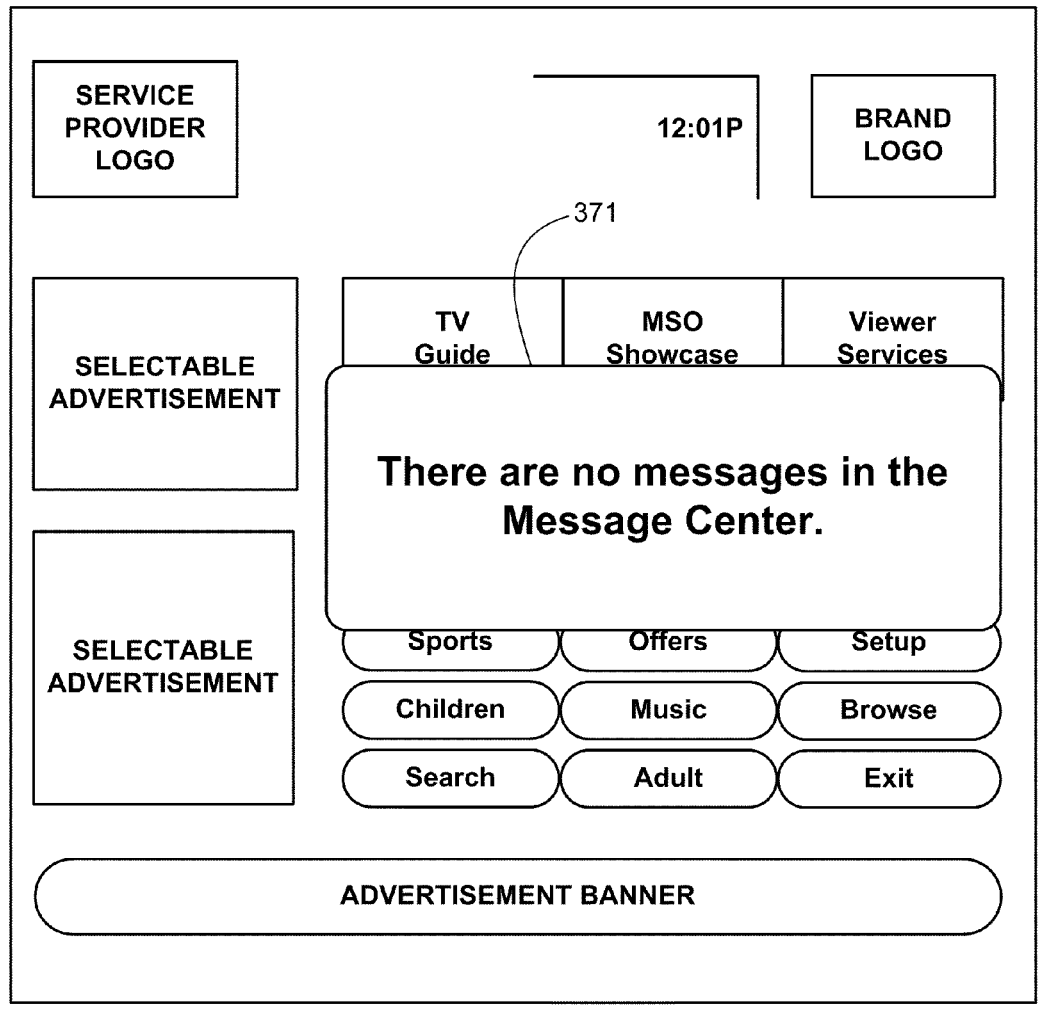

The program guide may provide a user with an opportunity to view and manage messages sent to a user from a cable service provider or guide provider. A user may indicate a desire to view available messages by, for example, selecting a "Message" feature from main menu 102 of FIG. 32. When a user indicates a desire to view messages, the program guide may display a message listings screen, such as message listings screen 361 of FIG. 34. If there are no messages, the program guide may display a suitable overlay such as overlay 371 shown in FIG. 36.

The program guide may provide a user with an opportunity to scroll or page through messages by, for example, pressing an "up" arrow, "down" arrow, "page up" key, "page down" key, or another suitable key, on remote control 40. If desired, an advertisement banner may be made part of the message listings. In this approach, a user may be required to scroll through the advertisement banner to access additional program listings. The program guide may also provide a user with an opportunity to highlight a selectable advertisement by, for example, arrowing left.

Figure 35:
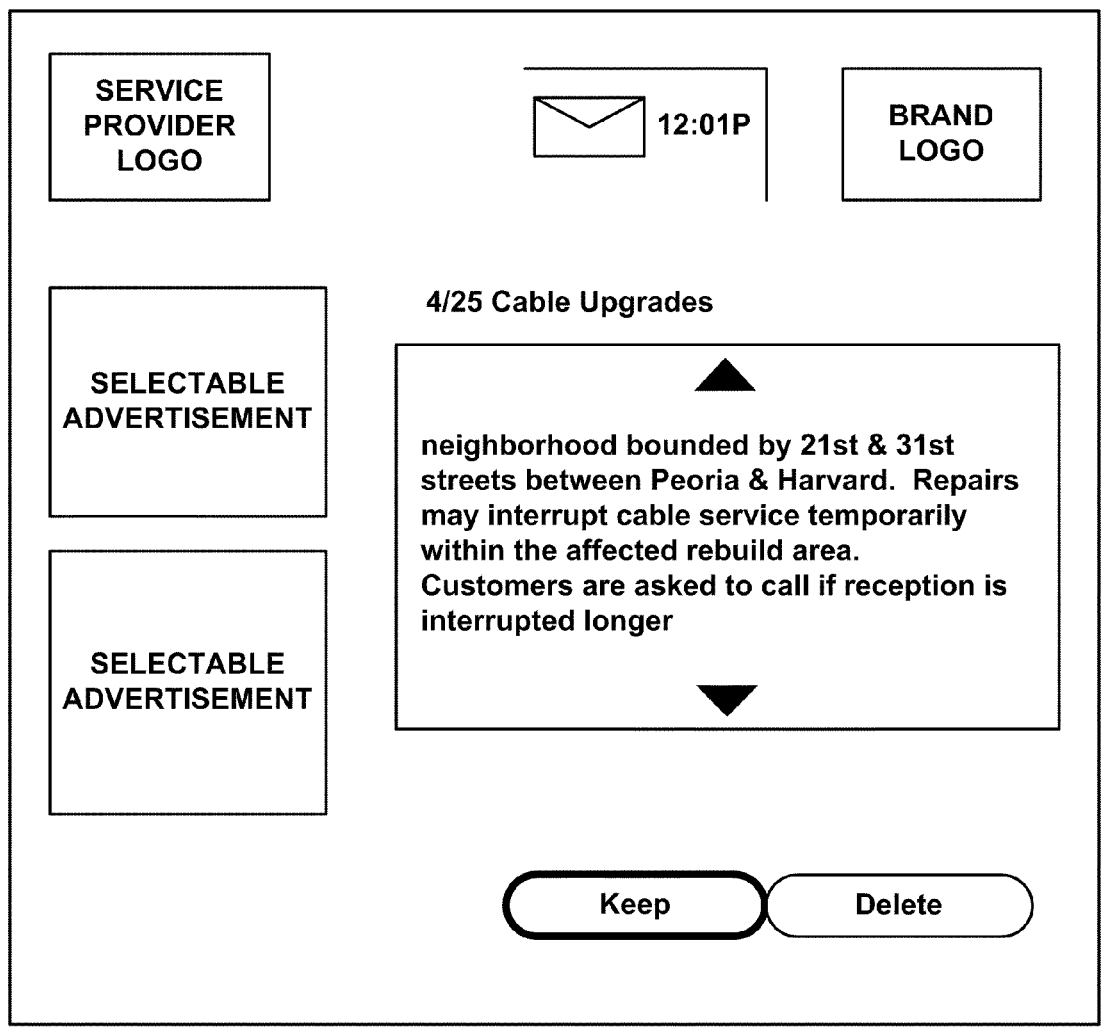

When a user selects a message, the program guide may display the selected message or a portion of it in a message screen such as illustrative message screen 362 of FIG. 35. Within message screen 362 the program guide may provide a user with an opportunity to scroll within a message, keep the message, or delete the message. A user may also be provided with an opportunity to highlight a selectable advertisement by, for example, arrowing left.

The program guide may provide a user with an opportunity to set channels as favorites. A user may indicate a desire to set a channel as a favorite using any suitable approach. A user may, for example, press a suitable key on remote control 40 (e.g., a "FAV" key) while watching television, while in a BROWSE overlay, after highlighting a program listing, while within an information screen for the channel, or from within any other suitable program guide display screen in which channels or program listings are displayed. A user may also indicate a desire to set a channel as a favorite by selecting a "Favorites" feature from menu 102 of FIG. 32.

Figure 37:
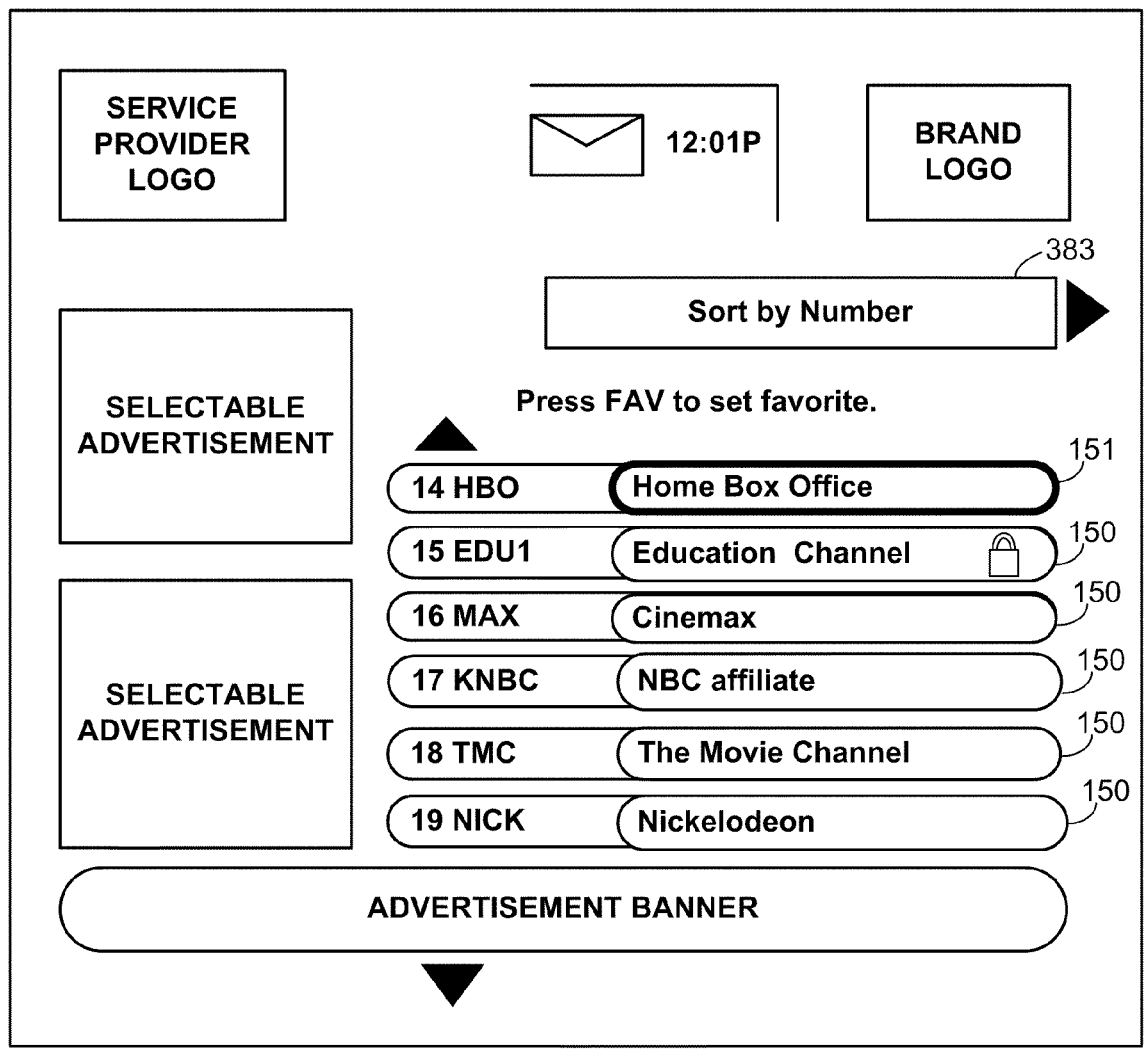
FIGS. 37-40 show illustrative program guide display screens for providing a user with access to favorite channel features of the program guide.

In response to a user selecting a "Favorites" feature from main menu 102 of FIG. 32, for example, the program guide may display a favorites screen, such as illustrative favorites screen 381 of FIG. 37. Favorites screen 381 may list available channels according to user selected sorting criteria. A user may, for example, sort channels by number or name by pressing "left" and "right" arrow keys on remote control 40. In this example, a user has selected sorting by channel number as indicated by criteria bar 383. If desired, favorites screen 381 may display the channel names and their network affiliations. Multiple network affiliations for a single channel may be displayed if desired. The program guide may also provide a user with an opportunity to tune to a channel, or parentally lock the channel by, for example, selecting a channel listing and pressing an "OK" OR "lock" key on remote control 40, respectively.

The program guide may provide a user with an opportunity to scroll through channel listings within favorites screen 381 by, for example, pressing an "up" arrow, "down" arrow, "page up" key, "page down" key, or another suitable key on remote control 40. If desired, an advertisement banner may be made part of the program listings. In this approach, a user may be required to scroll through the advertisement banner to access additional program listings. The program guide may also provide a user with an opportunity to highlight a selectable advertisement by, for example, arrowing left.

Figure 38:
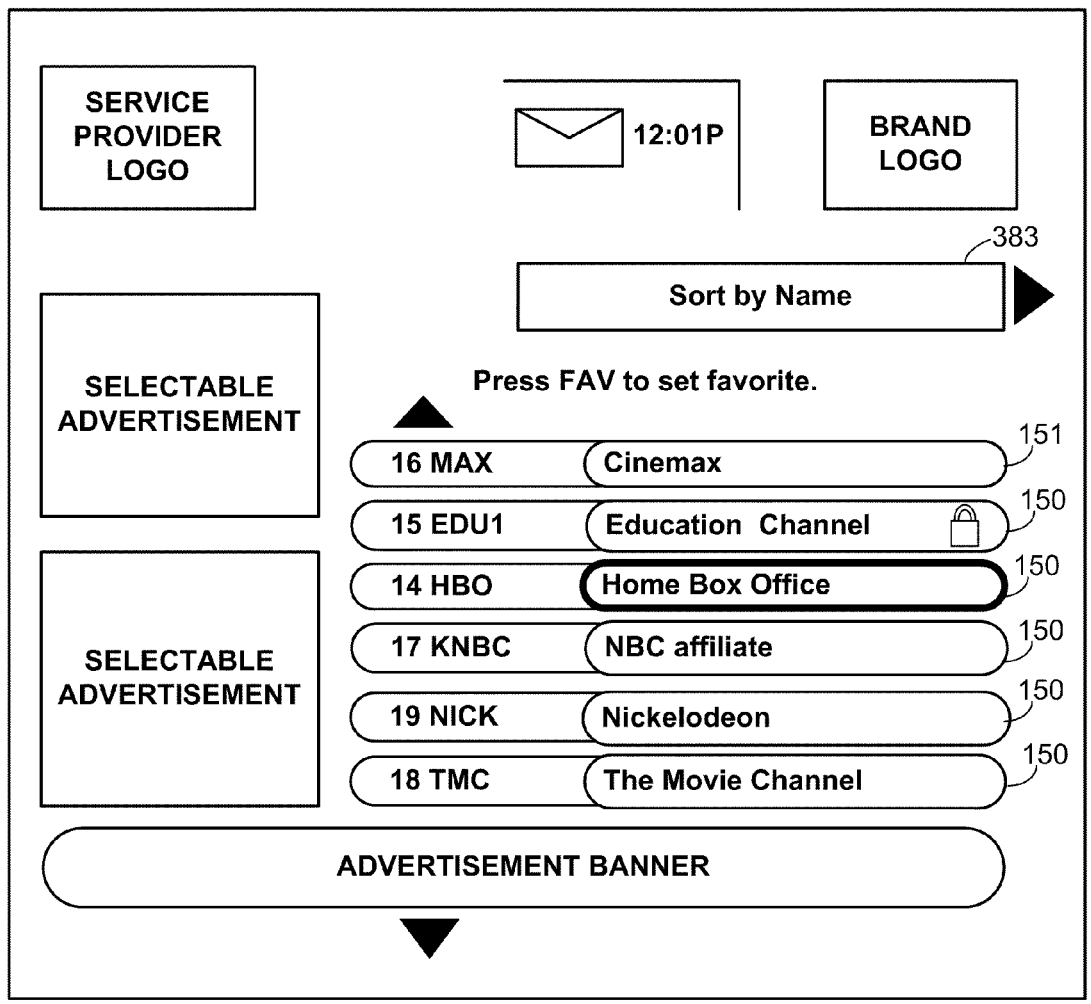

A user may set a channel as a favorite by for example, positioning highlight region 151 over a channel listing 150 and pressing a "fav" key on remote control 40. A user may also indicate a desire to obtain more information about a channel before setting it to a favorite by, for example, pressing a suitable key on remote control 40 (e.g., an "info" key"). In response, the program guide may display additional information about a channel in a channel information screen such as illustrative channel information screens shown in FIGS. 75a, 75b, 76a, and 76b. Channel information screens may display brief descriptions of channels and provide users with an opportunity to lock channels, set channels as favorites, view listings for channels, order channels, watch the channel or perform other suitable actions. When a user has entered a channel information screen from a favorites feature, the guide may provide users with an opportunity to sort channels by name or number by, for example, arrowing left right to display "Sort by Number" or "Sort by Name" in criteria bar 383. FIG. 38 shows an illustrative favorites screen 381 in which channels are sorted by name.

Figure 39:
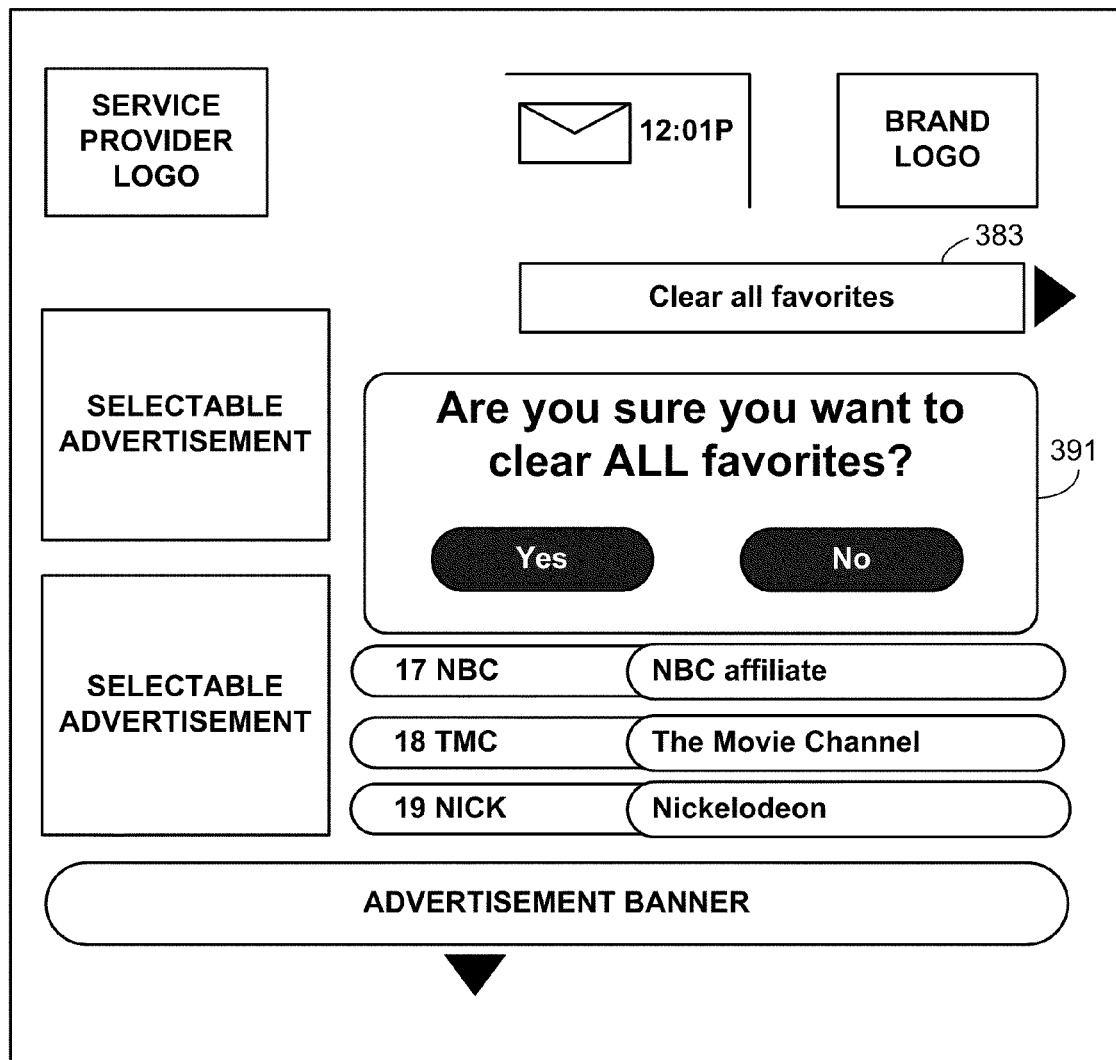

The program guide may provide a user with an opportunity to clear all favorites. A user may indicate a desire to clear all favorites by, for example, pressing a suitable key on remote control 40 (e.g., a "clear" key), or by arrowing right while in the channel listings to display "Clear all favorites" in criteria bar 383. When a user indicates a desire to clear all favorites, the program guide may display a clear all favorites overlay, such as clear all favorites overlay 391 of FIG. 39. The program guide may prompt a user to confirm the clear all favorites, and may clear all favorites after a user selects "Yes".

Figure 40:
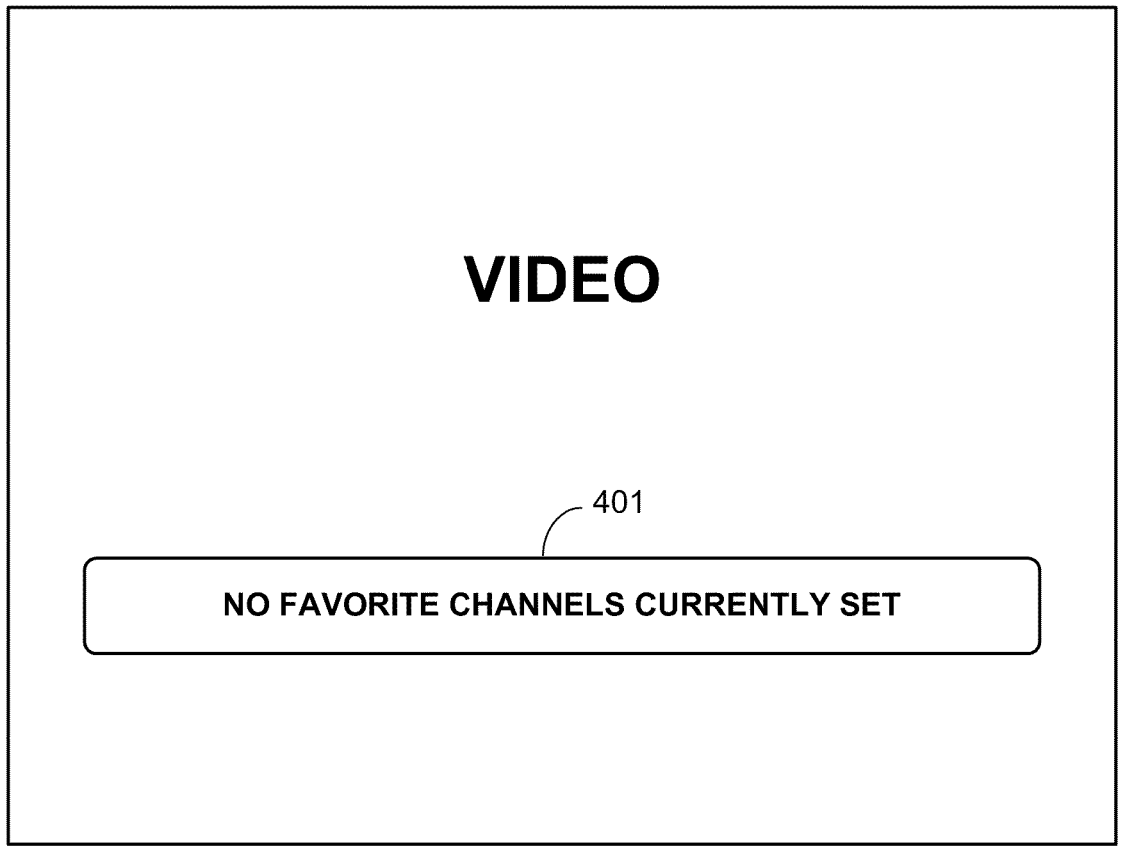

A user may indicate a desire to access favorite channels while, for example, watching television. If there are no favorite channels set, the program guide may display a suitable overlay. FIG. 40 shows an illustrative overlay 401 that the program guide may display when there are no favorites set and a user indicates a desire to access favorite channels.

The program guide may provide a user with an opportunity to set up various aspects of program guide operation. A user may indicate a desire to set up features of the program guide and user television equipment 22 by, for example, selecting a "Setup" feature from main menu 102 of FIG. 32. When a user indicates a desire to set up features of the program guide or user television equipment 22, the program guide may display a setup screen, such as illustrative setup screen 411 of FIG. 41. Set up screen 411 may provide a user with an opportunity to set up various guide features, set parental control features, set features of set-top box 28 (FIG. 3), set audio features, set the screen position, set languages for program guide operation, or to set up any other feature or suitable combination of features.

Figure 42:
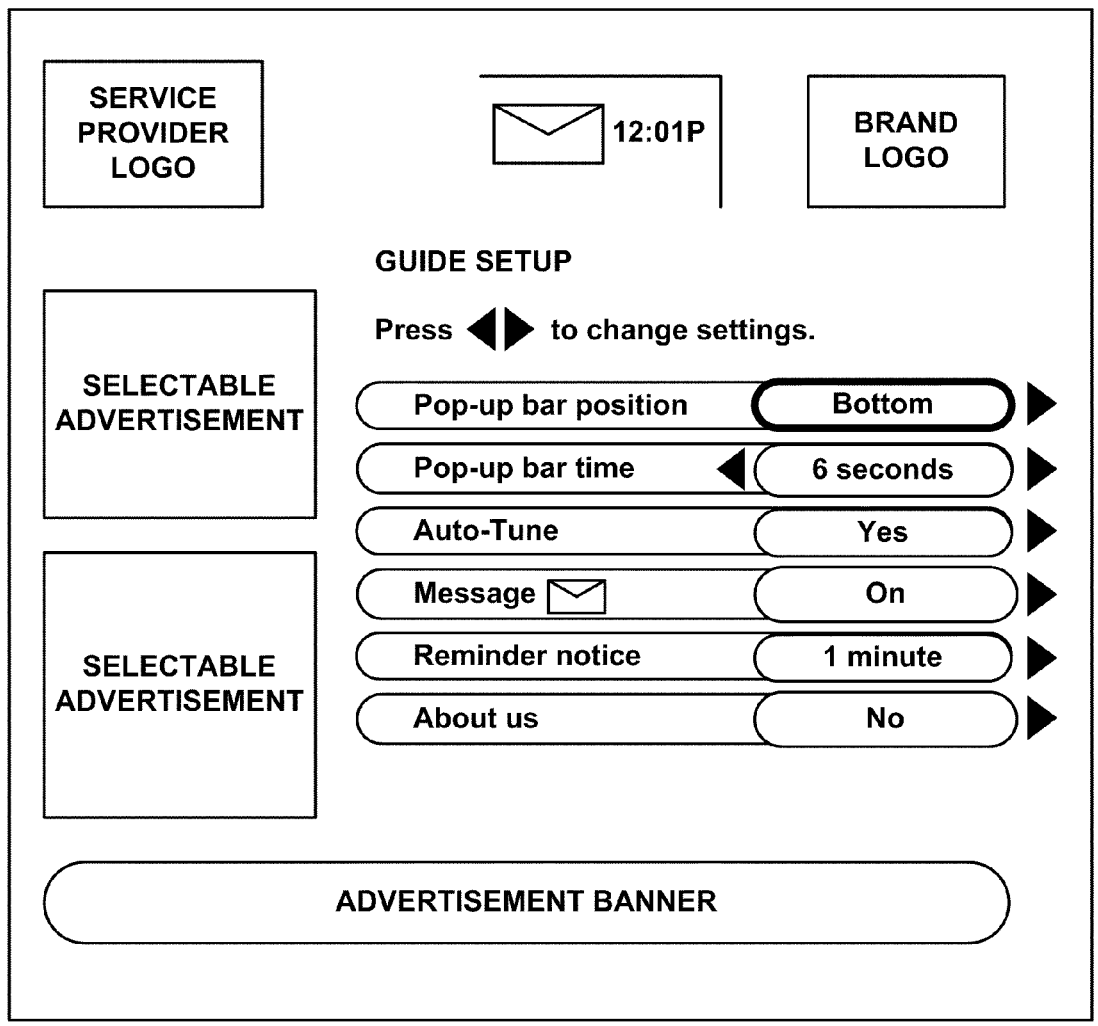
FIGS. 42-47 show illustrative program guide display screens for providing a user with access to setting up various program guide features.

A user may indicate a desire to set various guide feature by, for example, selecting a "guide" option from setup screen 411. When a user indicates a desire to set guide features, the program guide may display a guide setup screen, such as illustrative guide setup screen 421 of FIG. 42. From within guide setup screen 421, the program guide may provide a user with an opportunity to, for example, set a pop-up bar position on the screen for FLIP and BROWSE overlays, such as FLIP overlay 200 (FIGS. 5a and 5b) and BROWSE overlay 230 (FIGS. 6a and 6b). The program guide may also provide a user with an opportunity to set how long a FLIP overlay is displayed by setting its pop-up bar time. For example, the guide may allow a user to select a time-out value between 3 and 15 seconds in one-second increments.

The program guide may also provide a user with an opportunity to set an auto-tune function. An auto-tune function may eliminate the need for a user to press a "select," "enter," or "OK" key after a 1 or 2-digit channel number entry. Some devices that control set-top box 28 (e.g., a VCR) may send two digits without sending a select command. Setting the auto-tune feature on eliminates the need to press the select so that the control of set-top box 28 is possible by other devices in user television equipment 22 which do not emit the select command. Setting the auto-tune feature to off will cause the program guide to ignore channel numbers using less than three digits unless the user presses select.

Figure 43:
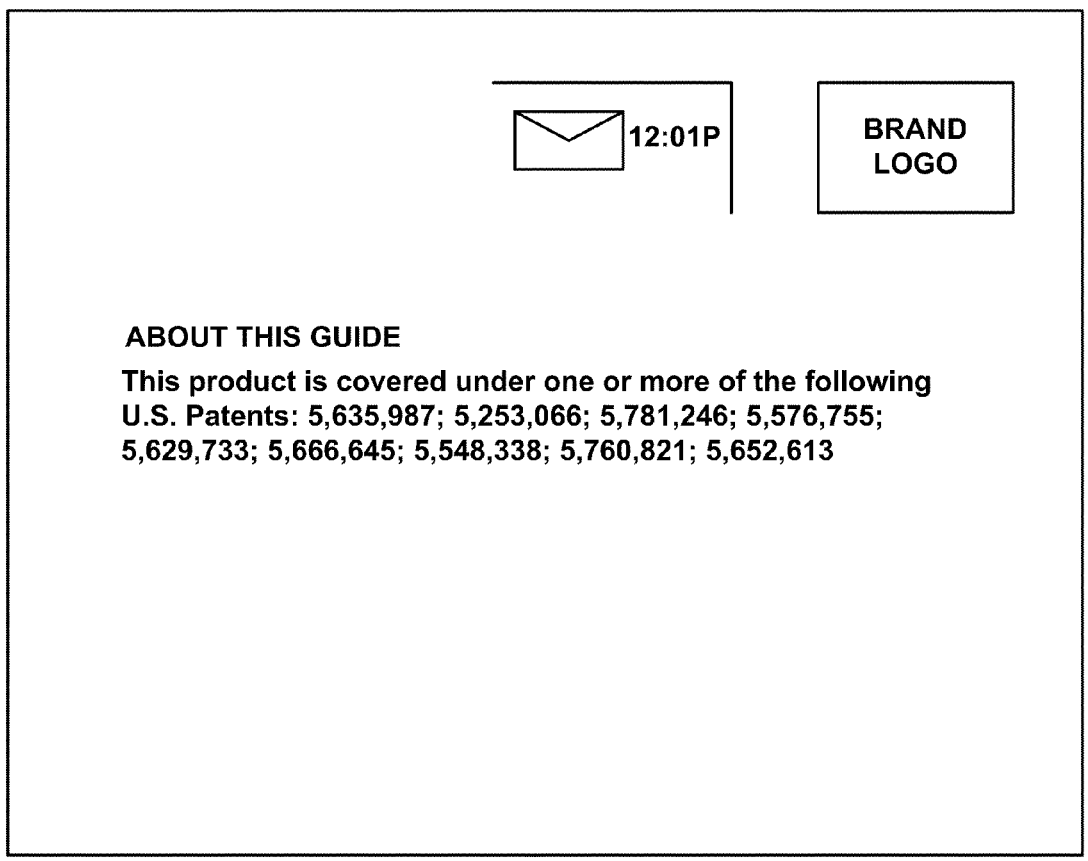

The program guide may also provide a user with an opportunity to set whether a message indicator is displayed when there are new messages, and to set how long before the start of programs reminder notices are displayed. The program guide may also provide a user with an opportunity to view information about the program guide. In response to a user indicating a desire to view information about the program guide, the program guide may display an about us screen, such as illustrative about us screen 431 of FIG. 43. This screen is preferably configurable by the program guide provider.

Figure 44:
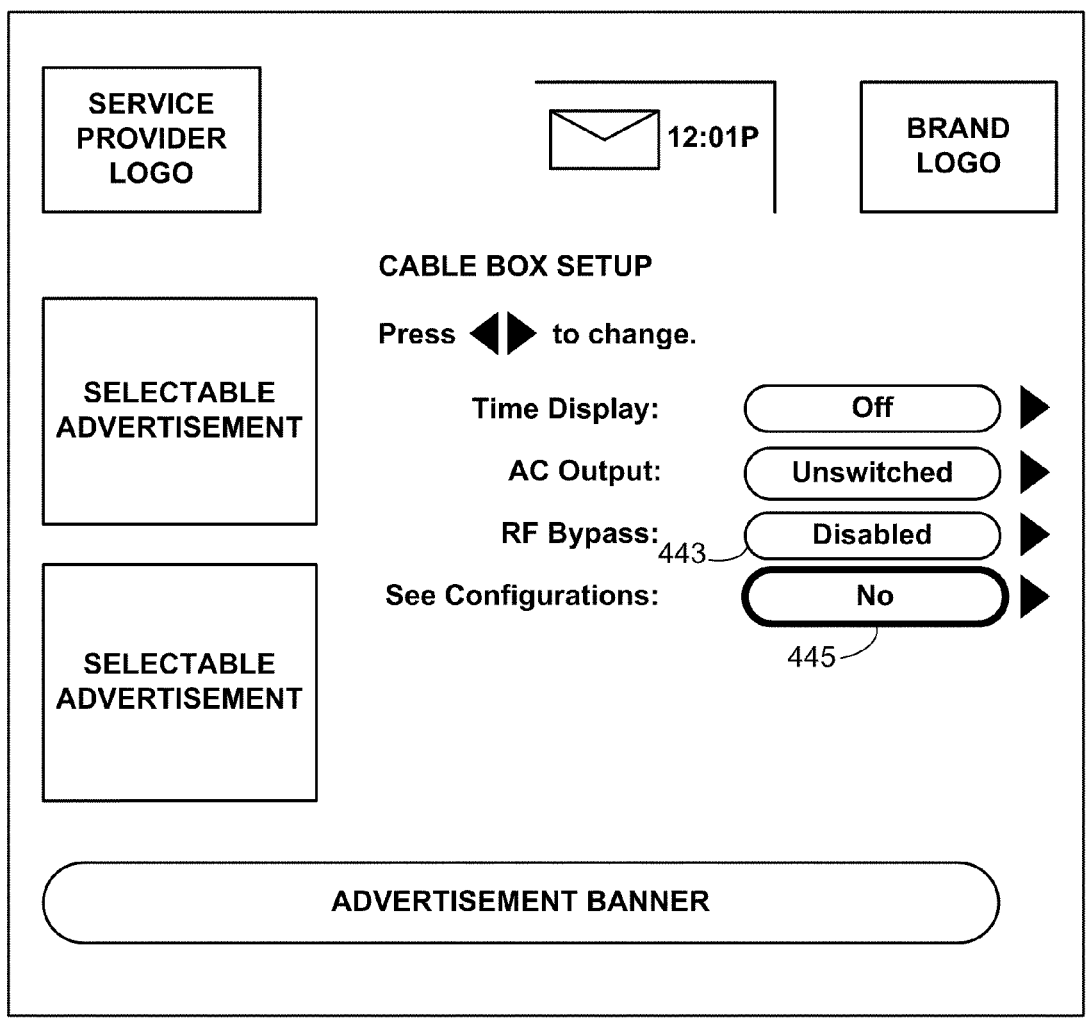

The program guide may also provide users with an opportunity to set up features of set-top box 28 of FIG. 3. FIG. 44 shows an illustrative cable box setup screen 441 that the program guide may display when a user indicates a desire to set up features of set-top box 28 by, for example, selecting Cable Box feature 414 of Setup screen 411. Illustrative cable box setup screen 441 shows how the program guide may provide users with an opportunity to set whether a time display is displayed, when an AC output is switched or unswitched, when a radio frequency (RF) bypass is turned on or off, and to view configuration information. Cable box setup screen 501 is only illustrative, as the program guide may provide users with an opportunity to setup any suitable settop box feature.

The RF Bypass feature operates in two modes, which may be configurable by the program guide provider on behalf of each individual operator of television distribution facility 16. The first mode supports users who do not wish to watch one program and record another program simultaneously. These users may have an RF Bypass switch on their set-top boxes 28 (FIG. 3) which, when engaged, allows the input signal from television distribution facility 16 to be passed to secondary storage device 32 and television 36 unprocessed by set-top box 28. When in this position, a cable-ready storage drive, such as a VCR, may be used to automatically record specific channels at specific times.

To use this first mode, the viewer first sets RF Bypass feature 443 in cable box setup screen 441 of FIG. 44 to Enabled. Then, whenever the viewer turns set-top box 28 off, the RF Bypass switch will be engaged, and a tuner in secondary storage device 32 or television 36 may be used to select any channel that maybe decoded for recording or viewing, typically unscrambled analog programming. When set-top box 28 is turned back on, the RF Bypass switch is disengaged, and the processed output from set-top box 28 is routed to secondary storage device 32 and television 36. If the viewer sets the RF Bypass feature 443 to Disabled, set-top box 28 will remove all signals from secondary storage device 32 and television 36 whenever the set-top box 28 is turned off.

The second mode supports users who wish to watch one program while simultaneously recording a different program. These users may have an RF Bypass switch on their set-top boxes 28 that, when engaged, allows the input signal from the television distribution facility 16 to be passed to television 36 unprocessed by set-top box 28 while continuing to send the processed signal from set-top box 28 to secondary storage device 32. When not engaged, the processed signal set-top box 28 is routed to television 36 after being processed by secondary storage device 32. When engaged, this configuration allows the user to record any program that can be processed by set-top box 28 while simultaneously allowing the user to watch any program that television 36 is capable of decoding, typically an unscrambled analog channel, without guide features. When not engaged, the user may record the program that is currently being viewed.

To use this second mode, the viewer first sets the RF Bypass feature 443 in cable box setup screen 441 of FIG. 44 to Enabled. Then, whenever the user presses a suitable key, such as a Bypass key on remote control 40 or set-top box 28, the RF Bypass switch will be engaged and the viewer may use secondary storage device 32 to record the output of set-top box 28, while using television 36 to continue to watch a different channel. Because set-top box 28 output is not being sent to television 36, guide features may not be usable in this state, and preferably the guide will disable most functions. For example, the guide may allow the user to change channels or the volume, but without any displays on the screen. The guide may disable any program listing displays or program reminders. The guide may enable parental control functions, but may not allow the user to enter a PIN to watch controlled programming. Pressing the Bypass key again will return the switch to its normal state, and allow the user to watch the same program that is being recorded and resume the use of guide functions.

The second mode includes features similar to the first mode. When the viewer turns set-top box 28 off, the RF Bypass switch will be engaged, and the user may record the program that was tuned prior to set-top box 28 being turned off, while watching any channel that television 36 can decode. When set-top box 28 is turned back on, the RF Bypass switch is disengaged, and normal functions resume. This will allow the user to easily exit from Bypass mode, for example if accidentally engaged, simply by turning set-top box 28 off and on. If the viewer sets the RF Bypass feature 443 to Disabled, set-top box 28 will remove all signals from secondary storage device 32 and television 36 when set-top box 28 is turned off, and will ignore the Bypass key.

Some cable systems distribute programming on two separate cables. In these dual-cable systems, set-top box 28 selects between the A cable and the B cable based on commands from the user, or based on programming that the user has selected. In those systems, when the Bypass switch is engaged, set-top box 28 will preferably bypass the input cable which is currently selected. If the Bypass switch is engaged while set-top box 28 is off, then the A and B cables will preferably be alternately bypassed as the user presses the Bypass key or the A/B key on remote control 40 or set-top box 28. If the Bypass switch is engaged while set-top box 28 is on, then pressing an A/B key may preferably alternate between the two inputs. Pressing the Bypass key may first select the alternate input, and then on a subsequent press it may disengage the RF Bypass switch.

Figure 45:
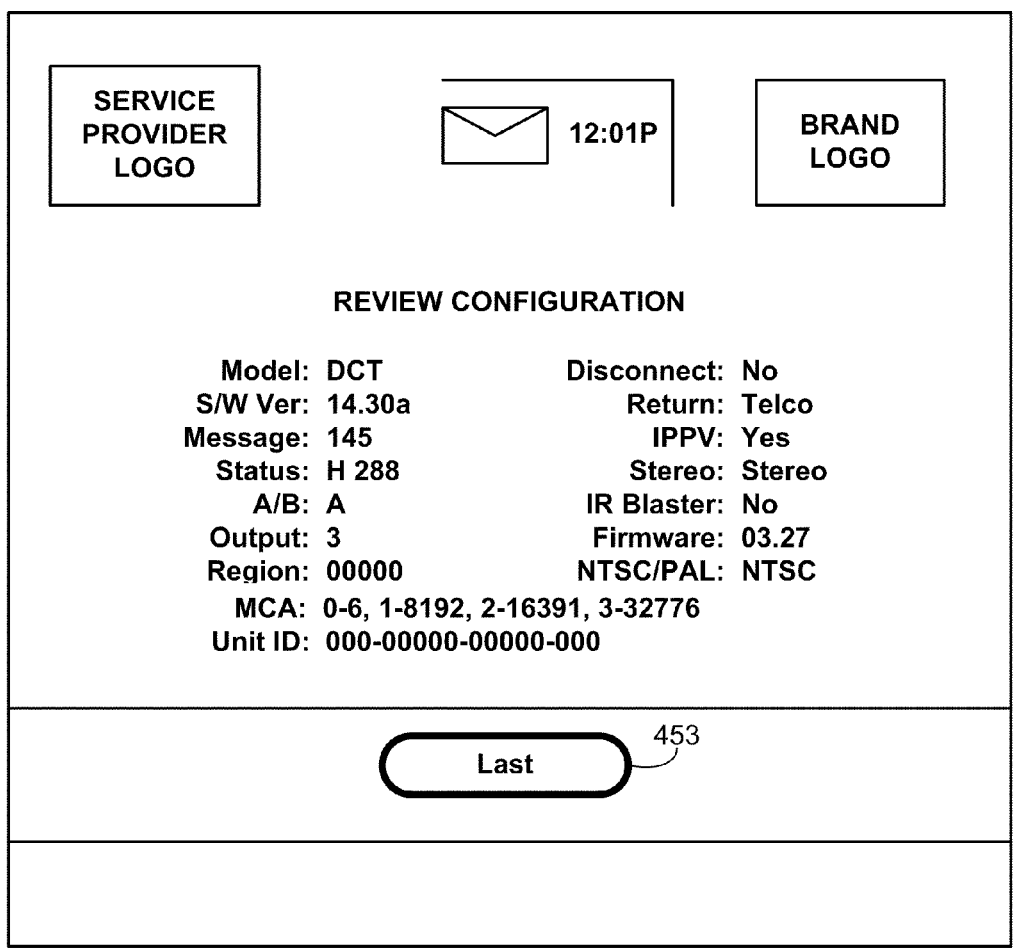

FIG. 45 shows illustrative configuration screen 451 that the program guide may display when a user indicates a desire to view the configuration of settop box 28 by, for example, setting See Configuration feature 445 of cable box setup screen 441 to "Yes". A user may return to cable box setup screen 441 by, for example, selecting last feature 453. If desired, pressing a "fav" key displays hidden screens with debugging information useful to program guide providers.

Figure 41:
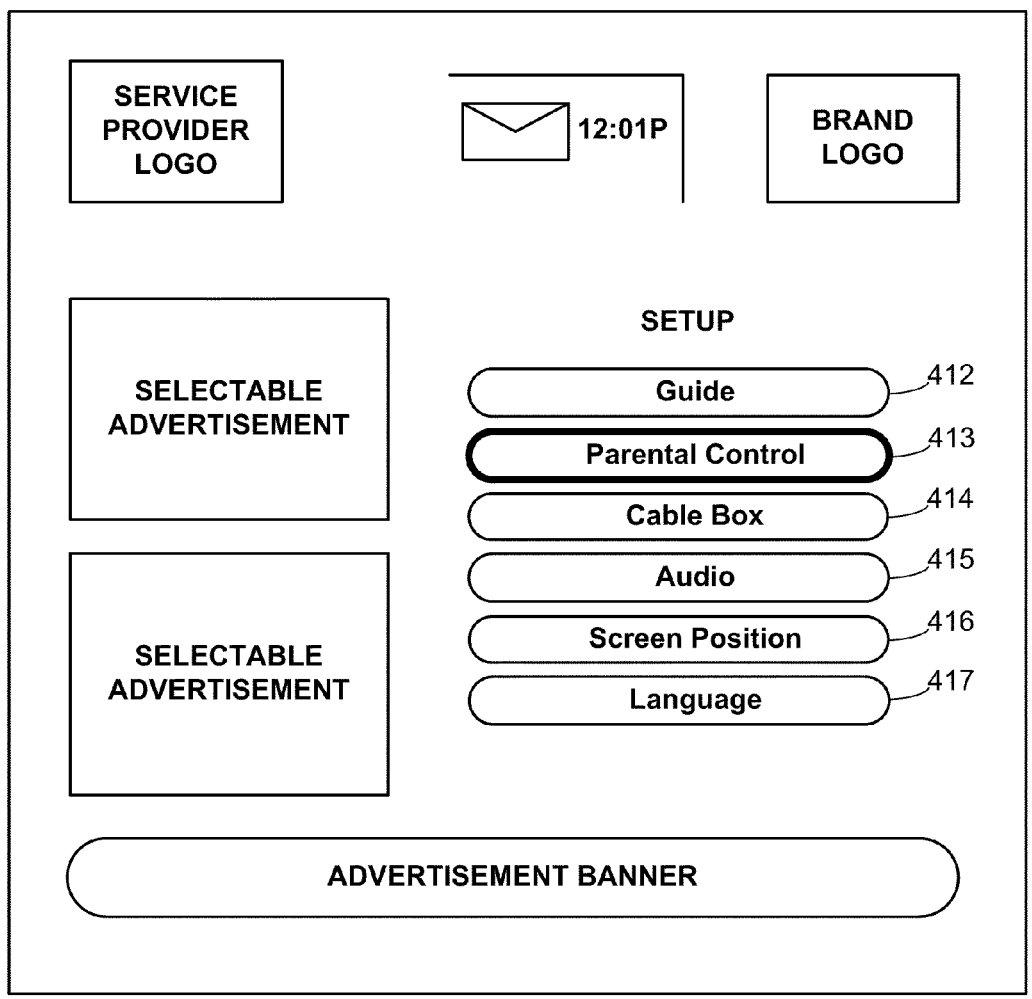
FIG. 41 is an illustrative program guide setup screen.
Figure 46:
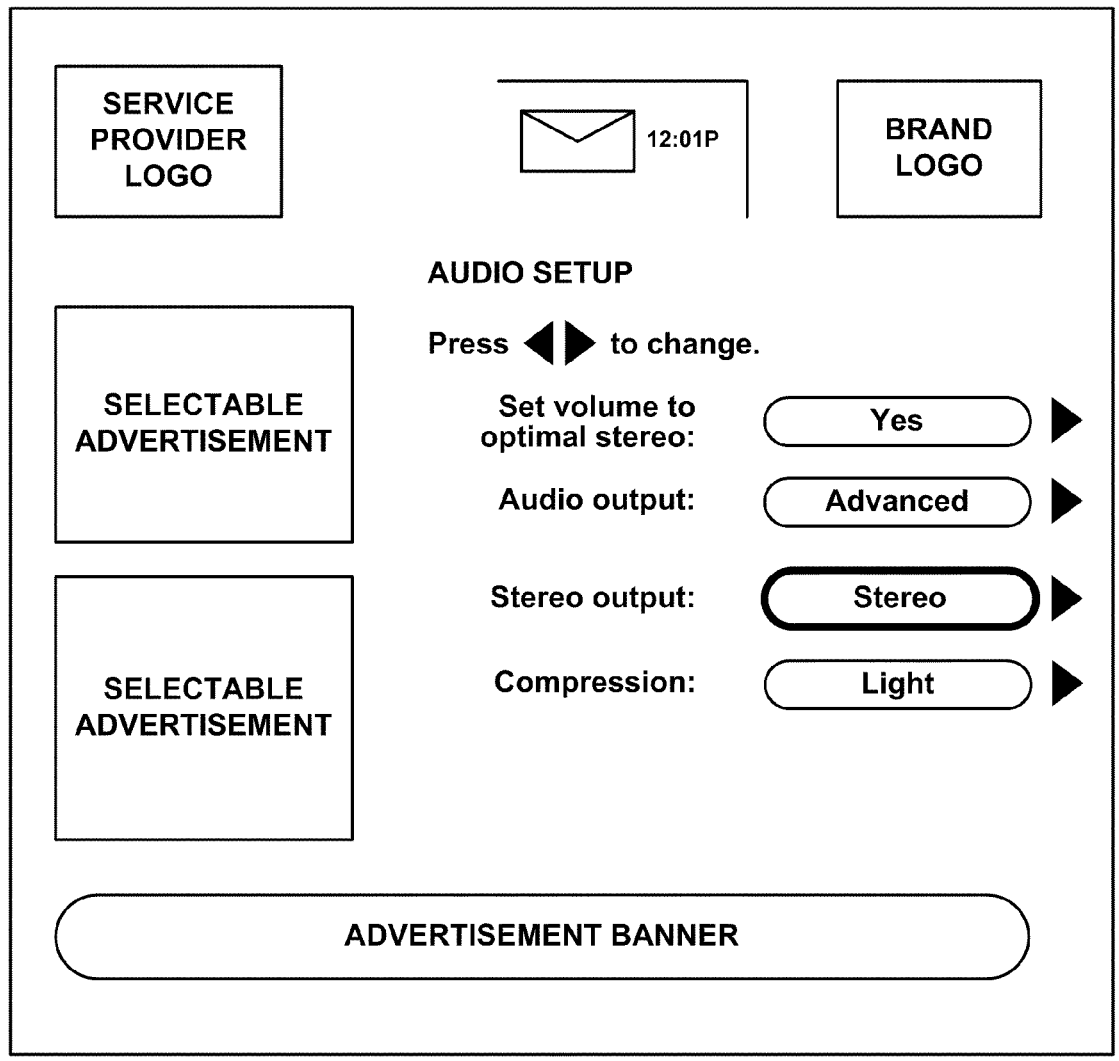
Figure 47:
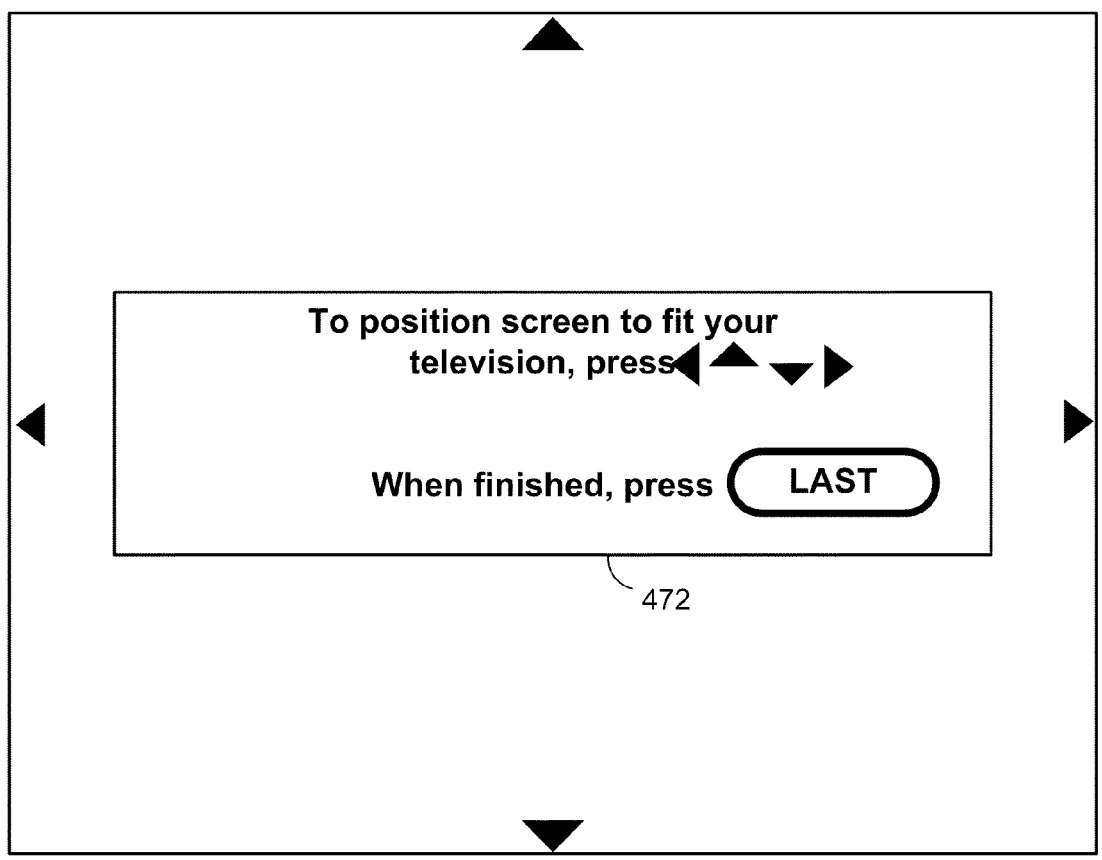

The program guide may provide a user with an opportunity to set up audio features of the guide and user television equipment 22. The program guide may display audio setup screen 461 of FIG. 46 when a user indicates a desire to set up audio feature of the guide or user television equipment 22. A user may indicate such a desire by, for example, selecting audio feature 415 of setup screen 411 (FIG. 41). The program guide may provide users with an opportunity to set, for example, the optimal stereo volume, the type of audio output, whether audio output is in stereo, the degree of Dolby compression, or any other suitable audio feature.

If desired, the program guide may provide the an user with opportunity to set the stereo output and Dolby compression settings when, for example, the user sets the audio output setting to "Advanced." When the audio output setting is set to something other than "Advanced," (e.g., "TV," or "Stereo"), the guide may hide the stereo output and Dolby compressing settings display elements (not shown) and use default settings (e.g., "Stereo" and "Light").

The program guide may provide users with an opportunity to set the screen position. The program guide may display, for example, position screen 471 when a user selects screen position feature 416 of setup screen 411 (FIG. 41). A user may set the screen position by, for example, pressing "right," "left", "up," and "down" keys on remote control 40. A user may return to setup screen 411 by, for example, pressing last feature 472. Adjustments made in this screen will apply in all subsequent guide screens.

Figure 48:
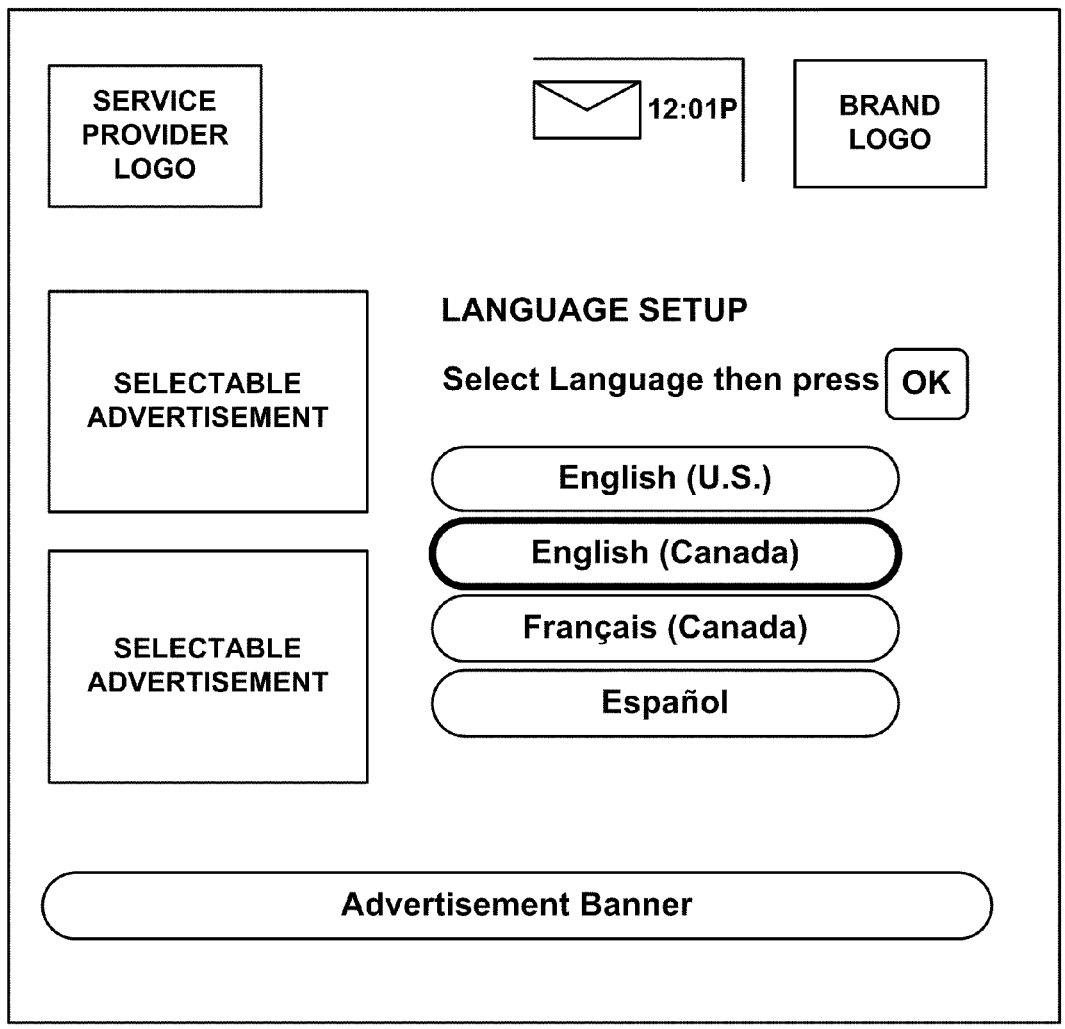
FIGS. 48 and 49 show illustrative program guide display screens for providing a user with an opportunity to select languages for programming audio and program guide display screen text.
Figure 49:
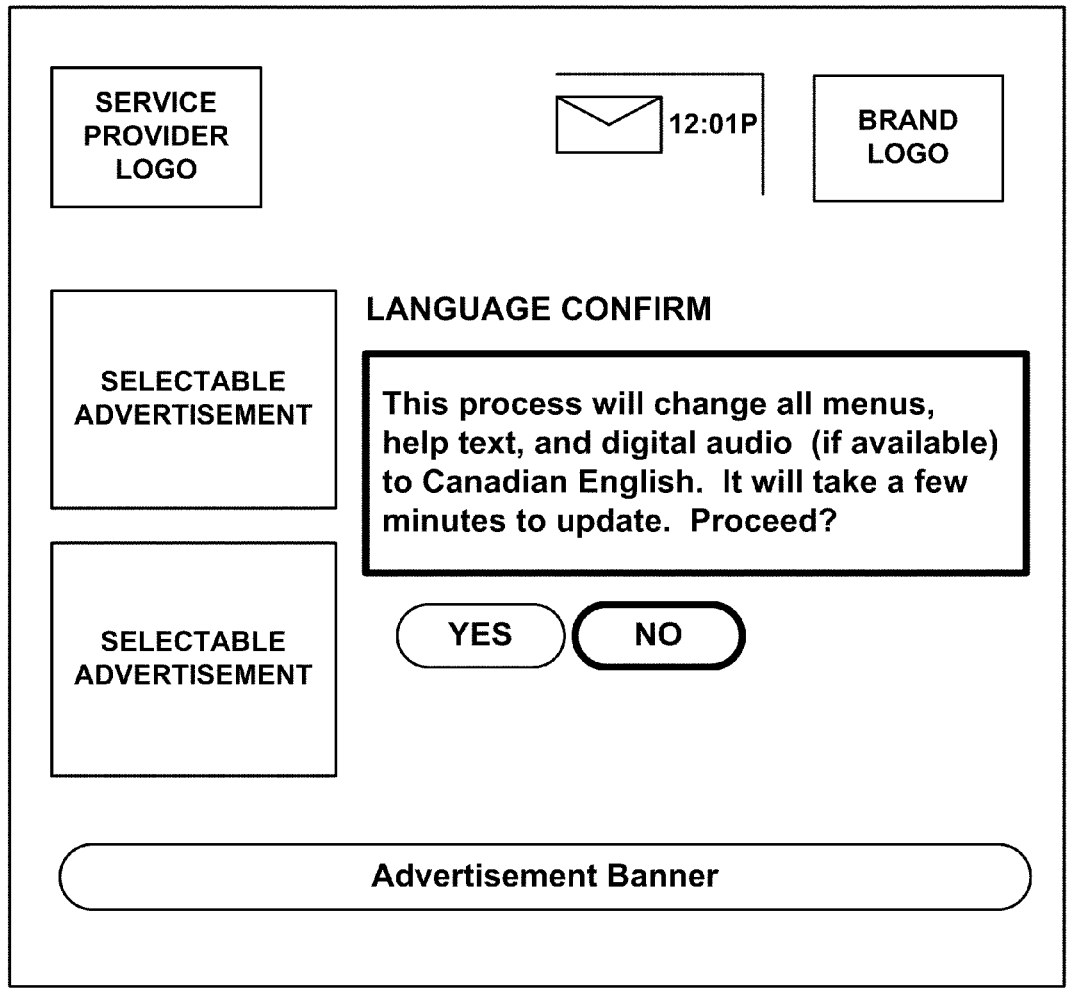

The program guide may provide users with the opportunity to select languages for programming audio and program guide display screen text. Program guide systems in which programming audio is played and program guide display screen text is displayed in selected languages are described, for example, in concurrently filed Ellis et al. U.S. patent application Ser. No. 09/354,602, filed Jul. 16, 1999, which is hereby incorporated by reference herein in its entirety. The program guide may display languages screen 481 as shown in FIG. 48 when a user indicates a desire to select a language by, for example, selecting language option 417 of setup screen 41. When a user selects a language, in this example Canadian English, the program guide may indicate to a user that the programming audio and program guide display screen text will be in the selected language, as shown in FIG. 49, and prompt a user to confirm the selection.

Figure 50:
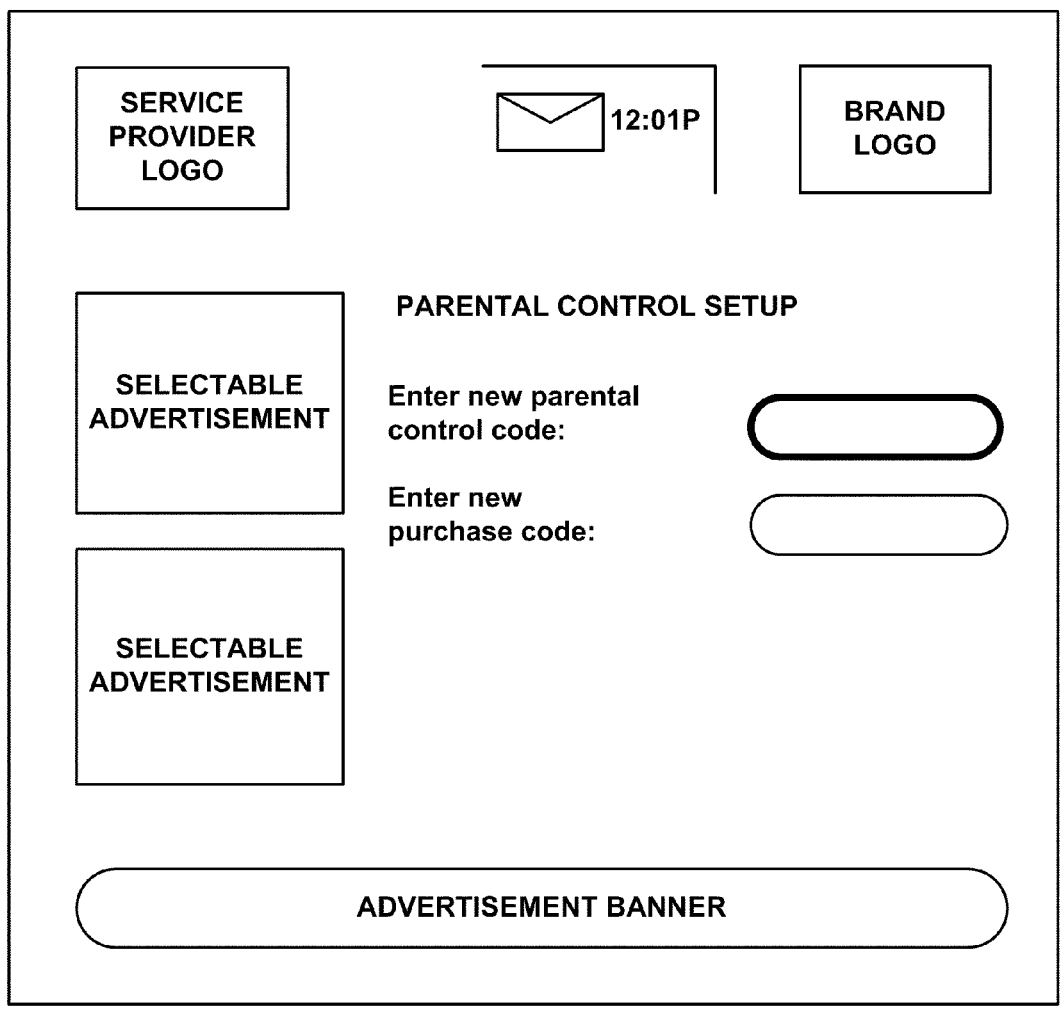
FIGS. 50 and 51 show illustrative program guide display screens for providing a user with an opportunity to set parental control codes.

FIG. 50 shows an illustrative parental control setup screen 501 that the program guide may display when a user indicates a desire to parentally control programs but has not previously set a parental control code or purchase code by, for example, selecting a parental control feature 413 from setup screen 411 (FIG. 41). Parental control codes are codes that the program guide requires a user to enter before a user is allowed to access channels, programs, program information, other program guide data, or any suitable combination thereof, when such material or information does not meet predefined control criteria. Purchase codes are codes that the program guide requires a user to enter before a user may purchase a pay-per-view program or package.

Figure 51:
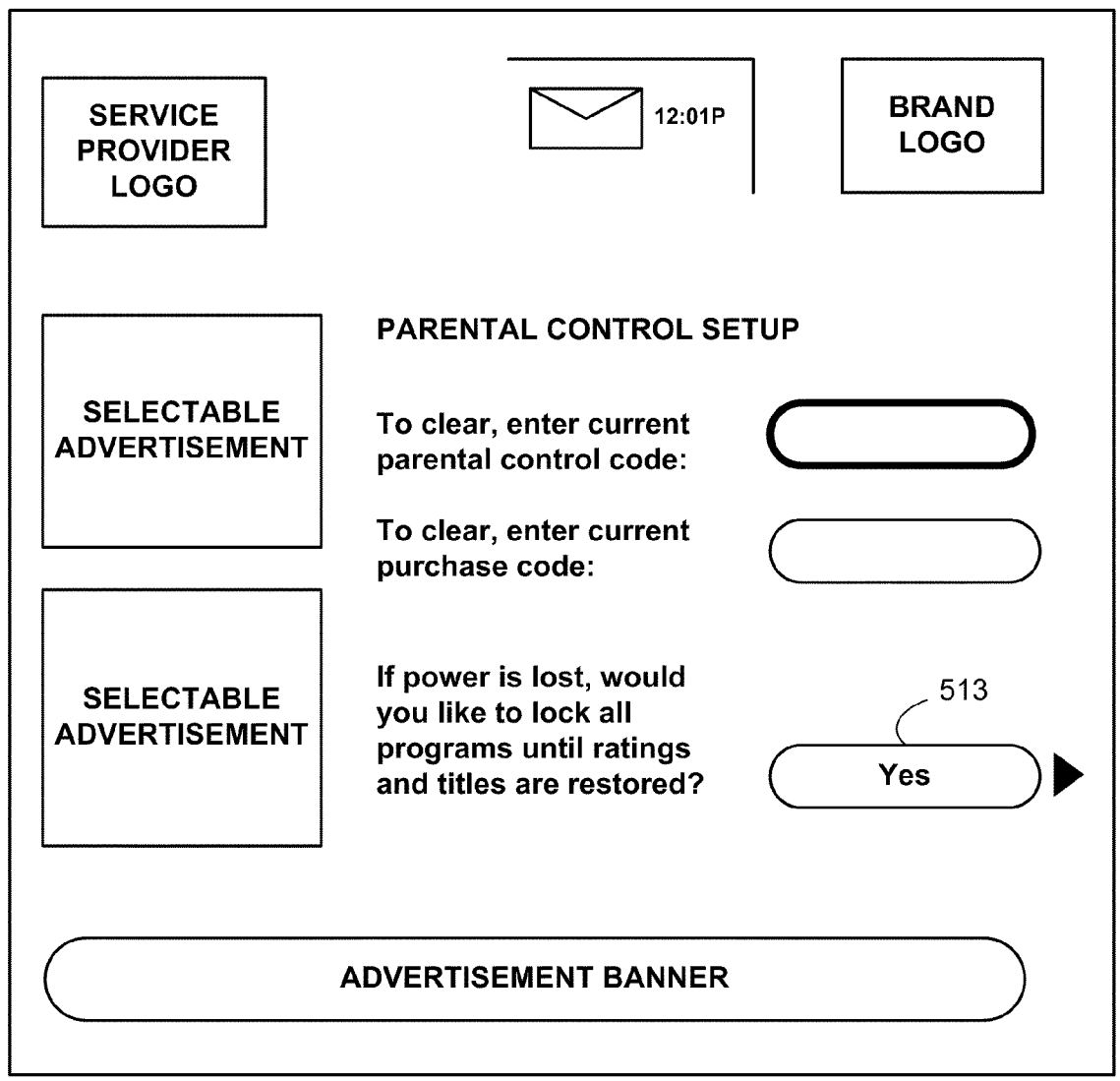

FIG. 51 shows parental control setup screen 511 that the program guide may display when a user has previously set a parental control or purchase code and indicates a desire to change it by, for example, highlighting a parental control option from setup screen 411 (FIG. 41) and presses an "OK" key on remote control 40. Parental control screen 511 may, for example, prompt a user for a parental control code in order to clear or otherwise modify parental control settings. After a user enter a valid parental control or purchase code, the program guide may clear the current code. A user may then set the code by entering a new code in parental control setup screen 501 of FIG. 50.

When program guide data is stored by the program guide, power outages may cause program guide data to be erased from the program guide. Normal parental control may be temporarily lost until the program guide data is restored. FIG. 51 also shows how the program guide may provide a user with an opportunity to set whether all programs are locked when power is lost. When a user has set option 513 to "Yes" and the program guide loses its data, the program guide may lock all programs until program guide data is restored.

Figure 52:
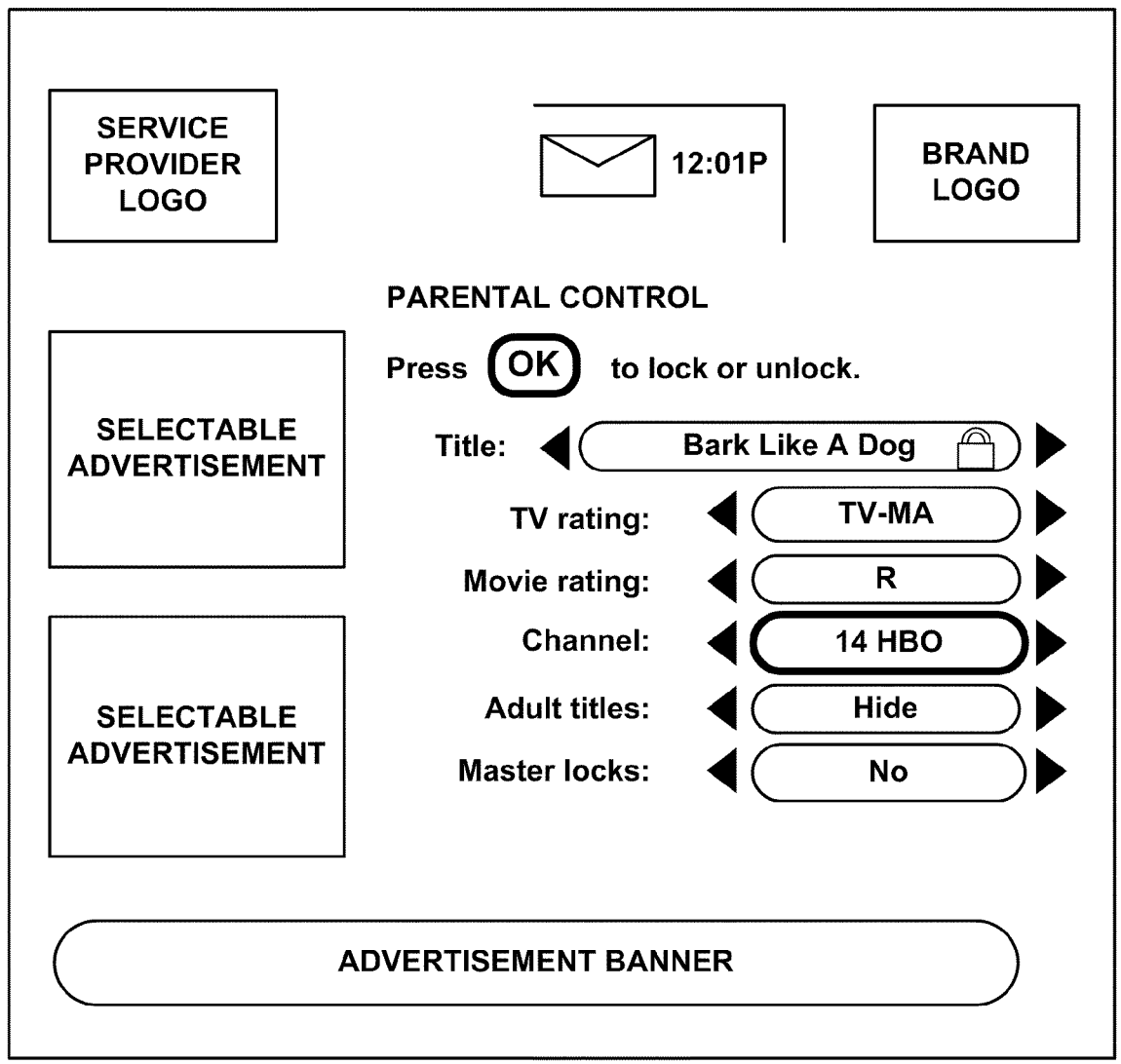
FIGS. 52-54 show illustrative program guide display screens for providing a user with an opportunity to define parental control criteria.

FIG. 52 shows illustrative parental control screen 521 that the program guide may display when a user indicates a desire to parentally control programs.

The program guide may display parental control screen 521 when, for example, a user selects a "Parents" option from main menu 102 of FIG. 32 and enters a valid parental control code. The program guide may, for example, provide a user with an opportunity to parentally control programming by title, channel, rating, or any other suitable criteria. A user may lock programs by, for example, selecting a criteria, arrowing left or right to display a particular selection, and pressing a "lock" key on remote control 40. For example, FIG. 52 shows a user locking programs by channel. By pressing "left" and "right" arrow keys on remote control 40, a user may scroll through the channels. As the channel numbers and call letters are displayed, they may be accompanied by a lock icon, highlighted, colored, or presented in another suitable manner to indicate to a user that a particular channel number is locked. A user may lock unlocked channels, or unlock locked channels, by, for example, pressing a "lock" key on remote control 40 as the channels are displayed.

The program guide may provide a user with an opportunity to hide adult titles. When a user activates the "hide adult titles" feature by, for example, setting it to "Yes", the program guide may display a default string such as "Adult Programming" instead of adult program title wherever program titles are displayed (e.g., FIGS. 1-16, 19-22, and 25-29). In addition, the program guide may replace any undesirable programming information with a default string information. Program guide systems in which adult titles and descriptions are hidden or blocked are described, for example, in Ellis et al. U.S. patent application Ser. No. 09/201,105 filed Nov. 30, 1998, which is hereby incorporated by reference herein in its entirety.

The program guide may provide a user with an opportunity to globally remove or deactivate locks using a "master locks" feature. In response to a user selection of the "master locks" feature shown in FIG. 52, the program guide may display a master locks program guide display screen.

Figure 53:
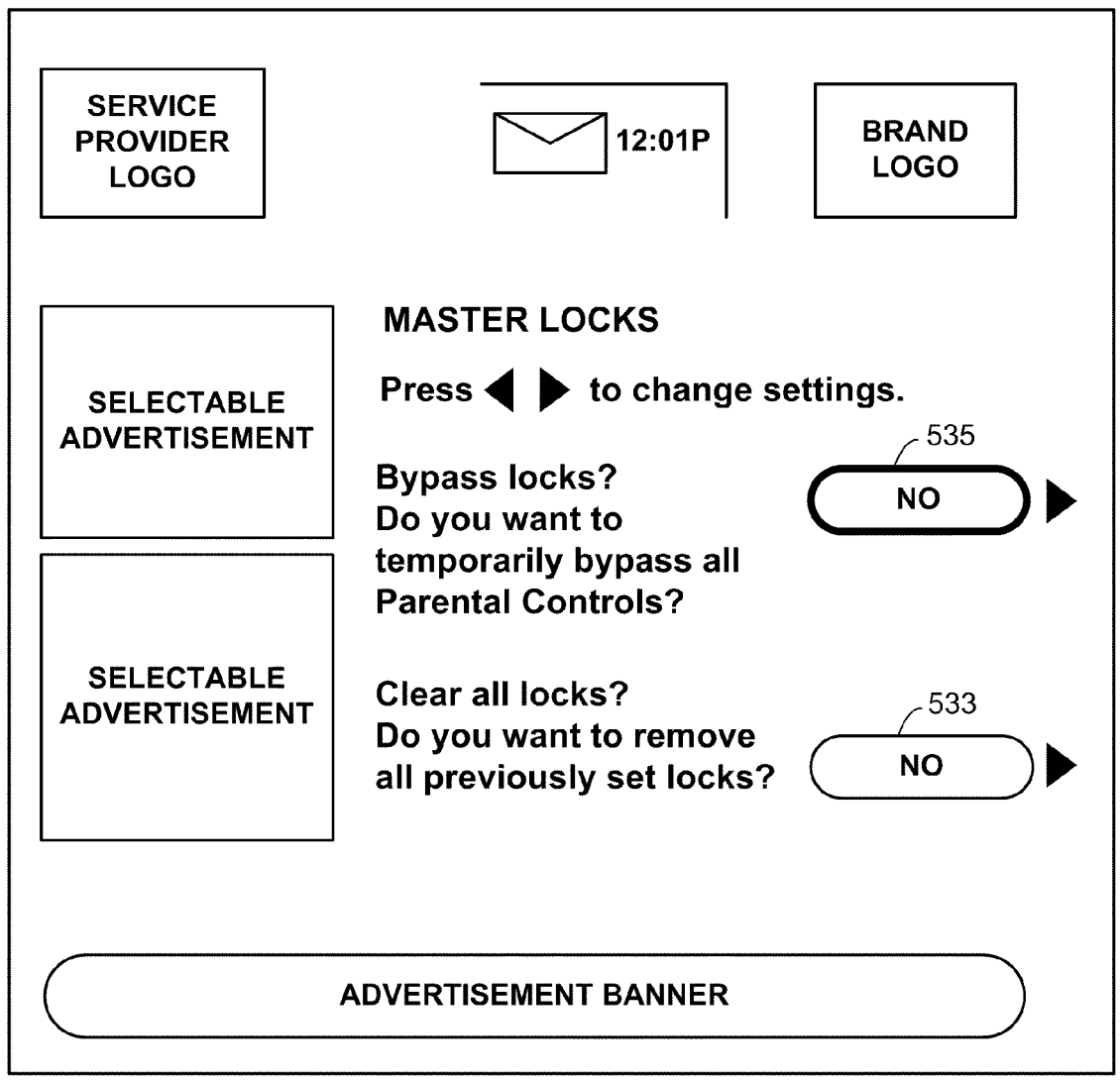
Figure 54:
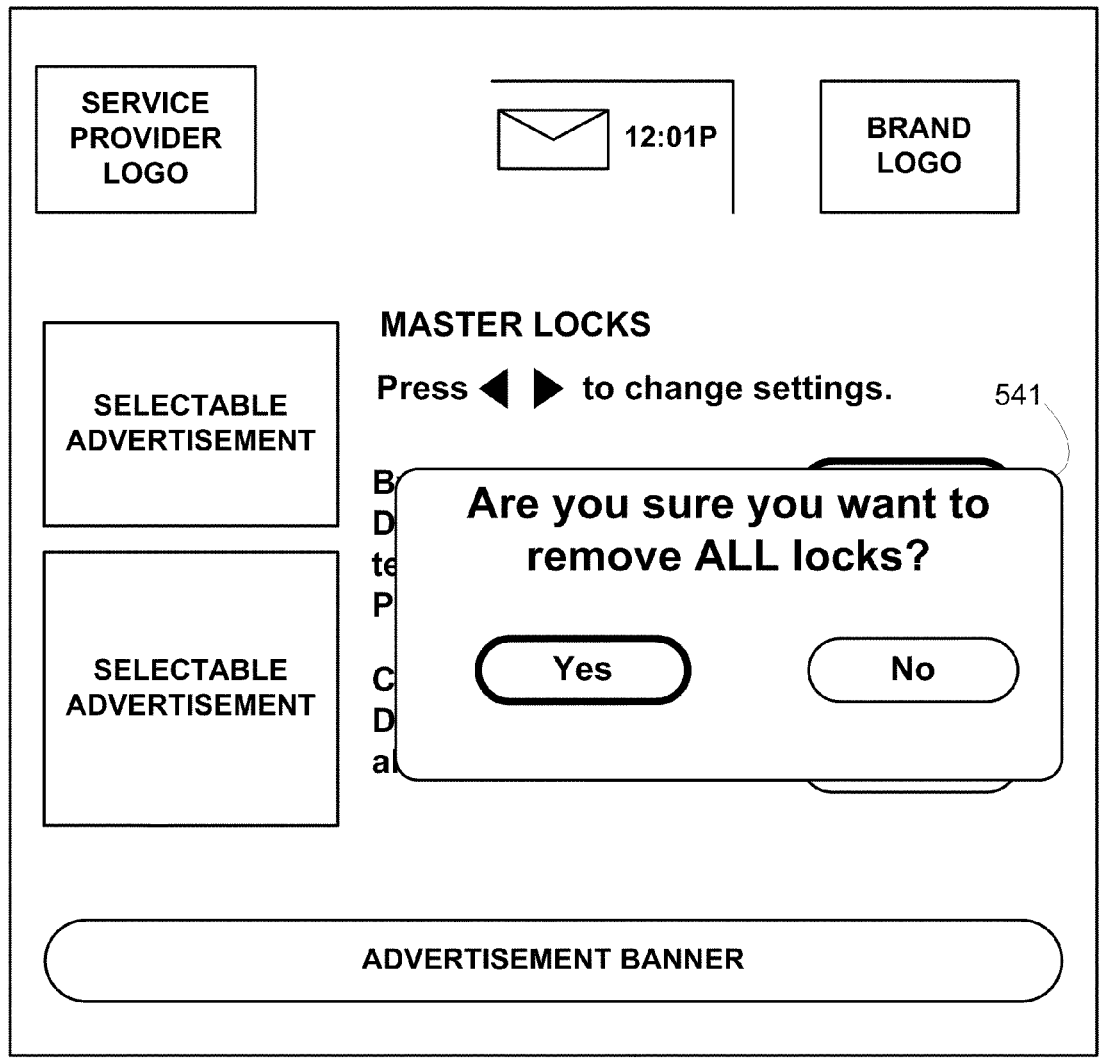

FIG. 53 shows an illustrative master locks display screen 531 for providing a user with opportunities to clear all parental control locks and to bypass parental control locks. When a user sets clear all locks feature 533 to "Yes", the program guide may provide a user with an opportunity to confirm the clearing of all locks by, for example, displaying overlay 541 of FIG. 54.

A user may activate the bypass locks feature by setting bypass locks feature 535 to "Yes". When activated, the bypass feature of the program guide temporarily deactivates the parental control locks and allows a user to view television programming that would otherwise be locked without entering a parental control code. In addition, when a suitable listing screen is displayed, the program guide may change the "padlock" icon of lock indicator 161 (e.g., FIG. 10) to an "open padlock" or other suitable icon to indicate that the bypass feature is activated.

Figure 55:
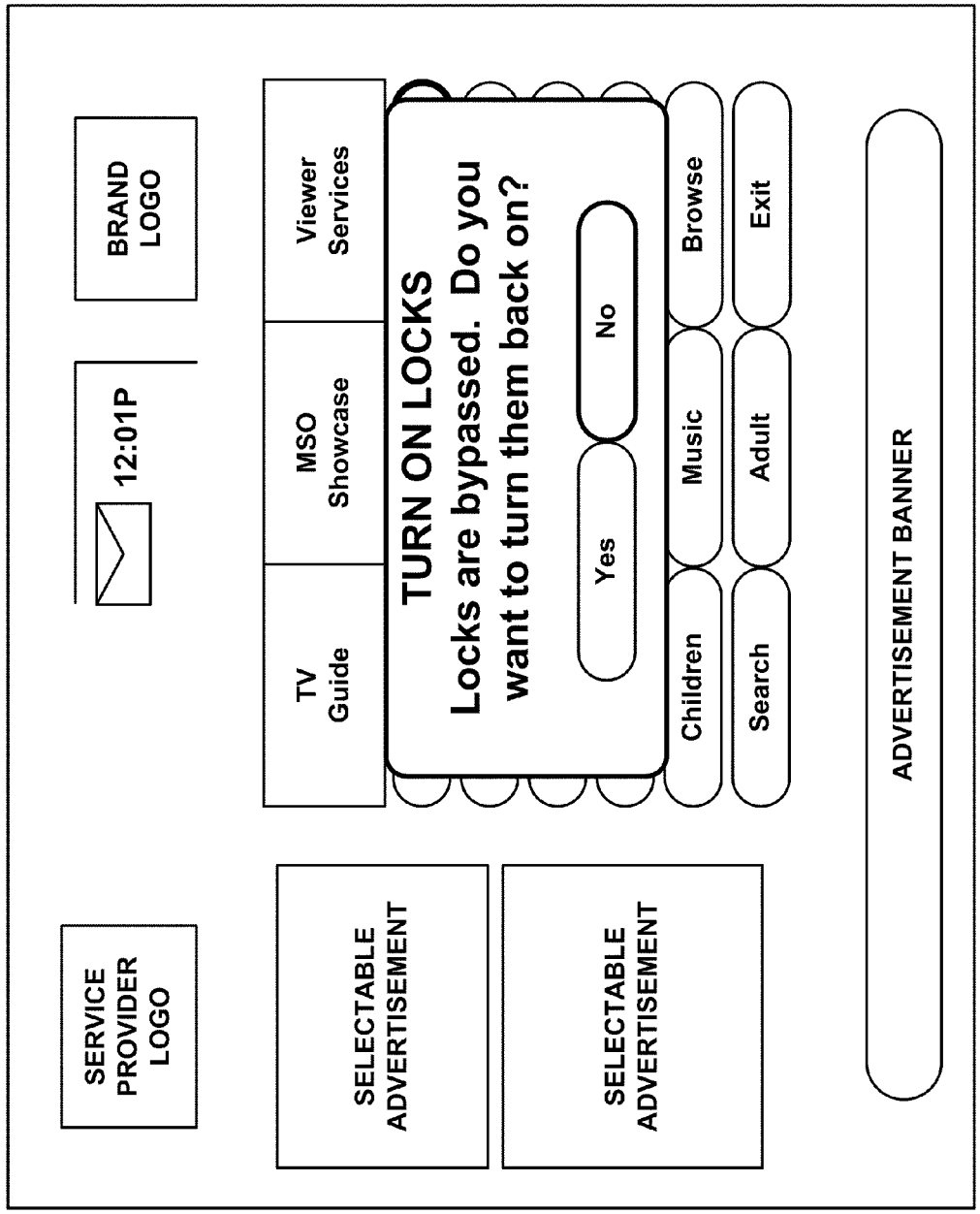
FIG. 55 shows an illustrative program guide display screen for providing a user with an opportunity to turn off the bypass of parental control locks.

Parental control may be reactivated and bypass disabled when, for example, the set-top box is turned off and then on again, when a user tries to access the parental control features of the program guide (e.g., by pressing a lock button on a remote control), or when any other suitable condition occurs. If the set-top box is reset (e.g., turned off and on), the program guide may automatically reenable the parental control feature to prevent the inadvertent disabling of the parental control locks. If a user tries to access the parental control features of the program guide, the program guide may provide a user with an opportunity to confirm reenabling the parental control locks, as shown in FIG. 55. If a user confirms reenabling the locks, the program guide may reenable them and allow user to use the parental control feature.

The program guide may provide users with an opportunity to parentally control programs and to set purchase codes for purchasing pay-per-view programs and packages. A user may indicate a desire to parentally control programs by, for example, pressing a "lock" key on remote control 40 while watching a program or while highlighting its listing, by selecting a parental control option from setup screen 411 of FIG. 41, by selecting a "Parents" feature from main menu 102 of FIG. 32, or when a user is in any other suitable program guide display screen.

Figure 56:
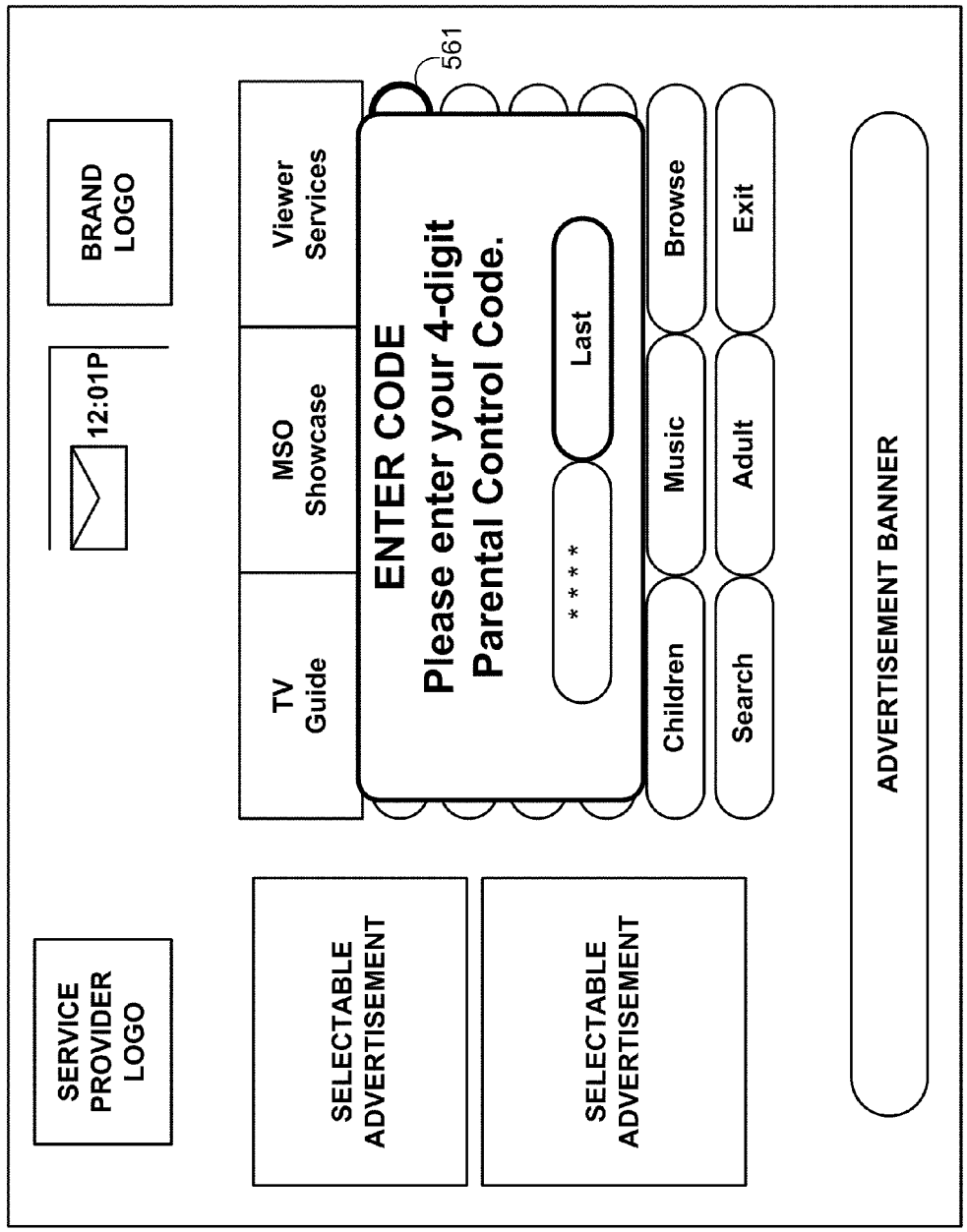
FIGS. 56-65 show illustrative overlays for requiring a user to enter a parental control code to access features of the program guide.
Figure 57:
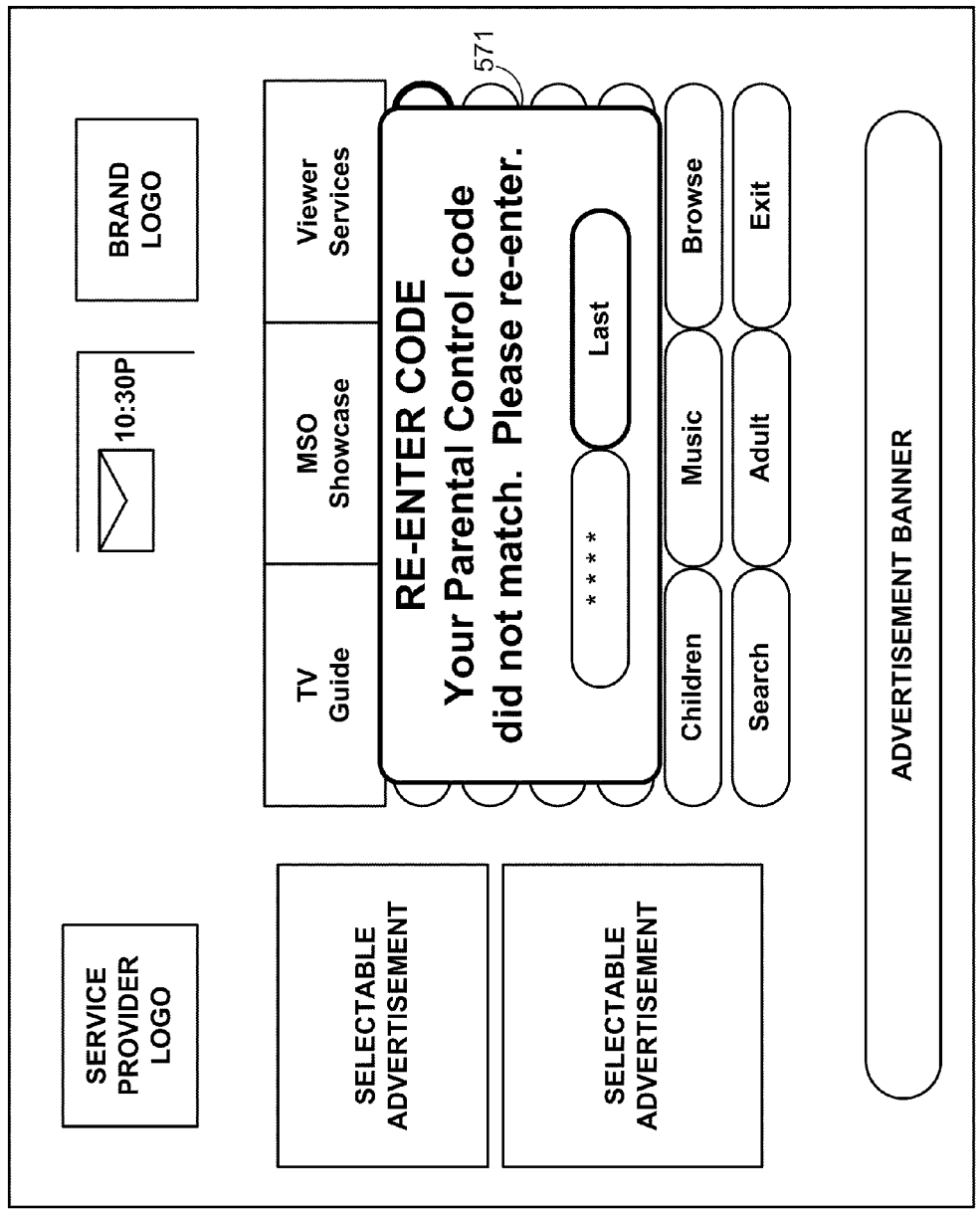
Figure 58:
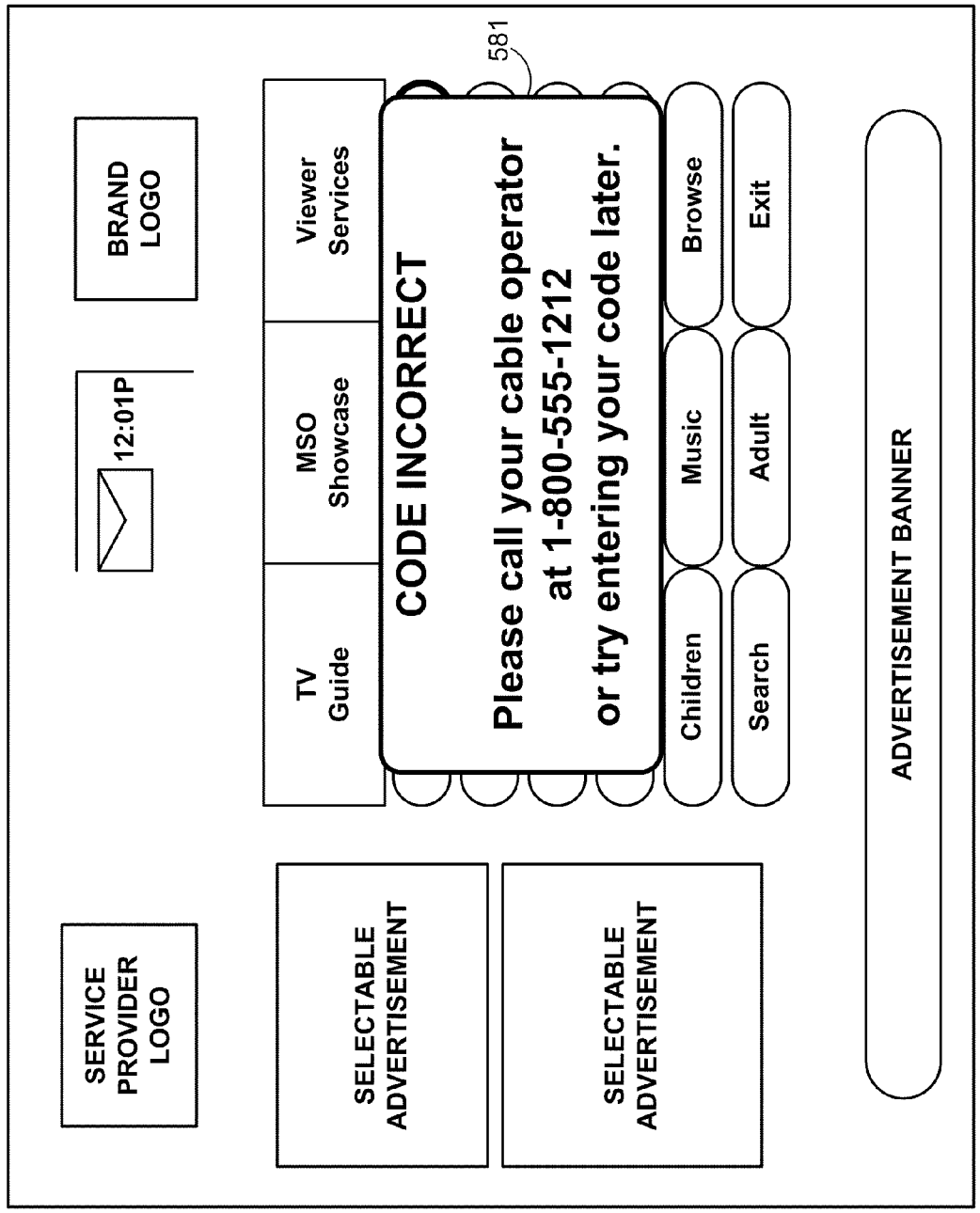

FIG. 56 shows an illustrative overlay 561 that the program guide may display when, for example, a user indicates a desire to parentally control programs by selecting a "Parents" feature from main menu 102 of FIG. 32. The program guide may prompt a user for the correct parental control code before providing a user with access to setting parental control functions. FIG. 57 shows an illustrative overlay 571 that the program guide may display when a user enters an incorrect parental control code after indicating a desire to access the parental control feature of the guide from main menu 102. FIG. 58 shows an illustrative overlay 581 that the program guide may display when a user enters a wrong code a number of times in a row (e.g., five). Overlay 581 may be displayed until the program guide is reset by, for example, television distribution facility 16. Alternatively, overlay 581 may disappear but the guide may prevent the user from attempting to enter a code until television distribution facility 16 clears the code or a pre-defined period of time has passed.

Figure 59:
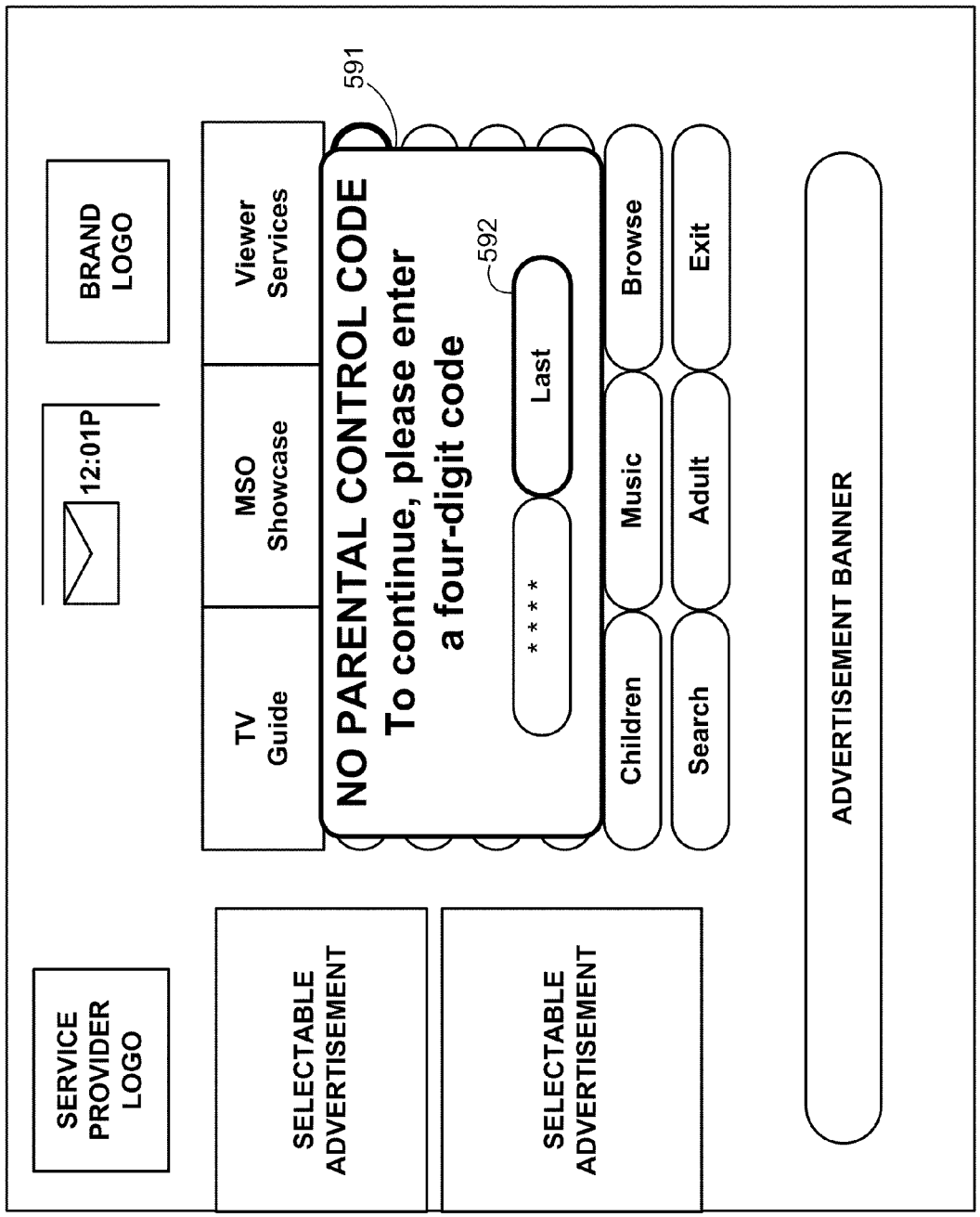
Figure 60:
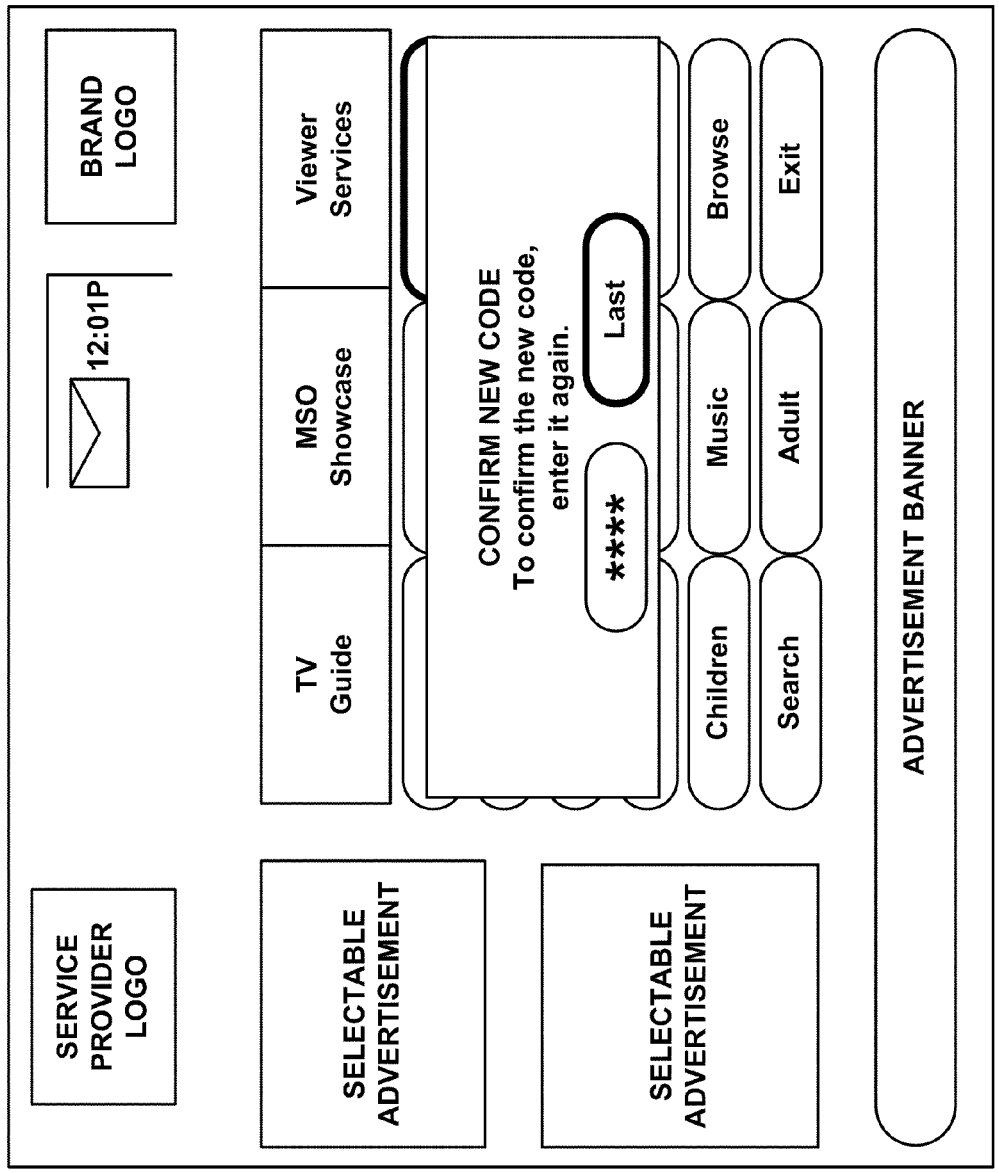

The program guide may provide a user with an opportunity to set a parental control code when, for example, a user indicates a desire to access the parental control feature of the program guide but a code is not set. FIG. 59 shows illustrative overlay 591 that the program guide may display when, for example, a user selects a "Parents" feature from main menu 102 of FIG. 32 and no parental control code is set. After a user enters a new code, the program guide may provide a user with an opportunity to confirm the code as shown in FIG. 60.

Figure 61:
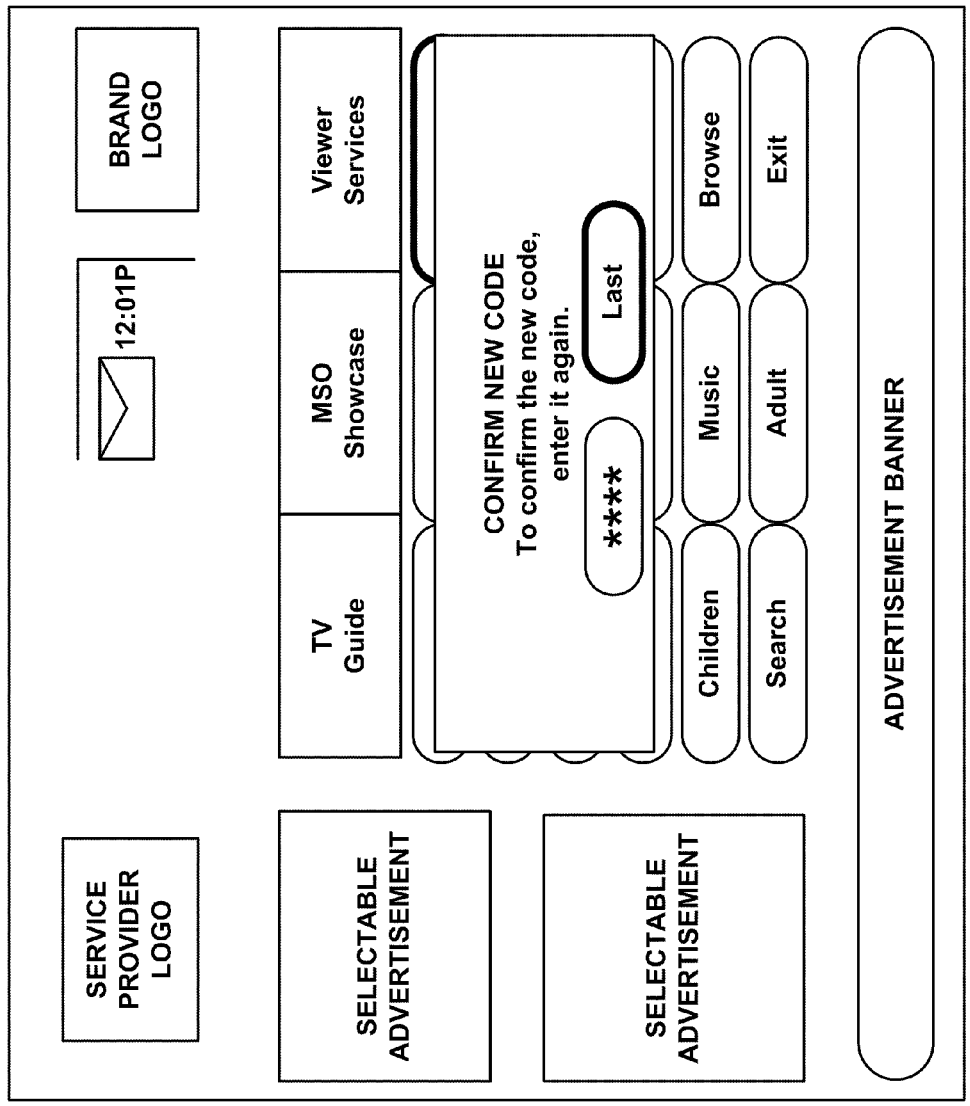
Figure 62:
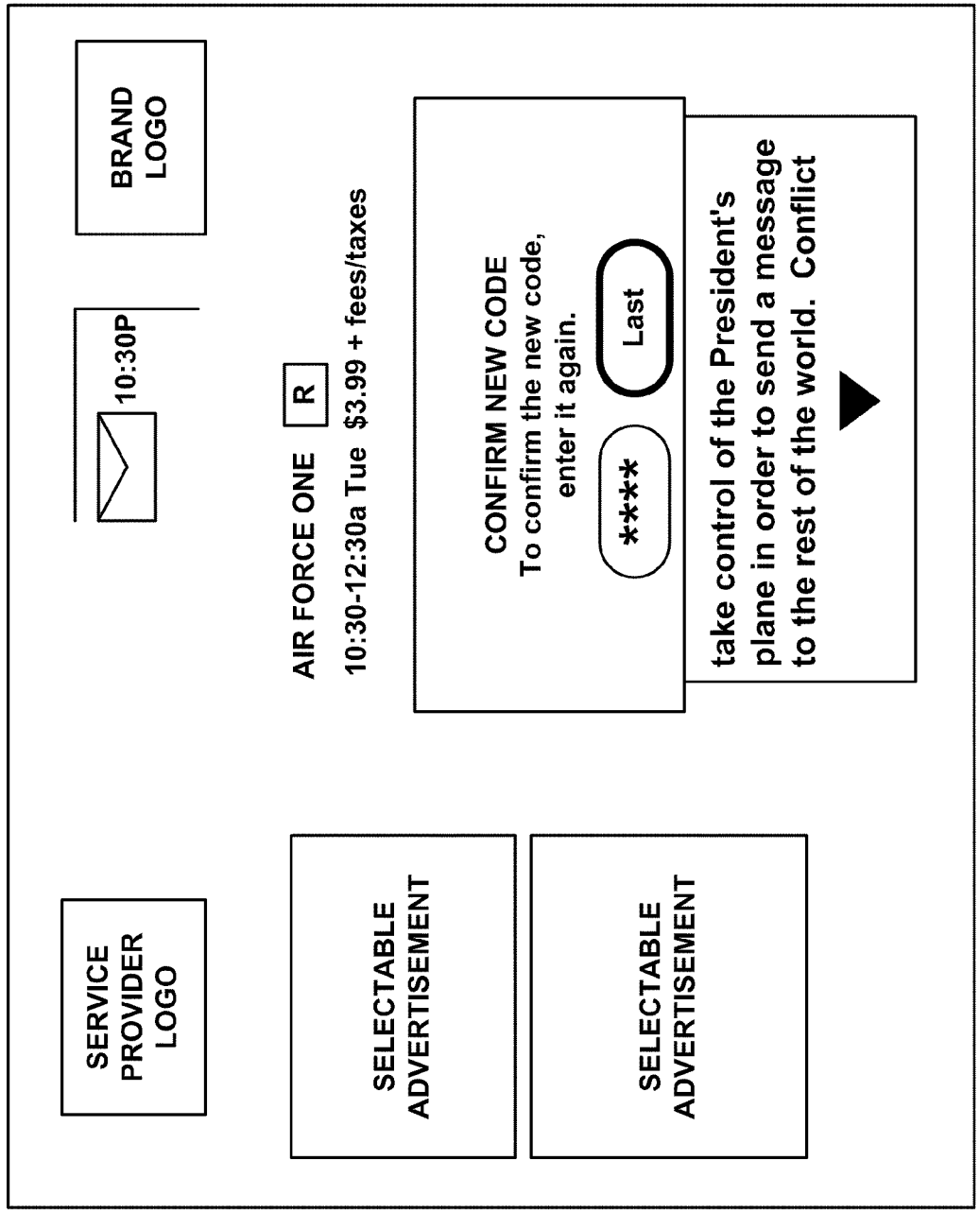

FIGS. 61-65 show illustrative program guide display screens that the program guide may display when, for example, a user indicates a desire to lock a program from within a program information screen. Program information screens are display screens that display additional information about a program for a user. Program information screens may, for example, tell a user the story-line of plot of a program, its actors, its rating, or any other suitable information. FIG. 61 shows illustrative overlay 611 that the program guide may display when, for example, a user indicates a desire to lock a program from within a program information screen but there is no parental code set. A user is prompted to enter a new code, and the program guide may provide a user with an opportunity to confirm the code, as is shown in FIG. 62.

Figure 63:
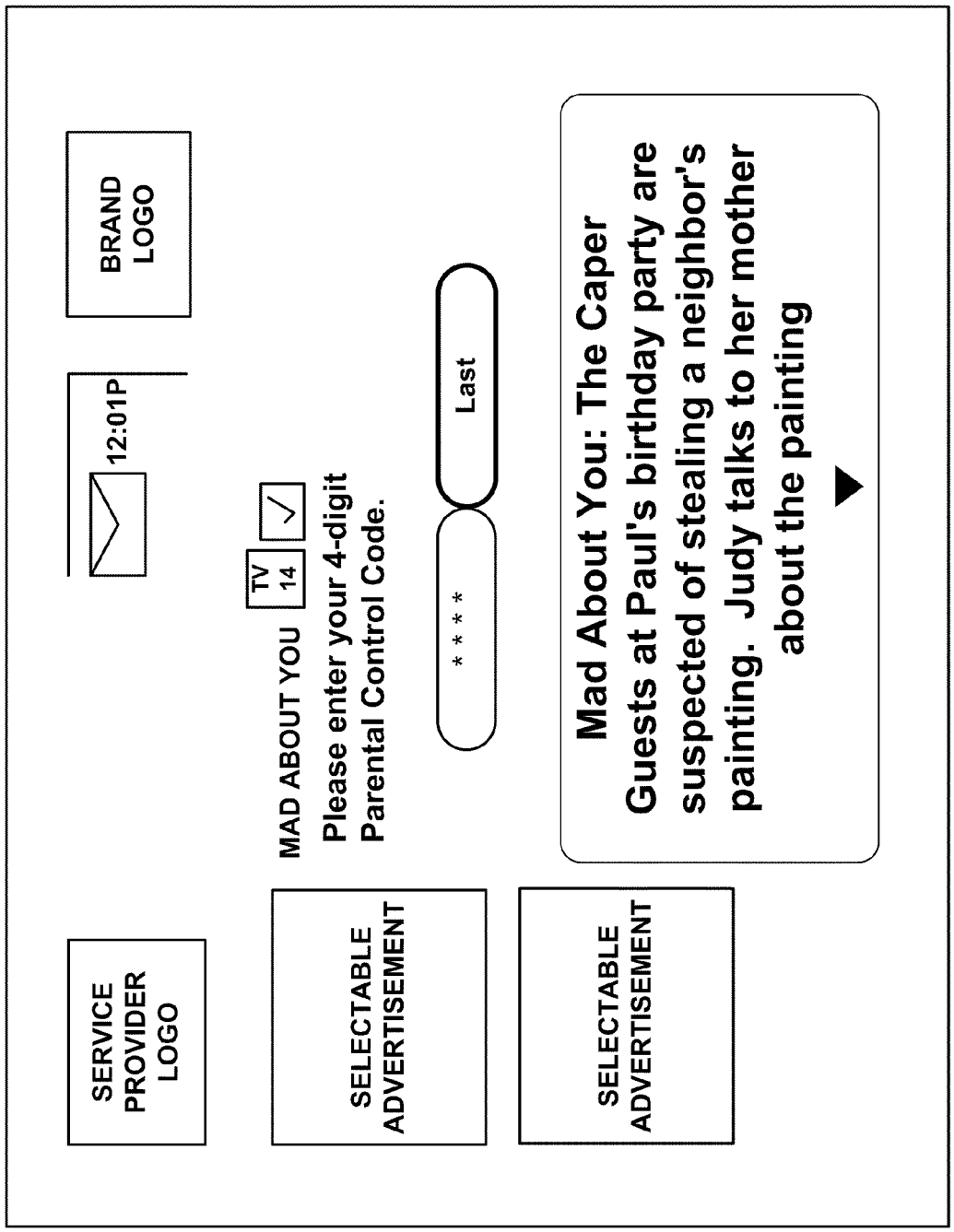
Figure 64:
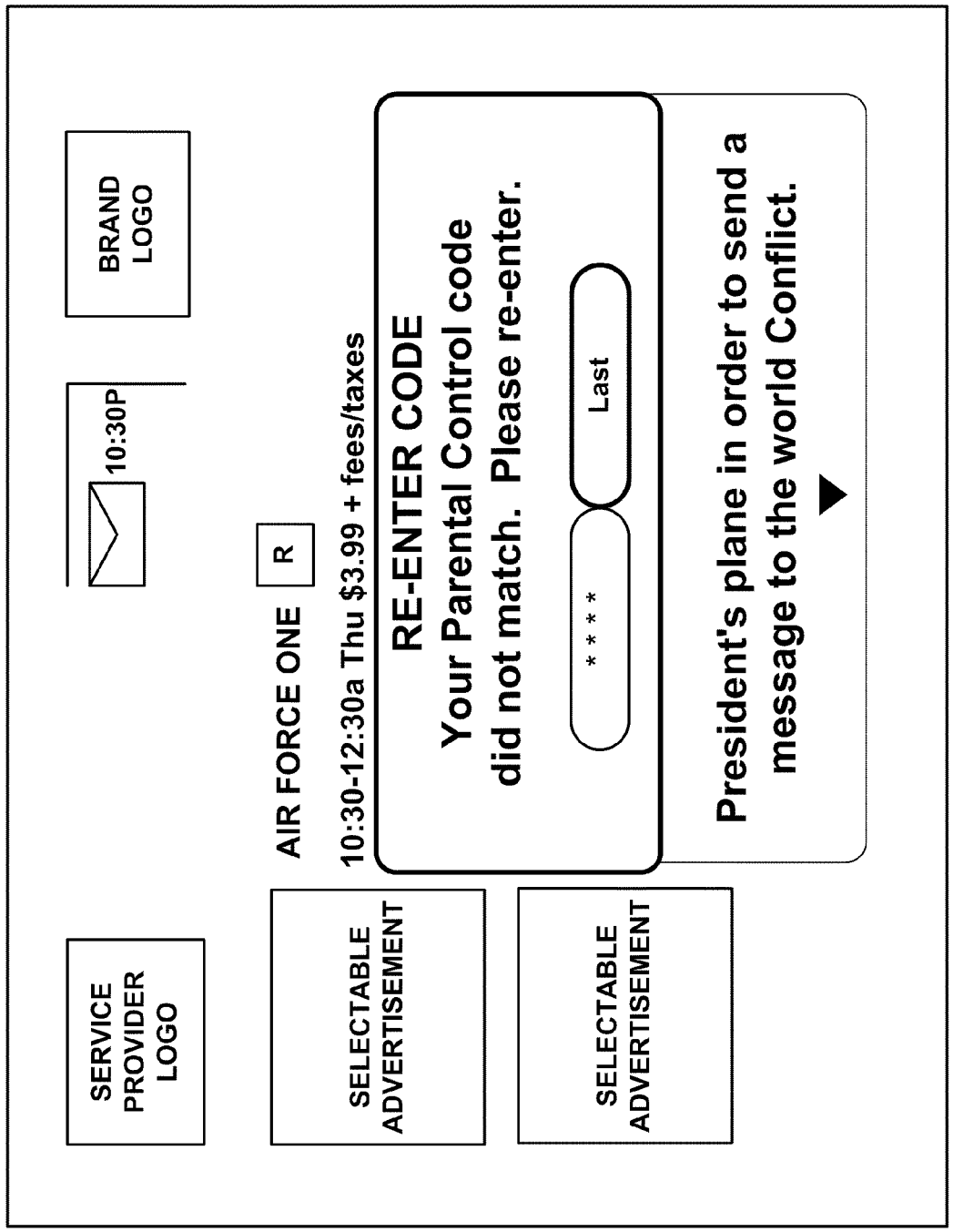
Figure 65:
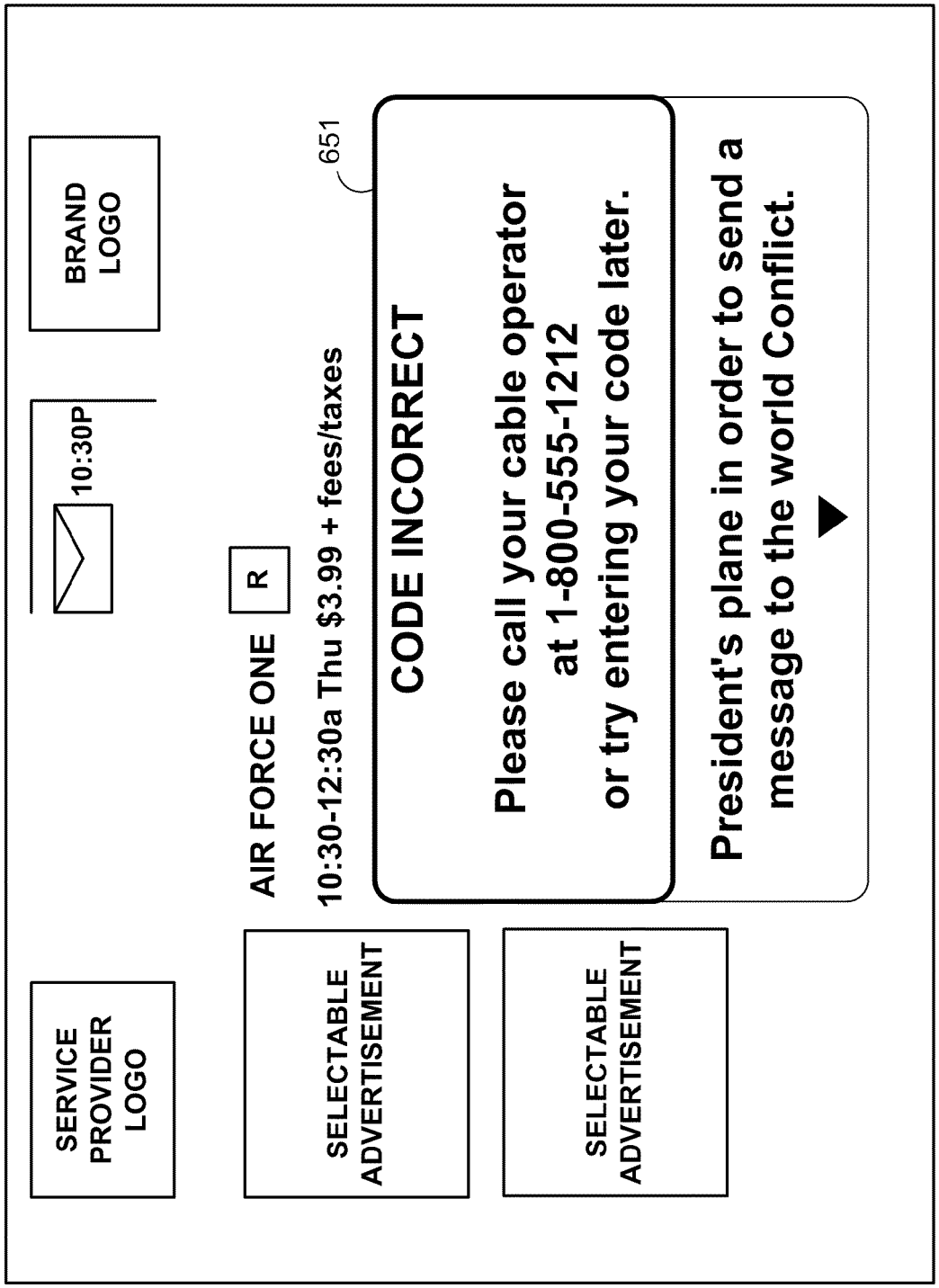

When a parental code is set and a user indicates a desire to lock a program from within a program information screen, the program guide may prompt a user for the parental control code as is shown in FIG. 63. If a user enters an incorrect code, the program guide may prompt a user to reenter it, as shown in FIG. 64. FIG. 65 shows an illustrative overlay 651 that the program guide may display when a user enters a wrong code a number of times in a row (e.g., five). Overlay 651 may be displayed until the program guide is reset by, for example, television distribution facility 16. Overlay 651 may also be displayed any time a user enters a wrong code too many times (e.g., from within the overlay shown in FIG. 56).

The program guide may also provide a user with an opportunity to lock programs "by example." A user may indicate a desire to lock programs by example by, for example, pressing a "lock" key while watching a program or after highlighting a program listing, or by selecting an on screen lock feature within a display screen (e.g., within a program information screen). When a user indicates a desire to lock programs by example, the program guide may allow the user to lock the title, rating, or channel of the program. By locking the title, rating, or channel of a program, the program guide locks programs (and episodes of a program) with similar characteristics.

Figure 66:
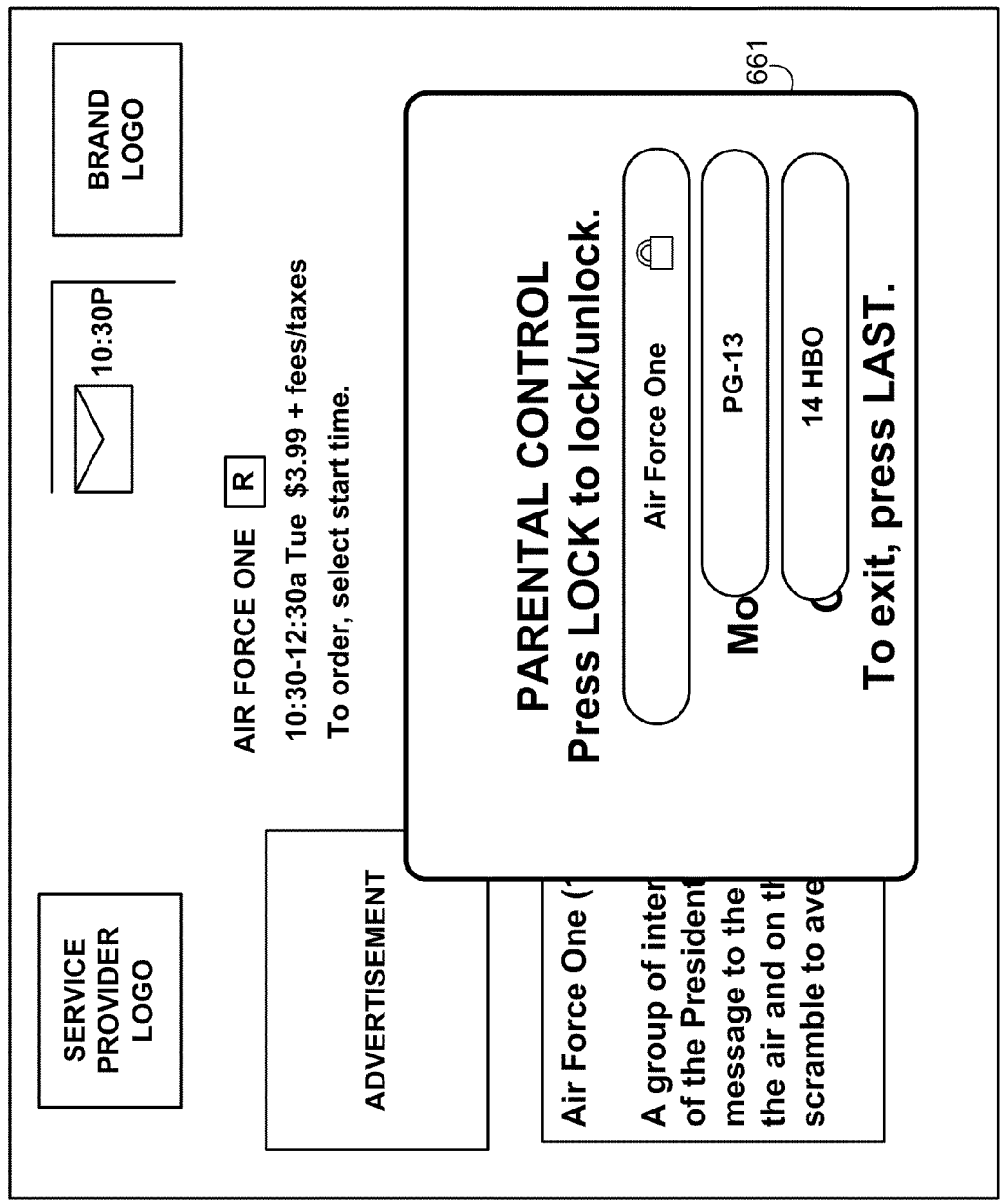
FIG. 66 shows an illustrative overlay for providing a user with an opportunity to lock by example.
Figure 67:
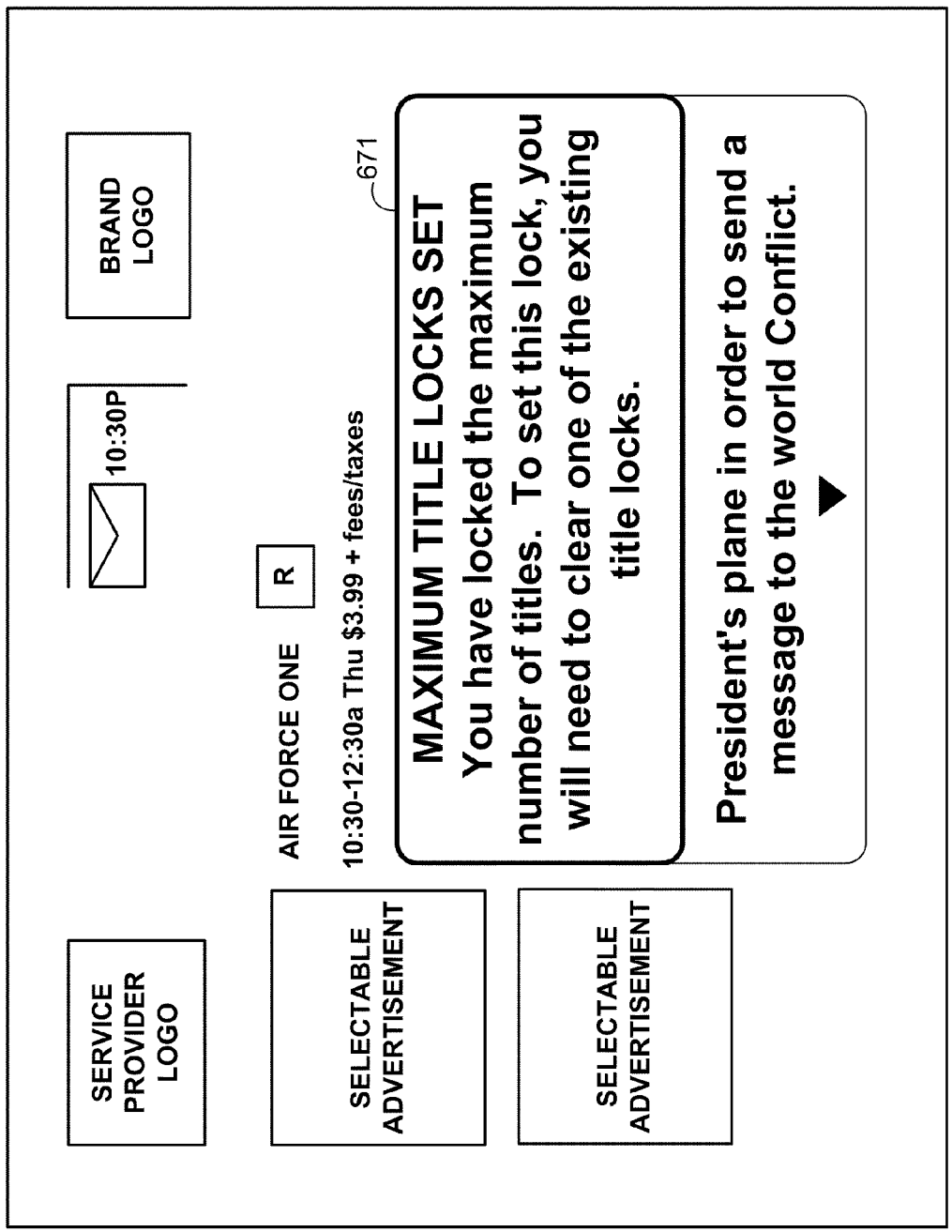
FIG. 67 shows an illustrative overlay that the program guide may display when a user has locked a maximum number of program titles.

FIG. 66 shows an illustrative overlay 661 that the program guide may display when a user indicates a desire to lock programs by example. Users may lock the title, rating, or channel of the program by, for example, arrowing to each selection or pressing a "lock" button on remote control 40. When the user locks a selection, the guide may display a lock indicator. Users may unlock selections by, for example, pressing a "lock" button. The program guide may respond by unlocking the selected title, rating, or channel and removing the displayed lock indicator. If desired or when system resources require, the program guide may limit the number of titles a user may lock. FIG. 67 shows illustrative overlay 671 that prompts a user to clear a title lock before adding another.

Figure 68:
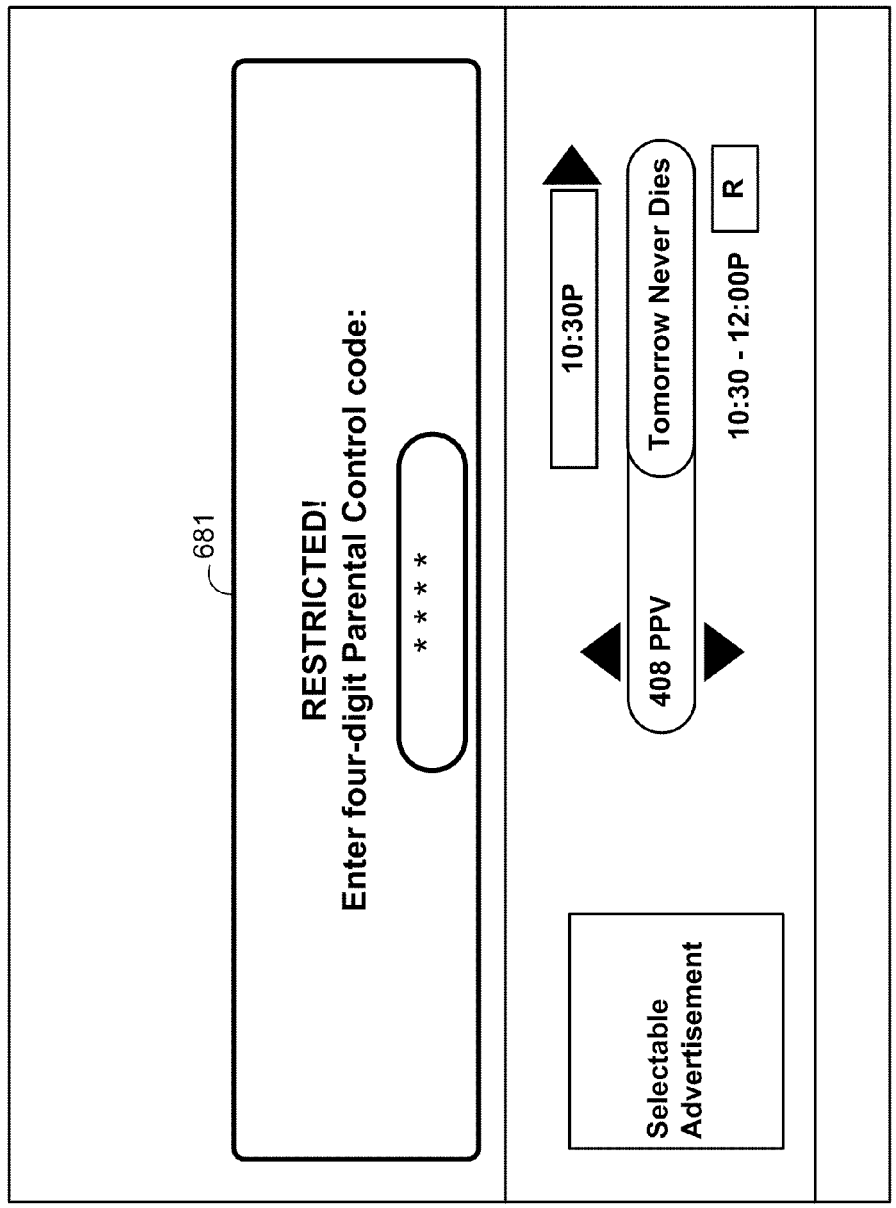
FIG. 68 shows an illustrative overlay for indicating to a user that a program is locked and for prompting the user for a parental control code.

Once a user has setup parental control features of the program guide, the program guide may require a user to enter a parental control code when a user indicates a desire to access programs, program information, or other program guide data that meet the parental control criteria. FIG. 68 shows an illustrative overlay 681 that the program guide may display when a user attempts to tune to a channel that is parentally restricted or that is broadcasting a program that is restricted.

The program guide may provide a user with opportunities to view information about programs and to access related features from within program information screens. Systems in which program guides provide users with opportunities to access program guide features from within information screens are described, for example, in concurrently filed Rudnick et al. U.S. patent application Ser. No. 09/356,268, which is hereby incorporated by reference herein in its entirety.

Program information screens may include, for example, a brief description of a program, the actors of a program, the rating of a program, when a program is aired, or any other suitable information related to a program. The program guide may display a program information screen when a user indicates a desire to view program information by, for example, pressing an "info" key on remote control 40 while watching a program or after selecting its listing, by selecting a selectable advertisement that promotes a program for which program information is available, or using any other suitable approach.

Figure 69:
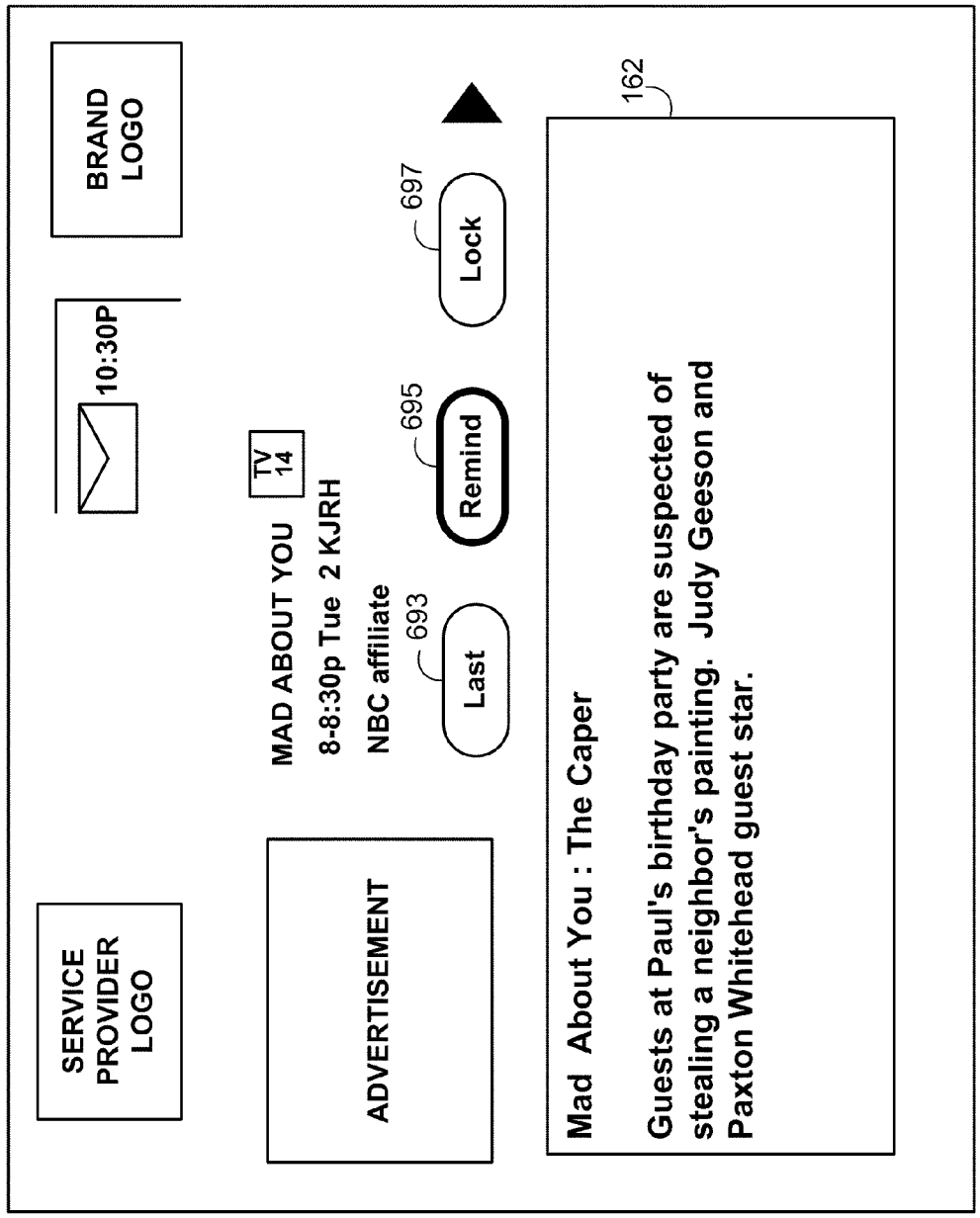
FIGS. 69-76 show illustrative program guide display screens for providing a user with access to programming, pay-per-view, package, channel, and digital music information.
Figure 70A:
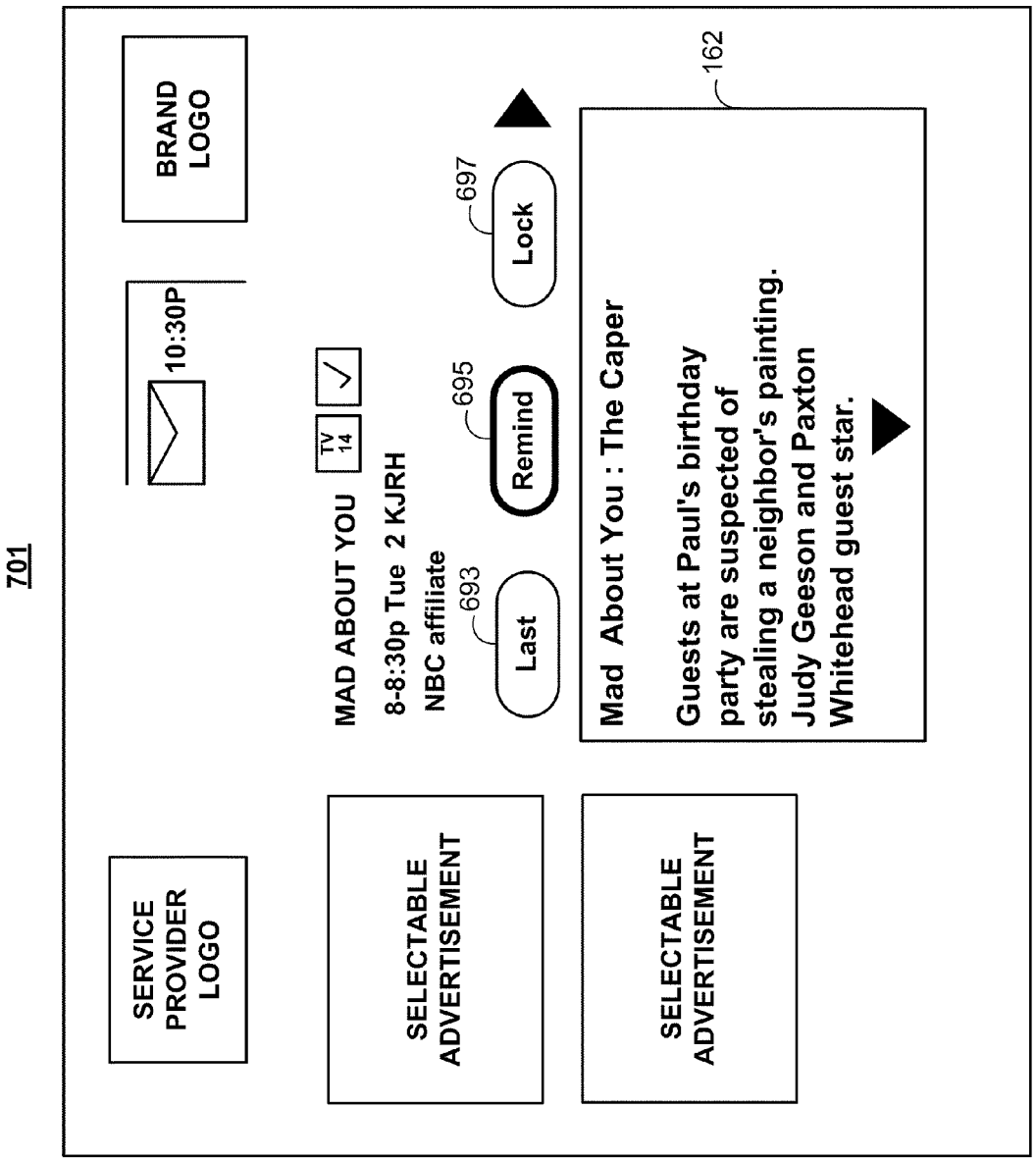

FIGS. 69 and 70a show illustrative program information screens 691 and 701. The program guide may display program information screen 691 when, for example, a user selects a selectable advertisement for a program from within any program guide display screen. An advertisement for the program that is displayed as part of program information screen 691 may not be selectable. Otherwise, selecting the advertisement would just bring a user back to the same screen. Program information screen 701 may be displayed when, for example, a user indicates a desire to view program information while watching a program or after selecting its listing.

Program information screens, such as program information screens 691 and 701, may also include features that a user may select for the subject program. A user may, for example, set a reminder for the subject program by selecting remind feature 695. A user may also, for example, lock the subject program by example by selecting lock feature 697. A user may return to the last screen by, for example, selecting last feature 693. A user may also select a watch feature (not shown), to watch the program.

Figure 70B:
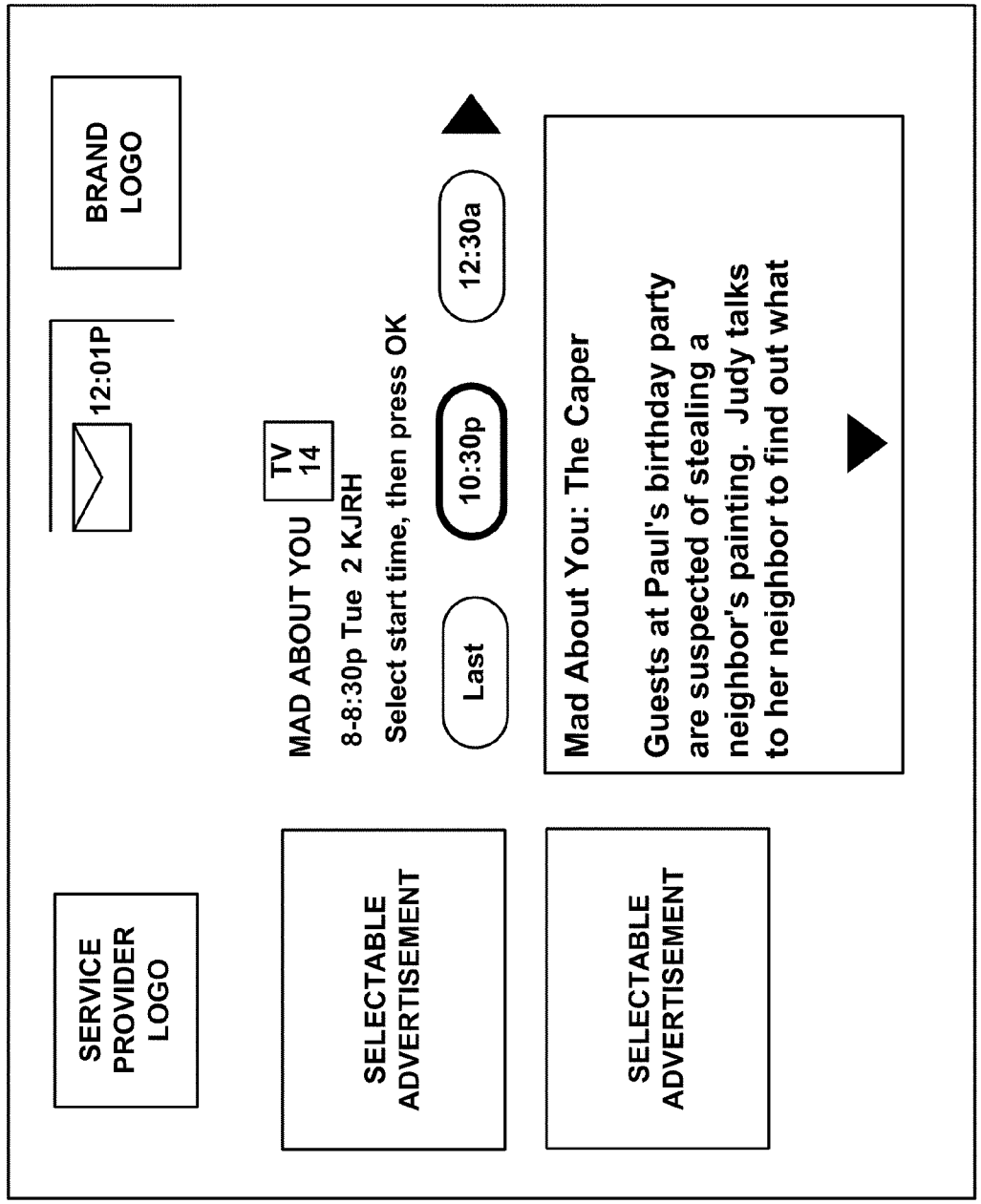

A user may view other air times for a program by, for example, selecting a times feature (as shown, for example, in FIGS. 73 and 74) and then pressing left and right arrow keys on remote control 40 to navigate through air times. FIG. 70b shows the air times, for example, for Mad About You. The program guide may display additional air times when, for example, a user arrows right or left. When a user selects an air time, the program guide may display a program information screen with the new air time and corresponding channel and program information.

Figure 71:
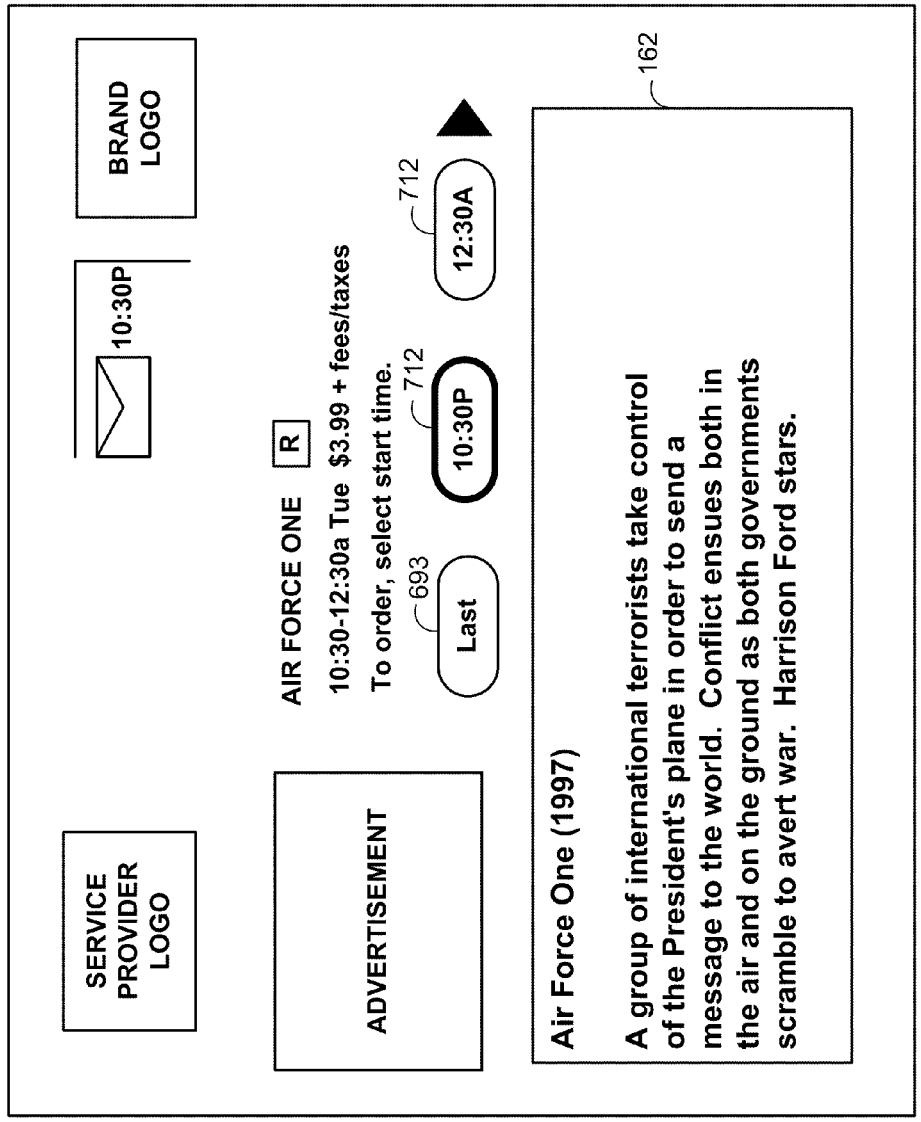

The program guide may provide users with an opportunity to view program information for other types of programs, such as movies, pay-per-view programs and programs which are part of orderable packages, or for channels such as premium and music channels. FIGS. 71 and 72 show illustrative program information screens 711 and 721 for pay-per-view programs. The program guide may display program information screen 711 when, for example, a user selects a selectable advertisement for a pay-per-view program. The program guide may display program information screen 721 when, for example, a user is watching a pay-per-view program, or highlights a pay-per-view program listing, and presses an "info" or "OK" key on remote control 40. As shown in FIGS. 71 and 72, the program guide may provide a user with an opportunity to view the times at which a pay-per-view program airs. When a user selects an air time, the program guide may allow the viewer to purchase that showing. If a program is not impulse purchasable, the guide may display a screen such as display 691 of FIG. 69 or 701 of FIG. 70a and include an order feature (not shown). When a user selects the order feature, the guide may instruct the user to purchase the selection by telephone as shown, for example, in FIG. 92.

Figure 74:
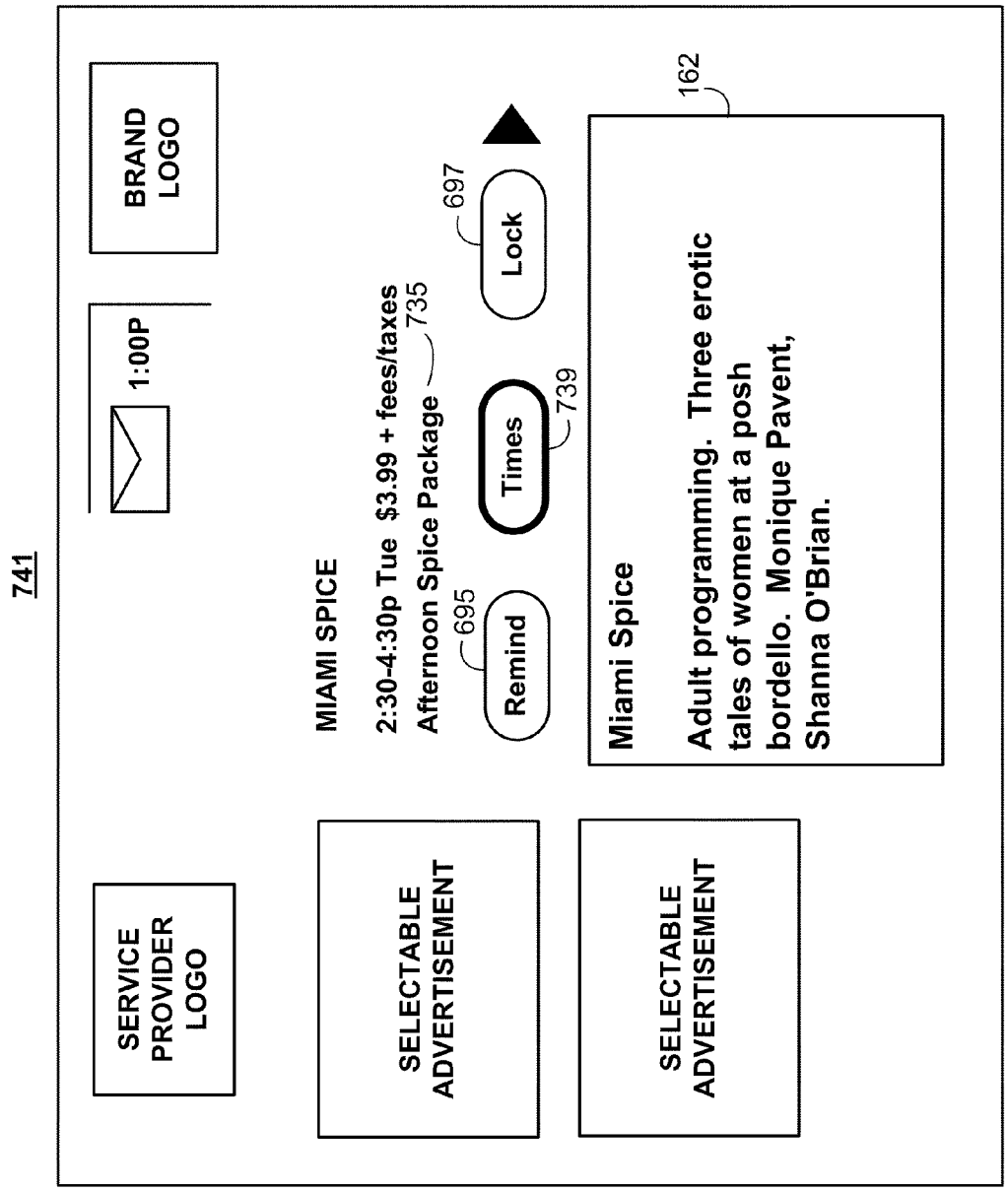

FIGS. 73 and 74 show illustrative program information screens 731 and 741 for a program which is part of an orderable package of pay-per-view programs. The program guide may display program information screen 731 when, for example, a user selects a selectable advertisement for a program which is part of a pay-per-view package. The program guide may display program information screen 741 when, for example, a user is watching a pay-per-view program that is within a package, or highlights its listing, and presses an "info" or "OK" key on remote control 40. As shown in FIGS. 73 and 74, the program guide may indicate to a user that the pay-per-view program is part of a package by displaying package name 735.

The program guide may provide a user with an opportunity to order pay-per-view programs and pay-per-view packages from within program information screens. A user may indicate a desire to order a pay-per-view package, for example, by selecting order feature 737 of program information screen 731. When a user selects order feature 737, the program guide may display an order confirmation screen, such as the order confirmation screens shown in FIGS. 80 and 81. A user may also see other air-times for a pay-per-view program within a package by, for example, selecting times option 739.

Figure 75A:
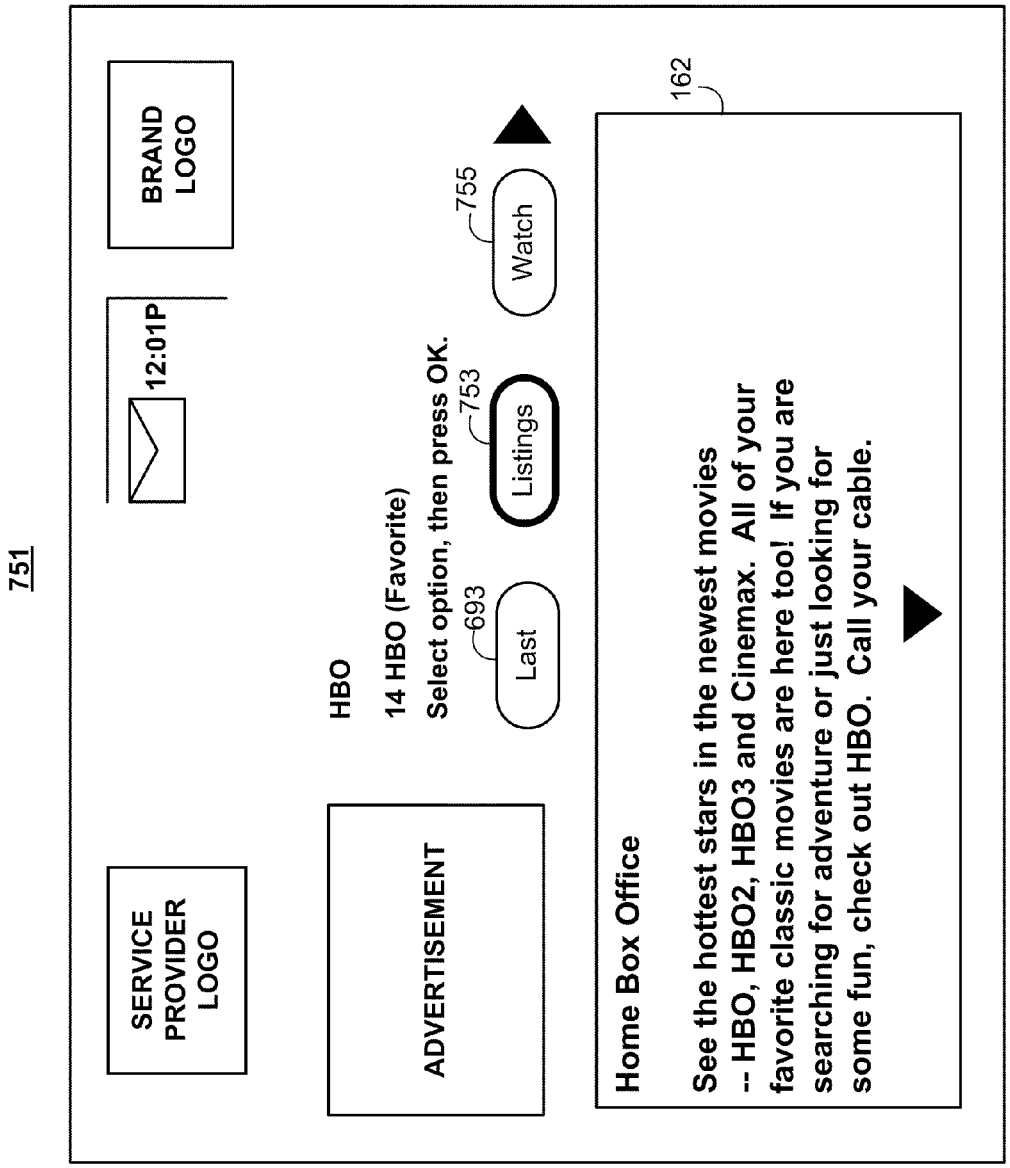
Figure 75B:
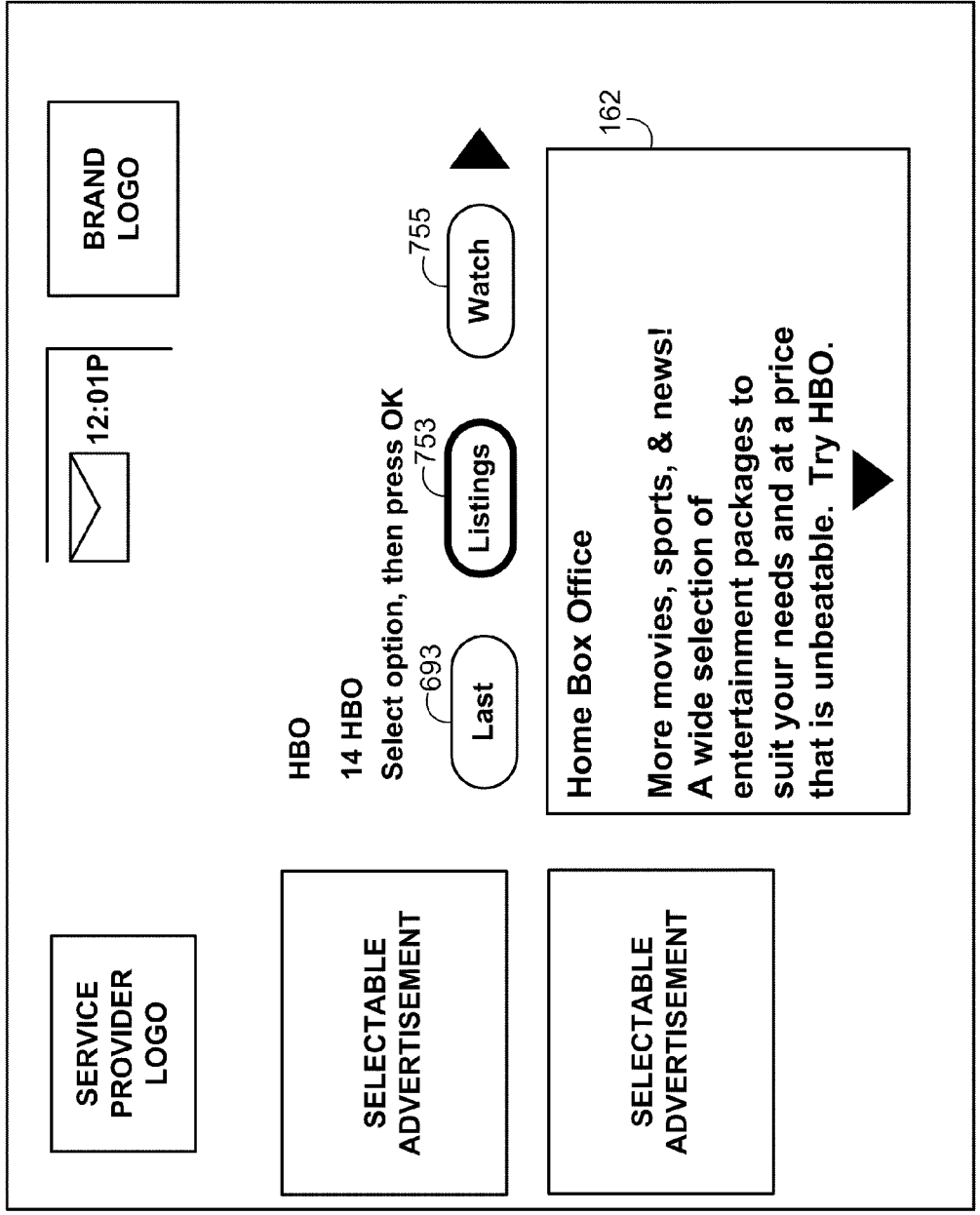

FIGS. 75a and 75b show illustrative channel information screens for a channel that the program guide may display when a user indicates a desire to view information for a channel. The program guide may display channel information screen 751 when, for example, a user selects a selectable advertisement for a channel. The program guide may display channel information screen 761 when, for example, a user highlights a listing for the channel (e.g., as in the display screen of FIG. 23 or FIG. 38), and presses an "info" key on remote control 40.

Channel information screens, such as channel information screen 751 or 761, may indicate that a channel has been designated as a favorite by, for example, displaying "Favorite" in the second text line of the screen. Channel information screens may also include listings option 753. When a user selects listings option 753, the program guide may display a program listings screen for the channel (e.g., listings by channel screen 140 of FIG. 11a). The program guide may also tune to the channel when, for example, a user selects watch feature 755. The guide may also allow users to perform other functions from the information screens of FIGS. 75a and 75b. The program guide may, for example, designate a channel as a favorite channel when the user selects an on-screen favorite feature (now shown). The guide may, also, for example, allow the user to parentally control the channel when the user selects an on-screen lock feature (not shown). The guide may display ordering information when the user selects an on-screen order feature (not shown).

Figure 76A:
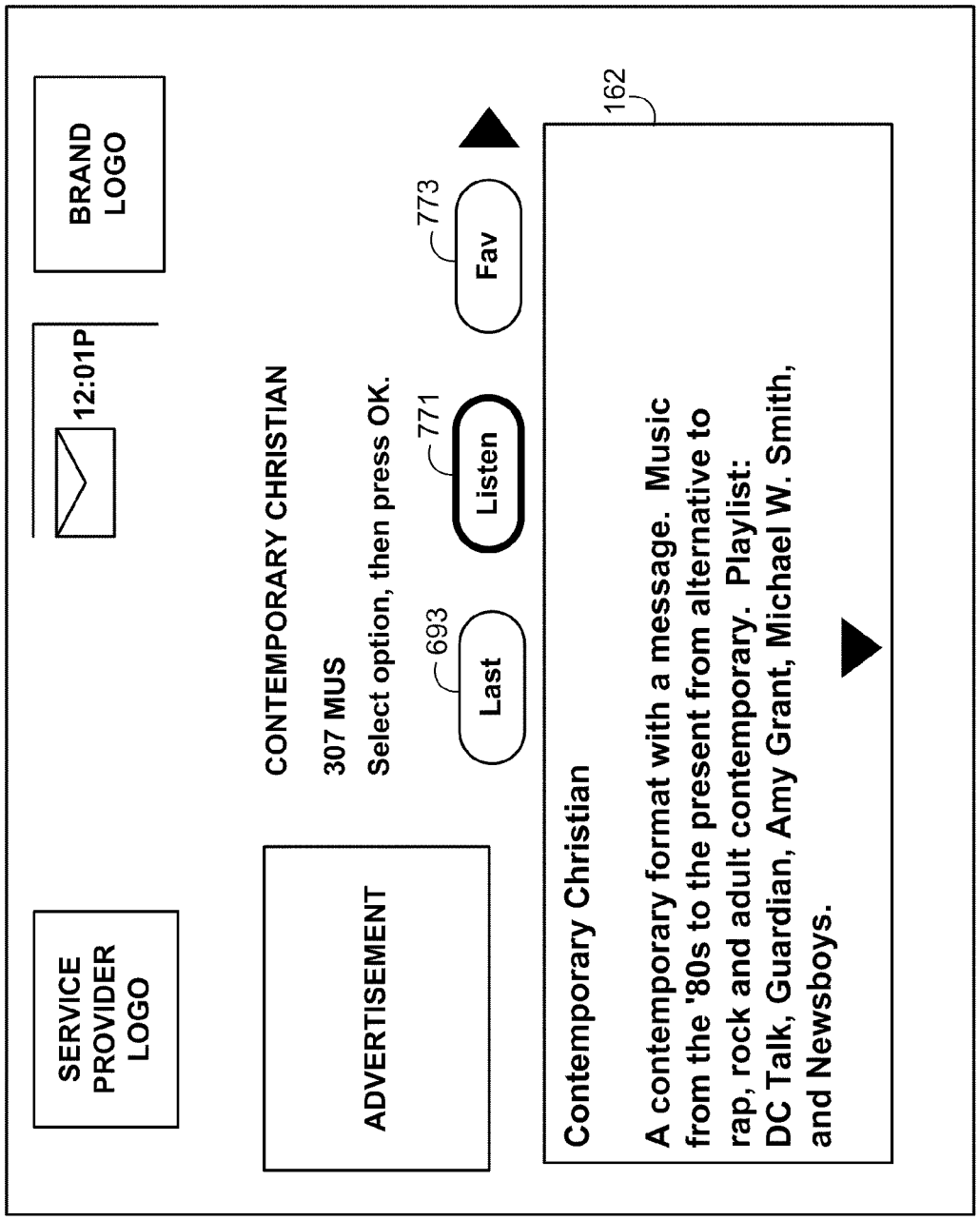
Figure 76B:
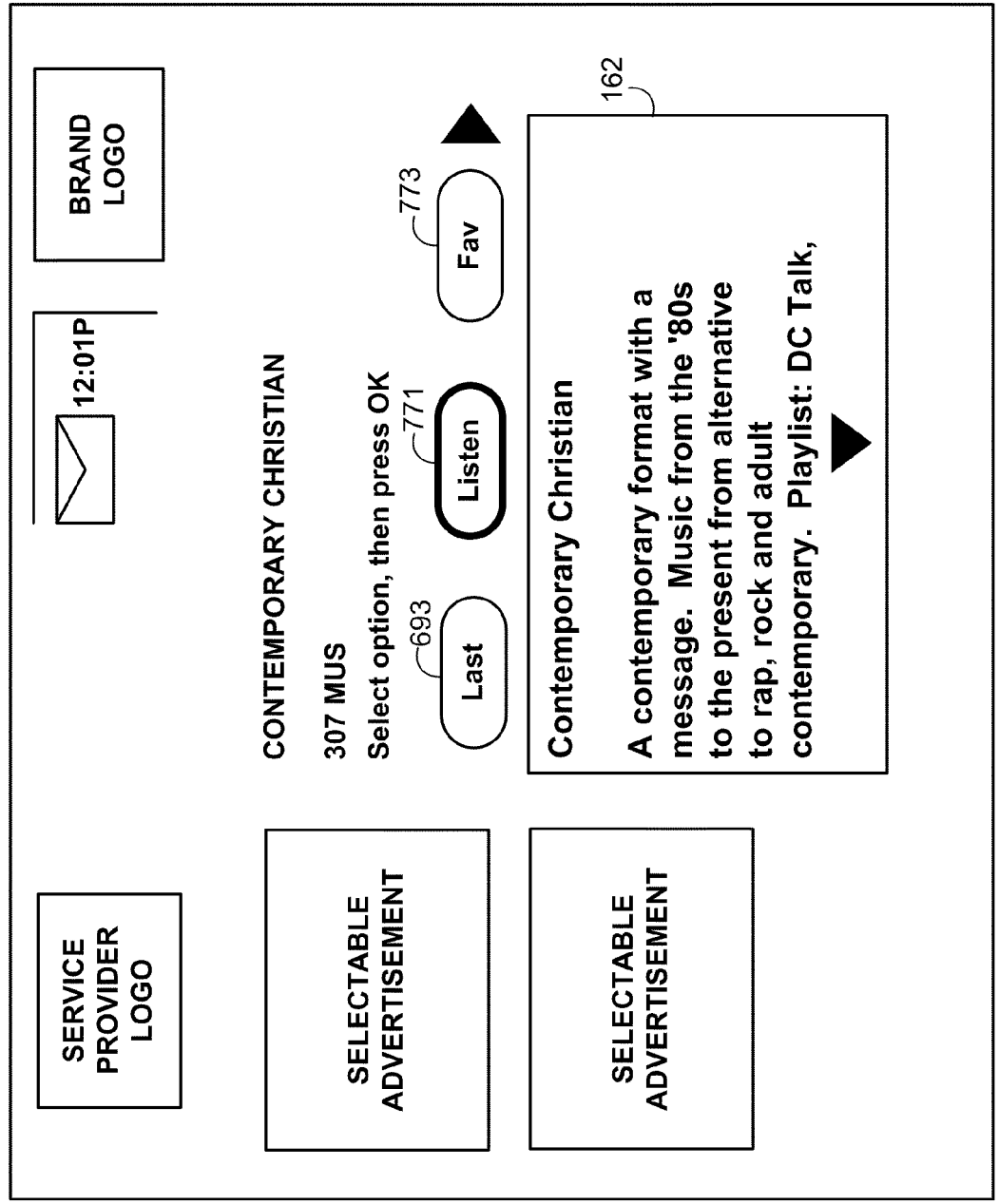

FIGS. 76a and 76b show illustrative channel information screens 771 and 781 for music channels that the program guide may display when a user indicates a desire to view information for a music channel. The program guide may display music channel information screen 771 when, for example, a user selects a selectable advertisement for a music channel. The program guide may display music channel information screen 781 when, for example, a user highlights its listing (e.g., as in the display screen of FIG. 23), and presses an "info" key on remote control 40.

Music channel information screens, such as music channel information screens 771 and 781, may include selectable features, such as favorite feature 773. Music channel information screens may also include a listen feature, such as listen feature 771. The program guide may tune to a music channel when, for example, a user selects listen feature 771. The guide may also allow users to perform other functions from the information screens of FIGS. 76a and 76b. The program guide may, for example, allow the user to parentally control the channel when the user selects an on-screen lock feature (not shown). The guide may also display ordering information when the user selects an on-screen order feature (not shown).

Figure 77A:
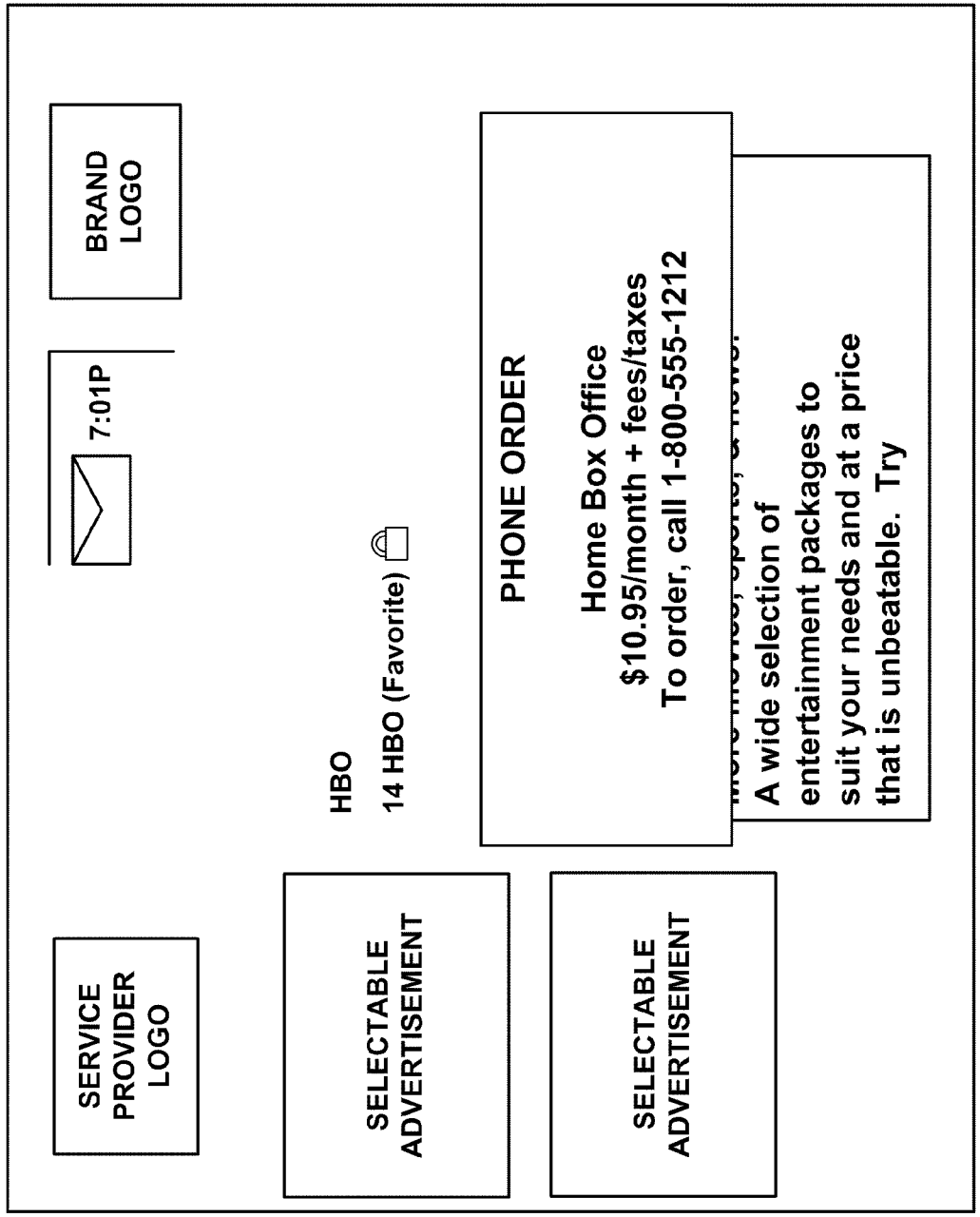
FIGS. 77a and 77b show illustrative phone ordering information overlays.
Figure 77B:
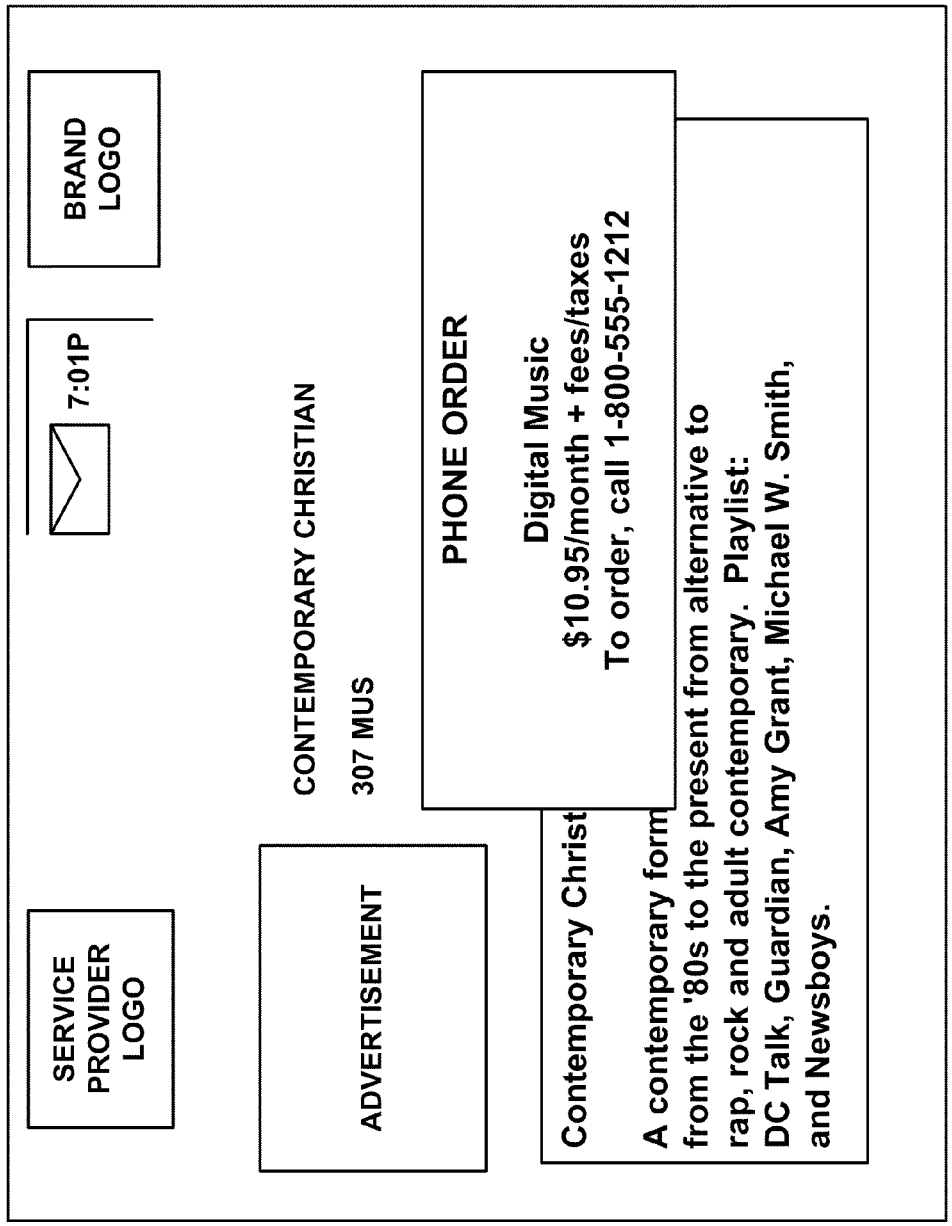
Figure 78:
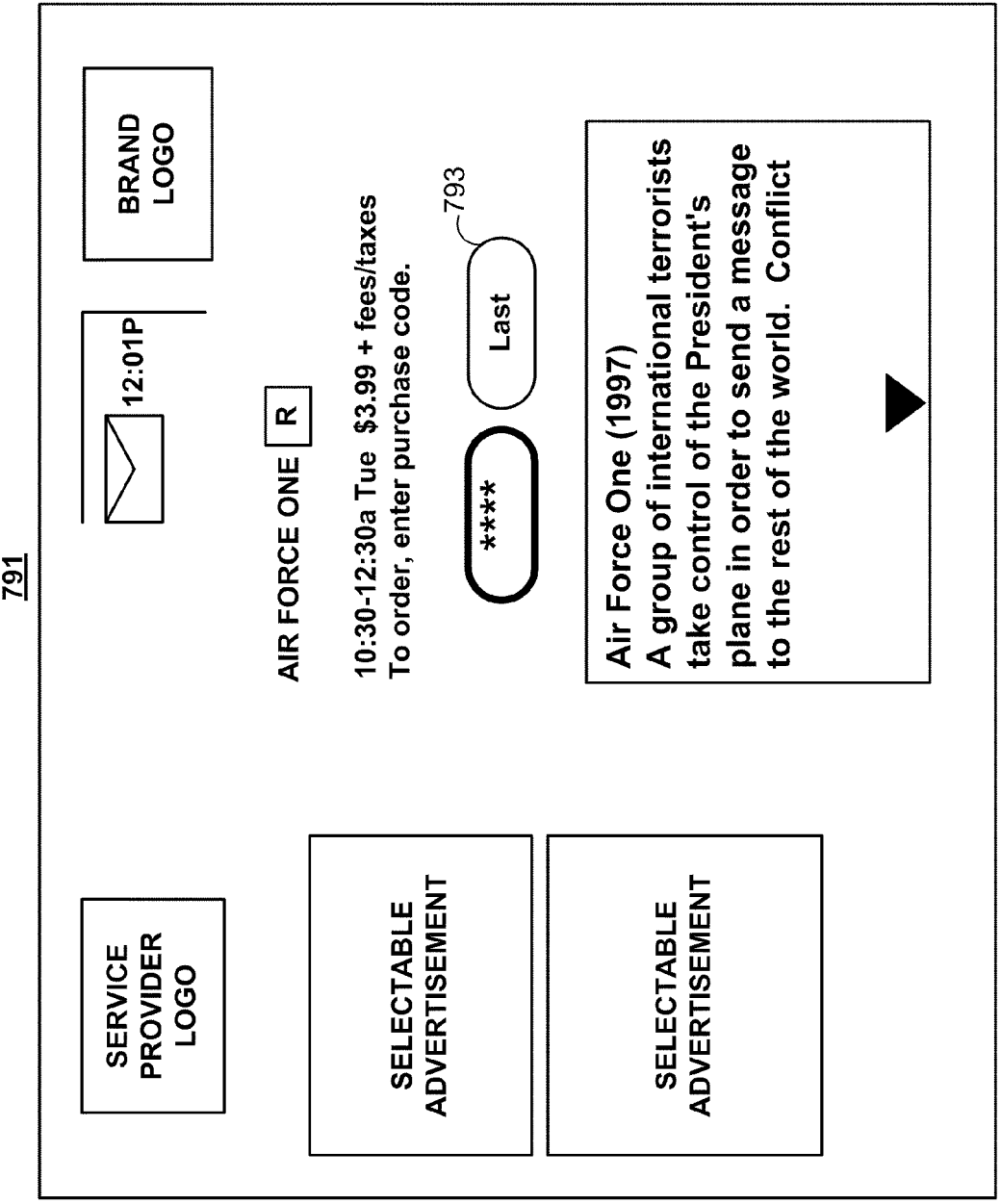
FIGS. 78-93 show illustrative program guide display screens for providing a user with access to program guide pay-per-view program and package ordering functionality.

Situations may arise where the user has not ordered a channel to which the user has tuned (as shown in FIGS. 27 and 28) or for which a user has displayed channel information (shown, for example, in FIGS. 75a, 75b, 76a, and 76b). The guide may instruct a user how to order a channel as shown in FIGS. 77 and 78 when, for example, a user selects an order feature (not shown) from the screens shown in FIGS. 75a, 75b, 76a, and 76b. As mentioned, users may access the information screens of FIGS. 75b and 76b after tuning to a channel to which the user has not subscribed and indicating a desire to view information, such as in response to the overlay of FIGS. 27 and 28.

Figure 79:
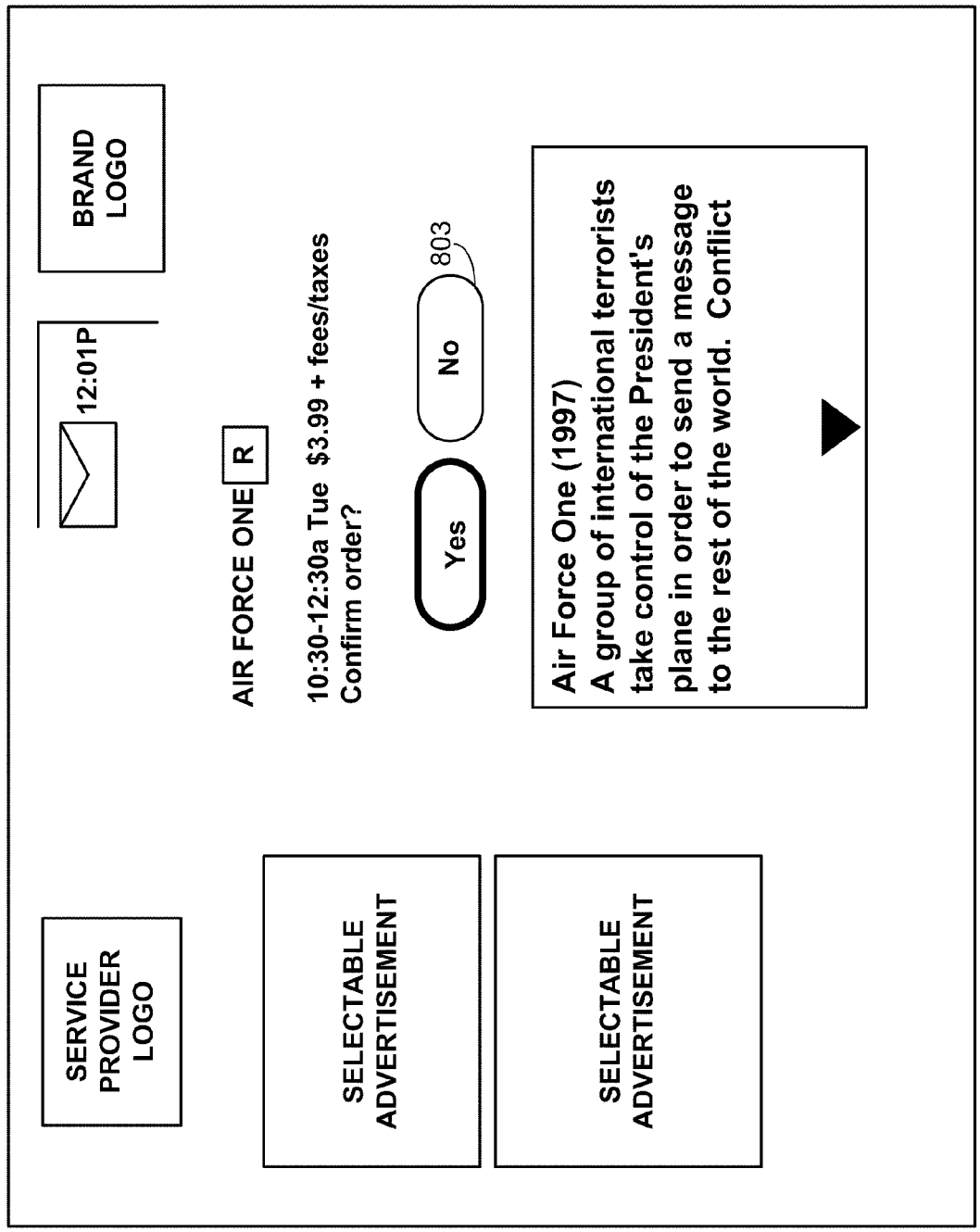

The program guide may provide users with the opportunity to order pay-per-view programs and pay-per-view program packages. A user may indicate a desire to order a pay-per-view program by, for example, selecting a start time within a pay-per-view program information screen for the pay-per-view program (e.g., FIGS. 71 and 72). The program guide may respond by displaying an order confirmation screen, such as order confirmation screen 791 of FIG. 78. Order confirmation screen 791 may prompt a user for a purchase code, such as the purchase code set up in parental control setup screen 501 of FIG. 50. After a user enters a correct purchase code, the program guide may allow the user to watch the program and register the purchase with television distribution facility 16. If no purchase code has been set, the program guide may instead prompt a user to confirm the purchase, as shown in FIG. 79.

Figure 80:
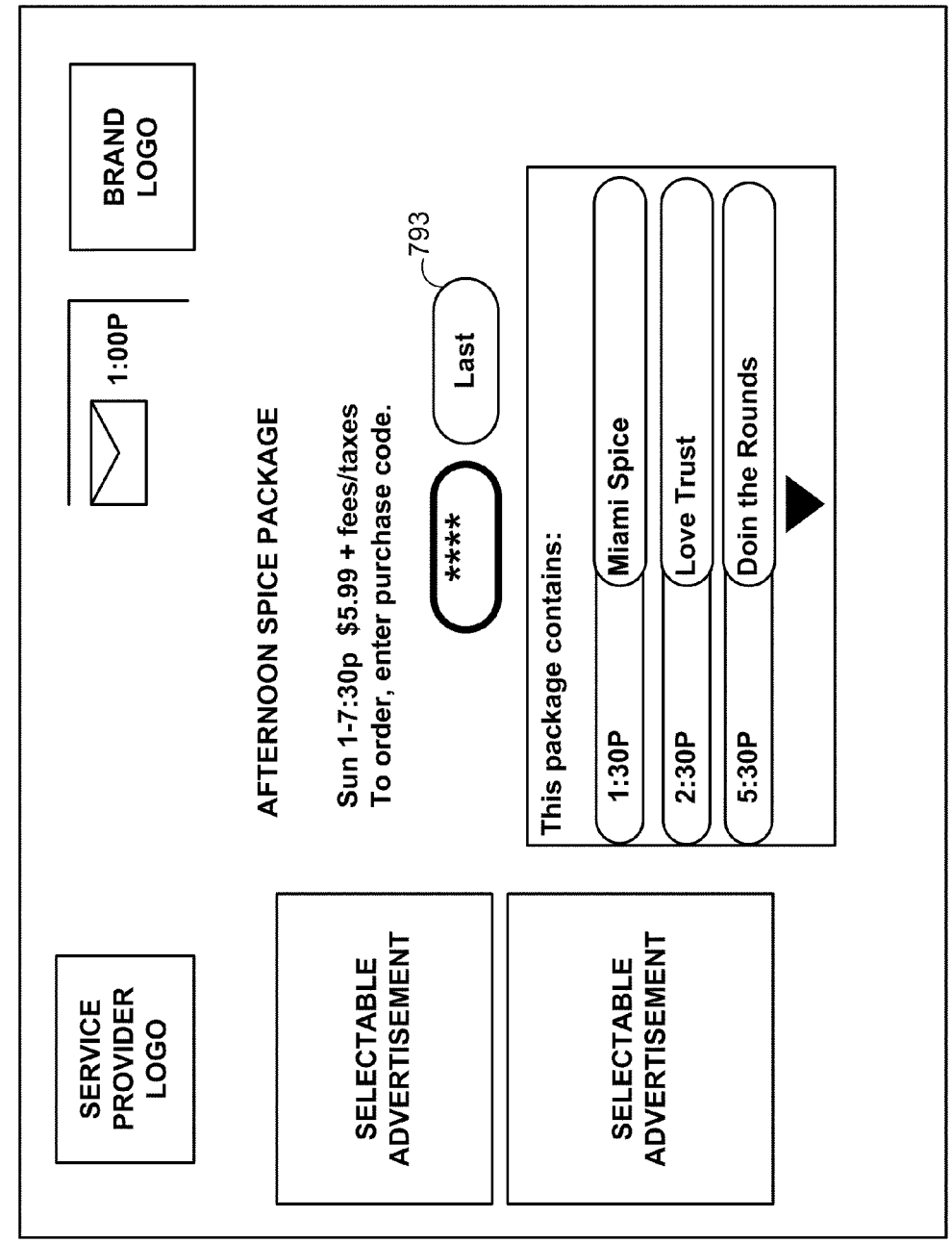
Figure 81:
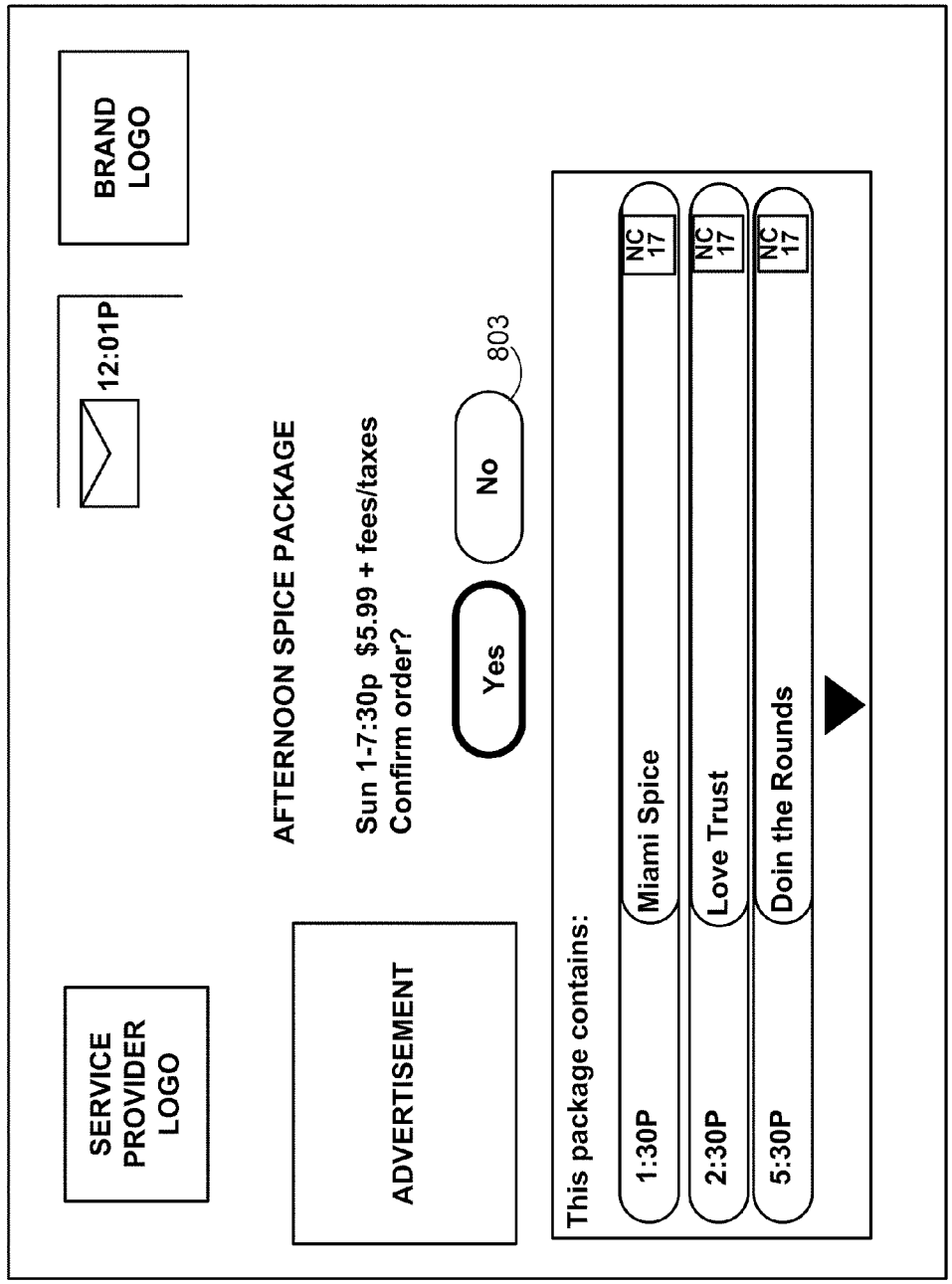

When a user indicates a desire to order a pay-per-view package by, for example, selecting order feature 737 of FIG. 73, the program guide may display a package order confirmation screen, such as package order confirmation screen 811 of FIG. 80. Package order confirmation screen 811 may prompt a user for a purchase code, such as the purchase code set up in parental control setup screen 501 of FIG. 50. After a user enters a correct purchase code, the program guide may register the purchase with television distribution facility 16. If no purchase code has been set, the program guide may instead prompt a user to confirm the purchase, as shown in FIG. 81. The user may also select an individual listing from the screens shown in FIGS. 80 and 81 to get information on the individual pay-per-view program within the package.

Figure 82:
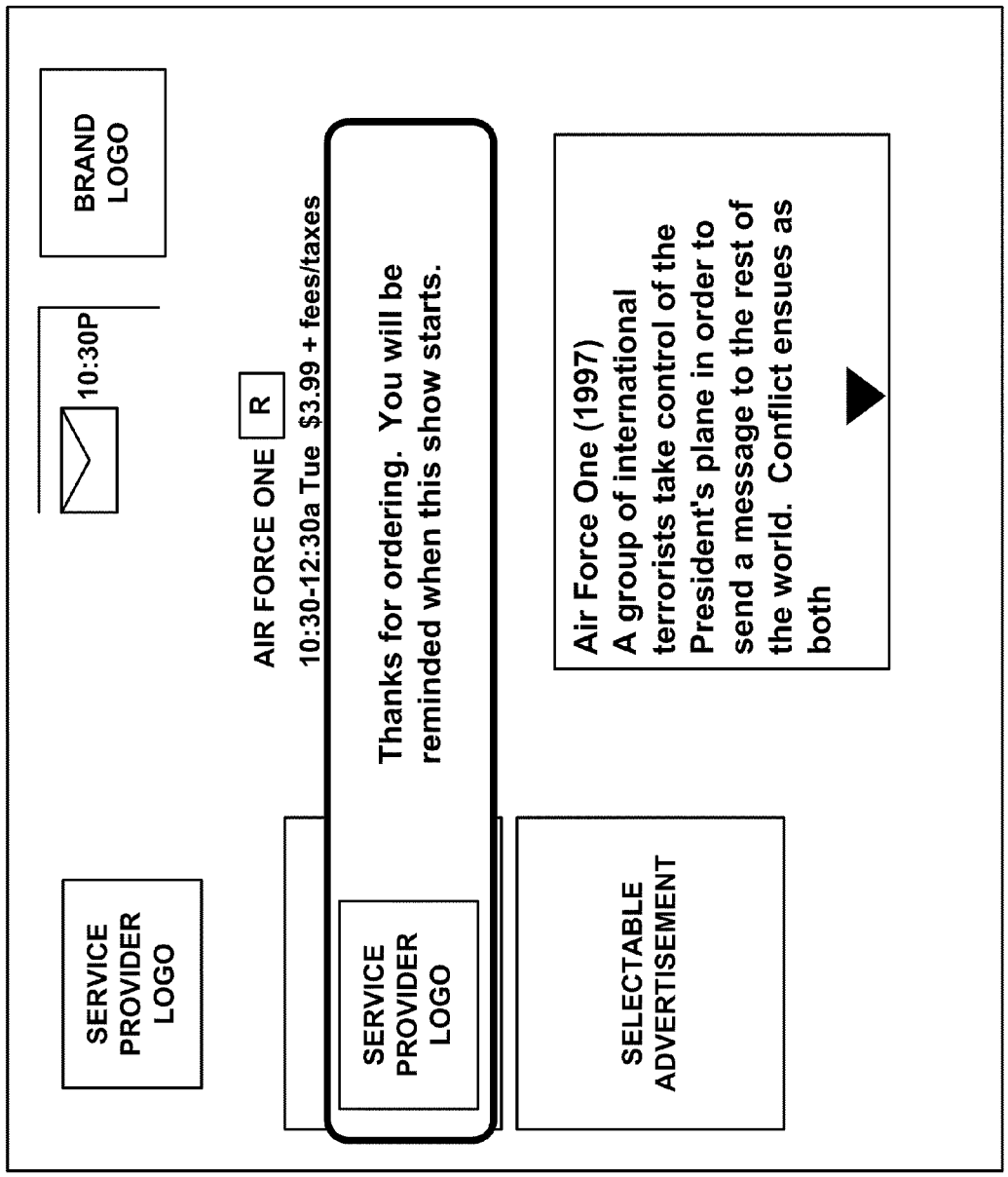
Figure 83:
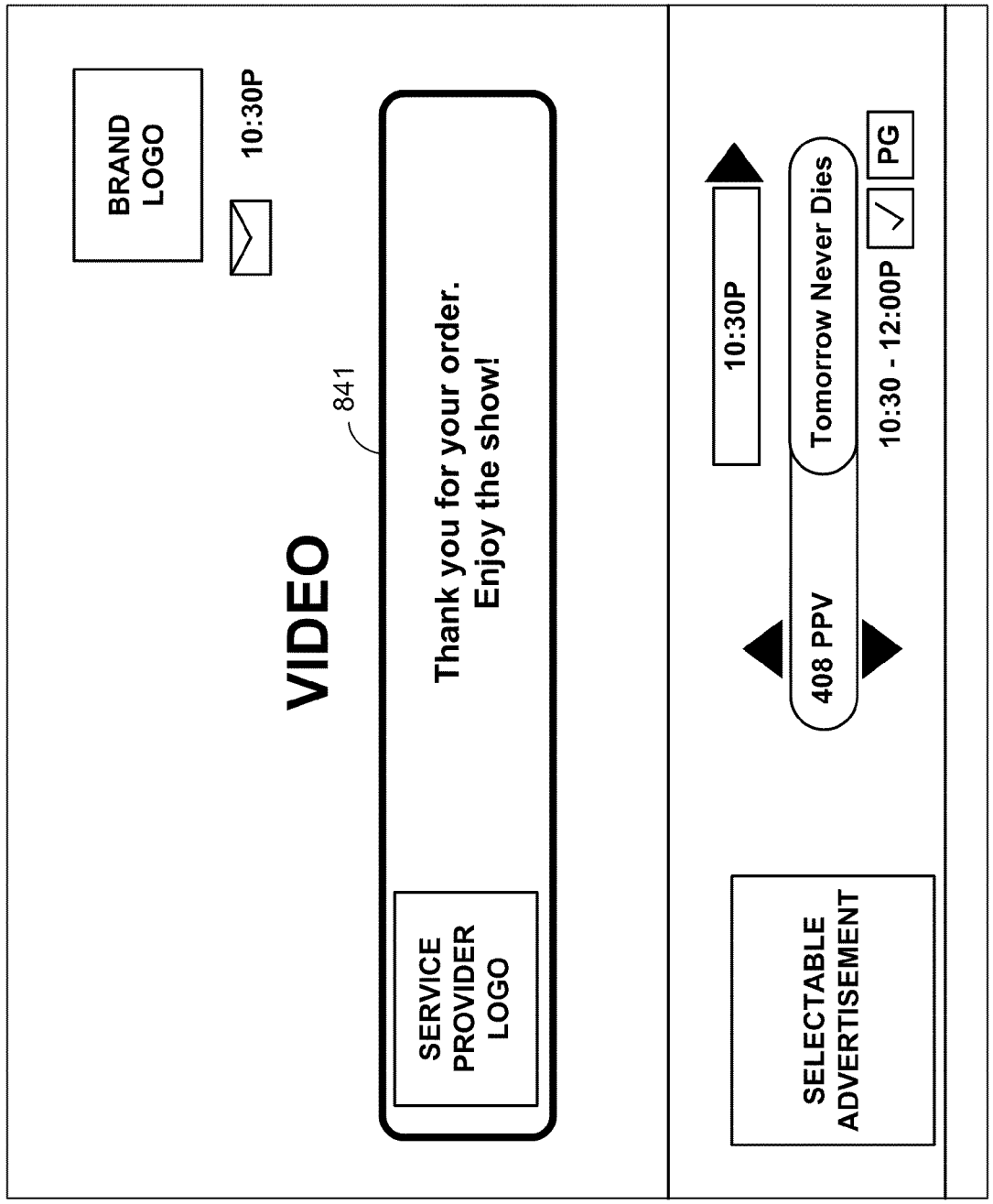

Once a user has entered a purchase code or confirmed an order, the program guide may display an overlay indicating that the program has been ordered, as shown in FIG. 82. If desired, the program guide may also set a reminder for the pay-per-view program or for the programs in a package. If the program is about to start or has already started, the program guide may tune to the channel on which the program, or a program in an ordered package, is carried. FIG. 83 shows illustrative overlay 841 that the program guide may display after tuning to the channel. If desired, a FLIP overlay also may be displayed as shown.

Figure 84:
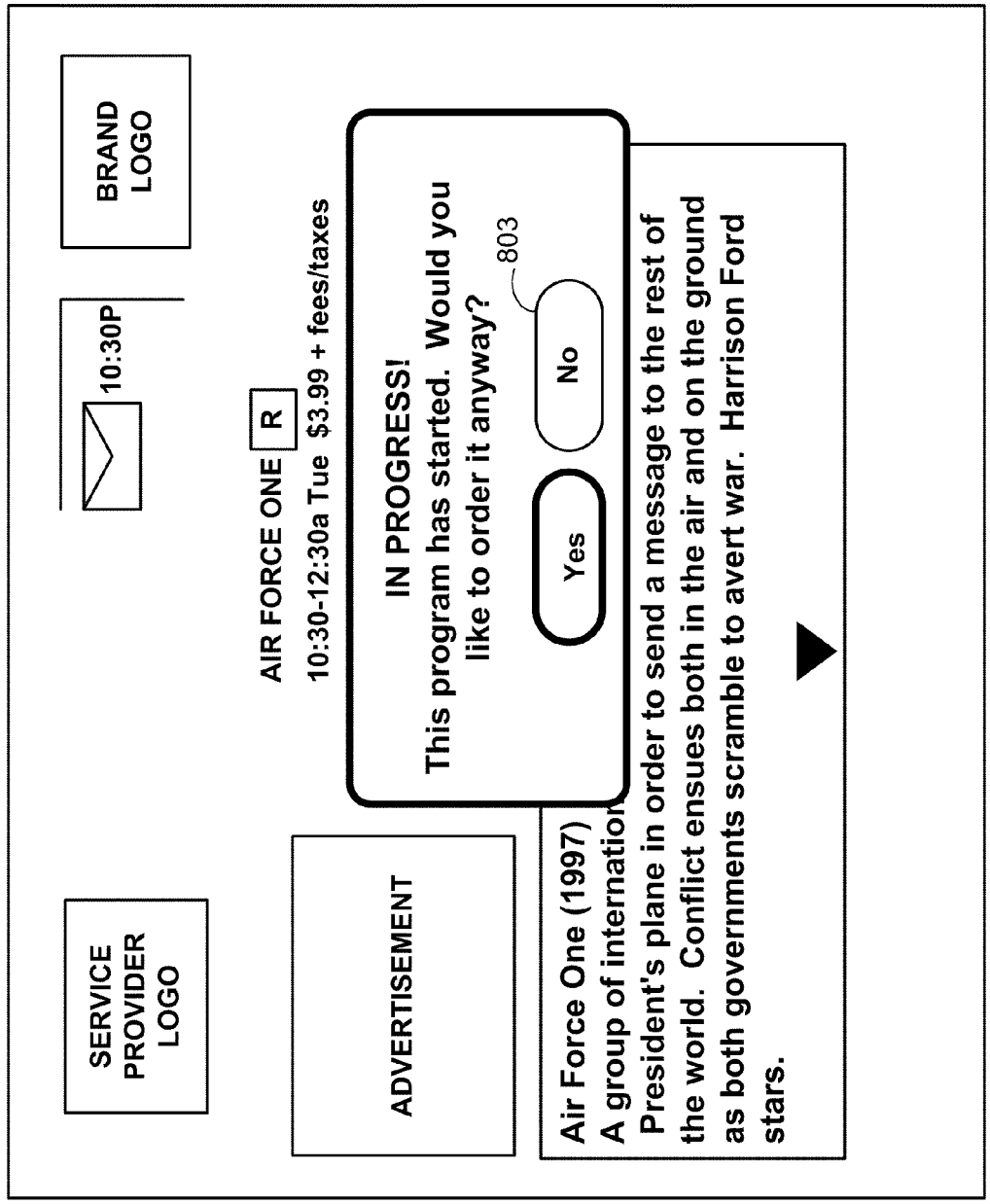
Figure 85:
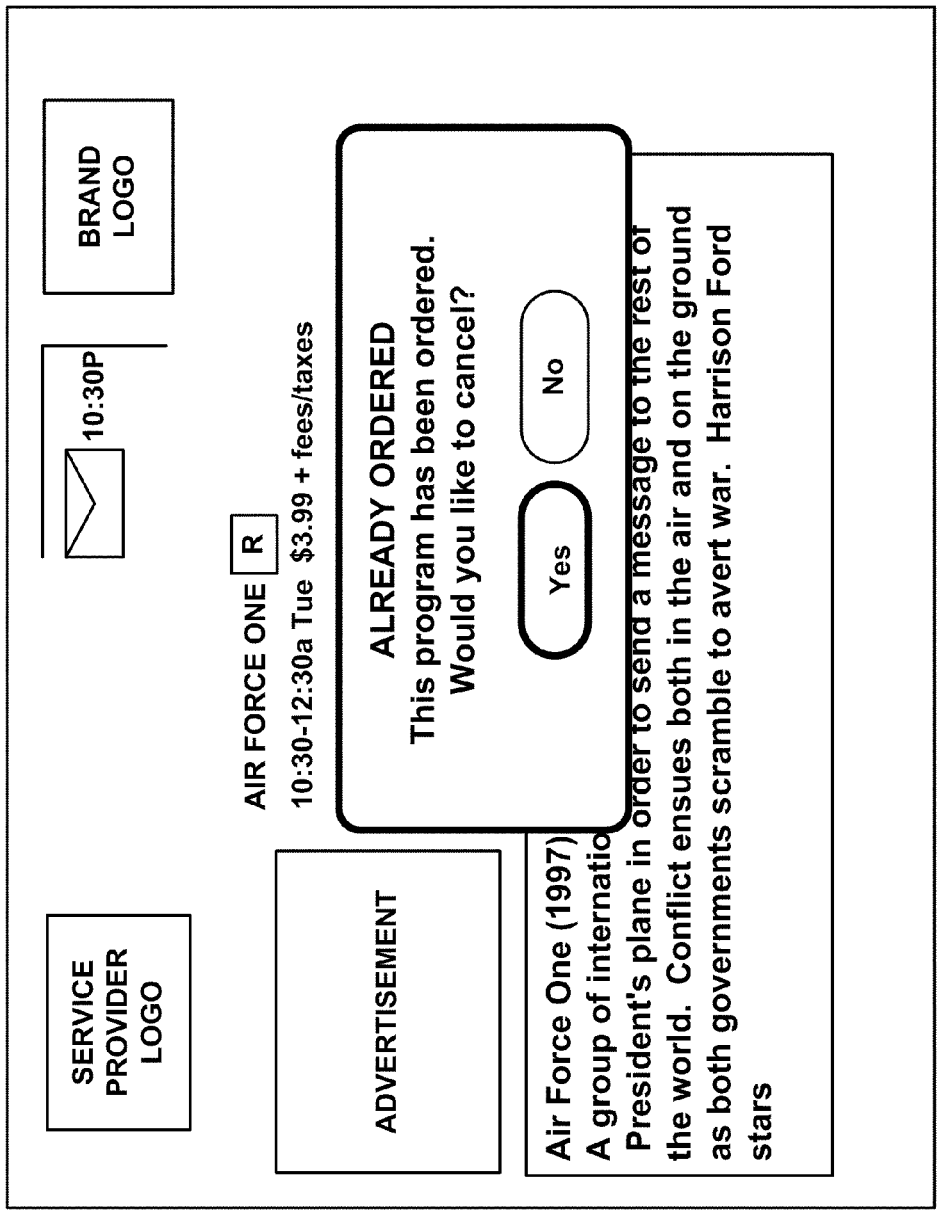
Figure 86:
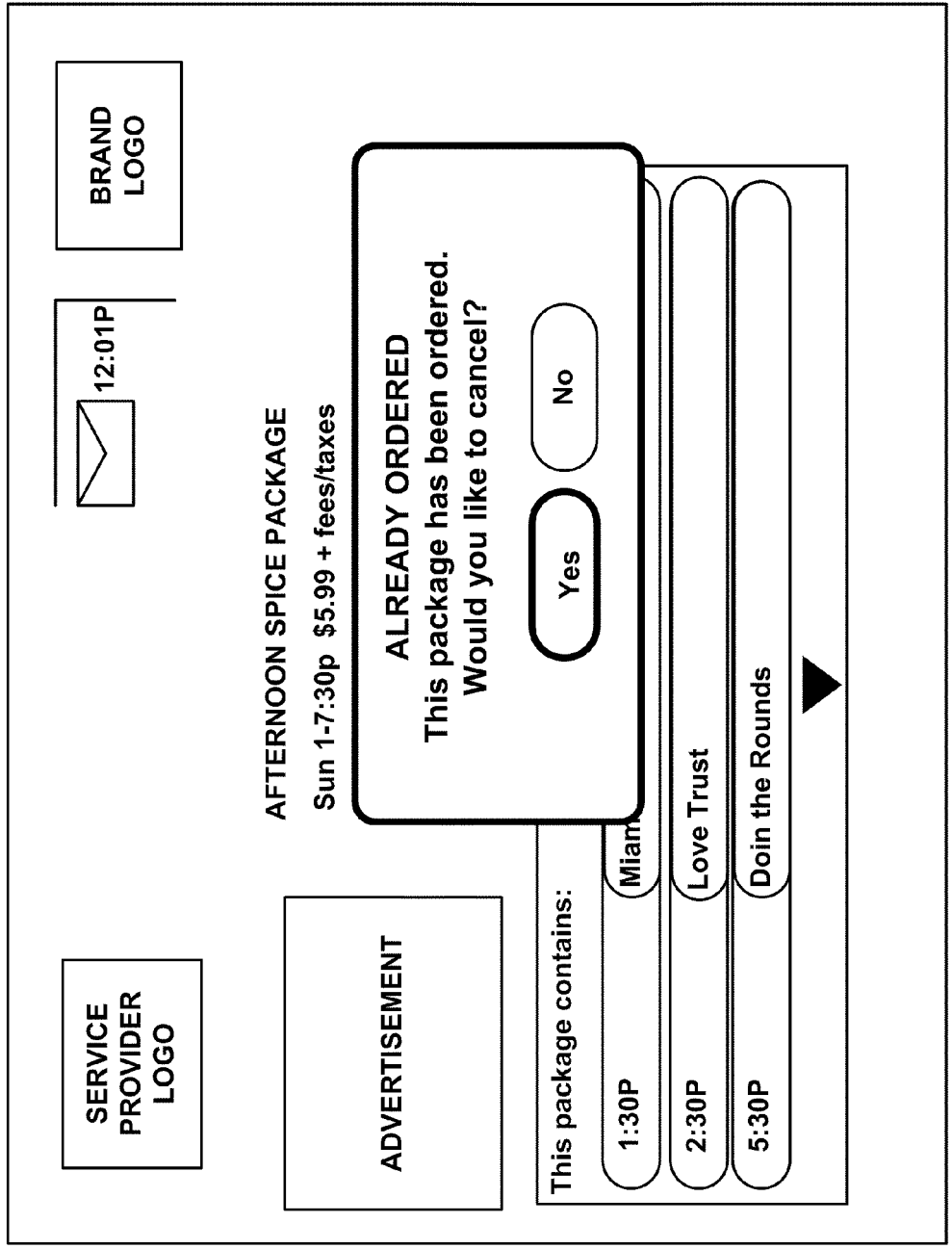
Figure 87:
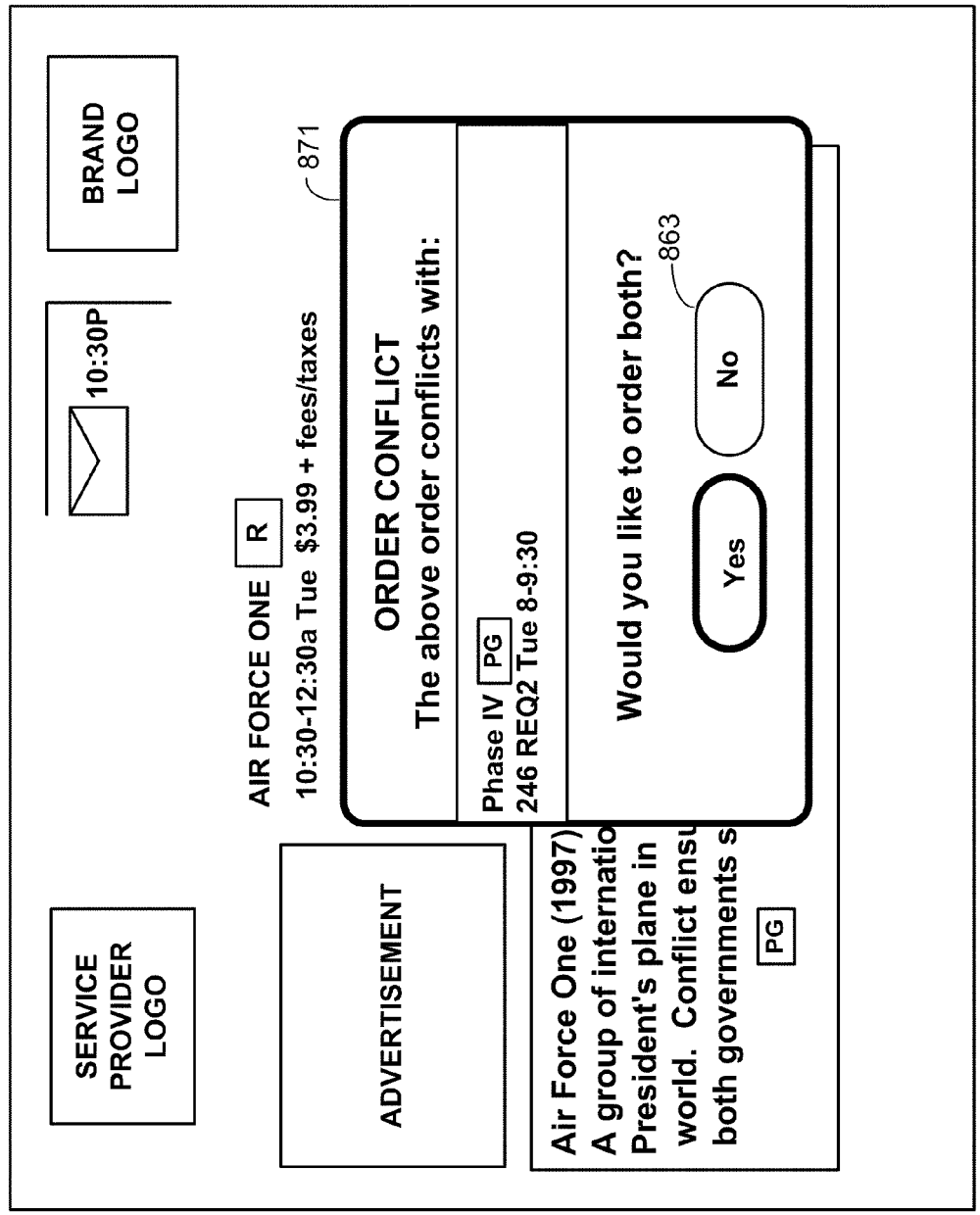

The program guide may indicate to a user that an ordered program, or program in a package, has already started or has already been ordered, and may prompt a user to confirm the current order, as shown in FIGS. 84, 85, and 86. The program guide may also indicate to a user that an ordered pay-per-view program or package conflicts with a pay-per-view program or with programs in a package that a user has already ordered. FIG. 87 shows an illustrative overlay 871 that the program guide may display when a user has an order conflict. Overlay 871 provides a user with an opportunity to cancel the order or to order both programs.

Figure 88:
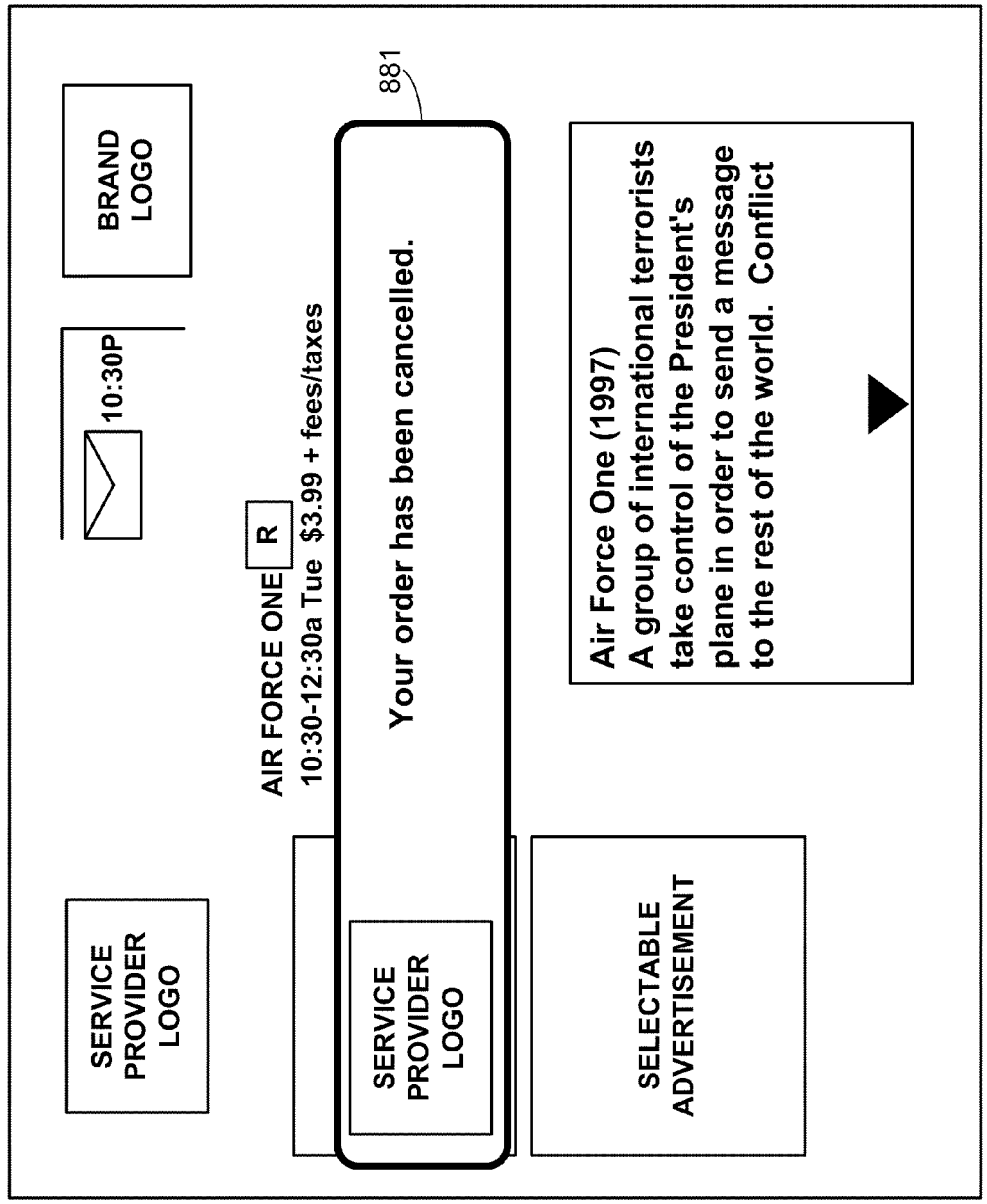

The program guide may also provide a user with an opportunity to cancel an order of a pay-per-view program or package. A user may indicate a desire to cancel an order by, for example, selecting last features 793 of FIGS. 78 and 80, or no features 803 of the screens shown in FIGS. 79, 81, 84, and 87. The user may also indicate a desire to cancel an order by selecting the "Yes" features of FIGS. 85 and 86. The program guide may respond by displaying an overlay indicating to a user that the order has been canceled. An illustrative overlay 881 is shown in FIG. 88.

Figure 89:
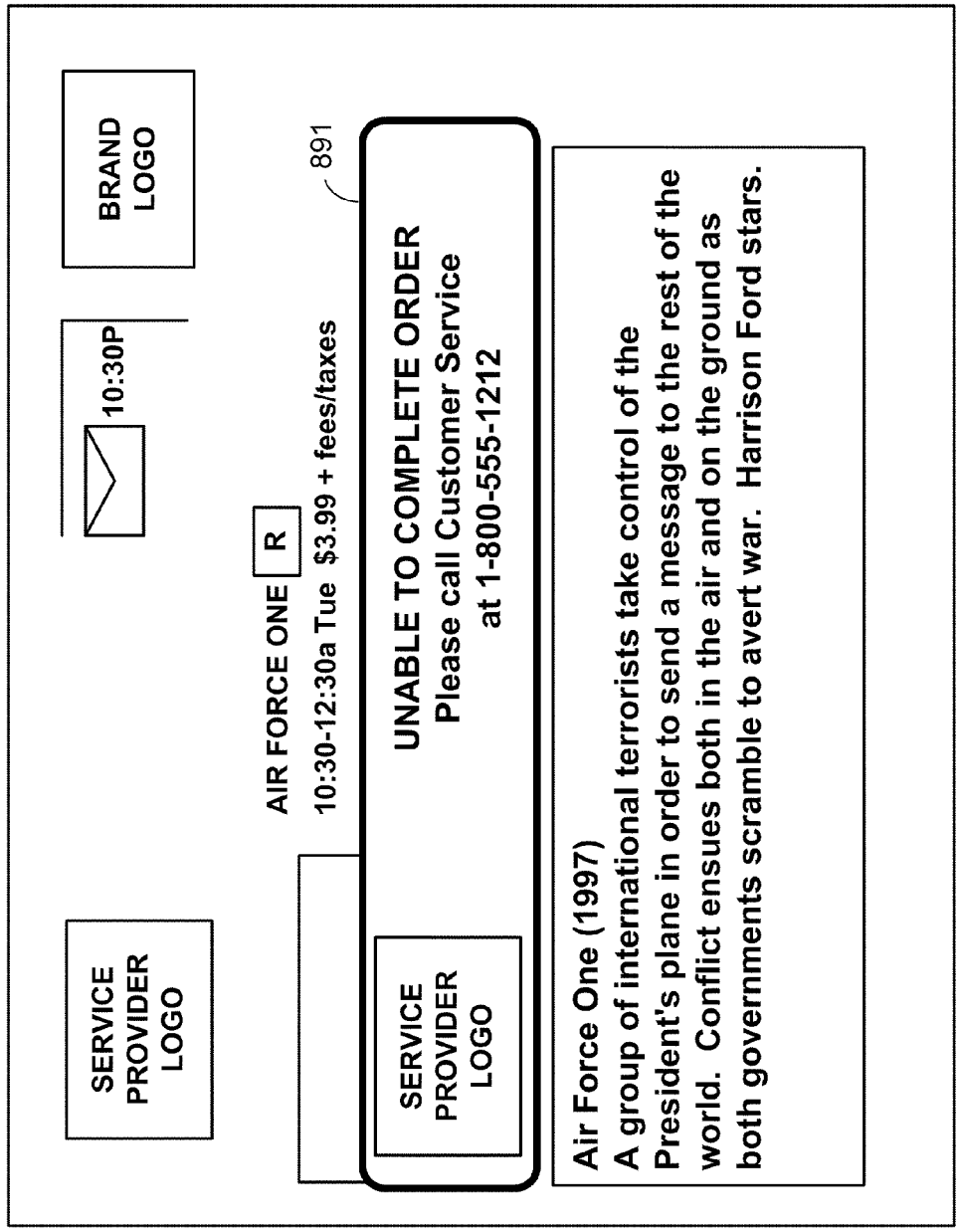
Figure 90:
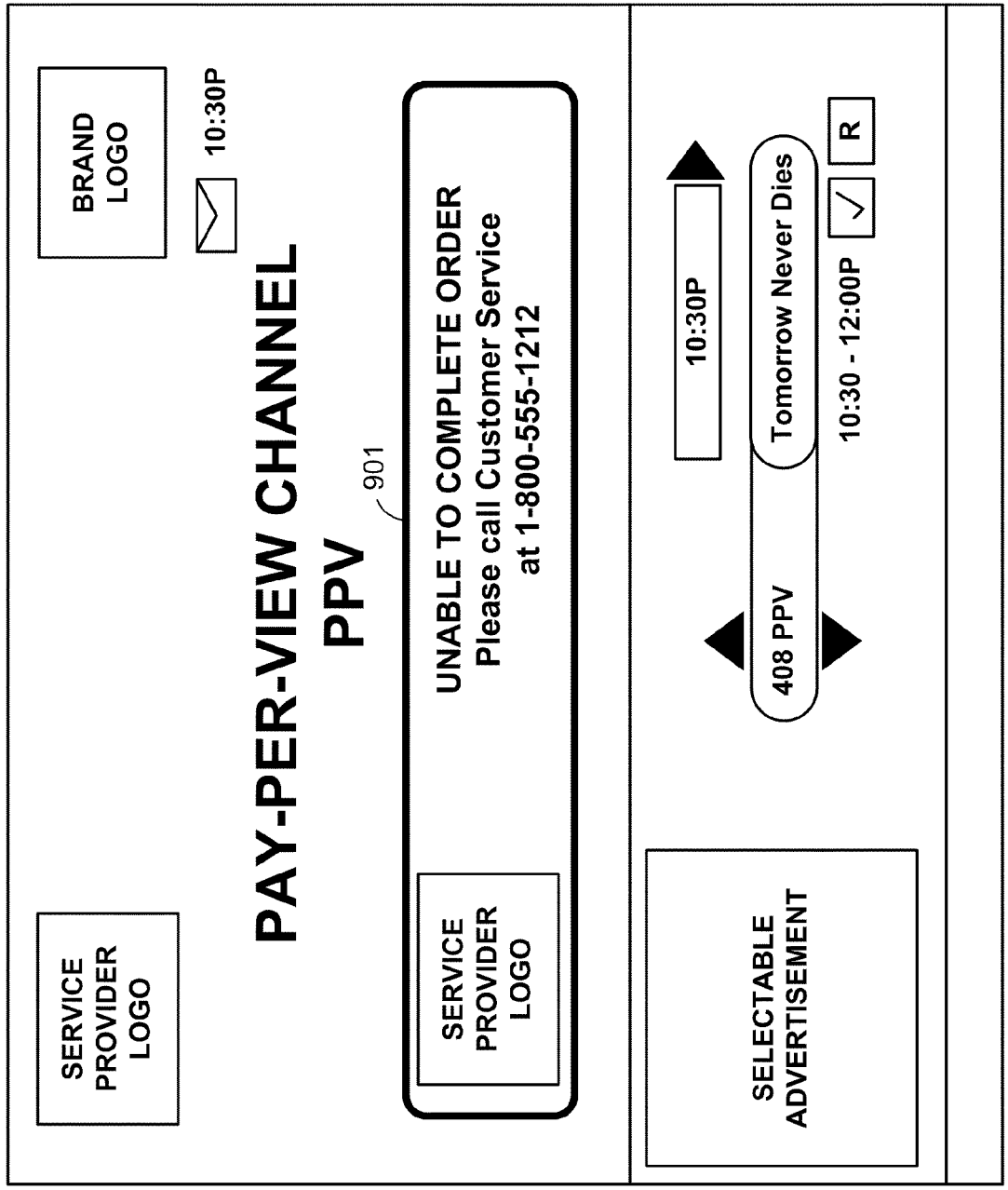
Figure 91:
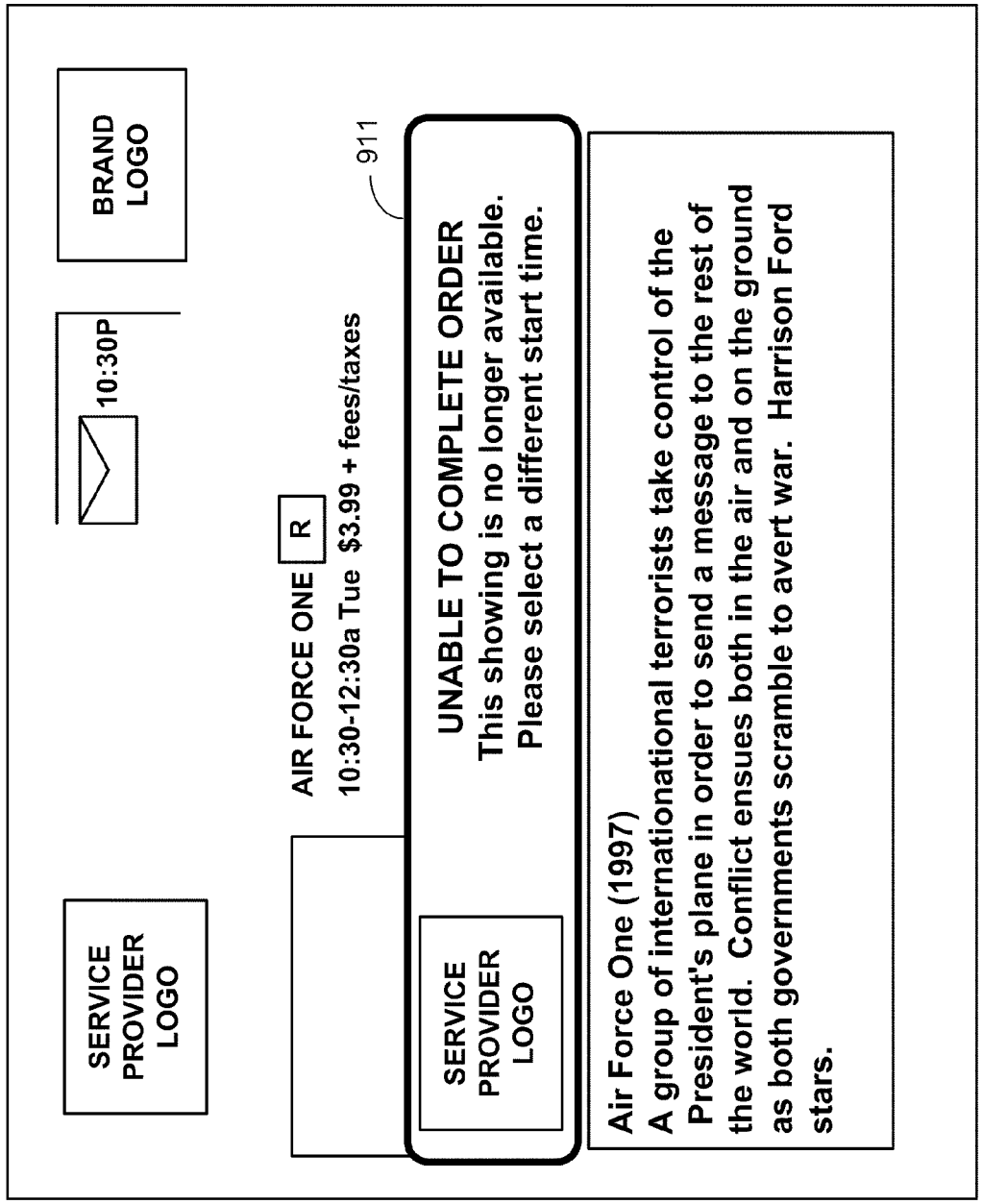

The program guide may be unable to order a pay-per-view program or package of programs because, for example, a user has ordered too many pay-per-view programs or packages, because a user has an insufficient amount of credit with an operator of television distribution facility 16, or because the program or package is no longer available. FIG. 89 shows an illustrative overlay 891 that the program guide may display when, for example, a user has ordered too many pay-per-view programs or packages. FIG. 90 shows an illustrative overlay 901 that the program guide may display when, for example, a user orders a pay-per-view program or package and has insufficient credit with an operator of television distribution facility 16. FIG. 91 shows an illustrative overlay 911 that the program guide may display when, for example, a user orders a pay-per-view program or package and the program or programs in the package are no longer available.

Figure 92:
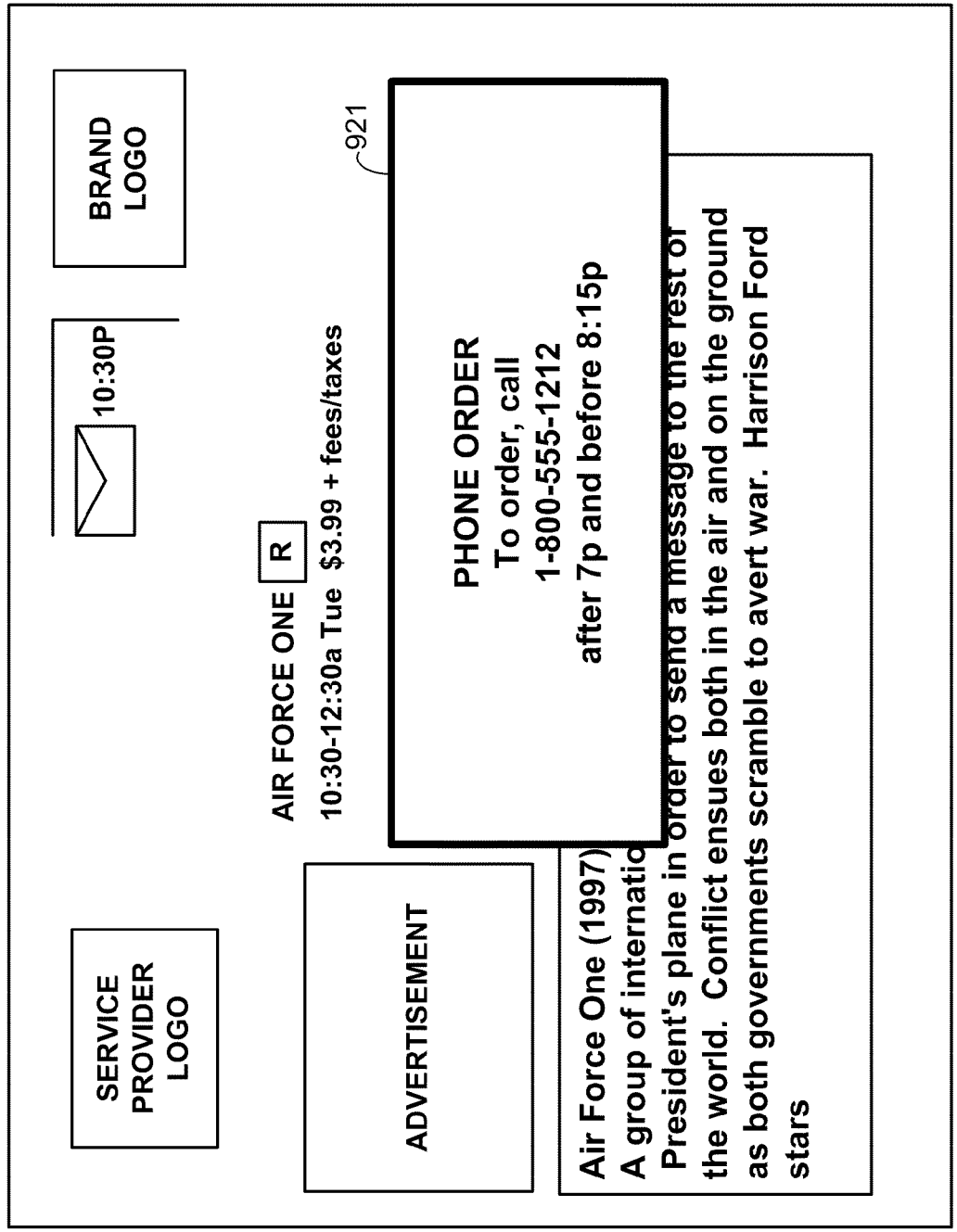
Figure 93:
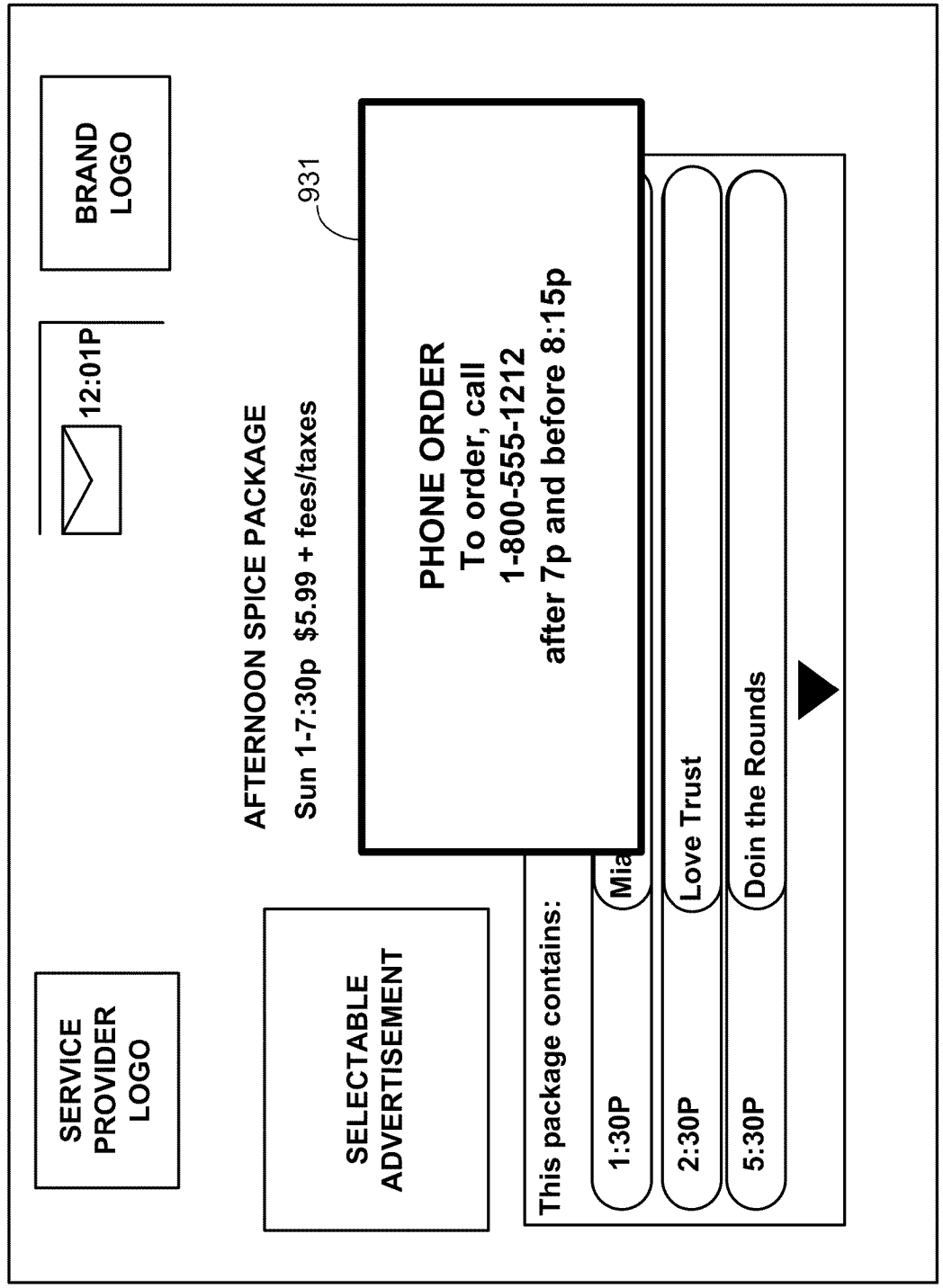

Set-top box 28 of FIG. 3 may not be configured so that the program guide can order pay-per-view programs or packages directly from television distribution facility 16. Also, a particular program may not be available for impulse purchase. When a user indicates a desire to order a pay-per-view program, the program guide may indicate to a user that a user must order the pay-per-view program or package by phone. FIGS. 92 and 93 show illustrative overlays 921 and 931 that the program guide may display when a user must order a program or package by phone, respectively.

Figure 94:
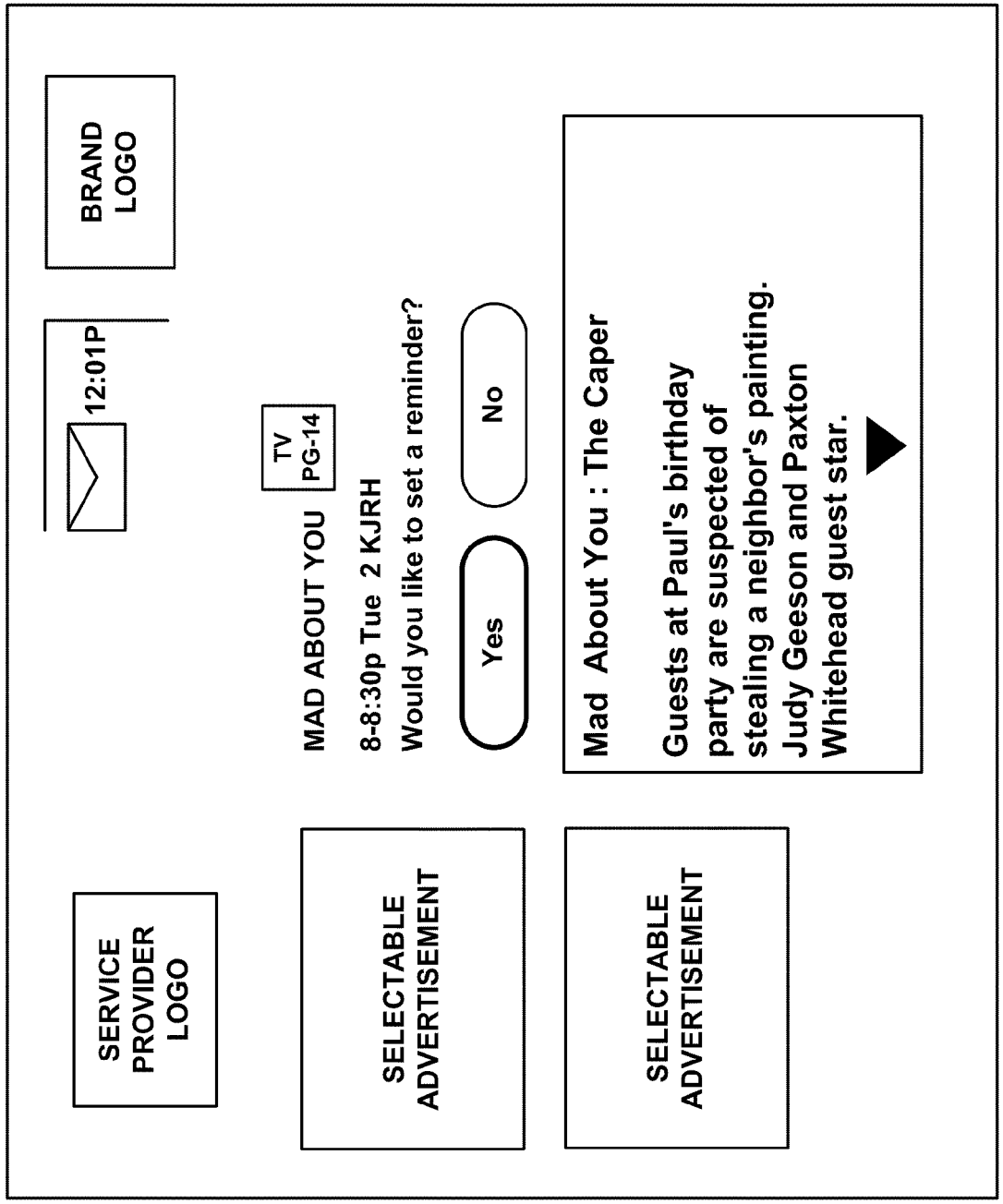
FIGS. 94-102 show illustrative program guide display screens for providing a user with access to program guide reminder functionality.
Figure 95:
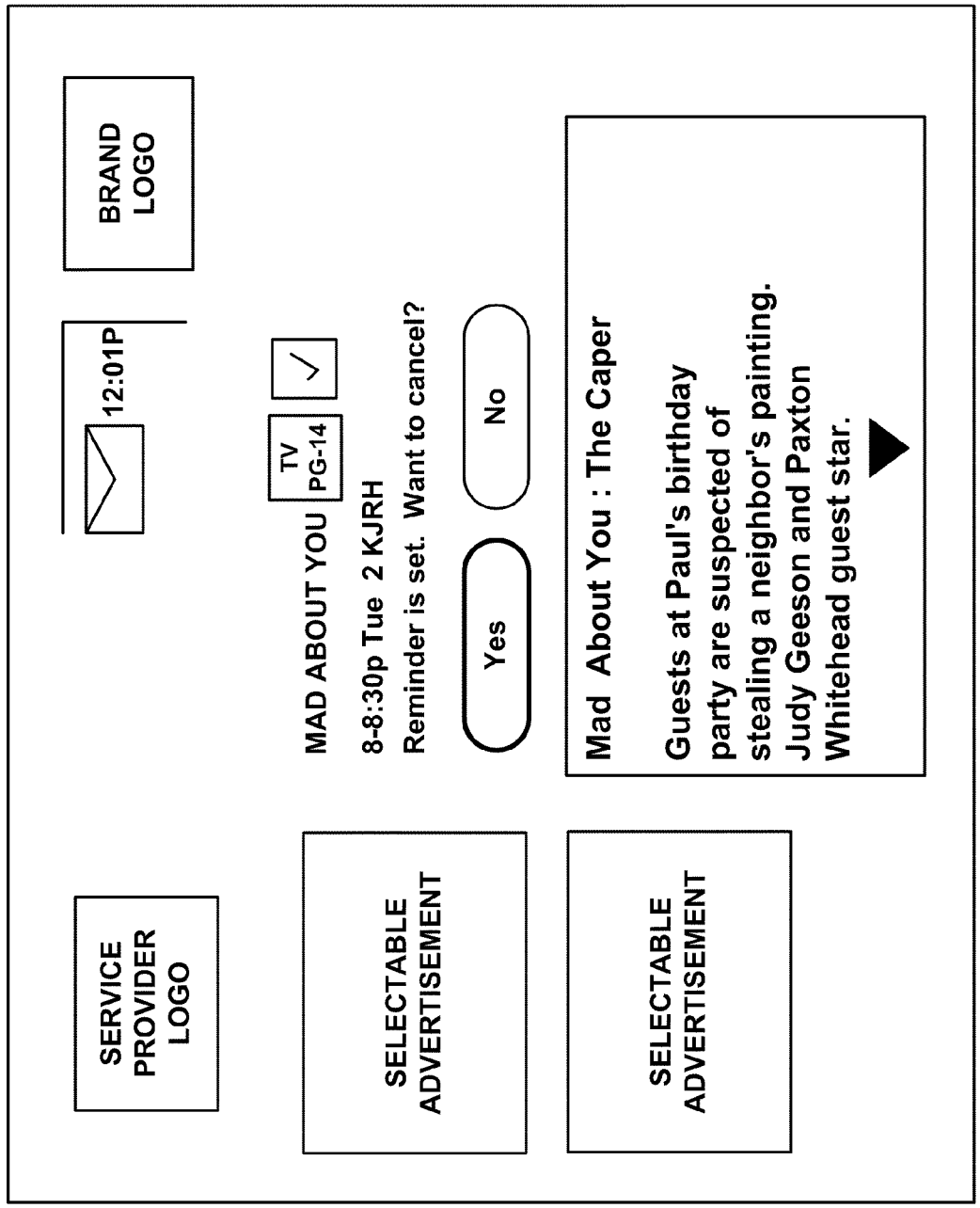
Figure 96:
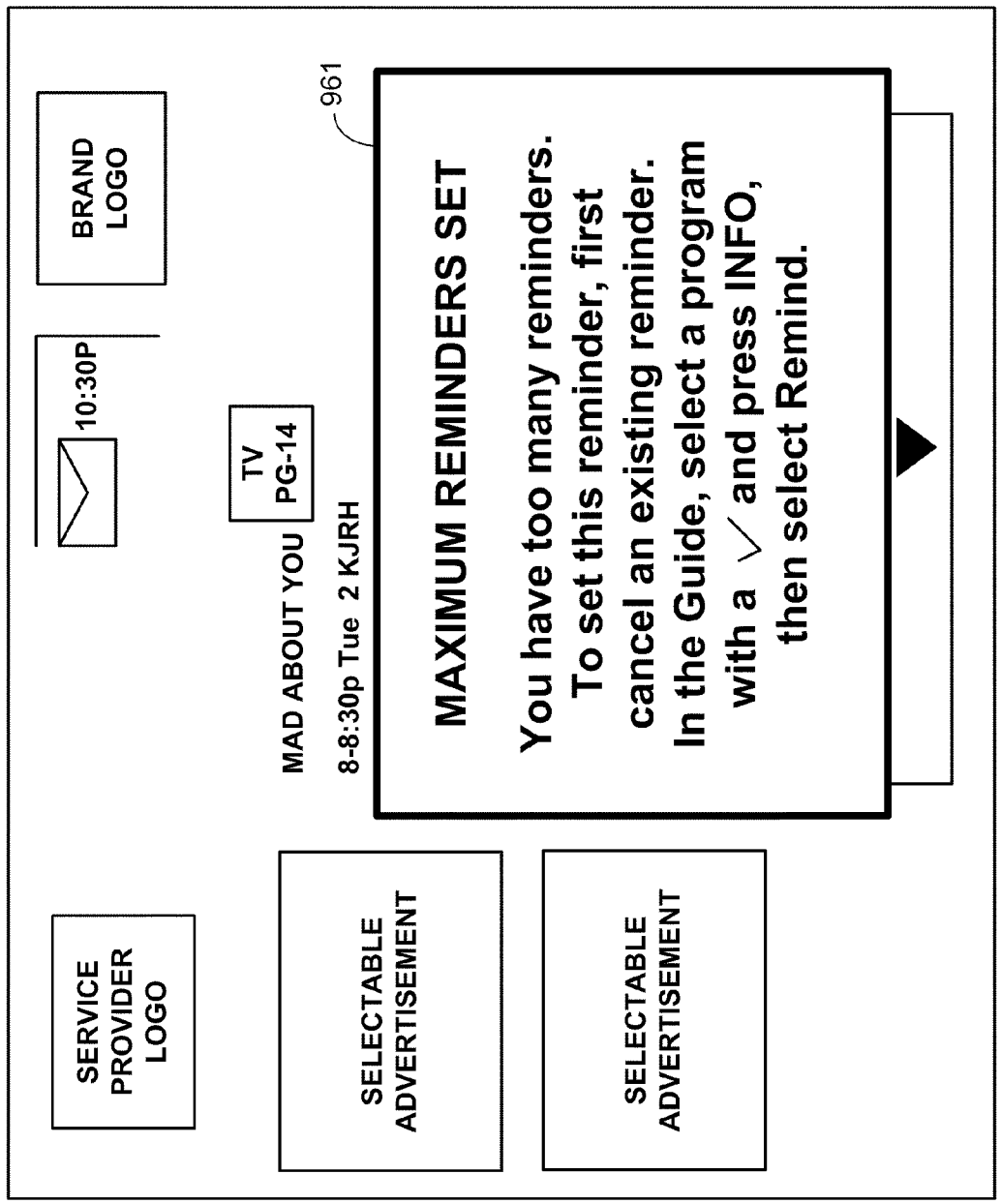

The program guide may set reminders for programs when a user indicates a desire to set a reminder by, for example, selecting an on-screen reminder feature. On-screen reminder features 695 are shown, for example, in FIGS. 69, 70a, and 74. When a user indicates a desire to set a reminder for a program from within a program information screen by selecting a reminder feature, the program guide may prompt a user to set the reminder as shown in FIG. 94. If a user selects a reminder feature when a reminder has already been set for a program, the guide may present the prompt shown in FIG. 95, thereby giving the user the opportunity to cancel the reminder. If desired or when system resources require, the program guide may limit the number of reminders a user can set. FIG. 96 shows illustrative overlay 961 that prompts a user to clear a reminder before adding another.

Figure 97:
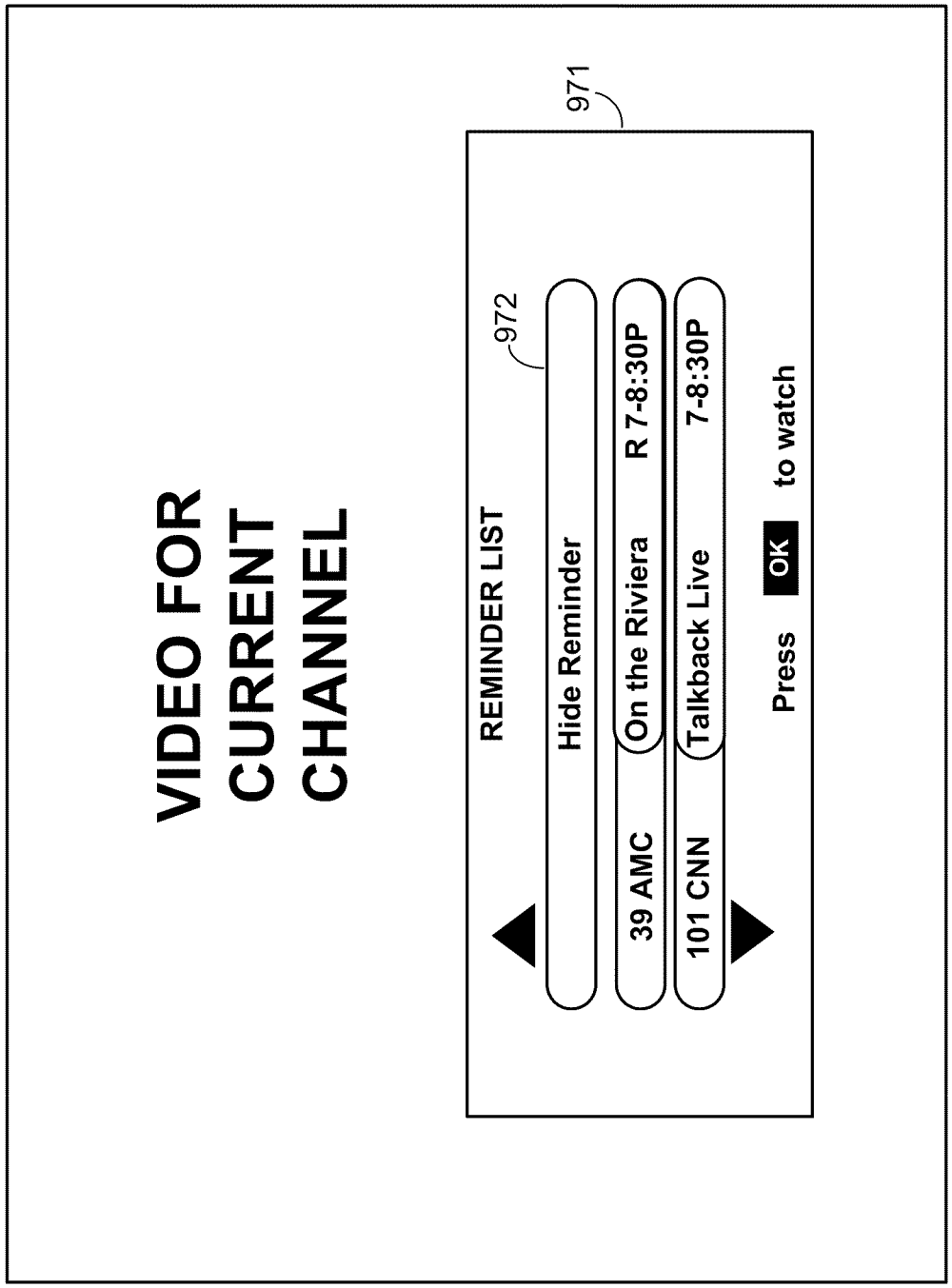
Figure 98:
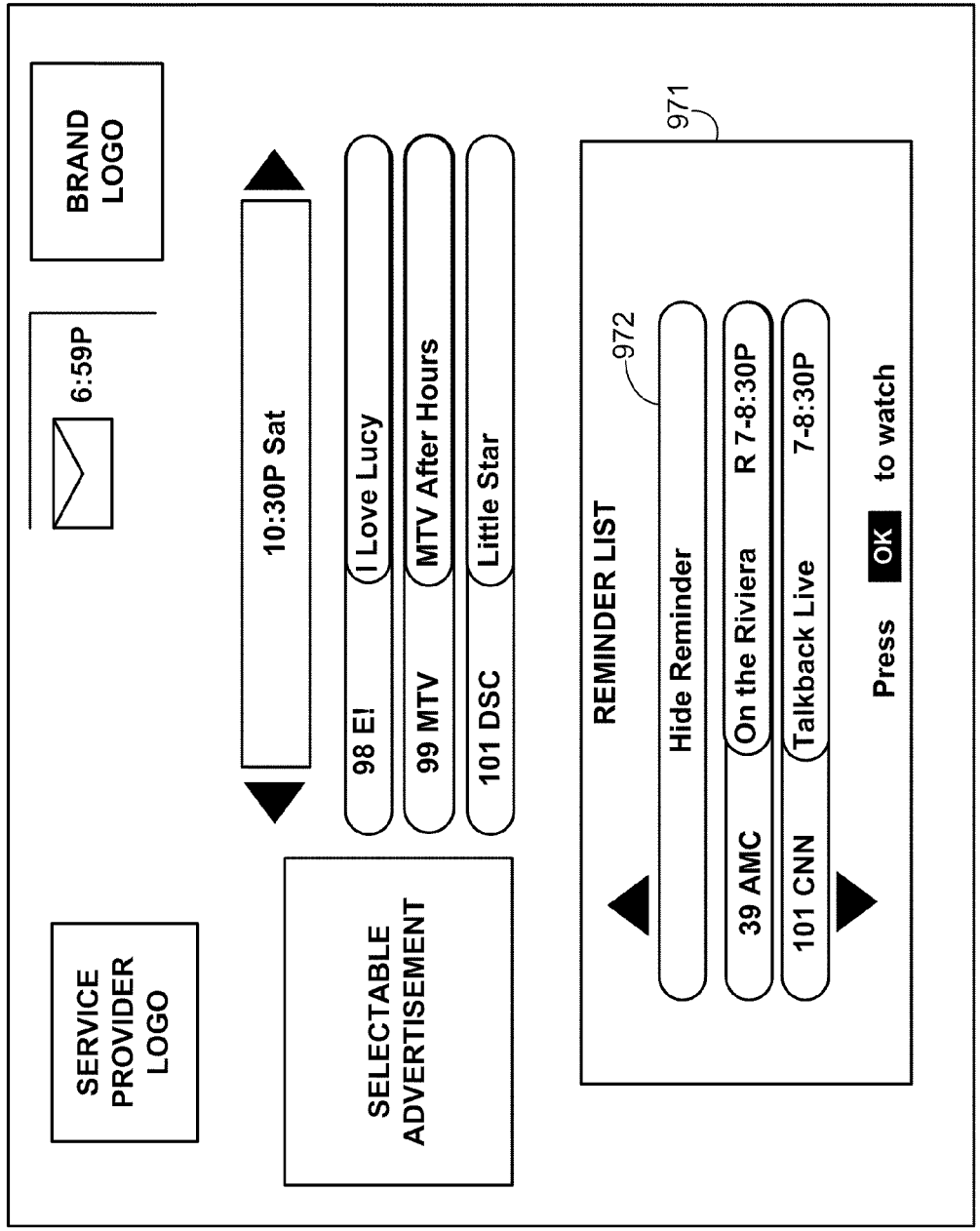

The program guide may remind a user that a program is airing at the time a program airs. In an alternative approach, the program guide may remind a user at some predetermined period of time before the program airs that a program is going to air. FIGS. 97 and 98 show illustrative program reminder lists 971. In FIG. 97, reminder list 971 is overlaid on top of the currently display television program to provide a user with the opportunity to view a reminder while still viewing a portion of the television program that a user is watching. In FIG. 98, reminder list 971 is shown overlaid on top of a program listings display screen. The program guide may provide a user with an opportunity to scroll through reminder list 971 by, for example, using remote control arrow keys. The program guide may hide the reminder list when, for example, a user selects hide reminder feature 972. The guide may also display reminder list 971 if, for example, the user presses an "OK" key at any time while watching TV.

Figure 99:
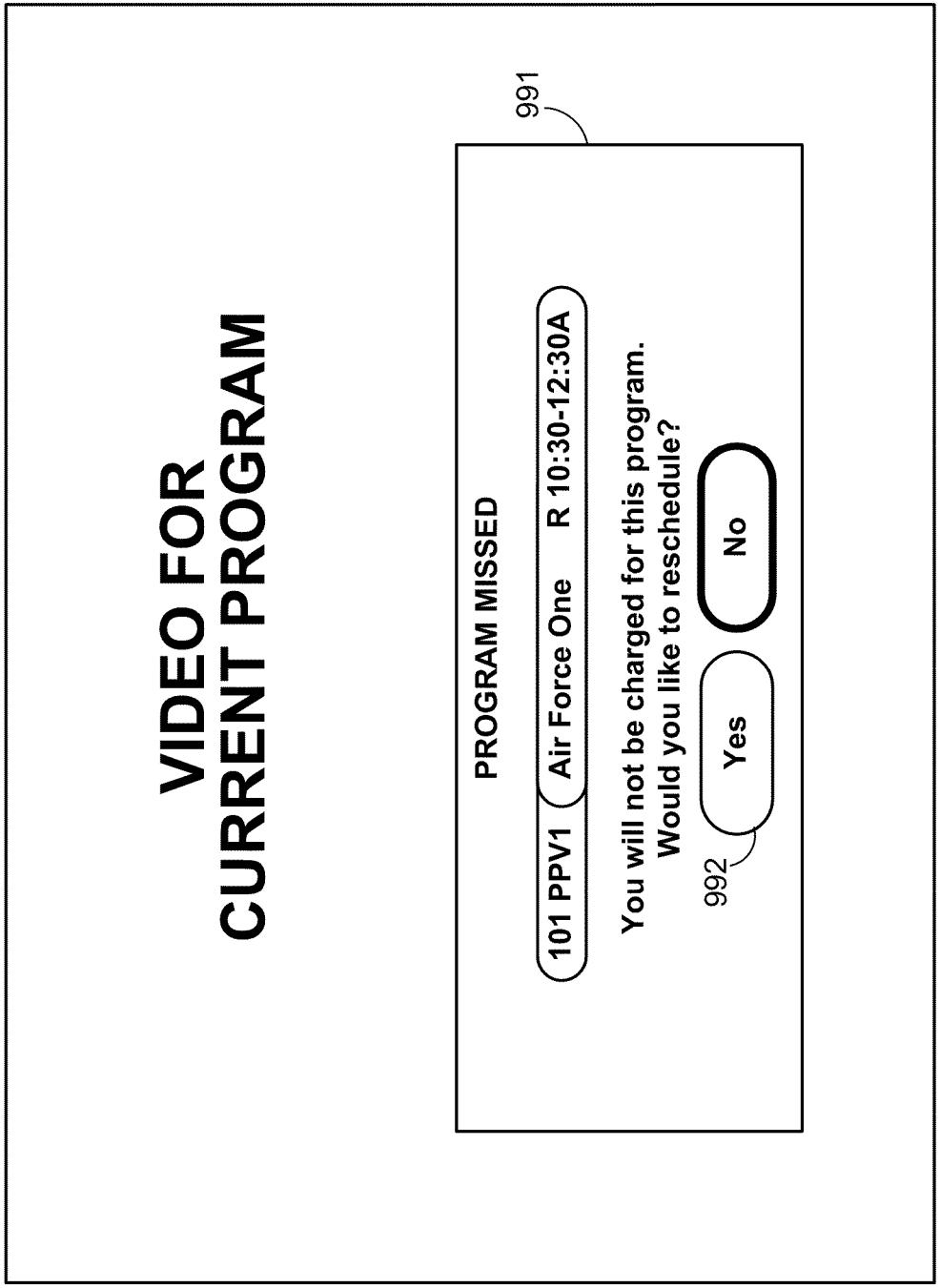
Figure 100:
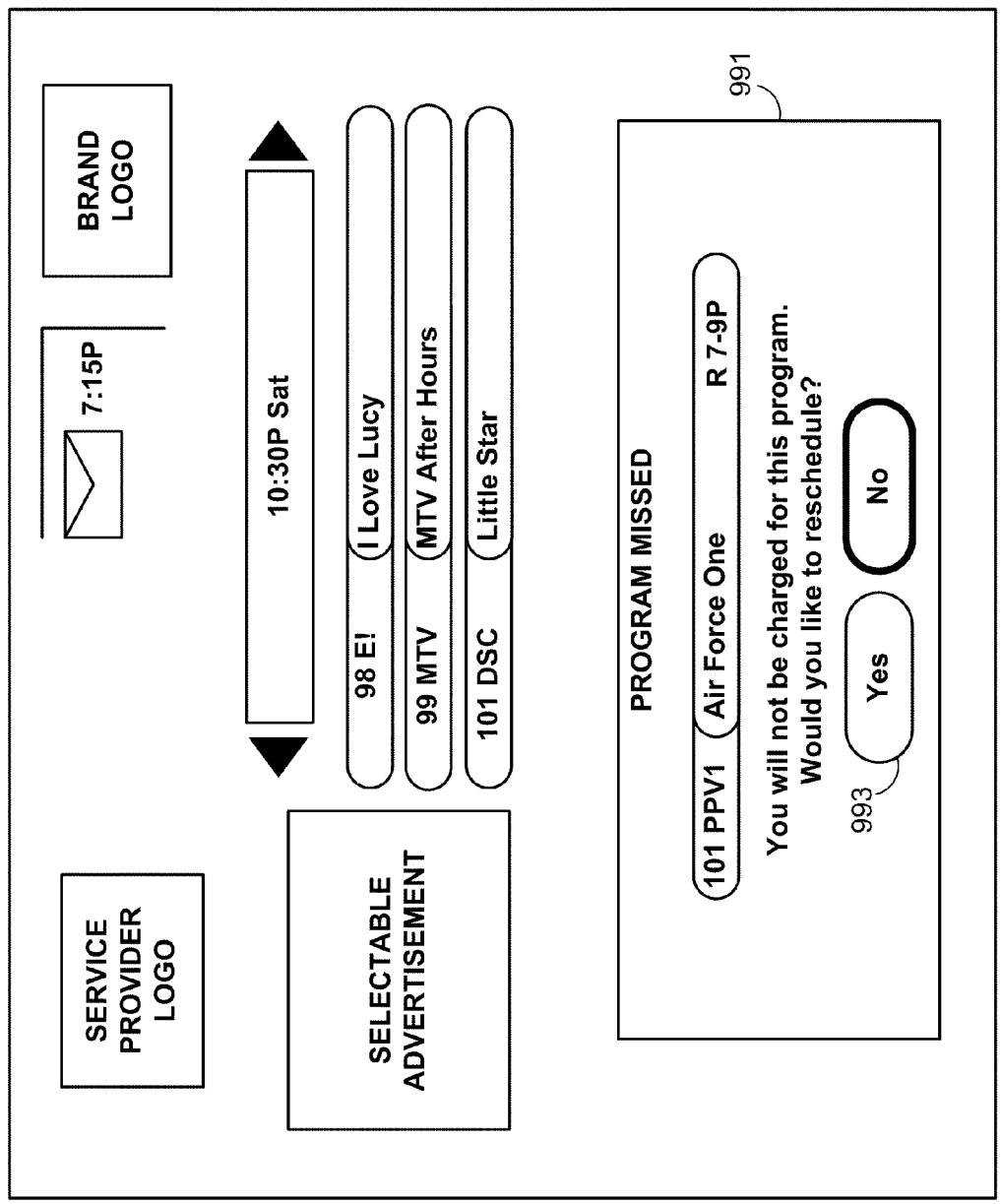

The program guide may also display reminders that indicate to a user that a user has missed an ordered pay-per-view program. The program guide may, for example, determine that a pay-per-view program started too long in the past and that the viewer never watched it. FIGS. 99 and 100 show illustrative overlay 991 overlaid on a television program and a program guide display screen, respectively that indicate to a user that a user has missed a pay-per-view program. Overlay 991 displays the missed pay-per-view program and prompts a user to indicate whether a user wishes to reschedule. A user may reschedule the missed program by, for example, selecting "Yes" button 993.

Figure 101:
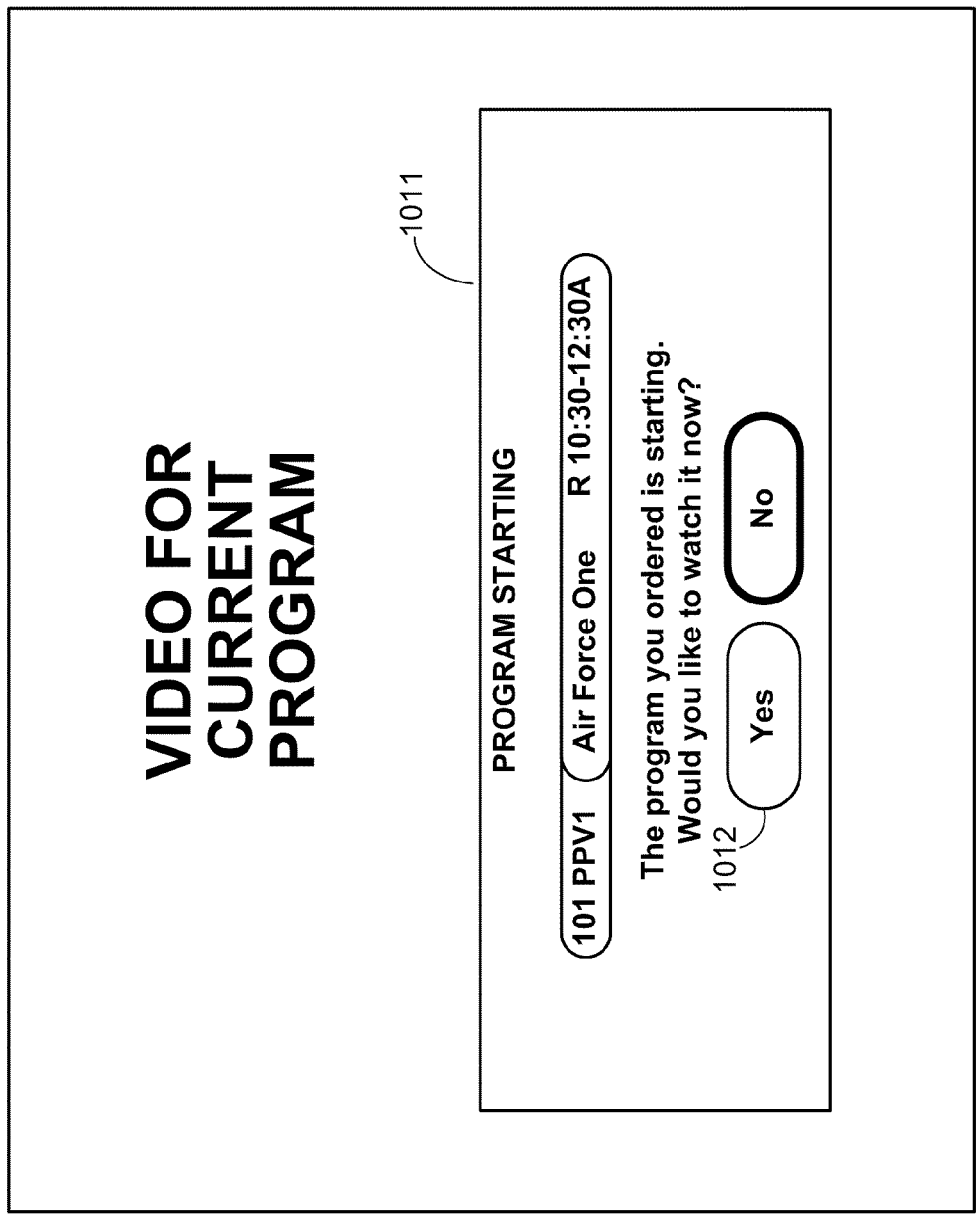
Figure 102:
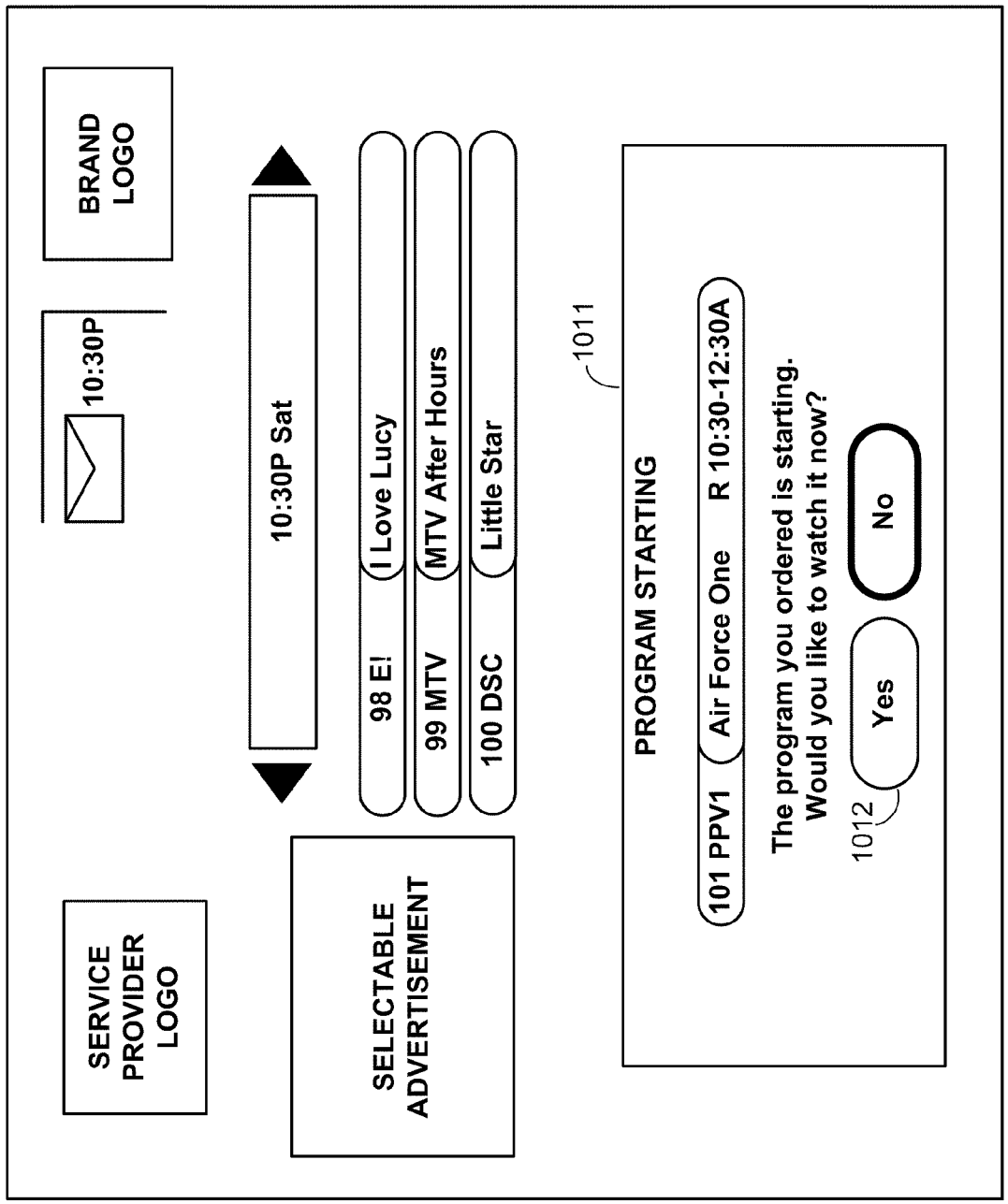

If the user ignores a reminder for a pay-per-view program, the program guide may display a reminder for when the ordered pay-per-view programs are starting. FIGS. 101 and 102 show illustrative overlays 1011 that indicate to a user that a pay-per-view program is starting. The program guide may overlay overlays 1011 over a television program or a program guide display screen as shown in FIGS. 101 and 102, respectively. Overlay 1011 displays the starting pay-per-view program and prompts a user to indicate whether a user wishes to tune to the program. A user may tune to the starting pay-per-view program by, for example, selecting "Yes" button 1012.

Figure 103:
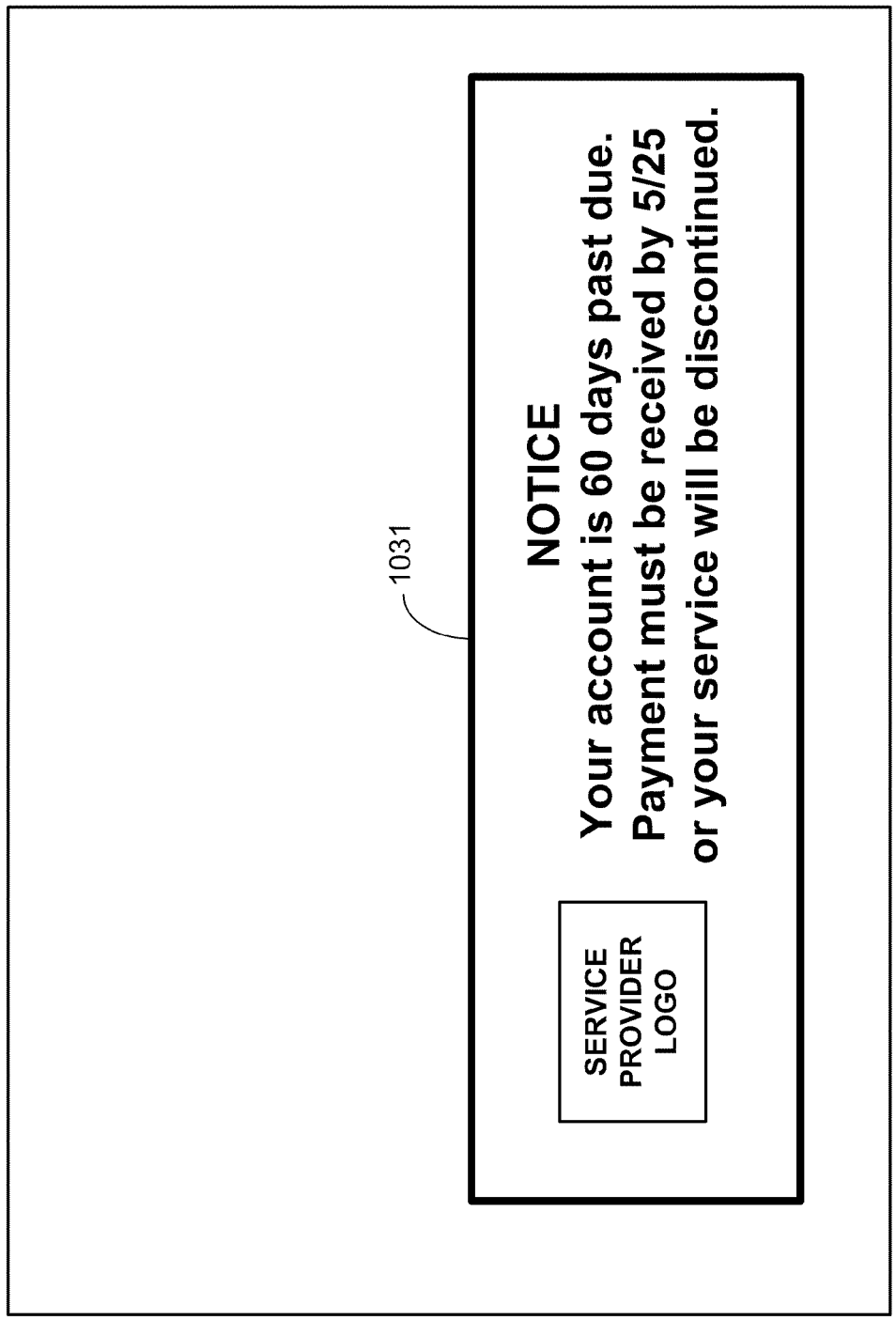
FIG. 103 shows an illustrative program guide display screen for providing a user with access to in-band messages provided by the system operator.

The program guide may also display overlays that indicate in-band messages sent by the operator of television distribution facility 16. FIG. 103, for example, shows overlay 1031 that indicates to a user that a user's account is past due. FIG. 29, for example, shows an illustrative overlay that indicates that a special pay-per-view promotion is being offered. The content of overlay 1031 (or the overlay of FIG. 29) is typically sent by an operator when the operator has a message that they want the user to see immediately. The content may also be preprogrammed into the program guide or may be downloaded as part of the program guide data.

Figure 104:
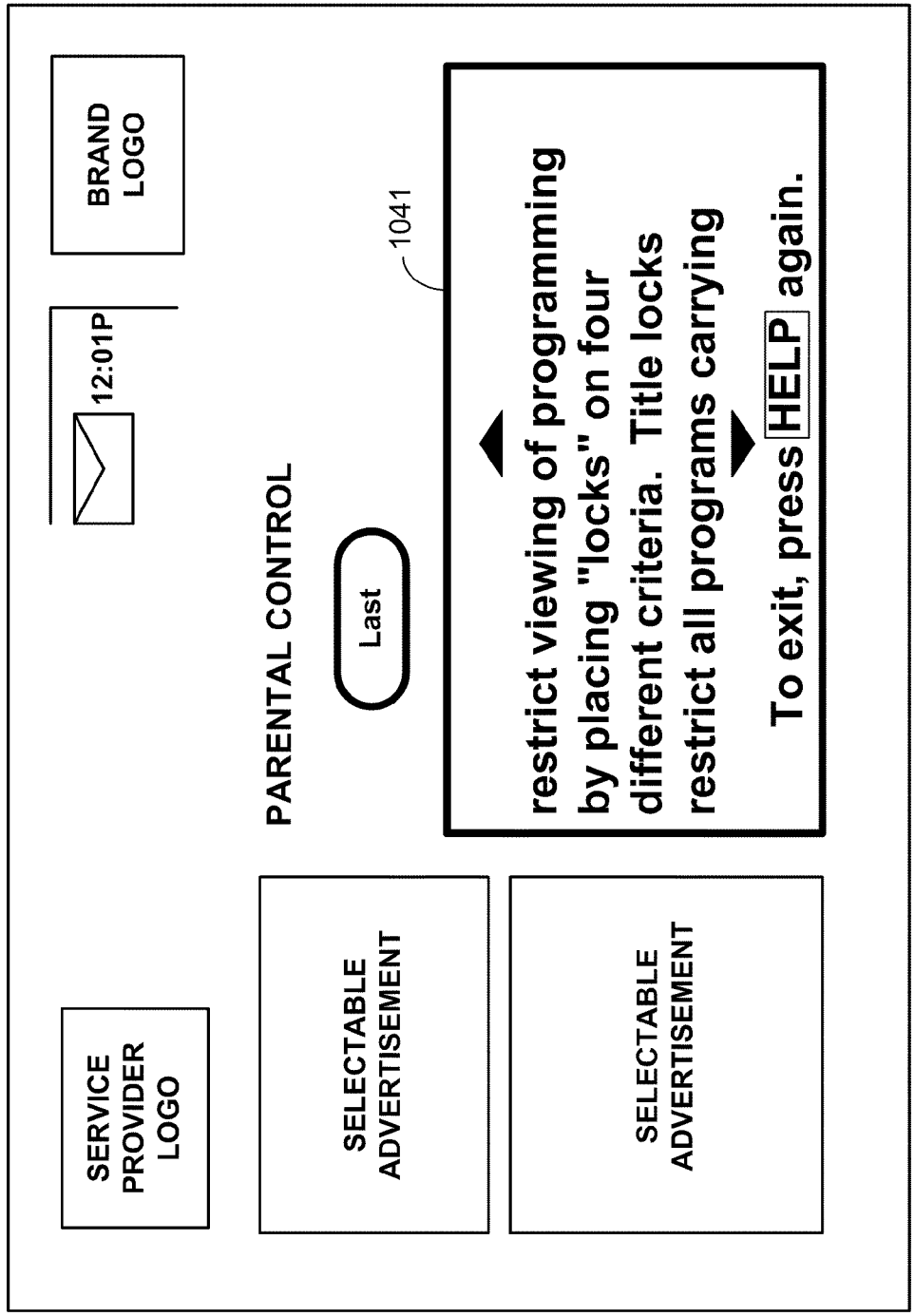
FIG. 104 shows an illustrative program guide display screen for providing a user with access to help information.

Users may forget how to access various features of the program guide. The program guide may provide users with the opportunity to view help text by, for example, pressing a "help" key on remote control 40. FIG. 104 shows an illustrative help overlay 1041 that may be displayed by the program guide to provide a user with help text. The content of overlay 1041 may be context sensitive thereby providing a user with help text for the program guide display screen currently being displayed by the program guide.

Figure 105:
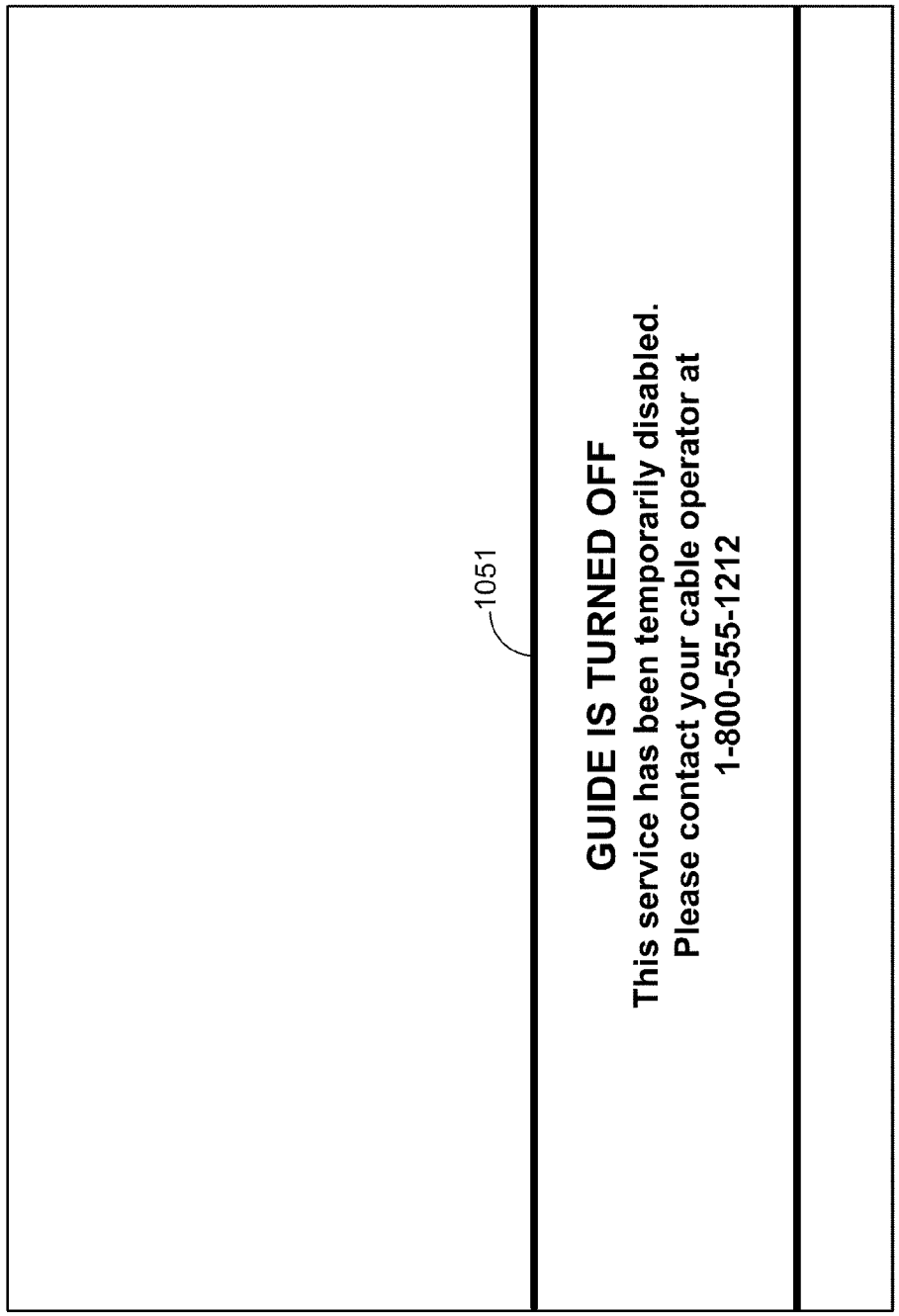
FIGS. 105 and 106 show illustrative banners or overlays for indicating to a user that the program guide has been deactivated by a main facility or other interested entity.
Figure 106:
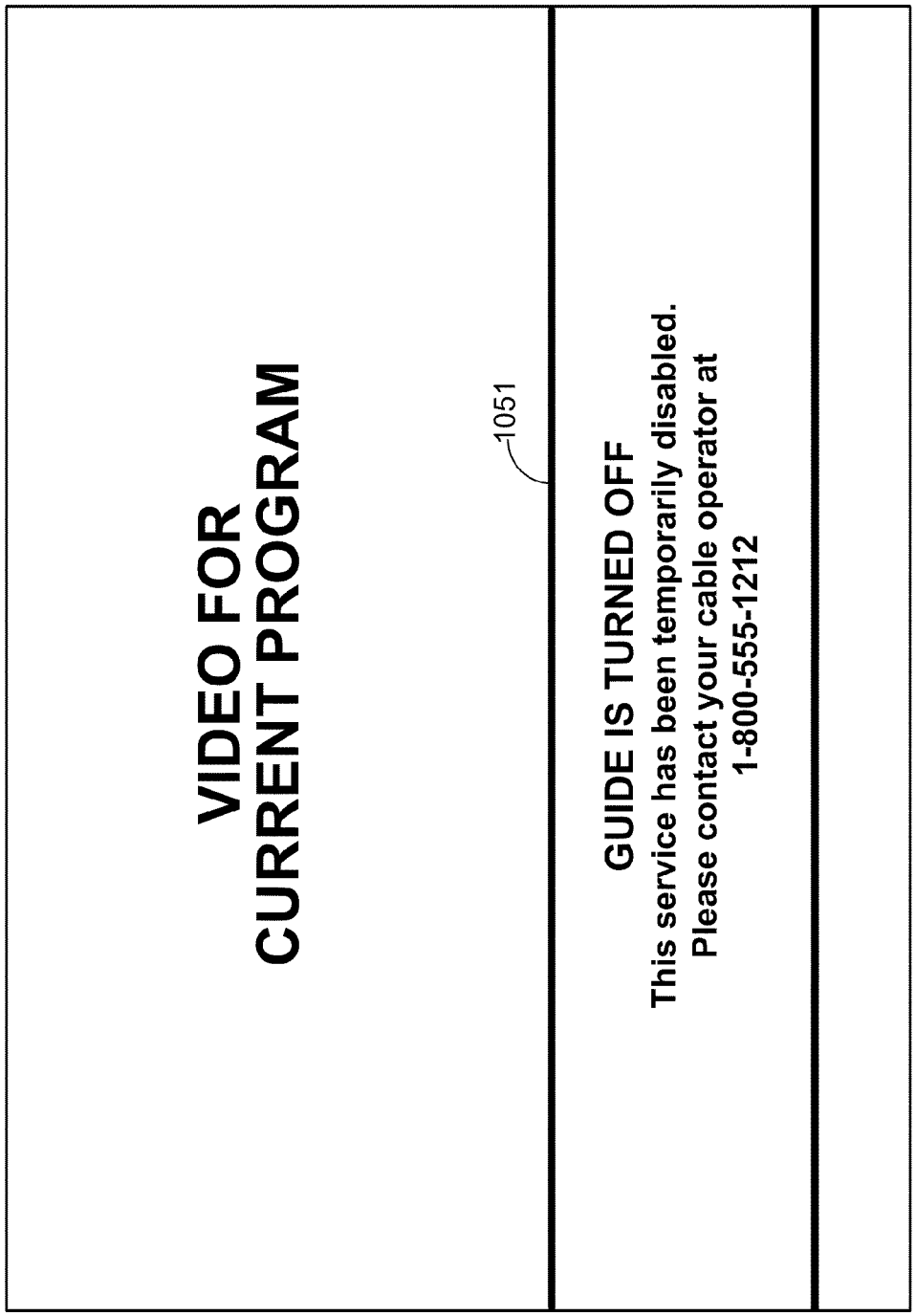

The program guide may be disabled by main facility 12 when, for example, an operator is not current with his or her account. FIGS. 105 and 106 show illustrative overlays 1051 that the program guide may display when it is disabled. FIG. 106 illustrates how television viewing may also be disabled if desired. FIG. 106 shows overlay 1051 overlaid on the video that a user is watching.

Figure 107:
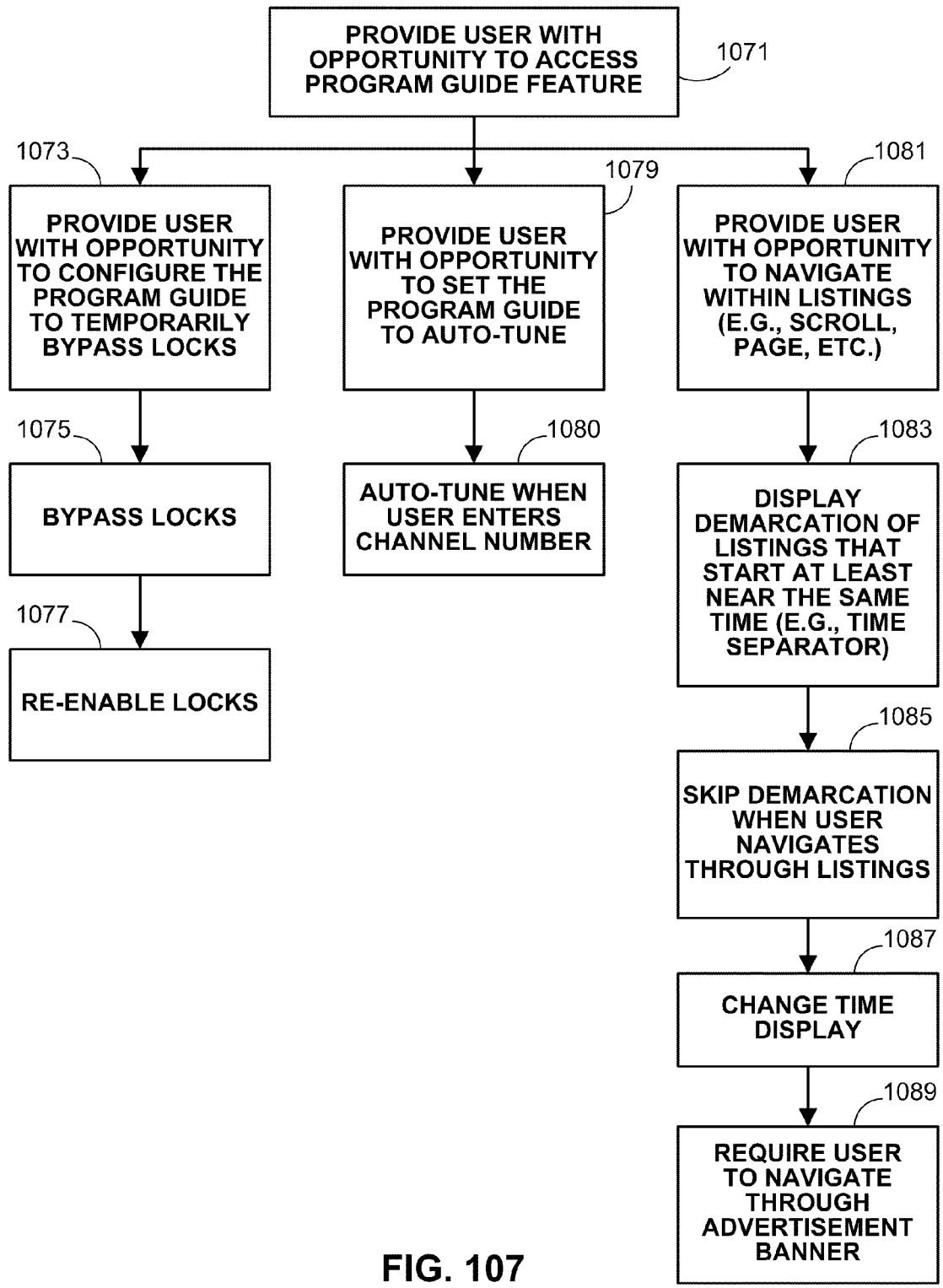
FIGS. 107 and 108 are flowcharts of illustrative steps involved in operating the program guide of the present invention.
Figure 108:
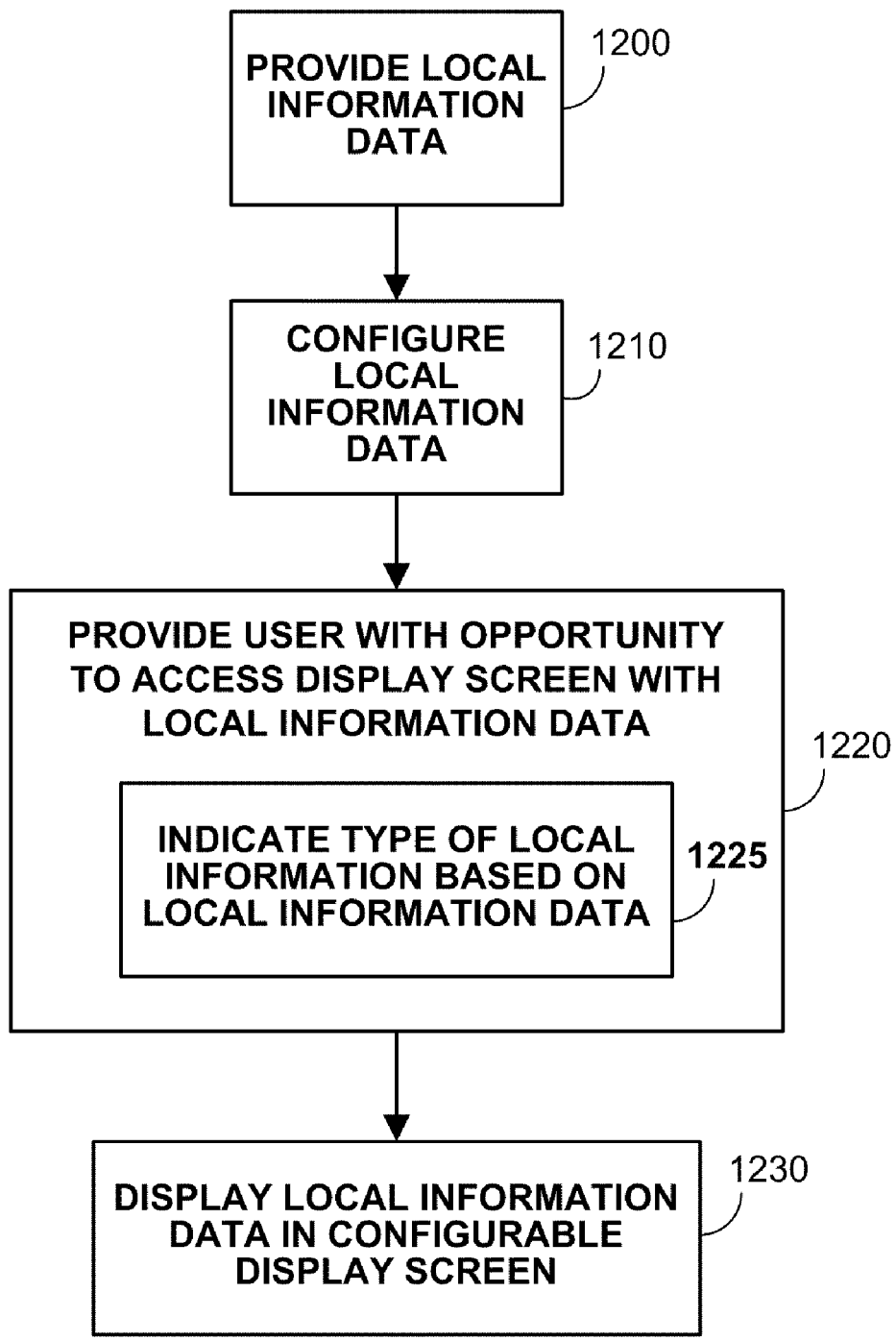

FIGS. 107 and 108 are illustrative flowcharts of steps involved in operating the program guide of the present invention. The steps shown in FIGS. 107 and 108 may be performed in any suitable order, and may be omitted if desired.

FIG. 107 shows illustrative steps involved in providing a user with an opportunity to access program guide features. At step 1071, the program guide provides a user with an opportunity to access a program guide feature by, for example, selecting a selectable feature 106 from main menu 102 of FIGS. 7, 18, and 34. When a user selects a "Setup" feature from main menu 102 for example, the program guide may provide a user with the opportunity to set parental control locks as discussed with respect to FIGS. 50-66. At step 1073, the program guide may provide a user with an opportunity to configure the guide to temporarily bypass locks. The guide may temporarily bypass (or disable) locks at step 1075. At step 1077, the program guide may reenable parental control locks because, for example, user television equipment 22 was reset.

The program guide may also provide a user with an opportunity to access a setup feature whereby a user may set the program guide to auto-tune when the user enters a channel number using, for example, remote control 40 of FIG. 3. At step 1079, the program guide provides a user with an opportunity to set the program guide to auto-tune. When the user sets the program guide to auto-tune, user television equipment 22 will tune to A channel that the user enters without requiring the user to enter three digits or to press "select" or "OK", on remote control 40.

The program guide may provide a user with an opportunity to navigate within program listings (step 1081). The user may, for example, scroll or page through listings that are displayed as part of a program listings screen. The program guide may display, within the listings, a demarcation (e.g., a separator) between listings that start at the same time or near the same time (step 1083). As the user navigates within listings, the program guide may skip the demarcation (step 1085), and require the user to navigate through an advertisement banner (step 1089), if desired. In by time screens, the guide may change the time bar display (or other suitable time display) to indicate that the user has changed time slots (step 1087). Users may change time slots by, for example, scrolling up or down until a new time slot is reached, or by arrowing left or right to quickly change time slots.

FIG. 108 is a flowchart of illustrative steps involved in providing a user with access to local information service data using the program guide. At step 1200, local information data is provided by program guide data source 14 by, for example, local information service 15 (FIG. 1). The local information data may be provided to main facility 12 or local television distribution facility 16. At step 1210, the local information data is configured so that it may be used by the program guide and may indicate to the program guide how display screens are to be configured. For example, the local information data may indicate that the program guide should use the format shown in FIG. 35c instead of FIG. 35a. In another suitable approach, the local information data may indicate to the program guide that a user should be provided an opportunity to access data from multiple information services as shown, for example, in FIG. 35b. The program guide provides a user with an opportunity to access a suitably configured display screen at step 1220.

Step 1220 may include indicating to the user the type of local information services available to the user based on the local information data (step 1225). For example, main facility 12 may configure the local information data to indicate to the program guide that the program guide is providing a user with access to local weather information. Accordingly, the program guide may display "Weather" as a selectable feature within main menu 102. At step 1230, the program guide displays the local information data in a suitable configured display screen.

The foregoing is merely illustrative of the principles of this invention and various modifications can be made by those skilled in the art without departing from the scope and spirit of the invention.

What is claimed is:

1. An interactive program guide system comprising:
   a program guide data source for providing program guide data comprising program listings; and
   an interactive program guide implemented on interactive program guide equipment having user equipment, the interactive program guide is configured to
      provide a user with an opportunity to configure the program guide to auto-tune channels when the user indicates a desire to change channels, and to configure the program guide to not change channels when the user enters channel numbers using less than a predefined number of digits; and display at least a portion of the program listings with the interactive program guide on the user equipment in a program guide display screen.

2. The system of claim 1, wherein the interactive program guide is further configured to:

provide the user with an opportunity to enter a predefined number of digits corresponding to desired channel numbers.

3. The system of claim 1, wherein the interactive program guide is further configured to:

provide the user with an opportunity to configure the program guide not to auto-tune channels when the user indicates a desire to change channels.

4. A method for use in an interactive program guide system comprising the steps of:

providing program guide data comprising program listings;

providing a user with an opportunity to configure an interactive program guide implemented on interactive program guide equipment having user equipment to auto-tune channels when the user indicates a desire to change channels, and to configure the program guide to not change channels when the user enters channel numbers using less than a predefined number of digits; and displaying at least a portion of the program listings with the interactive program guide on the user equipment in a program guide display screen.

5. The method of claim 4, wherein providing the user with an opportunity includes:

providing the user with an opportunity to enter a predefined number of digits corresponding to desired channel numbers.

6. The method of claim 5, further comprising:

providing the user with an opportunity to configure the program guide not to auto-tune channels when the user indicates a desire to change channels.

* * * * *